(12) United States Patent
Singh et al.

(10) Patent No.: US 10,811,154 B2
(45) Date of Patent: Oct. 20, 2020

(54) CONTAINER FOR RADIOACTIVE WASTE

(71) Applicant: HOLTEC INTERNATIONAL, Camden, NJ (US)

(72) Inventors: Krishna P. Singh, Hobe Sound, FL (US); John D. Griffiths, Deptford, NJ (US); Joseph A. Meckley, Marlton, NJ (US); Stephen J. Agace, Voorhees, NJ (US)

(73) Assignee: HOLTEC INTERNATIONAL, Camden, NJ (US)

( * ) Notice: Subject to any disclaimer, the term of this patent is extended or adjusted under 35 U.S.C. 154(b) by 175 days.

(21) Appl. No.: 16/029,786

(22) Filed: Jul. 9, 2018

(65) Prior Publication Data

US 2018/0322970 A1  Nov. 8, 2018

Related U.S. Application Data

(63) Continuation-in-part of application No. 14/358,032, filed as application No. PCT/US2012/065117 on
(Continued)

(51) Int. Cl.
*B23K 9/00* (2006.01)
*G21F 5/008* (2006.01)
(Continued)

(52) U.S. Cl.
CPC ............ *G21F 5/008* (2013.01); *B23K 9/0026* (2013.01); *G21F 5/005* (2013.01); *G21F 5/10* (2013.01);
(Continued)

(58) Field of Classification Search
CPC ... G21F 5/008; G21F 5/10; G21F 5/12; G21F 9/36; G21F 5/005; G21F 9/34; B23K 9/0026; B23K 2101/04–125
(Continued)

(56) References Cited

U.S. PATENT DOCUMENTS 1,978,610 A * 10/1934 Straty .................. F16L 41/084
285/288.1
2,040,370 A * 5/1936 Reuen ...................... C21D 1/70
148/625
(Continued)

FOREIGN PATENT DOCUMENTS

| CN | 1345452 | 4/2002 |
| DE | 2821780 | 11/1979 |

(Continued)

OTHER PUBLICATIONS

International Atomic Energy Agency, "Multi-purpose container technologies for spent fuel management," Dec. 2000 (IAEA-TECDOC-1192) pp. 1-49.
(Continued)

*Primary Examiner* — Kiley S Stoner
(74) *Attorney, Agent, or Firm* — The Belles Group, P.C.

(57) ABSTRACT

A method of forming a sealed canister and a method of storing radioactive materials is provided. The method of forming includes placing a top plate on a top opening of a side wall, a bottom of the side wall being sealed to a base plate. The top plate includes a top surface with a top edge having a bevel and with a channel set in from the top edge. Finally, a weld is formed between the beveled top edge and the top opening of the side wall to seal the top plate to the side wall.

11 Claims, 70 Drawing Sheets

Related U.S. Application Data

Nov. 14, 2012, now Pat. No. 10,049,777, application No. 16/029,786, which is a continuation-in-part of application No. 15/370,877, filed on Dec. 6, 2016, now Pat. No. 10,217,537, which is a continuation of application No. 15/053,608, filed on Feb. 25, 2016, now Pat. No. 9,514,853, which is a continuation-in-part of application No. 14/534,391, filed on Nov. 6, 2014, now Pat. No. 9,293,229, which is a continuation of application No. 13/208,915, filed on Aug. 12, 2011, now Pat. No. 8,905,259, said application No. 15/053,608 is a continuation-in-part of application No. 14/394,233, filed as application No. PCT/US2013/036592 on Apr. 15, 2013, now Pat. No. 9,396,824, said application No. 15/053,608 is a continuation-in-part of application No. 14/395,790, filed as application No. PCT/US2013/037228 on Apr. 18, 2013, now Pat. No. 9,831,005, said application No. 15/053,608 is a continuation-in-part of application No. 14/424,201, filed as application No. PCT/US2013/057855 on Sep. 3, 2013, now Pat. No. 9,442,037, said application No. 15/053,608 is a continuation-in-part of application No. 14/655,860, filed as application No. PCT/US2013/077852 on Dec. 26, 2013, now Pat. No. 9,779,843, said application No. 15/053,608 is a continuation-in-part of application No. 14/762,874, filed as application No. PCT/US2014/013185 on Jan. 27, 2014, now Pat. No. 9,466,400.

(60) Provisional application No. 61/559,251, filed on Nov. 14, 2011, provisional application No. 61/373,138, filed on Aug. 12, 2010, provisional application No. 61/624,066, filed on Apr. 13, 2012, provisional application No. 61/625,869, filed on Apr. 18, 2012, provisional application No. 61/695,837, filed on Aug. 31, 2012, provisional application No. 61/746,094, filed on Dec. 26, 2012, provisional application No. 61/756,787, filed on Jan. 25, 2013, provisional application No. 61/902,559, filed on Nov. 11, 2013.

(51) Int. Cl.

| | |
|---|---|
| *G21F 9/34* | (2006.01) |
| *G21F 5/005* | (2006.01) |
| *G21F 9/36* | (2006.01) |
| *G21F 5/12* | (2006.01) |
| *G21F 5/10* | (2006.01) |
| *B23K 101/12* | (2006.01) |

(52) U.S. Cl.
CPC .................. *G21F 5/12* (2013.01); *G21F 9/34* (2013.01); *G21F 9/36* (2013.01); *B23K 2101/12* (2018.08); *B23K 2101/125* (2018.08)

(58) Field of Classification Search
USPC .................................. 228/131, 174, 184, 104
See application file for complete search history.

(56) References Cited

U.S. PATENT DOCUMENTS

| | | | | |
|---|---|---|---|---|
| 2,173,759 | A | * | 9/1939 | McCloskey ............ B21D 41/04 72/69 |
| 2,412,169 | A | * | 12/1946 | O'Neil .................... B65D 7/36 220/363 |
| 2,630,936 | A | * | 3/1953 | Freygang ................ F17C 13/06 220/583 |
| 3,101,532 | A | * | 8/1963 | Christensen ......... B23K 33/004 228/187 |
| 3,111,078 | A | | 11/1963 | Breckenridge |
| 3,111,586 | A | | 11/1963 | Rogers |
| 3,448,859 | A | | 6/1969 | Barker et al. |
| 3,487,756 | A | * | 1/1970 | Glaza ..................... E01C 9/083 404/38 |
| 3,629,062 | A | | 12/1971 | Muenchow |
| 3,739,451 | A | | 6/1973 | Jacobson |
| 3,745,707 | A | | 7/1973 | Herr |
| 3,755,079 | A | | 8/1973 | Soodak et al. |
| 3,765,549 | A | | 10/1973 | Jones |
| 3,800,973 | A | | 4/1974 | Weaver |
| 3,836,267 | A | | 9/1974 | Schatz |
| 3,910,006 | A | | 10/1975 | James |
| 3,917,953 | A | | 11/1975 | Wodrich |
| 3,935,062 | A | | 1/1976 | Keller et al. |
| 3,945,509 | A | | 3/1976 | Weems |
| 3,962,587 | A | | 6/1976 | Dufrane et al. |
| 3,963,052 | A | * | 6/1976 | Mercier .................... F15B 1/14 138/30 |
| 3,984,942 | A | | 10/1976 | Schroth |
| 4,055,508 | A | | 10/1977 | Yoli et al. |
| 4,078,968 | A | | 3/1978 | Golden et al. |
| 4,158,599 | A | | 6/1979 | Andrews et al. |
| 4,192,350 | A | * | 3/1980 | Mercier .................... F15B 1/14 138/30 |
| 4,278,892 | A | | 7/1981 | Baatz et al. |
| 4,288,698 | A | | 9/1981 | Baatz et al. |
| 4,289,987 | A | * | 9/1981 | Russell ................. H01L 41/125 310/26 |
| 4,336,460 | A | | 6/1982 | Best et al. |
| 4,355,000 | A | | 10/1982 | Lumelleau |
| 4,356,146 | A | | 10/1982 | Knappe et al. |
| 4,366,095 | A | | 12/1982 | Takats et al. |
| 4,377,509 | A | | 3/1983 | Haynes et al. |
| 4,388,273 | A | | 6/1983 | Graf, Jr. et al. |
| 4,394,022 | A | | 7/1983 | Gilmore |
| 4,450,134 | A | | 5/1984 | Soot et al. |
| 4,498,011 | A | | 2/1985 | Dyck et al. |
| 1,525,324 | A | | 6/1985 | Spilker et al. |
| 4,526,344 | A | | 7/1985 | Oswald et al. |
| 4,527,066 | A | | 7/1985 | Dyck et al. |
| 4,532,104 | A | | 7/1985 | Wearden et al. |
| 4,532,428 | A | | 7/1985 | Dyck et al. |
| 4,582,638 | A | | 4/1986 | Homer et al. |
| 4,585,611 | A | | 4/1986 | Perl |
| 4,623,510 | A | | 11/1986 | Troy |
| 4,634,875 | A | * | 1/1987 | Kugeler .................... G21F 9/34 250/506.1 |
| 4,635,477 | A | | 1/1987 | Simon |
| 4,649,018 | A | | 3/1987 | Waltersdorf et al. |
| 4,663,533 | A | | 5/1987 | Kok et al. |
| 4,666,659 | A | | 5/1987 | Lusk et al. |
| 4,671,326 | A | | 6/1987 | Wilhelm et al. |
| 4,683,533 | A | | 7/1987 | Shiozaki et al. |
| 4,690,795 | A | | 9/1987 | Hardin et al. |
| 4,730,663 | A | | 3/1988 | Voelkl et al. |
| 4,764,333 | A | | 8/1988 | Minshall et al. |
| 4,765,525 | A | * | 8/1988 | Popp ..................... B23K 9/0213 228/9 |
| 4,780,269 | A | | 10/1988 | Fischer et al. |
| 4,800,062 | A | | 1/1989 | Craig et al. |
| 4,834,916 | A | | 5/1989 | Chaudon et al. |
| 4,847,009 | A | | 7/1989 | Madle et al. |
| 4,851,183 | A | | 7/1989 | Hampel |
| 4,893,022 | A | | 1/1990 | Hall et al. |
| 4,971,752 | A | | 11/1990 | Parker |
| 5,102,615 | A | | 4/1992 | Grande et al. |
| 5,161,413 | A | * | 11/1992 | Junker .................. G01N 29/223 73/634 |
| 5,182,076 | A | | 1/1993 | De Seroux et al. |
| 5,205,966 | A | | 4/1993 | Elmaleh |
| 5,267,280 | A | | 11/1993 | Duquesne |
| 5,297,917 | A | | 3/1994 | Freneix |
| 5,307,388 | A | | 4/1994 | Inkester et al. |
| 5,319,686 | A | | 6/1994 | Pizzano et al. |
| 5,387,741 | A | | 2/1995 | Shuttle |

(56) References Cited

U.S. PATENT DOCUMENTS

| | | | |
|---|---|---|---|
| 5,442,186 A * | 8/1995 | Walker | G21F 5/015 |
| | | | 250/506.1 |
| 5,469,936 A | 11/1995 | Lauga et al. | |
| 5,513,231 A | 4/1996 | Jones et al. | |
| 5,513,232 A | 4/1996 | Jones et al. | |
| 5,546,436 A | 8/1996 | Jones et al. | |
| 5,564,498 A | 10/1996 | Bochard | |
| 5,633,904 A | 5/1997 | Gilligan, III et al. | |
| 5,641,970 A | 6/1997 | Taniuchi et al. | |
| 5,646,971 A | 7/1997 | Howie | |
| 5,661,768 A | 8/1997 | Gilligan, III et al. | |
| 5,685,449 A * | 11/1997 | Oblak | B65D 7/36 |
| | | | 220/310.1 |
| 5,753,925 A | 5/1998 | Yamanaka et al. | |
| 5,771,265 A | 6/1998 | Montazer | |
| 5,786,611 A | 7/1998 | Quapp et al. | |
| 5,852,643 A | 12/1998 | Copson | |
| 5,862,195 A | 1/1999 | Peterson | |
| 5,898,747 A | 4/1999 | Singh | |
| 5,926,602 A | 7/1999 | Okura | |
| 6,064,710 A | 5/2000 | Singh | |
| 6,064,711 A | 5/2000 | Copson | |
| 6,074,771 A | 6/2000 | Cubukcu et al. | |
| 6,252,923 B1 | 6/2001 | Iacovino et al. | |
| 6,452,994 B2 | 9/2002 | Pennington | |
| 6,489,623 B1 | 12/2002 | Peters et al. | |
| 6,519,307 B1 | 2/2003 | Singh et al. | |
| 6,519,308 B1 | 2/2003 | Boardman | |
| 6,718,000 B2 | 4/2004 | Singh et al. | |
| 6,793,450 B2 | 9/2004 | Singh et al. | |
| 6,853,697 B2 | 2/2005 | Singh et al. | |
| 6,873,673 B2 | 3/2005 | Georgii | |
| 7,068,748 B2 | 6/2006 | Singh | |
| 7,294,375 B2 | 11/2007 | Taniuchi et al. | |
| 7,590,213 B1 | 9/2009 | Singh | |
| 7,933,374 B2 * | 4/2011 | Singh | G21F 5/002 |
| | | | 376/272 |
| 8,042,598 B2 * | 10/2011 | Bredemus | E06B 9/52 |
| | | | 160/371 |
| 8,351,562 B2 | 1/2013 | Singh | |
| 8,798,224 B2 | 8/2014 | Singh | |
| 2003/0028065 A1 | 2/2003 | Matsunaga | |
| 2003/0144568 A1 | 7/2003 | Singh et al. | |
| 2003/0147486 A1 | 8/2003 | Singh et al. | |
| 2003/0147730 A1 | 8/2003 | Singh et al. | |
| 2003/0194042 A1 | 10/2003 | Singh et al. | |
| 2004/0109523 A1 | 6/2004 | Singh et al. | |
| 2004/0175259 A1 | 9/2004 | Singh et al. | |
| 2005/0008462 A1 | 1/2005 | Singh et al. | |
| 2005/0066541 A1 | 3/2005 | Singh et al. | |
| 2005/0207525 A1 * | 9/2005 | Singh | G21F 5/00 |
| | | | 376/272 |
| 2005/0207535 A1 | 9/2005 | Alving et al. | |
| 2005/0220256 A1 | 10/2005 | Singh | |
| 2005/0220257 A1 | 10/2005 | Singh | |
| 2006/0215803 A1 | 9/2006 | Singh | |
| 2006/0251201 A1 | 11/2006 | Singh | |
| 2006/0272175 A1 | 12/2006 | Singh | |
| 2006/0288607 A1 | 12/2006 | Singh | |
| 2007/0003000 A1 | 1/2007 | Singh et al. | |
| 2008/0017644 A1 | 1/2008 | Wickland et al. | |
| 2008/0031396 A1 | 2/2008 | Singh et al. | |
| 2008/0031397 A1 | 2/2008 | Singh et al. | |
| 2008/0056935 A1 | 3/2008 | Singh | |
| 2008/0069291 A1 | 3/2008 | Singh et al. | |
| 2008/0076953 A1 | 3/2008 | Singh et al. | |
| 2008/0084958 A1 | 4/2008 | Singh et al. | |
| 2008/0260088 A1 | 10/2008 | Singh et al. | |
| 2008/0265182 A1 * | 10/2008 | Singh | G21F 5/10 |
| | | | 250/506.1 |
| 2008/0314570 A1 | 12/2008 | Singh et al. | |
| 2009/0069621 A1 | 3/2009 | Singh et al. | |
| 2009/0158614 A1 | 6/2009 | Singh et al. | |
| 2009/0159550 A1 | 6/2009 | Singh et al. | |
| 2009/0175404 A1 | 7/2009 | Singh et al. | |
| 2009/0198092 A1 | 8/2009 | Singh et al. | |
| 2009/0252274 A1 | 10/2009 | Singh | |
| 2010/0027733 A1 | 2/2010 | Cantonwine et al. | |
| 2010/0150297 A1 | 6/2010 | Singh | |
| 2010/0212182 A1 | 8/2010 | Singh | |
| 2010/0232563 A1 | 9/2010 | Singh et al. | |
| 2010/0272225 A1 | 10/2010 | Singh | |
| 2010/0282448 A1 | 11/2010 | Singh et al. | |
| 2010/0282451 A1 | 11/2010 | Singh et al. | |
| 2010/0284506 A1 * | 11/2010 | Singh | G21C 19/06 |
| | | | 376/272 |
| 2011/0021859 A1 | 1/2011 | Singh | |
| 2011/0033019 A1 | 2/2011 | Rosenbaum et al. | |
| 2011/0150164 A1 | 6/2011 | Singh et al. | |
| 2011/0172484 A1 | 7/2011 | Singh et al. | |
| 2011/0255647 A1 | 10/2011 | Singh | |
| 2011/0286567 A1 | 11/2011 | Singh et al. | |
| 2012/0037632 A1 | 2/2012 | Singh et al. | |
| 2012/0083644 A1 | 4/2012 | Singh et al. | |
| 2012/0142991 A1 | 6/2012 | Singh et al. | |
| 2012/0226088 A1 | 9/2012 | Singh et al. | |
| 2012/0267377 A1 * | 10/2012 | Mueller | F15B 1/04 |
| | | | 220/586 |
| 2012/0294737 A1 | 11/2012 | Singh et al. | |
| 2012/0306172 A1 | 12/2012 | Singh | |
| 2012/0307956 A1 | 12/2012 | Singh et al. | |
| 2013/0070885 A1 | 3/2013 | Singh et al. | |
| 2013/0163710 A1 | 6/2013 | Singh | |
| 2014/0047733 A1 | 2/2014 | Singh et al. | |
| 2014/0105347 A1 | 4/2014 | Singh et al. | |
| 2014/0247916 A1 | 9/2014 | Singh | |

FOREIGN PATENT DOCUMENTS

| | | | |
|---|---|---|---|
| DE | 3107158 | 1/1983 | |
| DE | 3144113 | 5/1983 | |
| DE | 3151475 | 5/1983 | |
| DE | 3404666 | 8/1985 | |
| DE | 3515871 | 11/1986 | |
| DE | 19529357 | 2/1997 | |
| EP | 0253730 | 1/1988 | |
| EP | 1061011 | 12/2000 | |
| EP | 1312874 | 5/2003 | |
| EP | 2853813 A1 * | 4/2015 | F23D 14/58 |
| FR | 2434463 | 3/1980 | |
| GB | 2295484 | 5/1996 | |
| GB | 2327722 | 2/1999 | |
| GB | 2337722 | 12/1999 | |
| JP | 59193000 | 11/1984 | |
| JP | 62185199 | 8/1987 | |
| JP | 10297678 | 11/1998 | |
| JP | 2001056392 | 2/2001 | |
| JP | 2001141891 | 5/2001 | |
| JP | 2001264483 | 9/2001 | |
| JP | 2003207597 | 7/2003 | |
| JP | 2003240894 | 8/2003 | |
| JP | 2004233055 | 8/2004 | |
| KR | 100833207 B1 * | 5/2008 | |
| RU | 2168022 | 5/2001 | |

OTHER PUBLICATIONS

U.S. Department of Energy, "Conceptual Design for a Waste-Management System that Uses Multipurpose Canisters," Jan. 1994 pp. 1-14.

Federal Register Environmental Documents, "Implementation Plan for the Environmental Impact Statement for a Multi-Purpose Canister System for Management of Civilian and Naval Spent Nuclear Fuel," Aug. 30, 1995 (vol. 60, No. 168) pp. 1-7.

National Conference of State Legislatures, "Developing a Multi-purpose Canister System for Spent Nuclear Fuel," State Legislative Report, col. 19, No. 4 by Sia Davis et al., Mar. 1, 1994, pp. 1-4.

Energy Storm Article, "Multi-purpose canister system evaluation: A systems engineering approach," Author unavailable, Sep. 1, 1994, pp. 1-2.

(56) References Cited

OTHER PUBLICATIONS

Science, Society, and America's Nuclear Waste-Teacher Guide, "The Role of the Multi-Purpose Canister in the Waste Management System," Author—unknown, Date—unknown, 5 pgs.
USEC Inc. Article, "NAC International: A Leader in Used Fuel Storage Technologies," copyright 2008, 2 pages.
Federal Register Notice, Nept. of Energy, "Record of Decision for a Multi-Purpose Canister or Comparable System," vol. 64, No. 85, May 4, 1999.
Zorpette, Glenn: "CAnnet Heat", Nuclear Power, Special Report, in IEEE Spectrum, Nov. 2001, pp. 44-47.
Optimization Strategies for Cask Design and Container Loading in Long Term Spent Fuel Storage, Dec. 2006 (Dec. 2006) [retrieved on Jan. 23, 2013 (Jan. 23, 2013)]. Retrieved from the Internet:<URL: http://www-pub.iaea.org/MTCD/publications/PDF/te_1523_web.pdf (US).
International Search Report and Written Opinion of the International Searching Authority for PCT/US2012/62470, dated Feb. 21, 2013. WO.
Corresponding International Search Report dated Jul. 19, 2013. WO.

\* cited by examiner

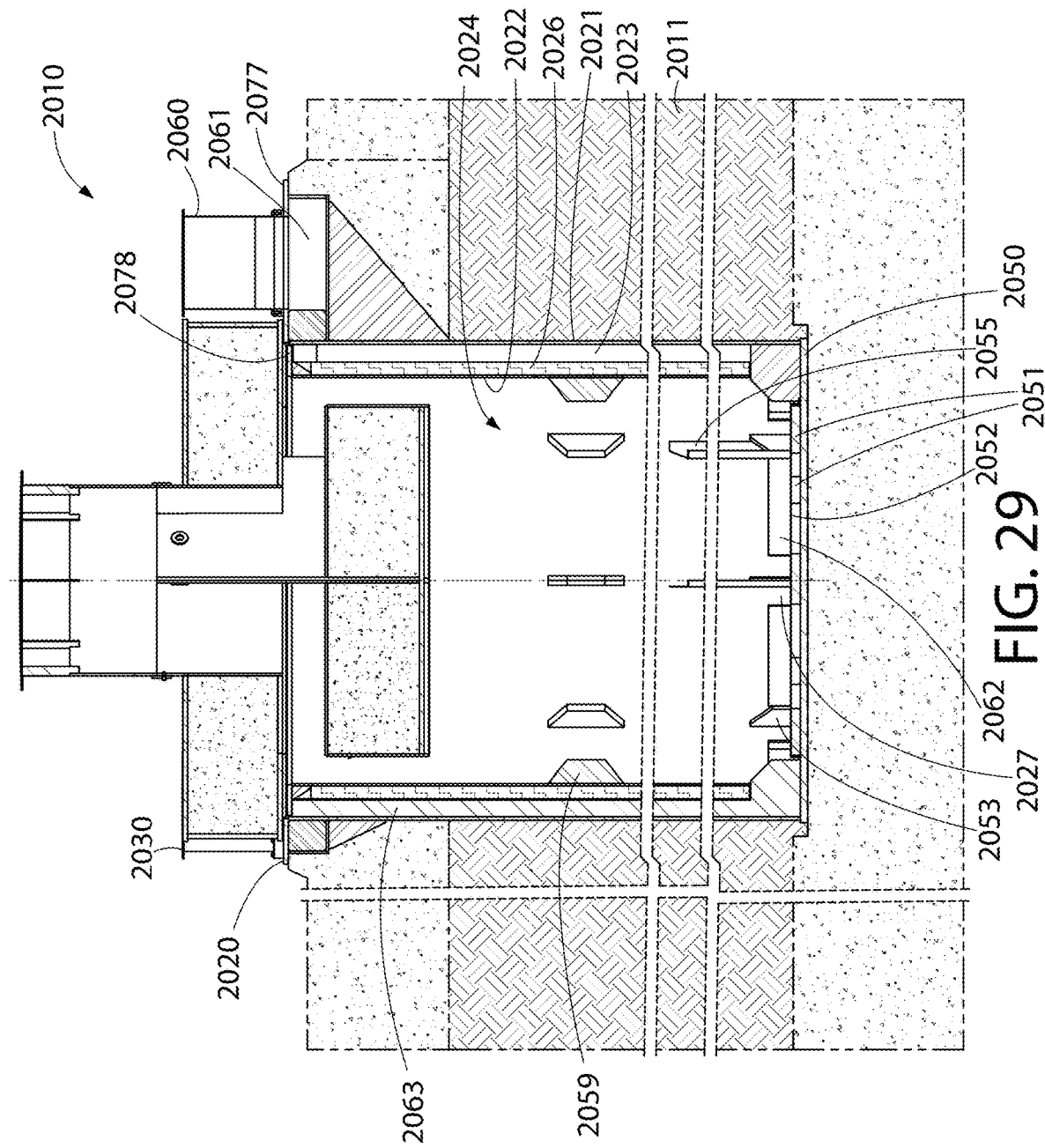

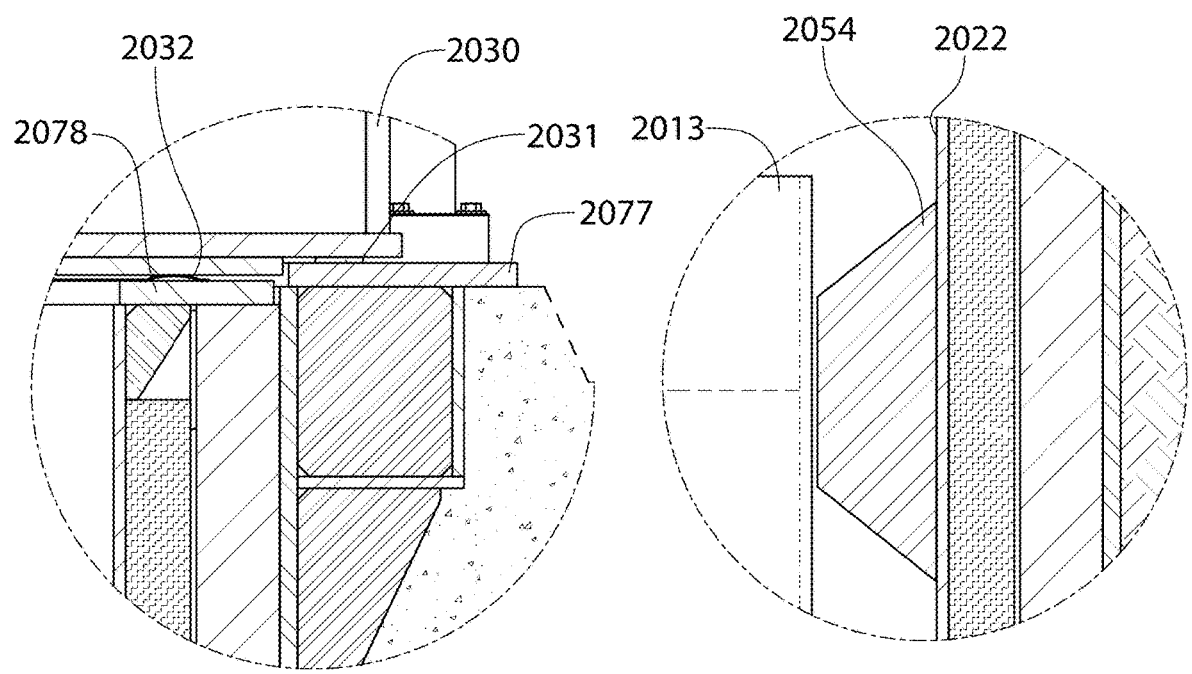
FIG. 31D
FIG. 31C
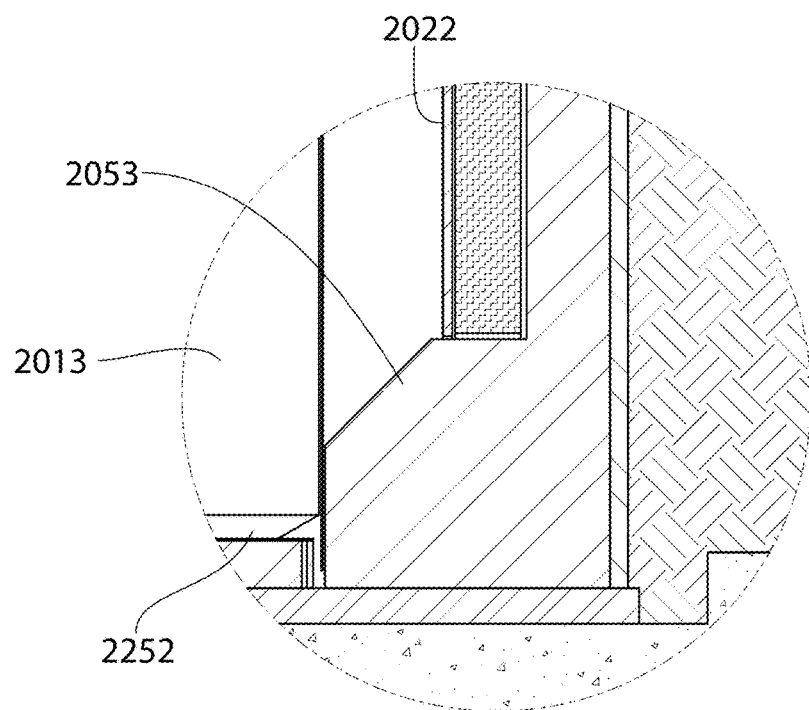
FIG. 31B

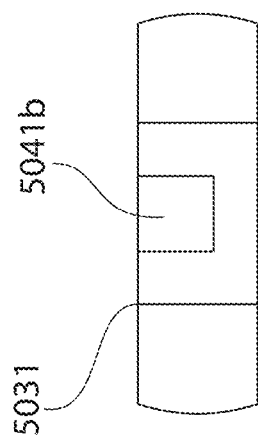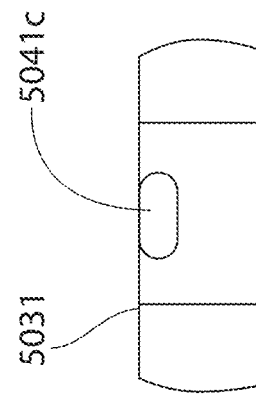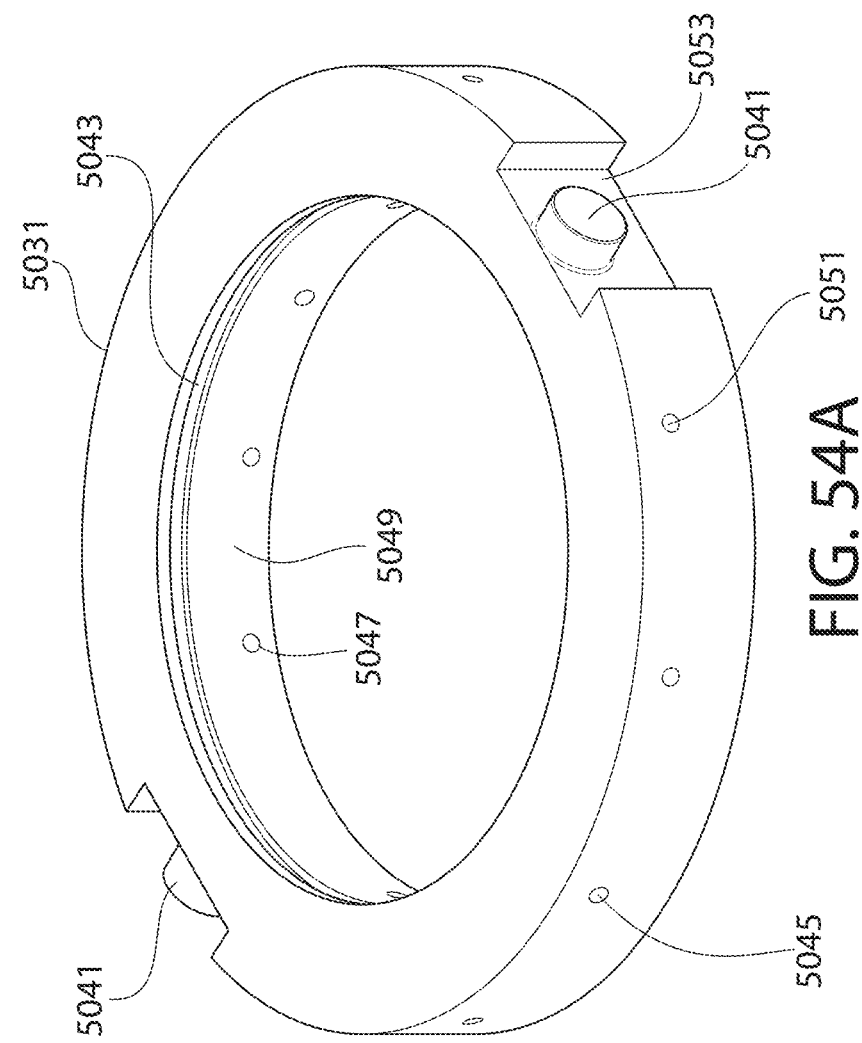

Ventilated Cask Air Temperature Profile Using Prior Art VVO of FIG. 60

Canister Axial Surface Temperature Profile When Stored
in Prior Art VVO of FIG. 60

CONTAINER FOR RADIOACTIVE WASTE

CROSS-REFERENCE TO RELATED PATENT APPLICATIONS

The present application is a continuation-in-part of U.S. patent application Ser. No. 14/358,032, filed May 13, 2014, which is a U.S. national stage application under 35 U.S.C. § 371 of PCT Application No. PCT/US2012/065117, filed Nov. 14, 2012, which claims the benefit of U.S. Provisional Patent Application Ser. No. 61/559,251, filed Nov. 14, 2011.

The present application is also a continuation-in-part of U.S. patent application Ser. No. 15/370,877, filed Dec. 6, 2016, which is a continuation of U.S. patent application Ser. No. 15/053,608, filed Feb. 25, 2016, now U.S. Pat. No. 9,514,853.

U.S. patent application Ser. No. 15/053,608 is a continuation-in-part of U.S. patent application Ser. No. 14/534,391, filed Nov. 6, 2014, now U.S. Pat. No. 9,293,229, which is a continuation of U.S. patent application Ser. No. 13/208,915, filed Aug. 12, 2011, now U.S. Pat. No. 8,905,259, which in turn claims the benefit of U.S. Provisional Patent Application Ser. No. 61/373,138, filed Aug. 12, 2010.

U.S. patent application Ser. No. 15/053,608 is also a continuation-in-part of U.S. patent application Ser. No. 14/394,233, filed Oct. 13, 2014, now U.S. Pat. No. 9,396,824, which is a U.S. national stage application under 35 U.S.C. § 371 of PCT Application No. PCT/US2013/036592, filed on Apr. 15, 2013, which claims the benefit of U.S. Provisional Patent Application No. 61/624,066 filed Apr. 13, 2012.

U.S. patent application Ser. No. 15/053,608 is also a continuation-in-part of U.S. patent application Ser. No. 14/395,790, filed Oct. 20, 2014, now U.S. Pat. No. 9,831,005, which is a U.S. national stage application under 35 U.S.C. § 371 of PCT Application No. PCT/US2013/037228, filed on Apr. 18, 2013, which claims the benefit of U.S. Provisional patent application 61/625,869, filed Apr. 18, 2012.

U.S. patent application Ser. No. 15/053,608 is also a continuation-in-part of U.S. patent application Ser. No. 14/424,201, filed Feb. 26, 2015, now U.S. Pat. No. 9,442,037, which is a U.S. national stage application under 35 U.S.C. § 371 of PCT Application No. PCT/US2013/057855, filed Sep. 3, 2013, which claims priority to U.S. Provisional Application Ser. No. 61/695,837, filed Aug. 31, 2012.

U.S. patent application Ser. No. 15/053,608 is also a continuation-in-part of U.S. patent application Ser. No. 14/655,860, filed Jun. 25, 2015, now U.S. Pat. No. 9,779,843, which is a U.S. national stage application under 35 U.S.C. § 371 of PCT Application No. PCT/US2013/077852 filed Dec. 26, 2013, which claims priority to U.S. Provisional Application Ser. No. 61/746,094 filed Dec. 26, 2012.

U.S. patent application Ser. No. 15/053,608 is also a continuation-in-part of U.S. patent application Ser. No. 14/762,874, filed Jul. 23, 2015, now U.S. Pat. No. 9,466,400, which is a U.S. national stage application under 35 U.S.C. § 371 of PCT Application No. PCT/US2014/013185, filed Jan. 27, 2014, which claims priority to U.S. provisional application No. 61/756,787, filed Jan. 25, 2013, and to U.S. provisional application No. 61/902,559, filed Nov. 11, 2013.

The disclosures of the aforementioned priority applications are incorporated herein by reference in their entireties.

BACKGROUND OF THE INVENTION

The storage, handling, and transfer of high level waste, (hereinafter, "HLW") such as spent nuclear fuel (hereinafter, "SNF"), requires special care and procedural safeguards. For example, in the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a canister. The loaded canister is then transported and stored in large cylindrical containers called casks. A transfer cask is used to transport spent nuclear fuel from location to location while a storage cask is used to store spent nuclear fuel for a determined period of time.

In a typical nuclear power plant, an open empty canister is first placed in an open transfer cask. The transfer cask and empty canister are then submerged in a pool of water. Spent nuclear fuel is loaded into the canister while the canister and transfer cask remain submerged in the pool of water. Once fully loaded with spent nuclear fuel, a lid is typically placed atop the canister while in the pool. The transfer cask and canister are then removed from the pool of water, the lid of the canister is welded thereon and a lid is installed on the transfer cask. The canister is then properly dewatered and filled with inert gas. The transfer cask (which is holding the loaded canister) is then transported to a location where a storage cask is located. The loaded canister is then transferred from the transfer cask to the storage cask for long term storage. During transfer from the transfer cask to the storage cask, it is imperative that the loaded canister is not exposed to the environment.

One type of storage cask is a ventilated vertical overpack ("VVO"). A VVO is a massive structure made principally from steel and concrete and is used to store a canister loaded with spent nuclear fuel (or other HLW). VVOs stand above ground and are typically cylindrical in shape and extremely heavy, weighing over 150 tons and often having a height greater than 16 feet. VVOs typically have a flat bottom, a cylindrical body having a cavity to receive a canister of spent nuclear fuel, and a removable top lid.

In using a VVO to store spent nuclear fuel, a canister loaded with spent nuclear fuel is placed in the cavity of the cylindrical body of the VVO. Because the spent nuclear fuel is still producing a considerable amount of heat when it is placed in the VVO for storage, it is necessary that this heat energy have a means to escape from the VVO cavity. This heat energy is removed from the outside surface of the canister by ventilating the VVO cavity. In ventilating the VVO cavity, cool air enters the VVO chamber through bottom ventilation ducts, flows upward past the loaded canister, and exits the VVO at an elevated temperature through top ventilation ducts. The bottom and top ventilation ducts of existing VVOs are located near the bottom and top of the VVO's cylindrical body respectively.

While it is necessary that the VVO cavity be vented so that heat can escape from the canister, it is also imperative that the VVO provide adequate radiation shielding and that the spent nuclear fuel not be directly exposed to the external environment. The inlet duct located near the bottom of the overpack is a particularly vulnerable source of radiation exposure to security and surveillance personnel who, in order to monitor the loaded overpacks, must place themselves in close vicinity of the ducts for short durations. Thus, a need exists for a VVO system for the storage of high level radioactive waste that has an inlet duct that reduces the likelihood of radiation exposure while providing extreme radiation blockage of both gamma and neutron radiation emanating from the high level radioactive waste.

The effect of wind on the thermal performance of a ventilated system can also be a serious drawback that, to some extent, afflicts all systems in use in the industry at the present time. Storage VVO's with only two inlet or outlet ducts are especially vulnerable. While axisymmetric air inlet and outlet ducts behave extremely well in quiescent air, when the wind is blowing, the flow of air entering and leaving the system is skewed, frequently leading to a reduced heat rejection capacity.

The thick top lid is one of the most expensive components of a radioactive waste canister. Such canisters may be used to store and transport non-fuel radioactive waste from nuclear generation plants such as activated reactor internals, control components, sundry non-fissile materials, and waste from operations such as resins, and in some applications vitrified nuclear waste fuel ("glass logs") encased in an outer metal cylinder. On existing canisters, the thick top lid is needed to shield personnel from radiation who are working on the lid (e.g. welding, bolting, fluid operations, etc.). The lid must also be thicker because the lid further performs the main canister lifting connection, and therefore must have the thickness needed for structural reasons to support the weight of the entire canister when hoisted via a crane or similar equipment used to move the canister. For these reasons, the thick top lid of a waste canister adds considerably to the overall weight and expense of the canister. An improved radioactive waste canister is desired.

A need also exists periodic leak testing is often required for monitoring the integrity of the inner and outer confinement boundaries on canisters holding radioactive materials. Some present leak testing processes involve removing the cask lid, which is undesirable, as doing so has the potential to increase radiation exposure to workers. Other leak testing processes and systems involve installing a continuous leak testing monitoring system that uses a compressed helium tank and pressure transducers. Such a system, however, requires periodic replacement of the transducers and replenishment of the helium gas stored in the tank. In view of the shortcomings of present leak detection processes and systems, improvements are desirable which reduce the on-site maintenance requirements, improve leak detection capabilities, and reduce potential radiation exposure to workers.

A need also exists for the ability to better examine welds formed on containers that are used to store spend nuclear fuel. Finally, a need exists to better enable spent nuclear fuel to be transferred from place to place as necessary.

BRIEF SUMMARY OF THE INVENTION

These, and other drawbacks, are remedied by the present invention.

In one embodiment, the invention can be a system for storing high level radioactive waste comprising: an overpack body extending along a vertical axis and having a cavity for storing high level radioactive waste, the cavity having an open top end and a floor; an overpack lid positioned atop the overpack body to enclose the open top end of the cavity; an air inlet vent for introducing cool air into the cavity, the air inlet vent extending from an opening in an outer surface of the overpack body to an opening in the floor, the opening in the outer surface of the overpack body extending about an entirety of a circumference of the outer surface of the overpack body; and an air outlet vent in the overpack lid for removing warmed air from the cavity.

In another embodiment, the invention can be a system for storing high level radioactive waste comprising: an overpack body extending along a vertical axis and having a cavity for storing high level radioactive waste, the cavity having an open top end and a floor, the overpack body comprising an air inlet vent for introducing cool air into a bottom portion of the cavity; a plurality of plates disposed within a portion of the air inlet vent, each of the plates extending along a reference line that is tangent to a third reference circle having a center point coincident with the vertical axis; and an overpack lid positioned atop the overpack body to enclose the open top end of the cavity, the overpack lid comprising an air outlet vent for removing warmed air from the cavity.

In yet another embodiment, the invention can be a system for storing high level radioactive waste comprising: an overpack body extending along a vertical axis and having a cavity for storing high level radioactive waste, the cavity having an open top end and a floor, the overpack body comprising an air inlet vent for introducing cool air into a bottom portion of the cavity; an overpack lid positioned atop the overpack body to enclose the open top end of the cavity, the overpack lid comprising an air outlet vent for removing warmed air from a top portion of the cavity; and the air inlet vent comprising a first section that extends substantially horizontally from an outer surface of the overpack body to a terminal end and a second section extending from the first section of the air inlet vent to an opening in the floor at an oblique angle relative to the vertical axis.

In still another embodiment, the invention can be a radioactive waste container system comprising: a canister having an interior chamber for holding radioactive waste and an open top; a lid assembly comprising a confinement lid and a shielded lifting lid, the confinement lid being detachably mounted to the lifting lid; the confinement lid being configured for mounting on the canister and having a first thickness; the lifting lid including a lifting attachment and having a second thickness; wherein the confinement lid is independently mountable on canister from the lifting lid.

In still a further embodiment, the invention can be a radioactive waste container system comprising: a canister having an interior chamber for holding radioactive waste and an open top; a lid assembly comprising a lower confinement lid and an upper shielded lifting lid, the confinement lid being detachably bolted to the lifting lid; the lifting lid including a plurality of first bolt holes having a first diameter and a plurality of second bolt holes having a second diameter, the first diameter being larger than the second diameter; the confinement lid including a plurality of third bolt holes having a third diameter, wherein each of the third bolt holes is concentrically aligned with one of the first or second bolt holes of the lifting lid; and a plurality of first mounting bolts inserted through the first bolt holes and threadably attaching the confinement lid to the canister without engaging the lifting lid.

In a yet further embodiment, the invention can be a method for storing radioactive waste using a container system, the method comprising: detachably mounting a confinement lid to a shielded lifting lid, the confinement lid and shielded lifting lid collectively forming a lid assembly; placing a canister having an interior chamber for holding radioactive waste into an outer protective overpack; lifting the lid assembly using the lifting lid; placing the lid assembly on an open top of the canister; attaching the confinement lid to the canister using a first set of mounting bolts without threadably engaging the lifting lid with the bolts; detaching the lifting lid from the confinement lid; and removing the lifting lid from the canister.

In another embodiment, the invention can be a module for storing high level radioactive waste, the module comprising:

an outer shell having a hermetically closed bottom end; an inner shell forming a cavity, the inner shell positioned inside the outer shell so as to form a space between the inner shell and the outer shell; at least one divider extending from a top of the inner shell to a bottom of the inner shell, the at least one divider creating a plurality of inlet passageways through the space, each inlet passageway connecting to a bottom portion of the cavity; a plurality of inlet ducts, each inlet duct connecting at least one of the inlet passageways to ambient atmosphere and each comprising an inlet duct cover affixed over a surrounding inlet wall, the inlet wall being peripherally perforated; and a removable lid positioned atop the inner shell, the lid having at least one outlet passageway connecting the cavity and the ambient atmosphere, wherein the lid and a top of the inner shell are respectively configured to form a hermetic seal at a top of the cavity.

In still another embodiment, the invention can be a system for storing radioactive materials, the system comprising: a canister comprising: a first hermetically sealed vessel having a first cavity; a second hermetically sealed vessel having a second cavity, wherein the first vessel is positioned in the second cavity; an interstitial space between the first and second vessels; and a test port through the second vessel in fluidic communication with the interstitial space; a conduit having a first end fluidically coupled to the test port; and a removable seal operably coupled to a second end of the conduit.

In yet another embodiment, the invention can be a method of storing radioactive materials, the method comprising: a) providing a cask having a cask body that forms a cask cavity having an open top end; b) positioning a canister loaded with the radioactive materials in the cask cavity, the canister comprising a first hermetically sealed vessel having a first cavity in which the radioactive materials are disposed and a second hermetically sealed vessel having a second cavity, wherein the first vessel is positioned in the second cavity, such that an interstitial space exists between the first and second vessels, and wherein the second vessel includes a test port that is in fluidic communication with the interstitial space; c) fluidically coupling a first end of a conduit to the test port, the conduit extending from the first end to a second end located outside of the cask; and d) securing a cask lid to the cask body to substantially enclose the open top end of the cask cavity.

In another embodiment still, the invention can be a system for leak testing a canister containing radioactive materials, the system comprising: a canister comprising: a first hermetically sealed vessel having a first cavity; a second hermetically sealed vessel having a second cavity, wherein the first vessel is positioned in the second cavity; an interstitial space between the first and second vessels; and a test port through the second vessel in fluidic communication with the interstitial space; a conduit having a first end fluidically coupled to the test port; a removable seal operably coupled to a second end of the conduit; and a leak detector configured to operably couple to the second end of the conduit and to detect whether a leak exists in at least one of the first vessel and the second vessel.

In a further embodiment, the invention can be a method of leak testing a storage canister for radioactive materials, the method comprising: a) positioning the canister in a cask cavity of a cask body, the canister comprising a first hermetically sealed vessel having a first cavity in which the radioactive materials are disposed and a second hermetically sealed vessel having a second cavity, the first vessel positioned in the second cavity such that an interstitial space exists between the first and second vessels, and wherein the second vessel includes a test port that is in fluidic communication with the interstitial space; b) coupling a first end of a conduit to the test port, the conduit extending from the first end to a second end located outside of the cask body; c) securing a cask lid to the cask body to substantially enclose the cask cavity; and d) operatively coupling a leak detector to the second end of the conduit to perform a leak test comprising determining whether a leak exists in at least one of the first vessel and the second vessel In a still further embodiment, the invention can be a method of leak testing a canister containing radioactive materials, the method comprising: a) coupling a first end of a conduit to a test port of the canister that is in fluid communication with an interstitial space of the canister, the conduit extending from the first end to a second end; and b) operatively coupling a leak detector to the second end; c) drawing gas from the conduit using the leak detector to establish a vacuum within the conduit and the interstitial space; and d) monitoring the drawn gas for the presence of a first indicator which is representative of a leak in a fluidic containment boundary of the canister that contains the radioactive materials.

In another embodiment, the invention can be a canister for storing radioactive materials, the canister comprising: a base plate; a side wall having a bottom sealed to the base plate; and a top plate including a top surface with a top edge having a bevel and with a channel set in from the top edge, wherein a weld is formed between the beveled top edge and a top of the side wall to seal the top plate to the side wall, and wherein the base plate, side wall, and top plate form a sealed vessel.

In another embodiment, the invention can be a method of forming a sealed canister, the method comprising: placing a top plate on a top opening of a side wall, a bottom of the side wall being sealed to a base plate, wherein the top plate includes a top surface with a top edge having a bevel and with a channel set in from the top edge; and forming a weld between the beveled top edge and the top opening of the side wall to seal the top plate to the side wall.

In another embodiment, still, the invention can be a method of storing radioactive materials, the method comprising: placing radioactive materials in a cavity formed by a side wall having a bottom sealed to a base plate; placing a top plate on a top opening of the side wall, the top plate including a top surface with a top edge having a bevel and with a channel set in from the top edge; forming a weld between the beveled top edge and the top opening of the side wall to seal the top plate to the side wall, so that the cavity is sealed; placing a first probe in the channel and a second probe opposite the first probe and adjacent the side wall, such that the weld is disposed between the two probes; activating the first and second probes to determine an integrity of a volume of the weld between the probes; and moving the first and second probes synchronously around the top plate to determine the integrity of an entire volume of the weld.

In another embodiment, the invention can be an apparatus for transferring spent nuclear fuel, the apparatus comprising: a cylindrical inner shell forming a cavity configured to receive a canister containing spent nuclear fuel, the cavity configured so that an annulus is formed between a canister placed in the cavity and an inner wall of the cylindrical inner shell; an intermediate shell disposed concentrically around and spaced apart from the inner shell; an outer shell disposed concentrically around and spaced apart from the intermediate shell; a bottom flange affixed to bottoms of each of the shells; a bottom lid removably affixed to the bottom flange and including at least one first channel fluidically connecting the annulus to an exterior of the bottom lid, wherein the at least one first channel is configured to preclude a direct line of travel from within the cavity to the exterior of the bottom lid; a top flange affixed to tops of each of the shells and including at least one second channel fluidically connecting the first annulus to an exterior of the top flange, wherein the at least one second channel is configured to preclude a direct line of travel from within the cavity to the exterior of the top flange; and a top lid removably affixed to the top flange.

In yet another embodiment, the invention can be an apparatus for transferring spent nuclear fuel, the apparatus comprising: a cylindrical inner shell forming a cavity configured to receive a canister containing spent nuclear fuel; an intermediate shell disposed concentrically around and spaced apart from the inner shell; an outer shell disposed concentrically around and spaced apart from the intermediate shell; a bottom flange affixed to bottoms of each of the shells; a bottom lid removably affixed to the bottom flange; a top flange affixed to tops of each of the shells, the top flange including at least two integrally formed trunnions configured to enable hoisting of the apparatus; and a top lid removably affixed to the top flange.

In still another embodiment, the invention can be an apparatus for transferring spent nuclear fuel, the apparatus comprising: a cylindrical inner shell forming a cavity configured to receive a canister containing spent nuclear fuel; an intermediate shell disposed concentrically around and spaced apart from the inner shell; an outer shell disposed concentrically around and spaced apart from the intermediate shell; a bottom flange affixed to bottoms of each of the shells; a bottom lid removably affixed to the bottom flange, the bottom lid including an impact zone comprising an impact absorbing structure; a top flange affixed to tops of each of the shells; and a top lid removably affixed to the top flange.

In another embodiment, the invention can be a method for transferring spent nuclear fuel from a pool, the method comprising: lifting a transfer cask from a pool, the transfer cask comprising: a cylindrical inner shell forming a cavity configured to receive a canister containing spent nuclear fuel, the cavity configured so that an annulus is formed between a canister placed in the cavity and an inner wall of the cylindrical inner shell; an intermediate shell disposed concentrically around and spaced apart from the inner shell; an outer shell disposed concentrically around and spaced apart from the intermediate shell; a bottom flange affixed to bottoms of each of the shells; a bottom lid removably affixed to the bottom flange and including at least one first channel fluidically connecting the annulus to a channel inlet at an exterior of the bottom lid, wherein the at least one first channel is configured to preclude a direct line of travel from within the cavity to the exterior of the bottom lid; a removable plug sealingly affixed to the channel inlet; a top flange affixed to tops of each of the shells and including at least one second channel fluidically connecting the first annulus to an exterior of the top flange, wherein the at least one second channel is configured to preclude a direct line of travel from within the cavity to the exterior of the top flange; and a top lid removably affixed to the top flange; removing the removable plug from the channel inlet, thereby allowing ambient air to enter the at least one first channel; draining the pool water from the canister; and moving the transfer cask to a staging area.

In another embodiment, the invention can be a ventilated system for storing high level radioactive waste comprising: a cask body comprising an outer surface and an inner surface forming a storage cavity for receiving high level radioactive waste; a cask lid positioned atop the cask body and enclosing a top end of the storage cavity; at least one outlet duct extending from a top of the storage cavity to an ambient atmosphere; a plurality of inlet ducts, each of the inlet ducts extending from a first opening in the outer surface of the cask body to a second opening in the inner surface of the cask body, the plurality of inlet ducts comprising a lowermost set of inlet ducts and an uppermost set of inlet ducts; and wherein the second openings of the lowermost set of air inlet ducts are located at a first vertical distance from a bottom end of the cask body and the second openings of the uppermost set of air inlet ducts are located at a second vertical distance from the bottom end of the cask body, the second vertical distance being greater than the first vertical distance.

In yet another embodiment, the invention can be a ventilated system for storing high level radioactive waste comprising: a cask body comprising a bottom end, a top end, an outer surface and an inner surface, the inner surface forming a storage cavity for receiving high level radioactive waste, the cask body extending along a vertical axis from the bottom end to the top end and having a vertical height measured from the bottom end of the cask body to the top end of the cask body; a cask lid positioned atop the cask body and enclosing a top end of the storage cavity; at least one outlet duct extending from a top of the storage cavity to an ambient atmosphere; a plurality of inlet ducts, each of the inlet ducts extending from a first opening in the outer surface of the cask body to a second opening in the inner surface of the cask body; the cask body comprising a lower axial section and an upper axial section, wherein the lower axial section is defined from the bottom end of the cask body to a vertical height of an uppermost one of the second openings of the plurality of air inlet ducts, and wherein the upper axial section is defined from the top end of the cask body to the vertical height of the uppermost one of the second openings of the plurality air inlet ducts; a metal canister containing high level radioactive waste positioned within the storage cavity so that an annular gap exists between an outer surface of the metal canister and the inner surface of the cask body, the annular gap forming a passageway from the second openings of the plurality of the inlet ducts to the at least one outlet duct; the second openings of the plurality of air inlet ducts arranged in a pattern on the inner surface of the cask body along the lower axial section; and wherein the pattern is configured and the vertical height of the uppermost one of the second openings is selected to maintain more than 90% of a vertical height of the metal canister above a predetermined threshold temperature for a predetermined heat generation rate of the high level radioactive waste.

In still another embodiment, the invention can be a method of storing high level radioactive waste comprising: a) positioning a metal canister containing high level radioactive waste having a heat generation rate in a storage cavity of a ventilated system comprising a cask body, a cask lid positioned atop the cask body, at least one outlet duct extending from a top of the storage cavity to an ambient atmosphere, and a plurality of inlet ducts, each of the inlet ducts extending from a first opening in the outer surface of the cask body to a second opening in the inner surface of the cask body; and b) sealing selected ones of the plurality of inlet ducts over time as a function of a decay of the heat generation rate to maintain a predetermined percentage of a vertical height of the metal canister above a predetermined threshold temperature Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 29 is a partial sectional view of the HLW storage container of FIG. 27B along the line XXIX-XXIX;

FIGS. 31B-31D are detailed views of the indicated parts of FIG. 31A;

FIG. 54A is a perspective view of a top flange for a transfer cask;

FIG. 54B is a schematic view of a first alternative trunnion configuration;

FIG. 54C is a schematic view of a second alternative trunnion configuration;

Figure 1:
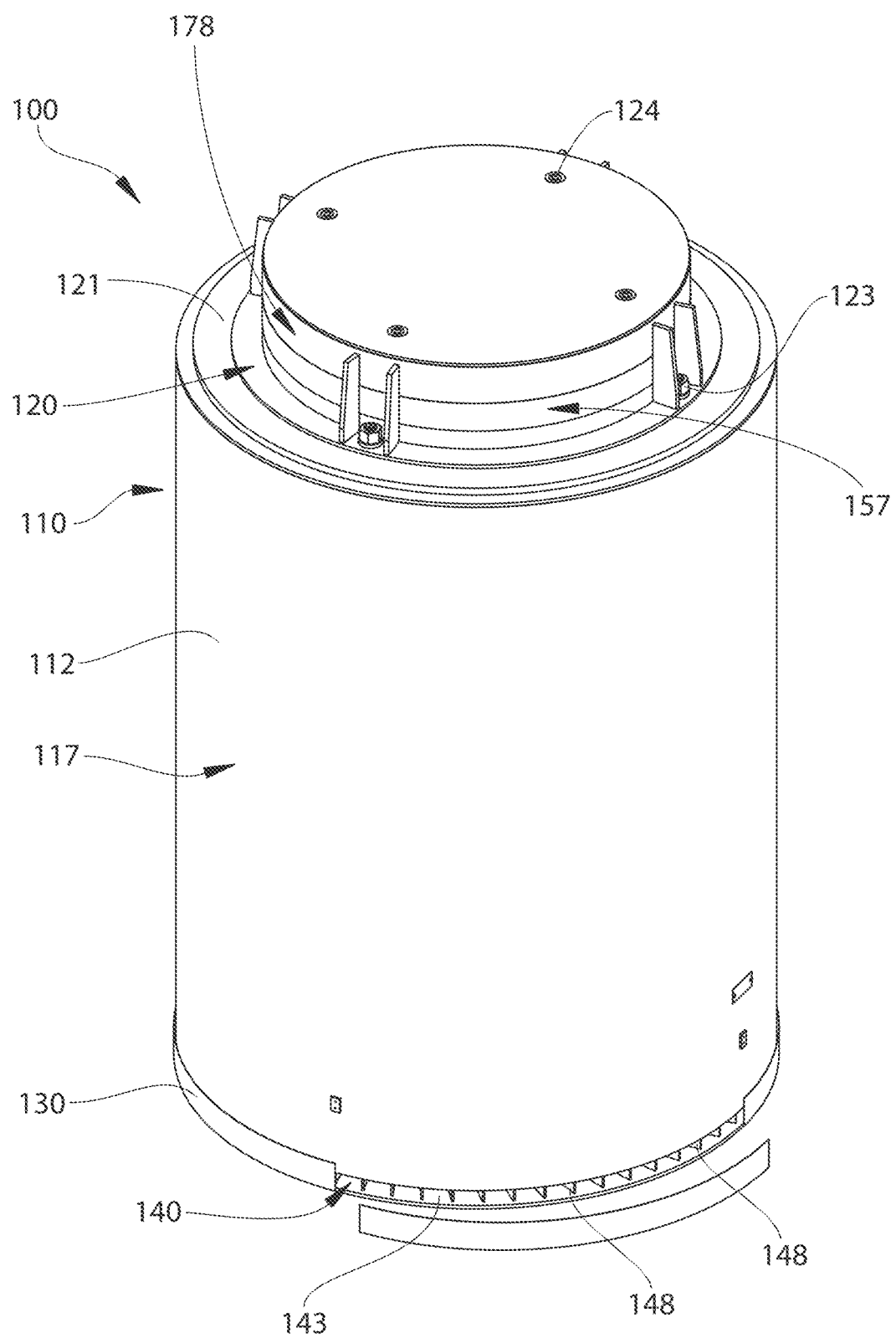
FIG. 1 is an isometric view of a vertical ventilated overpack in accordance with an embodiment of the present invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE DRAWINGS

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Multiple inventive concepts are described herein and are distinguished from one another using headers in the description that follows. Specifically, FIGS. 1-8 are relevant to a first inventive concept, FIGS. 9-26 are relevant to a second inventive concept, FIGS. 27-34 are relevant to a third inventive concept, FIGS. 35-47 are relevant to a fourth inventive concept, FIGS. 48-52B are relevant to a fifth inventive concept, FIGS. 53-59 are relevant to a sixth inventive concept, and FIGS. 60-66 are relevant to a seventh inventive concept. The first through seventh inventive concepts should be considered in isolation from one another. It is possible that there may be conflicting language or terms used in the description of the first through sixth inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

With reference to FIGS. 1-8, a first inventive concept will be described.

Referring to FIGS. 1-4 concurrently, a system for storing high level radioactive waste will be described in accordance with an embodiment of the present invention. The system can be considered a VVO 100. The VVO 100 is a vertical, ventilated dry spent fuel storage system that is fully compatible with 100 ton and 125 ton transfer casks for spent fuel canister operations. Of course, the VVO 100 can be modified/designed to be compatible with any size or style transfer cask. The VVO 100 is designed to accept spent fuel canisters for storage. All spent fuel canister types engineered for storage in free-standing and anchored overpack models can be stored in VVO 100.

As used herein the term "canister" broadly includes any spent fuel containment apparatus, including, without limitation, multi-purpose canisters and thermally conductive casks. For example, in some areas of the world, spent fuel is transferred and stored in metal casks having a honeycomb grid-work/basket built directly into the metal cask. Such casks and similar containment apparatus qualify as canisters, as that term is used herein, and can be used in conjunction with VVO 100 as discussed below.

In certain embodiments, the VVO 100 is a substantially cylindrical containment unit having a vertical axis A-A and a horizontal cross-sectional profile that is substantially circular in shape. Of course, it should be understood that the invention is not limited to cylinders having circular horizontal cross sectional profiles but may also include containers having cross-sectional profiles that are, for example, rectangular, ovoid or other polygon forms. While the VVO 100 is particularly useful for use in conjunction with storing and/or transporting SNF assemblies, the invention is in no way limited by the type of waste to be stored. The VVO cask 100 can be used to transport and/or store almost any type of HLW. However, the VVO 100 is particularly suited for the transport, storage and/or cooling of radioactive materials that have a high residual heat load and that produce neutron and gamma radiation, such as SNF. This is because the VVO 100 is designed to both provide extreme radiation blockage of gamma and neutron radiation and facilitate a convective/no force cooling of any canister contained therein.

The VVO 100 of the present invention generally comprises an overpack body 110 for storing high level radioactive waste and a removable overpack lid 120 that is positioned atop the overpack body 110. The overpack body 110 extends along the vertical axis A-A. The overpack lid 120 generally comprises a primary lid 121 and a secondary lid 122. The primary lid 121 is secured to the overpack body 110 by bolts 123 that restrain separation of the primary lid 121 of the overpack lid 120 from the overpack body 110 in case of a tip over situation. Moreover, the secondary lid 122 is secured to the primary lid 121 by bolts 124. The overpack lid 120 is a steel/concrete structure that is equipped with an axisymmetric air outlet vent or passageway 145 for the ventilation/removal of air as will be discussed in more detail below. An annular opening 157 is formed in an outer sidewall surface 178 of the overpack lid 120 that forms a passageway from the air outlet vent 145 to the external environment. More specifically, the annular opening 157 is a 360° opening in the outer sidewall surface 178 of the overpack lid 120. The overpack lid 120 has a quick connect/disconnect joint to minimize human activity for its installation or removal. In certain embodiments, the overpack lid 120 may weigh in excess of 15 tons.

The VVO 100 further comprises shock absorber or crush tubes 102 in its top region. The shock absorber tubes 102 are arranged at suitable angular spacings to serve as a sacrificial crush material if, for any reason, the VVO 100 were to tip over. The shock absorber tubes 102 also facilitate guiding and positioning of a canister within a cavity 111 of the VVO 100 in a substantially concentric disposition with respect to the VVO 100.

Figure 4:
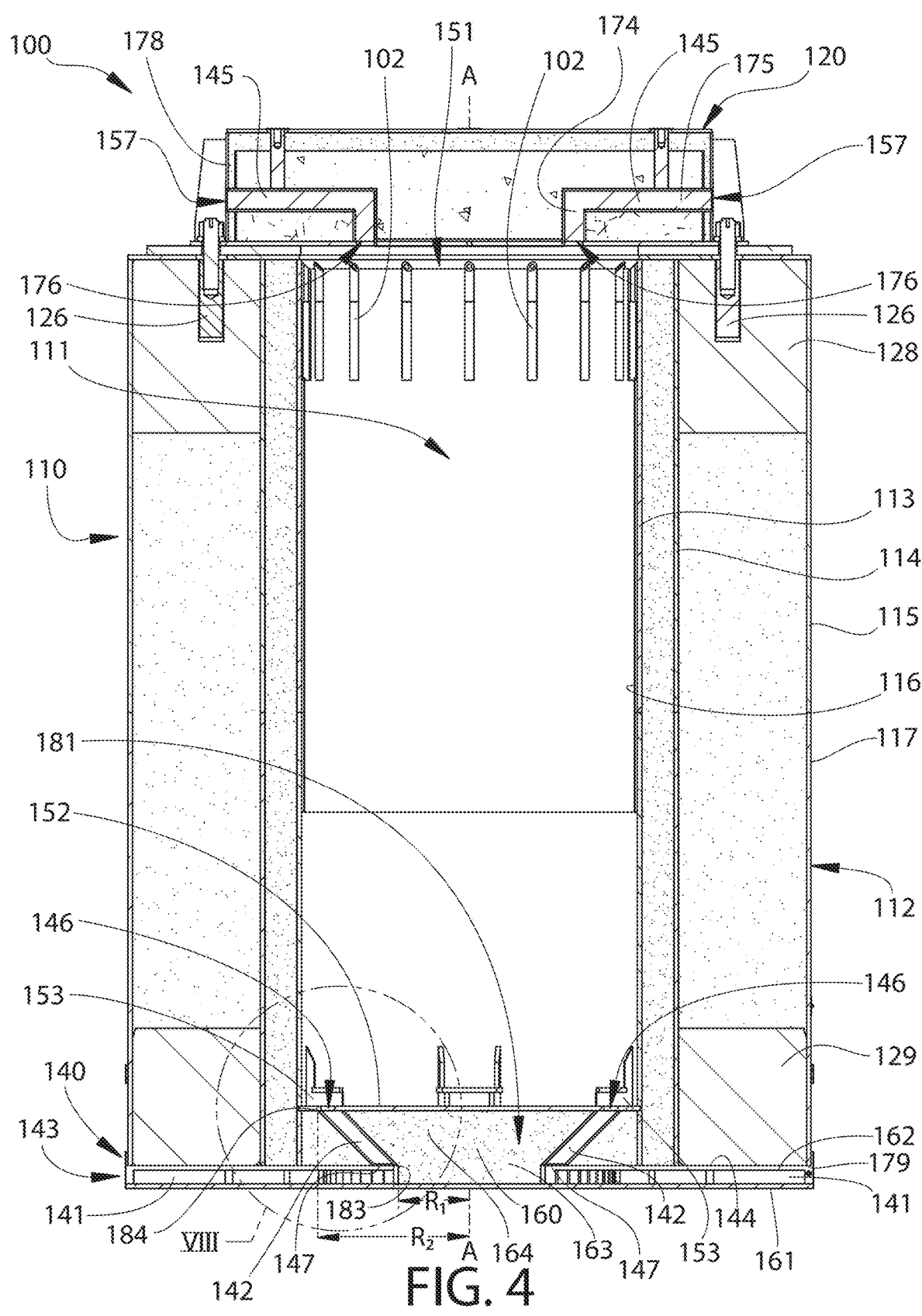
FIG. 4 is a cross-sectional view of the vertical ventilated overpack taken along line IV-IV of FIG. 2.
Figure 5:
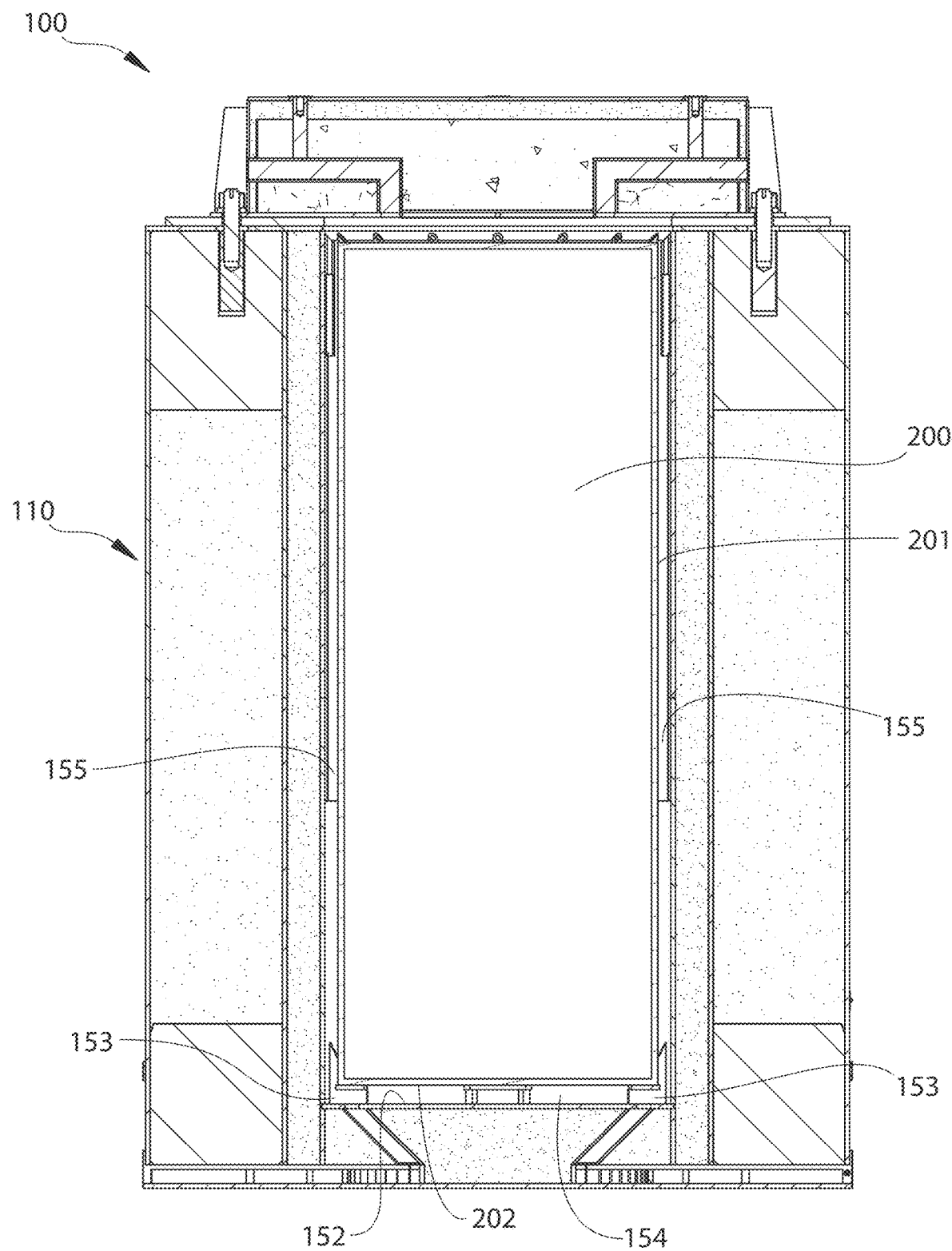
FIG. 5 is the cross-sectional view of the vertical ventilated overpack of FIG. 4 with a canister positioned within the cavity.
Figure 6:
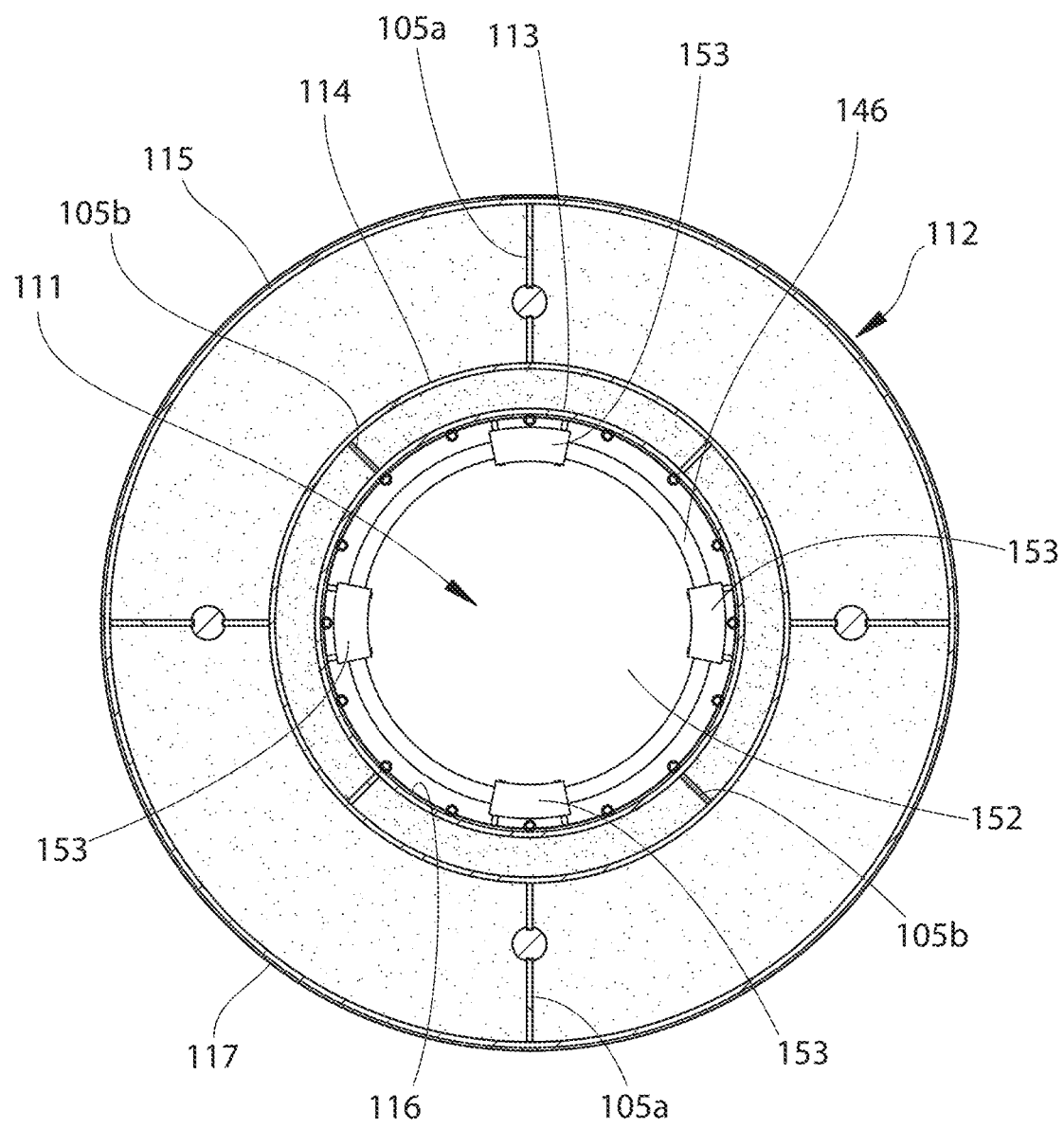
FIG. 6 is a cross-sectional view of the vertical ventilated overpack taken along line VI-VI of FIG. 3.
Figure 7:
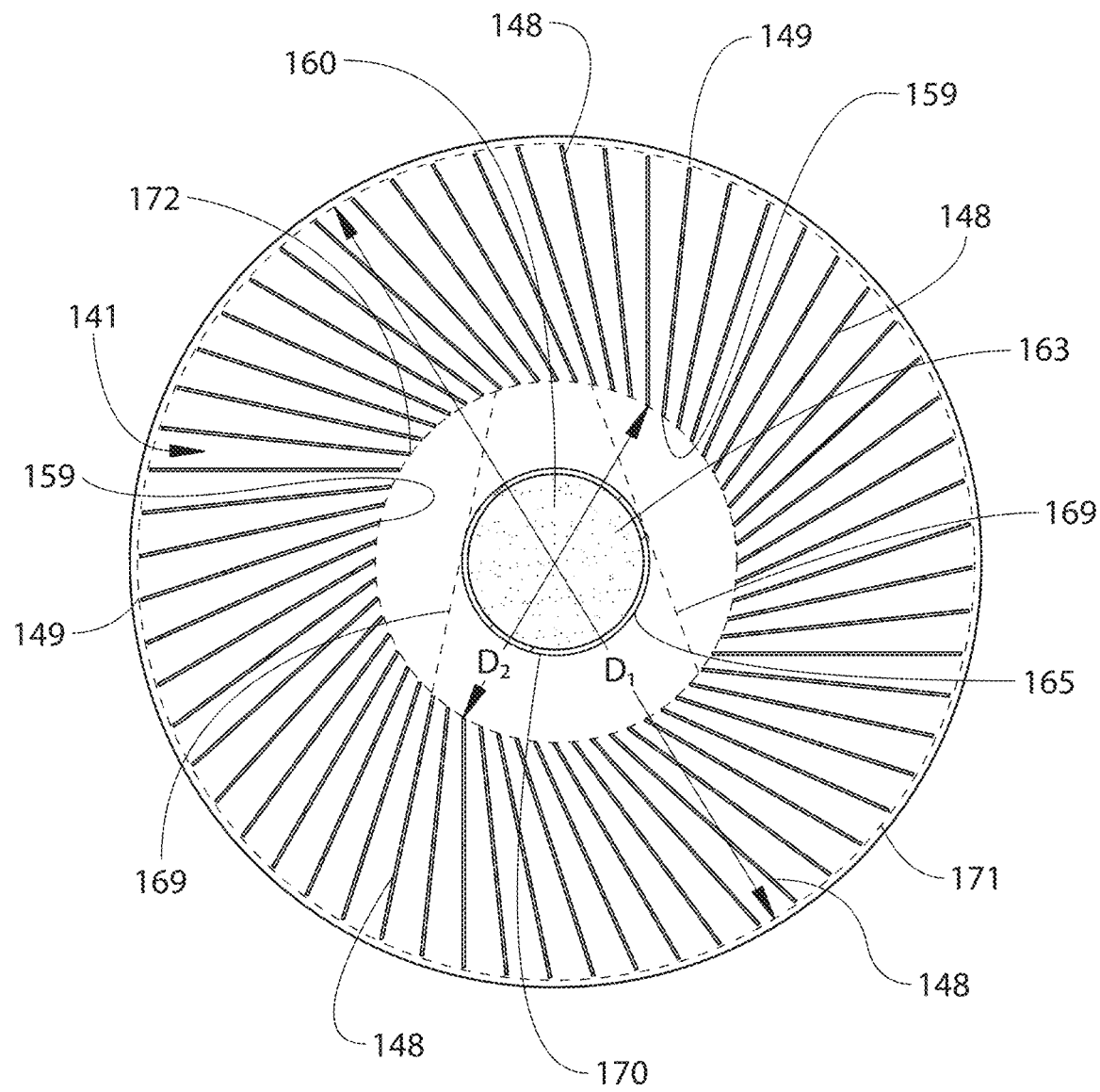
FIG. 7 is a cross-sectional view of the vertical ventilated overpack taken along line VII-VII of FIG. 3.

Referring to FIGS. 1, 4 and 6 concurrently, the overpack body 110 comprises a cylindrical wall 112, a bottom enclosure plate 130 and the overpack lid 120 described above. The cylindrical wall 112 has an inner shell 113, an intermediate shell 114 and an outer shell 115. In the exemplified embodiment, each of the inner, intermediate and outer shells 113, 114, 115 are formed of one-inch thick steel. Of course, the invention is not to be so limited and in other embodiments the inner, intermediate and outer shells 113, 114, 115 can be formed of metals other than steel and can be greater or less than one-inch in thickness. The inner shell 113 has an inner surface 116 that defines an internal cavity 111 for containing a hermetically sealed canister that contains high level radioactive waste (FIG. 5). The inner surface 116 of the inner shell 113 also forms the inner wall surface of the overpack body 110. Furthermore, the outer shell 115 has an outer surface 117. The outer surface 117 of the outer shell 115 also forms the outer sidewall surface of the overpack body 110.

In the exemplified embodiment, the inner, intermediate and outer shells 113, 114, 115 are concentric shells that are rendered into a monolithic weldment by a plurality of connector plates 105*a*, 105*b*. The inner shell 113 is spaced from the intermediate shell 114 by connector plates 105*a* and the intermediate shell 114 is spaced from the outer shell 115 by connector plates 105*b*. Of course, in certain other embodiments the connector plates 105*a*, 105*b* can be altogether omitted. The space between the inner shell 113 and the intermediate shell 114 is intended for placement of a neutron shielding material. For example, in certain embodiments the neutron radiation shielding material is a hydrogen-rich material, such as, for example, Holtite, water or any other material that is rich in hydrogen and a Boron-10 isotope. In certain embodiments, there is approximately seven inches of Holtite filling the space between the inner and intermediate shells 113, 114. Thus, the space between the inner and intermediate shells 113, 114 serves to prevent neutron radiation from passing through the VVO 100 and into the external environment.

An axially intermediate portion of the space between the intermediate shell 114 and the outer shell 115 is filled with a heavy shielding concrete to capture and prevent the escape of both gamma and neutron radiation. The density of the concrete is preferably maximized to increase the radiation absorption characteristics of the VVO 100. In certain embodiments, there is approximately twenty-eight inches of concrete filling the intermediate portion of the space between the intermediate and outer shells 114, 115. In some embodiments, steel plates are placed within the concrete to serve as a supplemental radiation curtain. There are no lateral penetrations in the multi-shell weldment that may provide a streaming path for the radiation issuing from the high level radioactive waste.

The top and bottom portions of the space between the intermediate and outer shells 114, 115 (both above and below the concrete) are top and bottom forgings 128, 129 in the form of thick annular rings made of a metal material, such as steel. The top forging 128 comprises machine threaded holes 126 that are sized and configured to receive the bolts 123 of the primary lid 121 therein during attachment of the overpack lid 120 to the overpack body 110.

As noted above, the inner surface 116 of the inner shell 113 defines the cavity 111. In the exemplified embodiment, the cavity 111 is cylindrical in shape. However, the cavity 111 is not particularly limited to any specific size, shape, and/or depth, and the cavity 111 can be designed to receive and store almost any shape of canister. In certain embodiments, the cavity 111 is sized and shaped so that it can accommodate a canister of spent nuclear fuel or other HLW. More specifically, the cavity 111 has a horizontal cross-section that can accommodate no more than one canister. Even more specifically, it is desirable that the size and shape of the cavity 111 be designed so that when a spent fuel canister is positioned in the cavity 111 for storage, a small clearance exists between outer side walls of the canister and the inner surface 116 of the inner shell 113, as will be discussed in more detail below with reference to FIG. 5.

Referring to FIGS. 4 and 5 concurrently, the present invention will be further described. The cavity 111 comprises a floor 152 and an open top end 151 that is enclosed by the overpack lid 120 as has been described herein above. A plurality of support blocks 153 are disposed on the floor 152 of the cavity 111 to support a canister 200 contained within the cavity 111 above the floor 152. In the exemplified embodiment, four support blocks 153 are illustrated (see FIG. 6). However, more or less than four support blocks 153 can be used in alternate embodiments. Each of the support blocks 153 is a low profile lug that is welded to the inner surface 116 of the inner shell 113 and/or to the floor 152. In the exemplified embodiment, the canister 200 is a hermetically sealed canister for containing the high level radioactive waste. When the canister 200 is positioned within the cavity 111, it rests atop the support blocks 153 so that a space 154 exists between a bottom 202 of the canister 200 and the floor 152. The space 154 is a bottom plenum that serves as the recipient of ventilation air flowing up from an inlet vent as will be described below.

Furthermore, when the canister 200 is positioned within the cavity 111, an annular gap 155 exists between the inner surface 116 of the inner shell 113 (i.e., the inner wall surface of the overpack body 110) and an outer surface 201 of the canister 200. The annular gap 155 is an uninterrupted and continuous gap that circumferentially surrounds the canister 200. In other words, the canister 200 is concentrically spaced apart from the inner shell 113, thereby creating the annular gap 155. As described in more detail below, the annular gap 155 forms an annular air flow passageway between an annular air inlet passageway 142 and the air outlet vent 145.

The VVO 100 is configured to achieve a cyclical thermosiphon flow of gas (i.e., air) within the cavity 111 when spent nuclear fuel emanating heat (i.e., the canister 200) is contained therein. In other words, the VVO 100 achieves a ventilated flow by virtue of a chimney effect. Such cyclical thermosiphon flow of the gas further enhances the transmission of heat to the environment external to the VVO 100. The thermosiphon flow of gas is achieved as a result of an air inlet vent 140 that introduces cool air into the bottom of the cavity 111 of the overpack body 110 from the external environment and an air outlet vent 145 for removing warmed air from the cavity 111. Thus, as a result of thermosiphon flow, cool external air can enter into the space 154 of the cavity 111 between the bottom 202 of the canister 200 and the floor 152 via the air inlet vent 140, flow upward through the cavity 111 within the annular gap 155 between the canister 200 and the inner surface 116 of the inner shell 113, and flow back out into the external environment as warmed air via the air outlet vent 145. The newly entered air will warm due to proximity to the extremely hot canister 200, which will cause the natural thermosiphon flow process to take place whereby the heated air will continually flow upwardly as fresh cool air continues to enter into the cavity 111 via the air inlet vent 140. Thus, the air inlet vent 140 provides a passageway that facilitates cool air entering the cavity 111 from the external environment and the air outlet vent 145 provides a passageway that facilitates warm air exiting the cavity back to the external environment.

In the exemplified embodiment, the air outlet vent 145 is formed into the overpack lid 120. The air outlet vent 145 provides an annular passageway from a top portion of the cavity 111 to the external environment when the overpack lid 120 is positioned atop the overpack body 110 thereby enclosing the top end 151 of the cavity 111. Specifically, the air outlet vent 145 has a vertical section 174 that extends from the cavity 111 upwardly into the overpack lid 120 in the vertical direction (i.e., the direction of the vertical axis A-A) and a horizontal section 175 that extends from the vertical section 174 to the annular opening 157 in the horizontal direction (i.e., the direction transverse to the vertical axis A-A). More specifically, the vertical section 174 of the air outlet vent 145 extends from an annular opening 176 in a bottom surface 177 of the overpack lid 120 and the horizontal section 175 extends from the vertical section 174 to the annular opening 157 in the outer sidewall surface 178 of the overpack lid 120. As described above, the annular opening 157 is a circumferential opening that extends around the entirety of the overpack lid 120 in a continuous and uninterrupted manner and circumferentially surrounds the vertical axis A-A.

The overpack body 110 additionally comprises a bottom block 160 disposed within the cylindrical wall 112, and more specifically within the inner shell 113 of the cylindrical wall 112, and a base structure at a bottom end 179 of the cylindrical wall 112. The base structure comprises a base plate 161 and an annular plate 162. The air inlet vent 140 is formed directly into the bottom block 160, which is a thick sandwich of steel and concrete. The bottom block 160 is positioned below the floor 152 of the cavity 111. More specifically, the bottom block 160 extends between the floor 152 of the cavity 111 and the base plate 161, which forms the bottom end of the VVO 100. The bottom block 160 has a columnar portion 163 and a horizontal portion 164.

The annular plate 162 is a donut-shaped plate having a central hole 181. The annular plate 162 is axially spaced from the base plate 161, thereby creating a space or gap in between the annular plate 162 and the base plate 161. Moreover, the annular plate 162 extends from the outer surface 117 of the overpack body 110 inwardly towards the vertical axis A-A a radial distance that is less than the radius of the overpack body 110. More specifically, the annular plate 162 extends from the outer surface 117 of the overpack body 110 to the columnar portion 163 of the bottom block 160. Thought of another way, the columnar portion 163 of the bottom block 160 extends through the central hole 181 of the annular plate 162 and rests atop the base plate 161.

Referring to FIGS. 1, 4, 6 and 8 concurrently, the air inlet vent 140 will be described in more detail. In the exemplified embodiment, the air inlet vent 140 is formed into the bottom closure plate 130 and extends into the bottom block 160 and comprises an annular air inlet plenum 141 and an annular air inlet passageway 142. The annular air inlet plenum 141 is formed in the space/gap between the annular plate 162 and the base plate 161. Thus, the annular air inlet plenum 141 is substantially horizontal and extends radially inward from the outer surface 117 of the overpack body 110. More specifically, the annular air inlet plenum 141 extends horizontally from the outer surface 117 of the overpack body 110 at an axial height below the floor 152 of the cavity 111. An opening 143 is formed in the outer surface 117 of the overpack body 110 that forms a passageway from the external environment to the annular air inlet plenum 141 to enable cool air to enter into the annular air inlet plenum 141 from the external environment as has been described above. The opening 143 circumferentially surrounds the vertical axis A-A around the entirety of the outer surface 117 of the overpack body 110 in an uninterrupted and continuous manner. In other words, the opening 143 is a substantially 360° opening in the outer surface 117 of the overpack body 110.

The annular air inlet passageway 142 extends upward from a top surface 144 of the annular air inlet plenum 141 to the floor 152 of the cavity 111. More specifically, the annular air inlet passageway 142 extends upwardly from an opening 147 in the top surface 144 of the annular air inlet plenum 141 to an opening 146 in the floor 152. The annular air inlet passageway 142 is wholly formed within the bottom block 160. The opening 147 in the top surface 144 of the annular air inlet plenum 141 is proximate an end of the annular air inlet plenum opposite the opening 143 in the outer surface 117 of the overpack body 110. The opening 146 in the floor 152 is an annular opening that extends 360° around the floor 152.

The annular air inlet plenum 141 circumferentially surrounds the vertical axis A-A. In the exemplified embodiment, the annular air inlet passageway 142 also circumferentially surrounds the vertical axis A-A and has an inverted truncated cone shape. Thus, the annular air inlet passageway 142 extends upward from the air inlet plenum 141 to the opening 146 in the floor 152 of the cavity 111 at an oblique angle relative to the vertical axis A-A. Thought of another way, the annular inlet passageway 142 extends from the air inlet plenum 141 at a first end 183 to the floor 152 at a second end 184. The first end 183 is located a first radial distance $R_1$ from the vertical axis A-A and the second end 184 is located a second radial distance $R_2$ from the vertical axis A-A. The second radial distance $R_2$ is greater than the first radial distance $R_1$. Of course, the invention is not to be so limited and in certain other embodiments the annular air inlet passageway 142 can take on other shapes as desired.

Referring to FIGS. 1, 4, 7 and 8 concurrently, the annular air inlet plenum 141 will be further described. The annular air inlet plenum 141 comprises a plurality of plates 148 therein. Each of the plates 148 extends from a first end 149 to a second end 159. The first ends 149 of the plates 148 are proximate the outer surface 117 of the overpack body 110 and the second ends 159 of the plates 148 are proximate the columnar portion 163 of the bottom block 160. A line connecting the first ends 149 of the plates 148 forms a first reference circle 171 having a diameter $D_1$ and a line connecting the second ends 159 of the plates 148 forms a second reference circle 172 having a diameter $D_2$, wherein the first diameter $D_1$ is greater than the second diameter $D_2$.

Each of the plates 148 in the annular air inlet plenum 141 extend along a reference line 169 that is tangent to a third reference circle 170. Although the reference line 169 is only illustrated with regard to two of the plates 148, it should be understood that each of the plates has a reference line that is tangent to the third reference circle 170. The circumference of the third reference circle 170 is formed by an outer surface 165 of the columnar portion 163 of the bottom block 160. The third reference circle 170 has a center point that is coincident with the vertical axis A-A. In the exemplified embodiment, the plates 148 are thin steel plates that facilitate transferring the weight of the VVO 100 to the base plate 161 and also provide a means to scatter and absorb any errant gamma radiation that may attempt to exit the air inlet plenum. Furthermore, in the exemplified embodiment sixty plates 148 are illustrated. However, the invention is not to be so limited and in certain other embodiments more or less than sixty plates 148 may be disposed within the annular air inlet plenum 141.

Due to the axisymmetric configuration of the air inlet plenum 141, the annular air inlet vent 140 is configured so that aerodynamic performance of the air inlet vent 140 is independent of an angular direction of a horizontal component of an air-stream applied to the outer surface 117 of the overpack body 101. Similarly, due to the axisymmetric configuration of the air outlet vent 145, the air outlet vent 145 is configured so that the aerodynamic performance of the air outlet vent 145 is independent of an angular direction of a horizontal component of an air-stream applied to the outer surface 117 of the overpack body 110.

II. Inventive Concept 2

With reference to FIGS. 9-26, a second inventive concept will be described.

The present invention provides a separate, reusable shielded lifting lid for waste canister lid bolting and lifting. Accordingly, the lifting lid is bolted and not welded to the canister. The canister loading is dry in an overpack such as a metal cylindrical jacket holding the radioactive waste inside. Canisters typically have thick (e.g. 10 inch) steel lids on each canister to protect the operator from radiation during canister closure operations. The thick lids are heavy and expensive, and further not reusable as they remain attached to the canister for longer-term storage.

Advantageously, the present invention allows use of a significantly thinner main closure confinement lid (e.g. about 3 to 5-inch thick in exemplary embodiments) for radionuclides containment. After radioactive waste contents are placed in the canister, the confinement lid is installed and held in place by gravity alone in some embodiments. The confinement lid thickness, however, has generally poor radiation shielding value. Accordingly, the confinement lid is installed using a thicker and reusable shielded lifting lid which serves as an upper over-lid to the lower confinement lid. The two-part lid system combination of the confinement lid and shielded lifting lid provide the thickness required to shield the operator from the radioactive canister contents during the canister closure bolting operations.

In use, the shielded lifting lid in one exemplary and non-limiting embodiment has holes that match the bolt spacing to allow the operator to install the confinement lid bolts in a radiation shielded environment. After the lifting lid bolts are installed, the operator hooks up the lifting rigging to the shielded lifting lid and moves away from the canister to a more distal and remote location. The shielded lifting lid may then be removed from the top of the canister, preferably with the confinement lid remaining in place, and a heavy overpack lid is installed for longer term storage and radiation shielding. Using this method, the waste canister and overpack advantageously are shorter, lighter, better shielded, and less expensive to fabricate.

Figure 9:
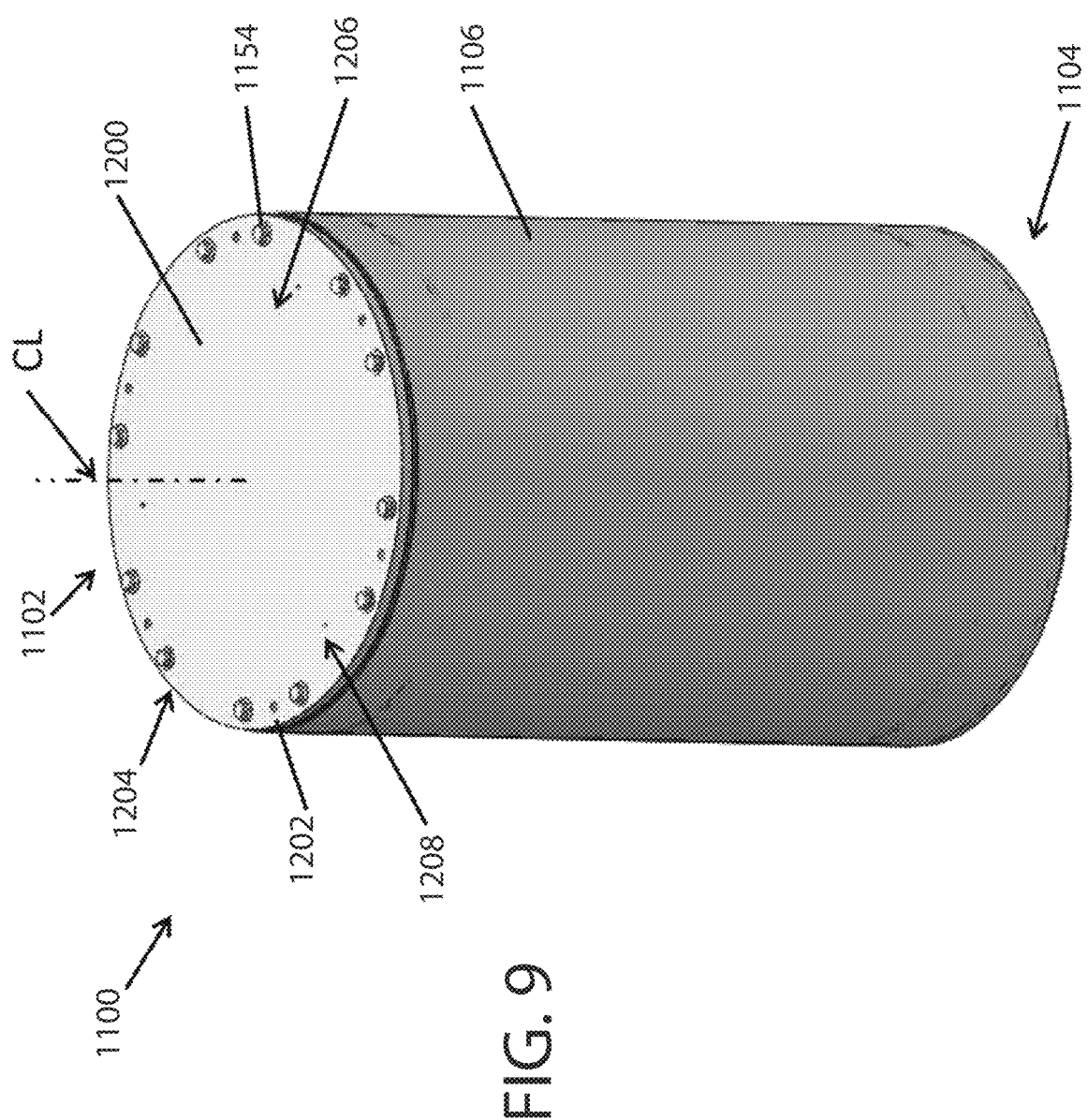
FIG. 9 is perspective view of a radioactive waste canister according to one embodiment of the present disclosure having a confinement lid mounted thereon.
Figure 10:
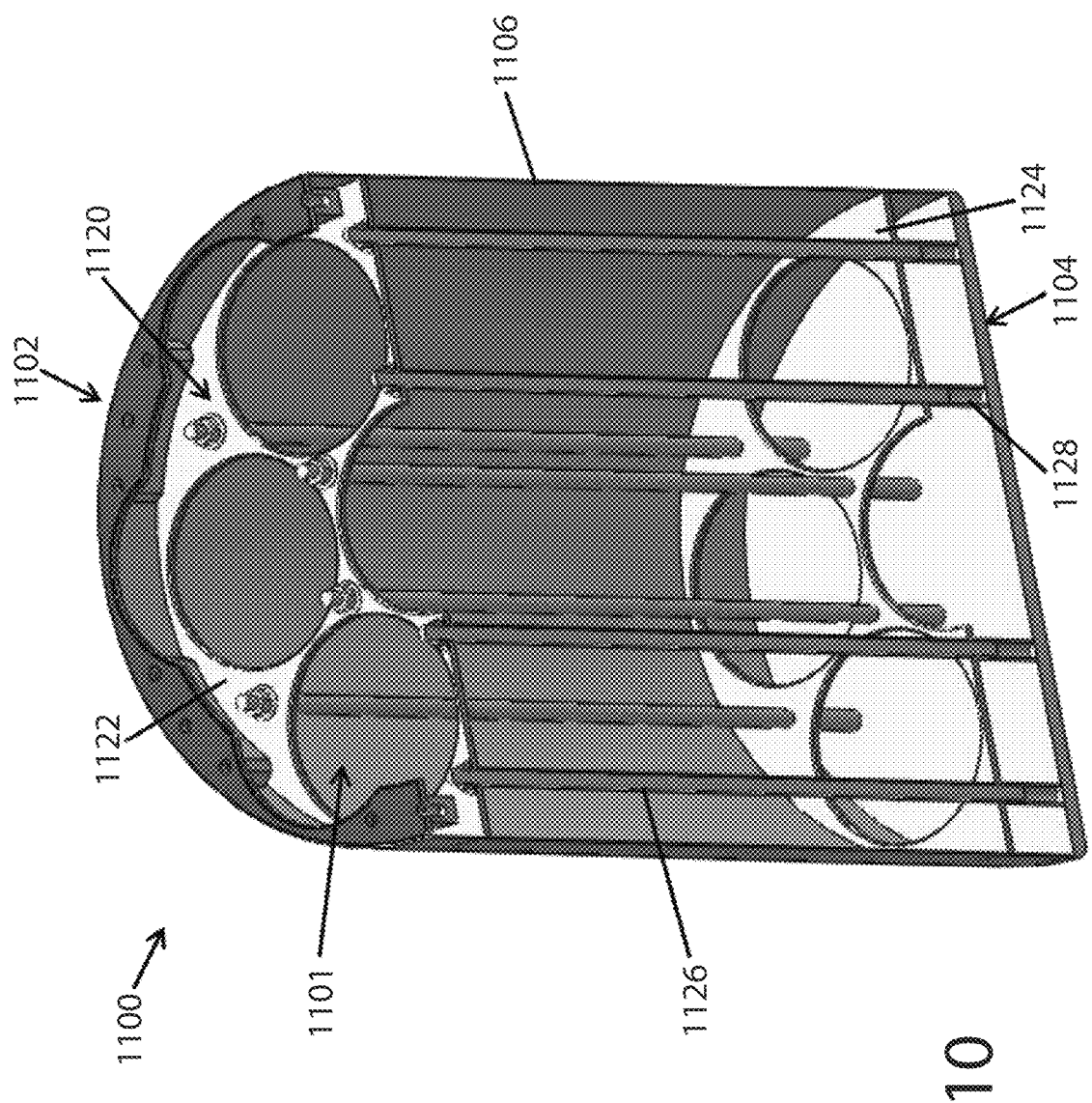
FIG. 10 is a cross-sectional perspective view thereof with confinement lid removed and showing a waste cylinder basket insert.

FIGS. 9 and 10 depict a radioactive canister system according to the present disclosure including a waste canister 1100 having a generally cylindrical body defining an interior chamber 1101 and comprised of a top 1102, bottom 1104, and cylindrical sidewall 1106 extending therebetween. Top 1102 is open for insertion of radioactive waste and bottom 1104 is preferably closed in one embodiment. A main closure confinement lid 1200 is shown attached to top 1102 of canister 1100 by a plurality of fasteners such as mounting bolts 1154 which may be circumferentially spaced apart around the top of the canister, as further described herein. In one embodiment, canister 1100 may be a non-fuel radioactive waste canister (NWC).

Figure 14:
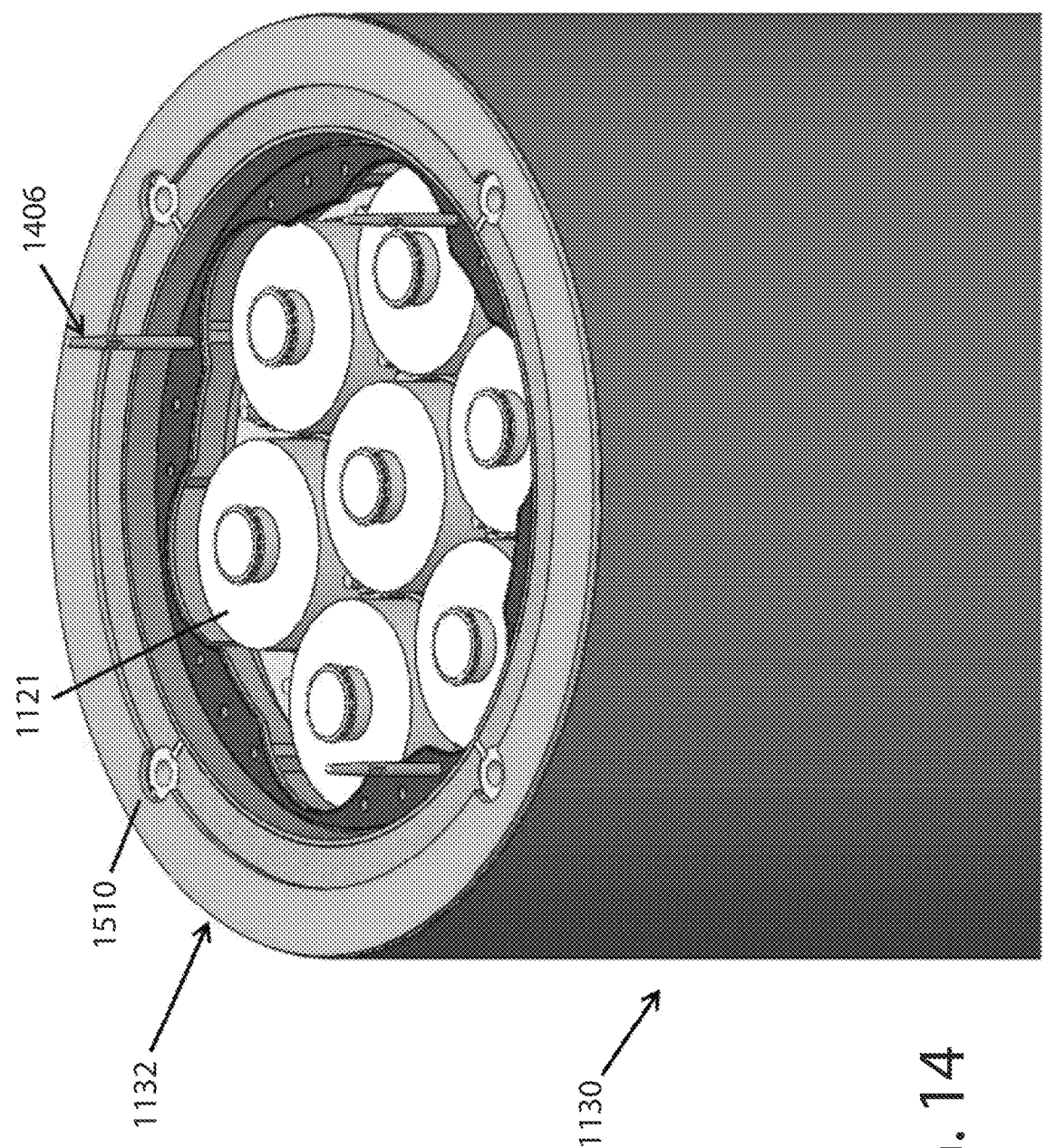
FIG. 14 is a perspective view thereof showing a plurality of waste cylinders installed in the basket insert of the canister.

Referring to FIG. 10, canister 1100 has an interior configured to store the size and shape of radioactive waste to be deposited in the canister. In one embodiment, the canister may include a basket insert 1120 configured for holding a plurality of metal waste cylinders 1121 (see, e.g. FIG. 14) each containing radioactive waste materials. Basket insert 1120 includes a pair of vertically spaced apart top and bottom plates 1122, 1124 which are connected via a plurality of tie rods 1126. Top plate 1122 and bottom plate 1124 include a plurality of horizontally spaced apart circular openings 1123 each having a diameter which is configured and dimensioned to receive waste cylinders 1121 therethrough, as shown in FIG. 14.

Figure 11:
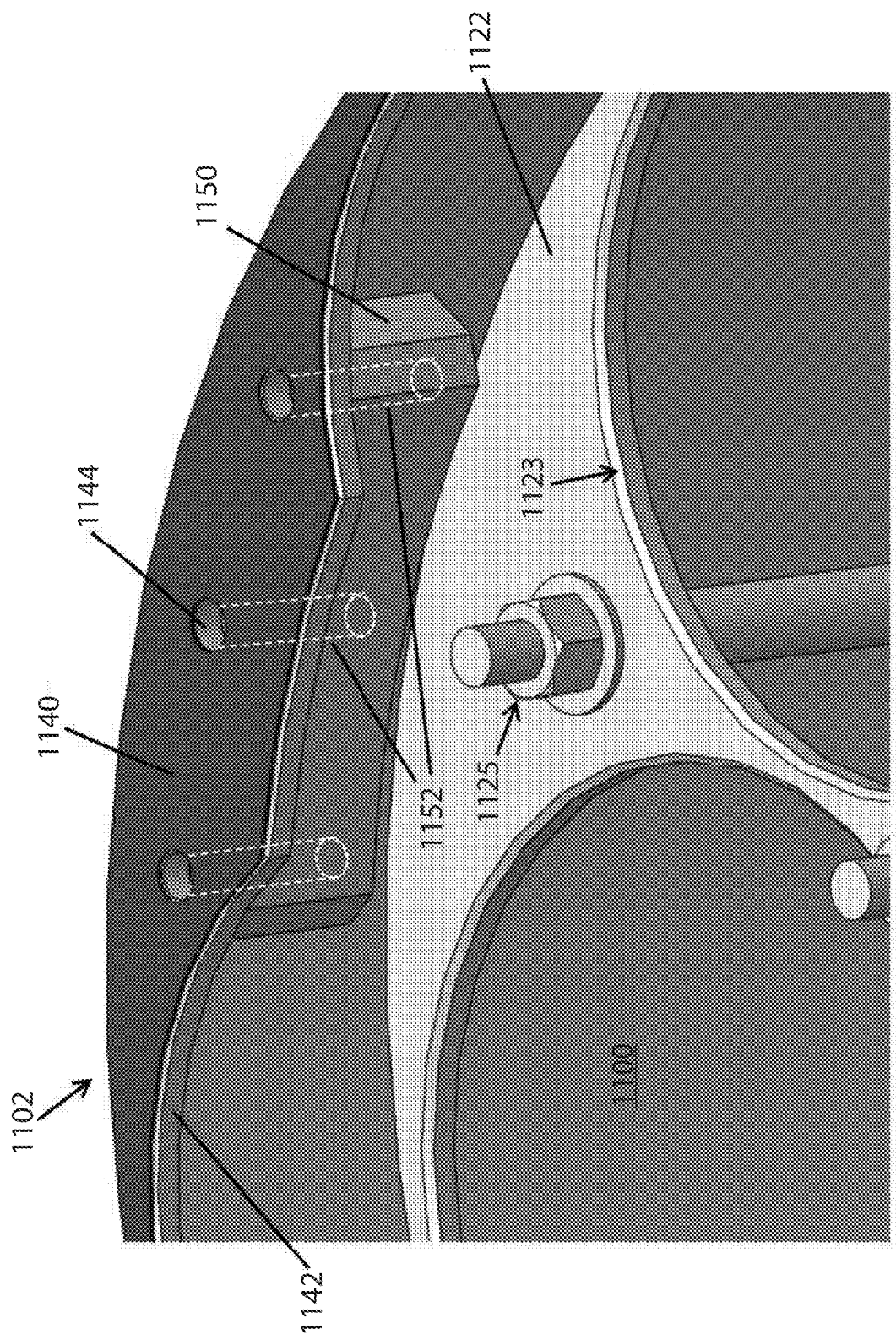
FIG. 11 is a close-up view thereof of the top portion of the canister showing details of the basket insert, a radiation containment barrier, and a bolting block.
Figure 12:
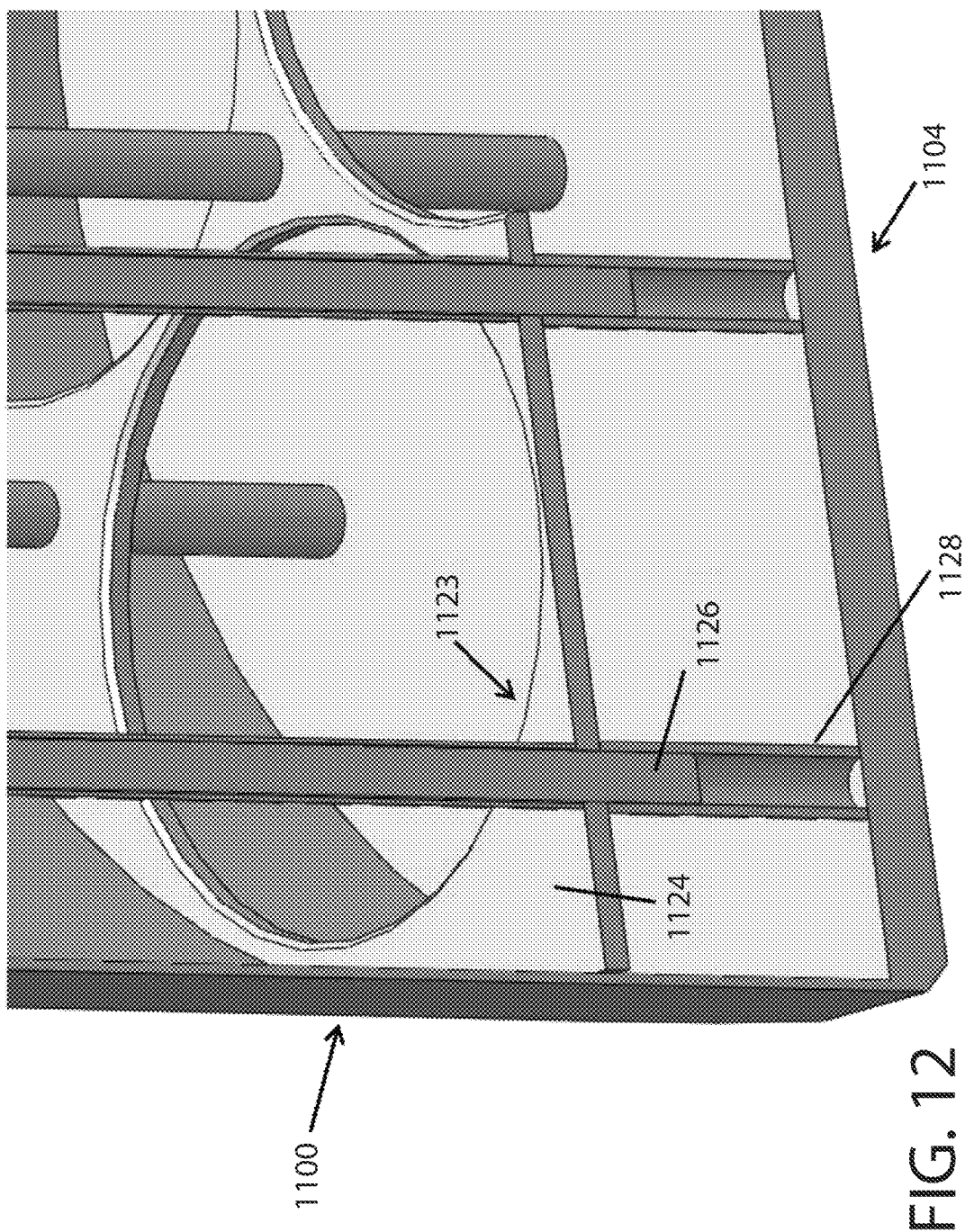
FIG. 12 is a close-up view thereof of the bottom portion of the canister showing details of the basket insert.

Referring to FIGS. 10 and 11, the top portion of tie rods 1126 may be threaded for attachment to top plate 1122 by a threaded nut 1125. Top plate 1122 may be spaced by a vertical distance below the top 1102 of canister 1100. Bottom plate 1124 may be elevated by a vertical distance above the bottom 1104 of canister 1100 by a plurality of vertical tubular sleeves 1128 having a bottom end resting on bottom 1104 of the canister 1100 and a top end attached to bottom plate 1124 as better shown in FIG. 12. In one embodiment, sleeves have an inside diameter sized to receive the bottom end portion of tie rods 1126 which are slidably received in the sleeves. This provides for vertical adjustment in the height of the basket insert 1120 to accommodate the height of waste cylinders 1121 to be stored inside canister 1100. Bottom plate 1124 remains fixed and stationary in position. The top plate 1122 with attached tie rods 1126, however, is movable upwards and downwards with respect to the canister and bottom plate 1124 to reach a desired position depending on the height of waste cylinders 1121. In some embodiments, the top plate 1122 may be thereafter be fixed in the desired position after vertical adjustments are made by securing the top plate to the interior of the canister sidewall 1106 such as by welding or other suitable means. Accordingly, adjustable basket insert 1120 may accommodate a variety of waste cylinder heights.

Basket insert 1120 (i.e. top plate, bottom plate, tie rods, etc.) may be made of any suitable material, including without limitation a corrosion resistant metal such as stainless steel in one embodiment.

Figure 13:
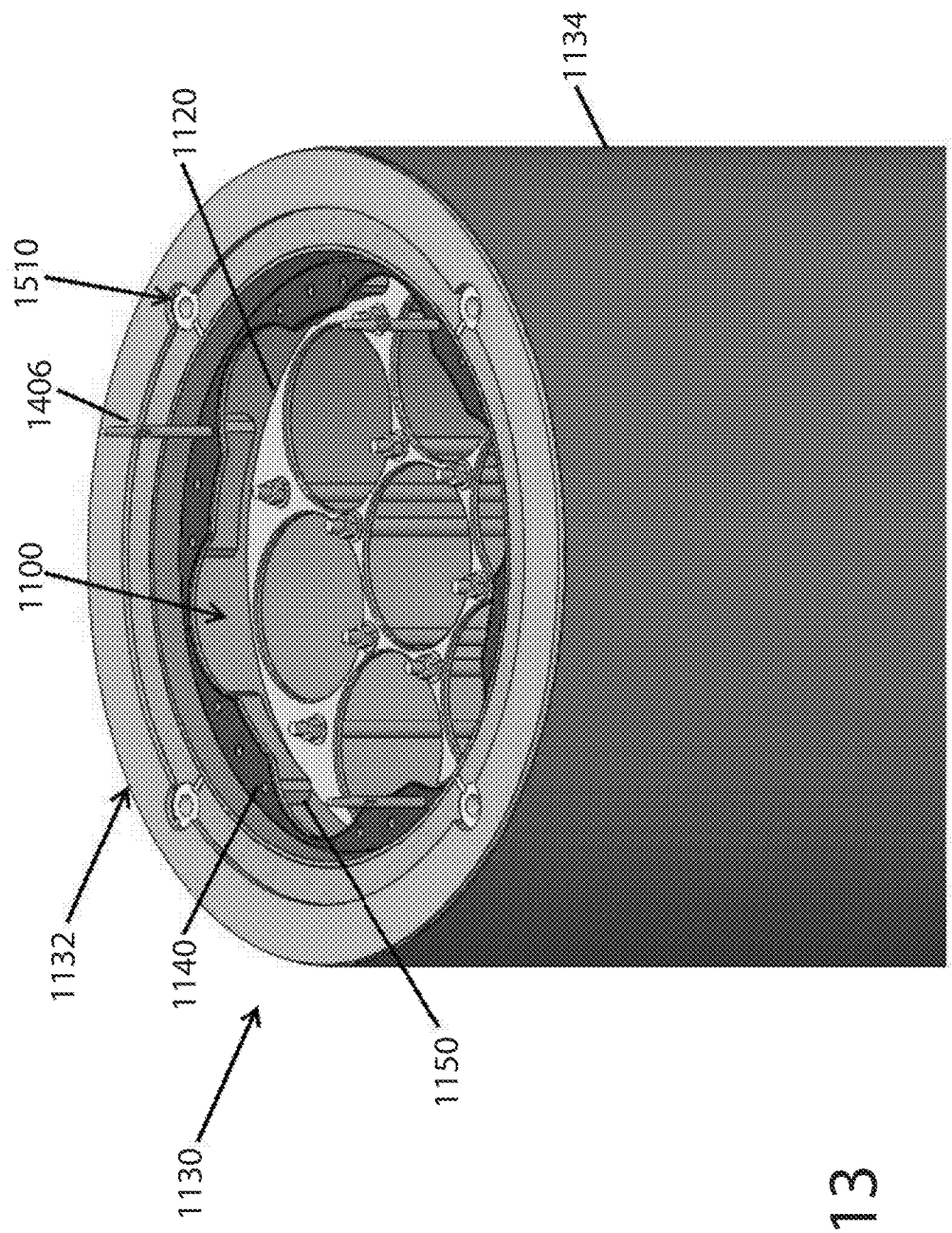
FIG. 13 is a perspective view of the canister of FIG. 9 disposed inside a protective overpack.

FIG. 13 shows canister 1100 loaded into an outer overpack 1130 for transport and storage of radioactive waste. The overpack provides protection during transport and storage of the waste by encapsulating the waste canister in an outer protective jacket. Overpack 1130 has an open top 1132, and is configured and dimensioned to completely receive canister 1100 through the top 1102. Overpack 1130 has an open interior defining an interior surface 1133 and an exterior surface 1135 (see also FIG. 17). Overpack 1130 is generally cylindrical in shape further including a cylindrical sidewall 1134 and flat closed bottom 1136 (see FIG. 23) configured for resting on a flat surface such as concrete slab. Preferably, in one embodiment, overpack 1130 has a greater height than canister 1100 so that the canister is recessed below the open top 1132 of the overpack when fully inserted therein.

Overpack 1130 may be made of any suitable material or combination of materials (see, e.g. FIG. 17) which may include neutron absorbing materials such as without limitation concrete, lead, or boron. An example of a suitable overpack for use with canister 1100 may be a HI-SAFE™ transport overpack as used in vertical non-fuel waste storage systems available from Holtec International of Marlton, N.J. The sidewalls 1134 forming the spaced apart cylindrical walls that define an annular space between the inner and outer surfaces 1133 and 1135 respectively may be formed of a corrosion resistant metal also selected for strength to protect the inner canister 1100, such as stainless steel as one non-limiting example. The neutron absorbing material may be disposed between the inner and outer surfaces 1133 and 1135. In some embodiments, overpack 1130 may also include Metamic® for radiation shielding which is a discontinuously reinforced aluminum/boron carbide metal matrix composite material also available from Holtec International.

Referring to FIGS. 10-11 and 13, the top of the canister 1100 may include a peripheral contamination boundary seal which cooperates with the confinement lid 1200 to prevent leakage of radiation from the canister, particularly at the lid bolting locations. In particular, the boundary seal shields the mounting blocks 1150 to prevent radiation streaming.

In one embodiment, the boundary seal may be configured as an annular shielding flange 1140 that extends circumferentially around the upper peripheral edge of the top 1102 of the canister. Confinement lid 1200 rests on the shielding flange when bolted to the canister 1100. Shielding flange 1140 may be horizontally flat and extend inwards in a direction perpendicular to and from sidewall 1106 towards the vertical axial centerline CL of the canister 1100. In one embodiment, shielding flange 1140 is attached to the uppermost top edge of the sidewall 1106 as shown. Shielding flange 1140 may have an at least partially scalloped configuration in top plan view in some embodiments as shown to accommodate insertion of waste cylinders 1121 into the canister. According, the scallops 1142 if provided are preferably concentrically aligned with the circular openings 1123 in basket insert 1120 in top plan view. This minimizes the required diameter of the canister 1100 for holding the waste cylinders 1121. In other possible embodiments, however, shielding flange 1140 may have an uninterrupted shape forming a continuous ring in top plan view.

At the lid bolting locations, shielding flange 1140 is configured to cover a with a plurality of mounting blocks 1150 which are circumferentially spaced around the interior of canister 1100 disposed adjacent to sidewall 1106 to provide a radiation-shielded bolting system for attaching confinement lid 1200 and shielded lifting lid 1300 to the canister. Shielding flange 1140 may be formed of any suitable material including metals which are corrosion resistant such as stainless steel.

With continuing reference to FIGS. 10-11 and 13, mounting blocks 1150 may have a generally arcuate and curved shape in top plan view which complements the inside radius of curvature of the sidewall 1106 to which mounting blocks 1150 may be attached. Mounting blocks 1150 may be rigidly/fixedly attached to the canister sidewall 1106 by a suitably strong mechanical connection capable of supporting at least the entire dead weight of canister 1100 and basket insert 1120 for lifting and loading the canister into overpack 1130. Accordingly, in one preferred embodiment, mounting blocks 1150 are welded to at least sidewall 1106 of the canister body for strength. In some embodiments, the mounting blocks 1150 may be abutted against but are not fixedly connected to the underside of radiation shielding flange 1140 so that lifting loads are not transferred to the flange directly but rather bypass the flange to the mounting blocks 1150 via the bolting provided.

Any suitable number of mounting blocks 1150 may be provided; the number and circumferential spacing being dependent on the magnitude of the structural load imparted to the blocks dependent on whether the canister 1100 will be lifted in an empty condition or in a fully loaded condition with filled waste cylinders 1121 positioned in the canister. It is well within the ambit of those skilled in the art to determine an appropriate number and circumferential spacing of the mounting blocks 1150.

Figure 17:
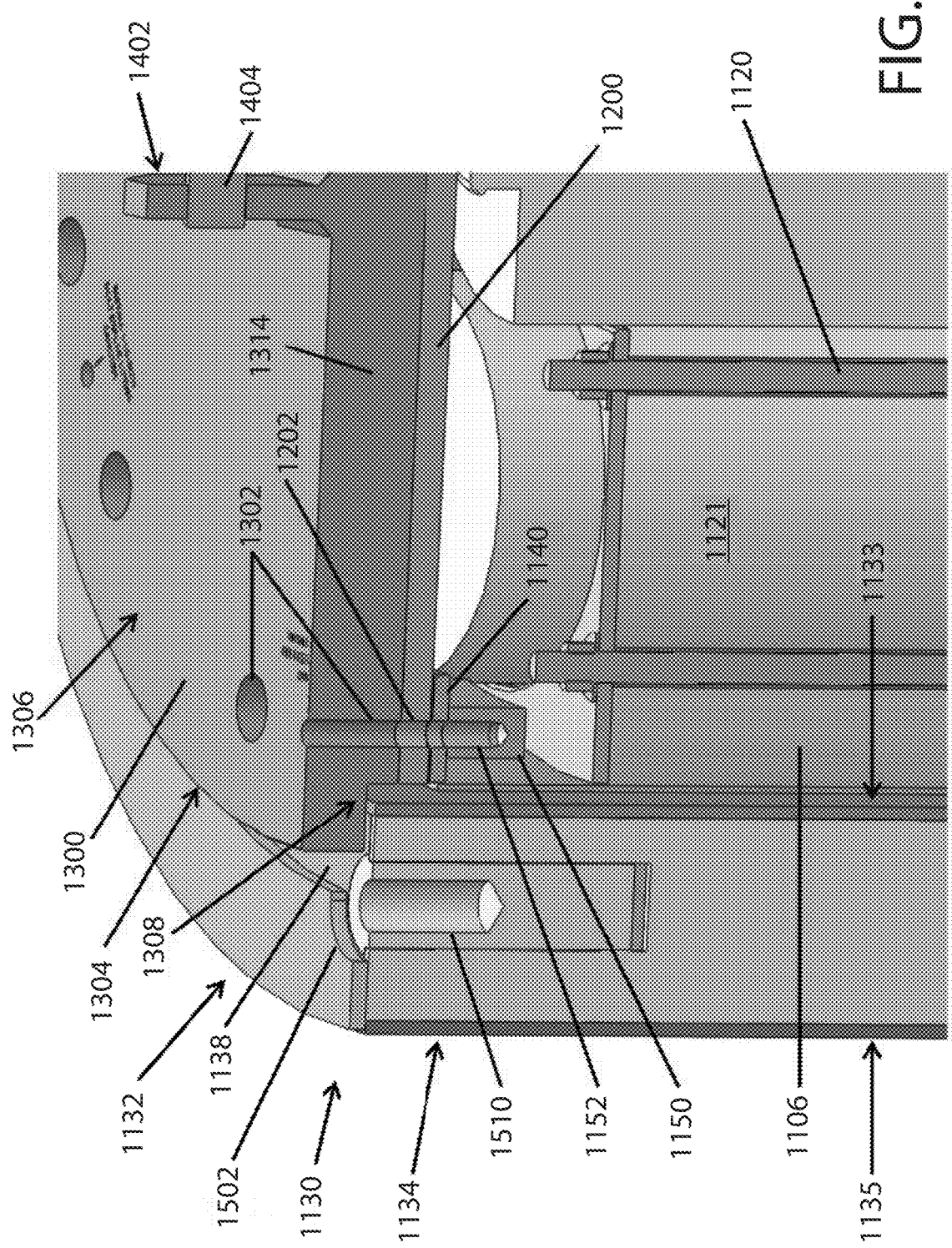
FIG. 17 is a cross-sectional perspective view thereof of the upper left corner portion of the overpack and canister.

In one embodiment, the mounting blocks 1150 are each configured for both lifting canister 1100 and attaching both the lower confinement lid 1200 and upper lifting lid 1300. As best shown in FIGS. 11 and 17, mounting blocks 1150 each include a plurality of threaded mounting sockets 1152 for forming a threaded connection with complementary threaded mounting bolts 1154 and 1156 used for attaching confinement lid 1200 and shielded lifting lid 1300 respectively to the canister 1100. In one non-limiting example, three threaded mounting sockets 1152 may be provided in each mounting block. However, other suitable numbers of mounting sockets may be used. In certain embodiments, the mounting sockets 1152 extend only partially into the mounting blocks 1150 as shown. Radiation shielding flange 1140 includes mating holes 1144 which are each concentrically aligned with the threaded mounting sockets 1152 of the mounting block to provide access for mounting bolts 1154, 1156 to the mounting sockets in the block. Because shielding flange 1140 in some embodiments in not intended to be a load-bearing member relied upon for lifting the canister, holes 1144 may not be threaded so that the weight of the canister is transferred through the flange via the mounting bolts 1156 to the shielded lifting lid 1300.

Figure 19:
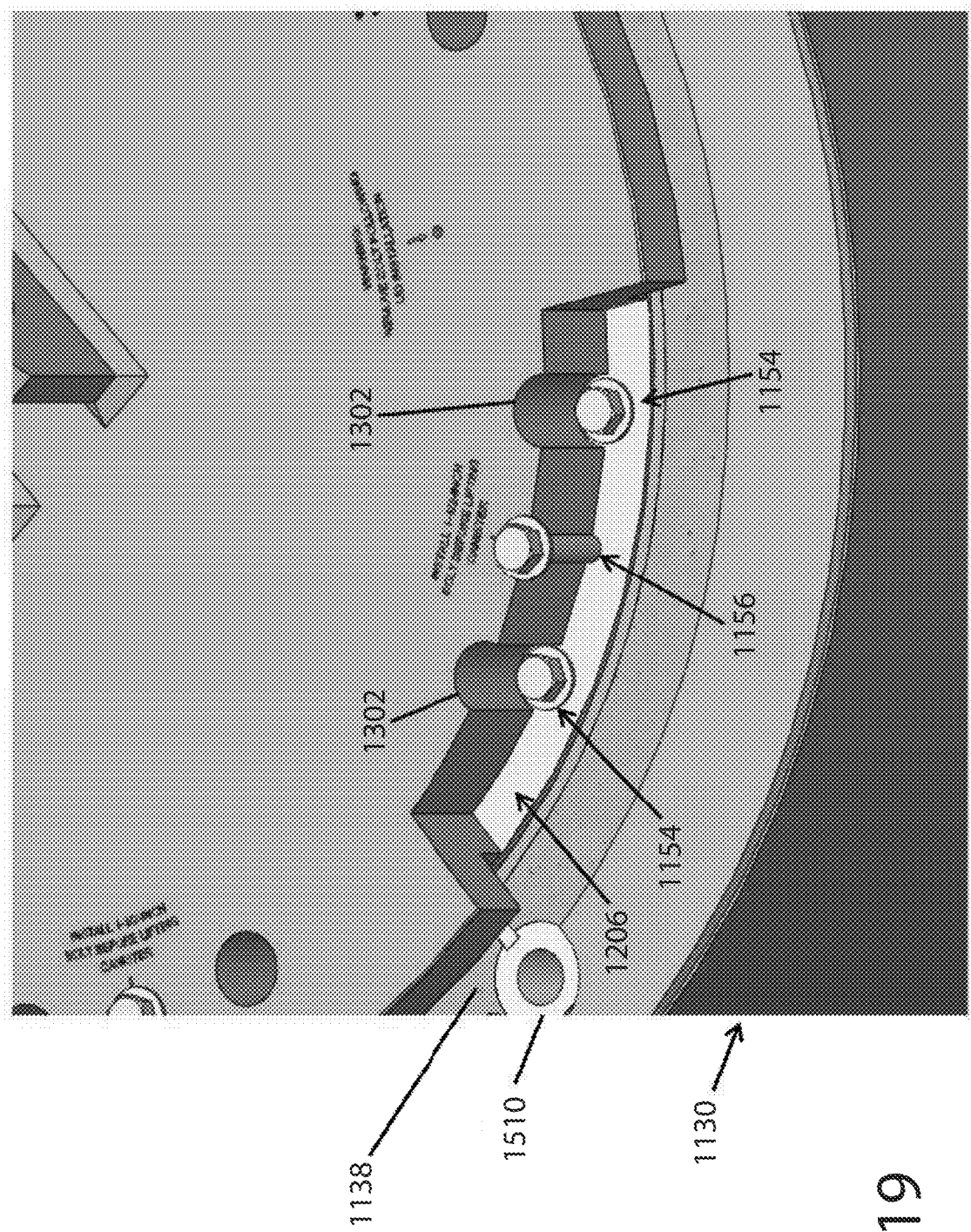
FIG. 19 is a close-up perspective view thereof with a portion of the shielded lifting lid being shown cutaway to show details of the confinement lid and shielded lifting lid bolting arrangement.
Figure 20:
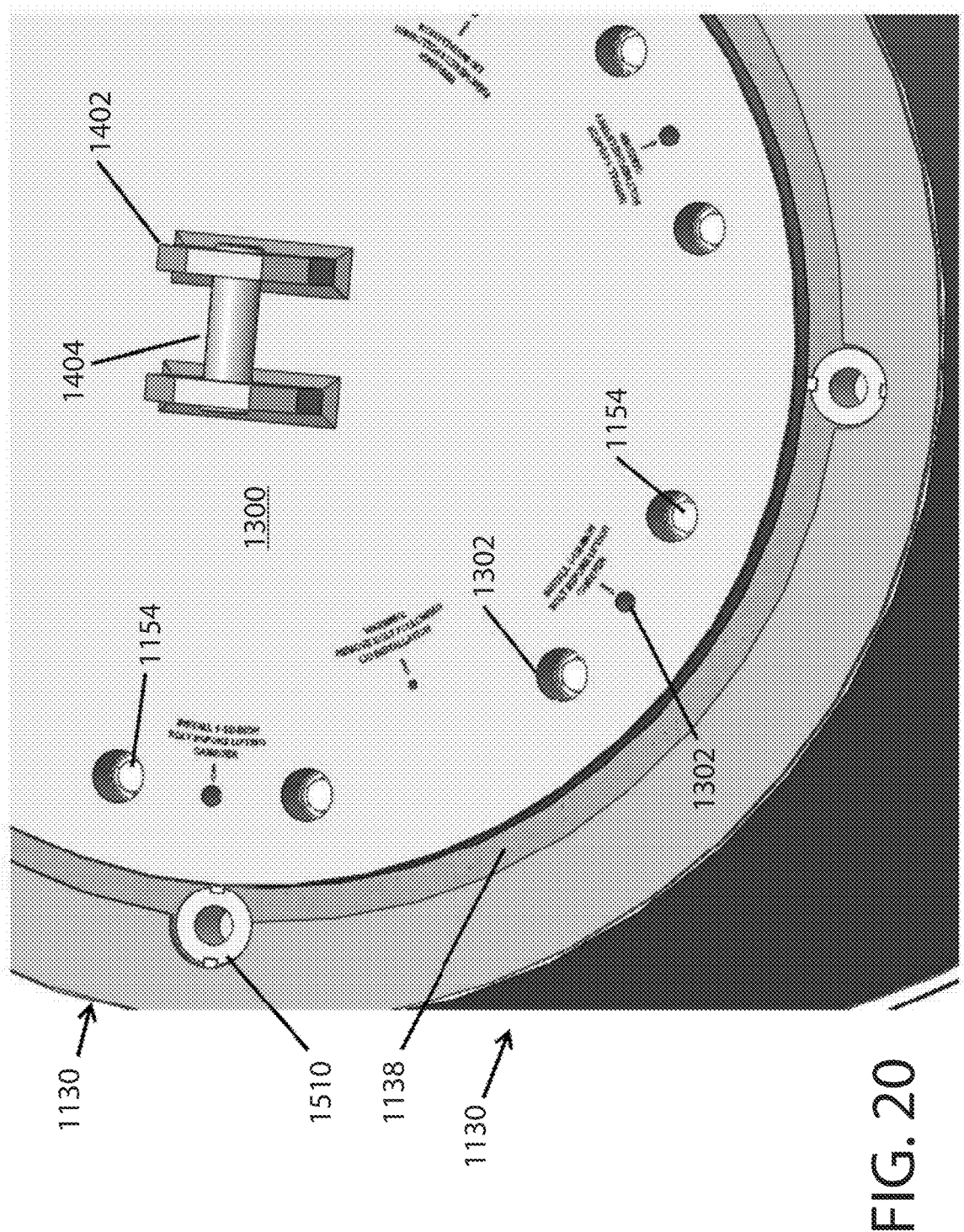
FIG. 20 is a perspective view thereof showing confinement lid mounting bolts in place.

In one embodiment, mounting bolts 1154 and/or 1156 may be threaded bolts having an integral or separate washer disposed adjacent to the head, as best shown in FIG. 19. Mounting bolts 1154 are used for attaching the lower confinement lid 1200 to canister 1100 via mounting blocks 1150. In one embodiment, mounting bolts 1154 are not used for lifting the canister 1100 but rather for lid securement. By contrast, mounting bolts 1156 serve a dual purpose and may be used for both attaching the lower shielded lifting lid 1300 to canister 1100 and supporting the weight of the canister during lifting operations via mounting blocks 1150 engaged by bolts 1156. In one preferred embodiment, mounting bolts 1156 may have a longer shank than mounting bolts 1154 as shown. This arrangement ensures that the depth of threaded engagement between the threaded mounting sockets 1152 of the mounting blocks 1150 and mounting bolt 1156 is sufficient for lifting the canister 1100, as further explained herein.

Figure 8:
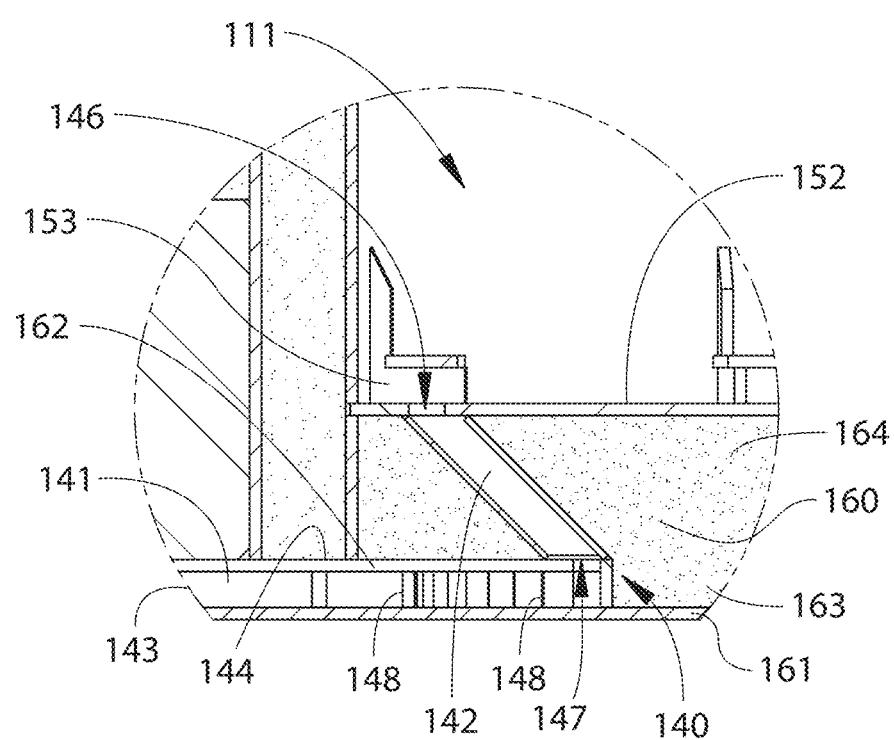
FIG. 8 is a close-up view of a portion of the vertical ventilated overpack illustrated in FIG. 4.

The confinement lid 1200 is generally circular in shape (top plan view) and shown in FIGS. 8, 17, and 19. Confinement lid 1200 includes a plurality of bolt holes 1202 spaced circumferentially around the peripheral side 1204 of the lid as best shown in FIG. 9 (including at locations where mounting bolts 1154 are shown installed). Bolt holes 1202 penetrate top surface 1206 of the confinement lid, and in one embodiment are not threaded. The bolt holes 1202 may be arranged in groups corresponding to the location and arrangement of the mounting blocks 1150 inside the canister 1100. The bolt holes 1202 have a diameter sized to at least pass the shank of mounting bolts 1154 and 1156 through the holes to threadably engage the mounting blocks 1150. Accordingly, some of the bolt holes 1202 are configured to receive the shanks of the confinement lid mounting bolts 1154 and others are configured to receive the shank of shielded lifting lid mounting bolts 1156. In cases where the mounting bolts 1154 and 1156 have shanks of the same diameter, the bolt holes 1202 may all have the same diameter. Where the shanks of bolts 1154 and 1156 are different in diameter, the holes 1202 may have correspondingly different diameters for each bolt.

The confinement lid 1200 may have a uniform thickness from peripheral side 1204 to peripheral side 1204 as best shown in FIG. 17 in one embodiment. In other embodiments, the thickness may vary at different locations on the lid 1200. Confinement lid 1200 may be made of any suitable material, preferably an appropriate metal for the application. In an exemplary embodiment, without limitation, the confinement lid 1200 for example may be made of stainless steel for corrosion resistance.

The upper shielded lifting lid 1300 is not intended to remain on canister 1100 for longer term waste storage. Instead, in some embodiments, the lifting lid 1300 is configured and structured for transporting and initially lifting the canister 1100 into position in the cylindrical overpack 1130 prior to loading the waste cylinders 1121 after which the lifting lid is removed, and then after the waste cylinders are loaded in the canister, the lifting lid is replaced on the canister to shield the operator for bolting the lower confinement lid 1200 in place after which the lifting lid is removed again. It will be appreciated that this scenario for using the shielded lifting lid 1300 may be varied in other embodiments.

Referring to FIGS. 15-20, shielded lifting lid 1300 is generally circular in shape (top plan view) and includes a plurality of bolt holes 1302 spaced circumferentially around the peripheral side 1304 of the lid as best shown in FIG. 9. In one embodiment, holes 1302 are not threaded. The bolt holes 1302 may be arranged in clustered groups or sets corresponding to the location and arrangement of the mounting blocks 1150 inside the canister 1100. The bolt holes 1302 have a diameter sized to at least pass the shank of mounting bolts 1154 and 1156 through the holes to threadably engage the mounting blocks 1150. Accordingly, some of the bolt holes 1302 are configured to receive the shanks of the confinement lid mounting bolts 1154 and others are configured to receive the shank of shielded lifting lid mounting bolts 1156. In cases where the mounting bolts 1154 and 1156 have shanks of the same diameter, the bolt holes 1302 may all have the same diameter. Where the shanks of bolts 1154 and 1156 are different in diameter, the holes 1302 may have correspondingly different diameters for each bolt.

According to another aspect of the invention, bolt holes 1302 have different diameters in one embodiment even if the mounting bolts 1154, 1156 are used have the same shank diameter. The confinement lid mounting bolts 1154 need not engage the upper shielded lifting lid because bolts 1154 are only required to secure the lower confinement lid to canister 1100. Accordingly, in the embodiment shown in FIG. 19, the bolt holes 1302 for the confinement lid mounting bolts 1154 may have a larger diameter than the bolt holes 1302 for the lifting lid mounting bolts 1156. In this arrangement, the bolt holes 1302 for the confinement lid mounting bolts 1154 are sized with a diameter large enough to allow the shank and entire head of bolts 1154 to pass through the bolt holes so that the head and integral washer directly engage the top surface 1206 of the confinement lid 1200 (see, e.g. FIG. 9). When completely installed, the heads of the mounting bolts 1154 are recessed below the top surface of the lifting lid 1300 as shown.

By contrast, since the mounting bolts 1156 for the lifting lid 1300 also serve a lifting function for the canister 1100, the bolt holes 1302 have a diameter sized so that the heads of bolts 1156 do not pass through the bolt holes and instead engage the top surface 1306 of the lifting lid (thereby projecting above the top surface and remaining exposed as shown in FIG. 19). In this manner, the bolts 1156 transfer the dead load and weight of the canister 1100 from the mounting blocks 1150 directly to the shielded lifting lid 1300 without involvement of the confinement lid 1200. Accordingly, to accommodate the foregoing arrangement, the lifting lid mounting bolts 1156 preferably have a longer shank than the confinement lid mounting bolts 1154 in this embodiment.

Figure 18:
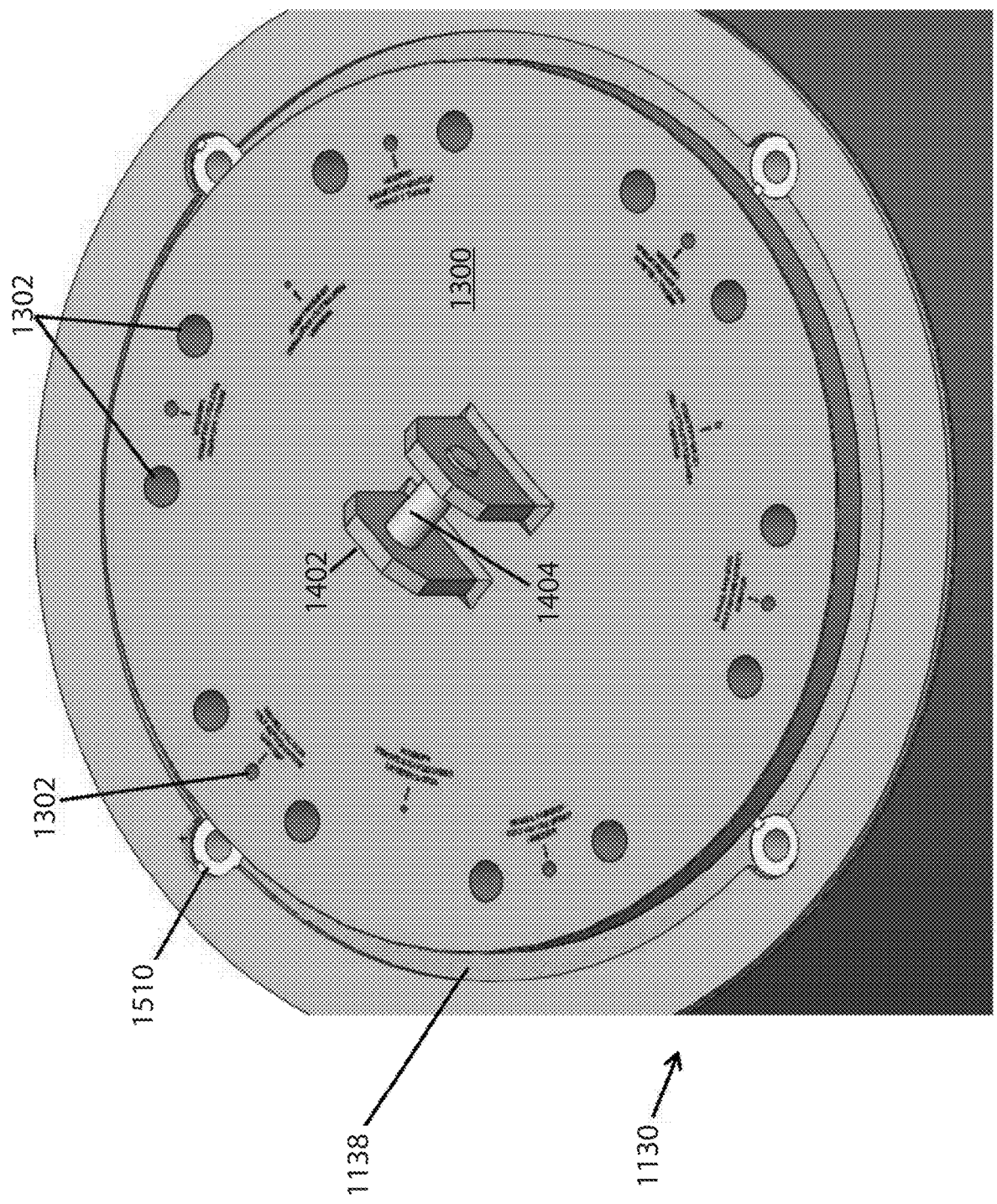
FIG. 18 is a top perspective view of the overpack showing the confinement lid-shielded lifting lid positioned on the overpack.

As shown in FIGS. 17 and 18, several spaced apart clusters comprised of three bolt holes 1302 may be provided in the non-limiting embodiment shown which are spaced circumferentially around and proximate to the peripheral side 1304 of the shielded lifting lid 1300. Each cluster of bolt holes 1302 is spaced apart by an arcuate distance from adjacent clusters of holes 1302. The clusters of bolts holes 1302 are each vertically aligned with a corresponding mounting block 1150 (see also FIG. 11). In this embodiment, the center hole 1302 has a smaller diameter for the lifting lid mounting bolt 1156 than the two adjacent outer holes 1302 have larger diameters for the confinement lid mounting bolts 1154. Other suitable arrangements of holes 1302 may be provided. The bolt holes 1202 in the confinement lid 1200 may also arranged in clusters of three to mate with the bolt holes 1302 of the lifting lid 1300. All three of the bolt holes 1202 in each cluster in the confinement lid, however, may have the same diameter.

Advantageously, having two different size bolt holes 1302 for the confinement lid mounting bolts 1154 and the lifting lid mounting bolts 1156 reduces possible installation error and ensures that the operator will not confuse which holes are intended for each. This plays a role in deploying the two-part lid system when the confinement lid 1200 and its respective bolts 1154 are eventually left in place after bolting the confinement lid to the canister 1100 and the lifting lid mounting bolts 1156 are removed by the operator, as further described herein.

The shielded lifting lid 1300 may have a non-uniform thickness from peripheral side 1304 to peripheral side 1304 as best shown in FIG. 17. Accordingly, in one possible embodiment as shown, the peripheral portion of lifting lid 1300 may include an outer annular step or shoulder 1308 having a smaller thickness than the inner central portion 1314 of the lid. The shoulder 1308 is configured to complement and abuttingly engage a corresponding top annular rim 1138 of the overpack 1130 such that portions of the lifting lid 1300 adjacent to peripheral side 1304 overlap the top of the rim to prevent radiation streaming as shown. Rim 1138 therefore defines an annulus for receiving shoulder 1308. Accordingly, as shown in FIG. 17, shielded lifting lid 1300 has a larger diameter than confinement lid 1200 to account for the overlap with the annular rim 1138 of the overpack 1130.

The central portion 1314 of the lifting lid 1300 preferably has a thickness and a diameter sized to allow at least partial insertion of the central portion into the overpack 1130 such that the outwards facing annular sides of the central portion abuts the interior surface 1133 of the overpack as shown. This arrangement further prevents radiation streaming from the canister 1100 when the lifting lid 1300 is in place on the canister.

Because shielded lifting lid 1300 serves a structural purpose for lifting the canister 1100, the lifting lid preferably has a thickness which is greater than the confinement lid 1200. In one embodiment, the lifting lid has a thickness which is at least twice the thickness of the confinement lid. Shielded lifting lid 1300 may be made of any suitable material, preferably an appropriate metal for the application.

In exemplary embodiments, without limitation, the lifting lid 300 for example may be made of carbon steel or stainless steel.

Figure 15:
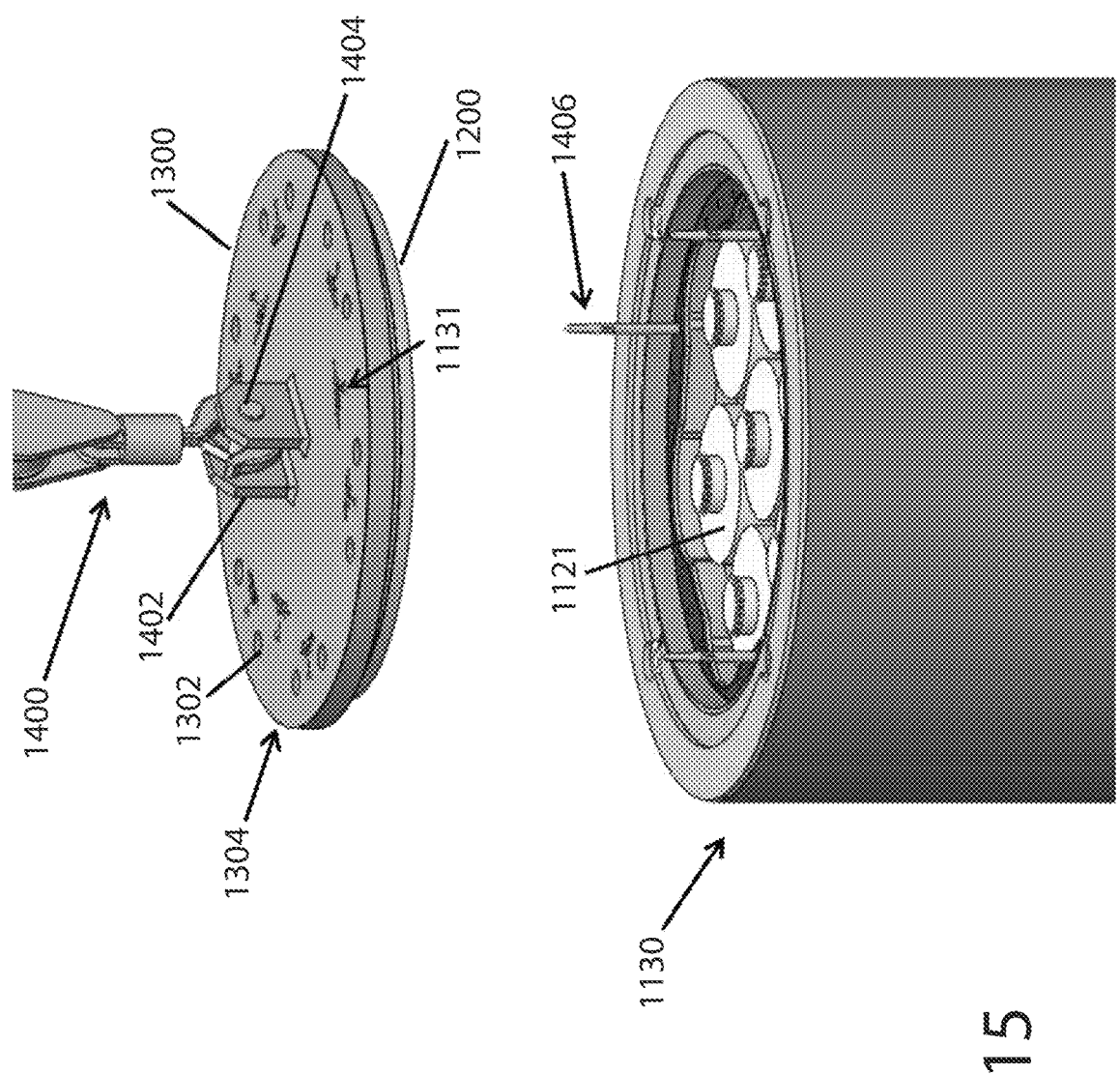
FIG. 15 is a perspective view thereof also showing a coupled confinement lid-shielded lifting lid assembly being grappled and hoisted over the overpack and canister.
Figure 16:
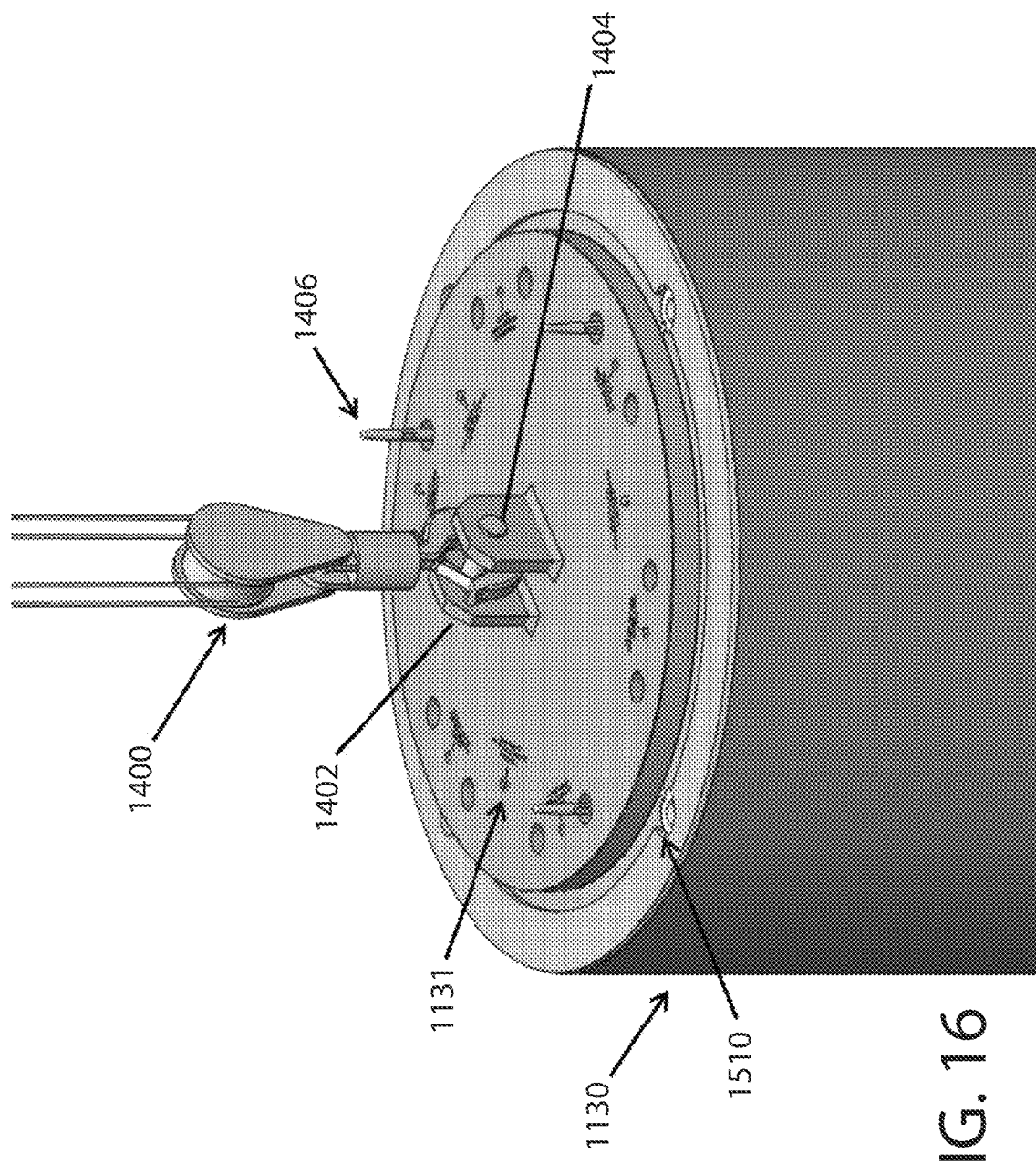
FIG. 16 is a perspective view thereof showing the grappled confinement lid-shielded lifting lid assembly lowered and placed in position on the overpack and canister.

Referring to FIGS. 15 and 16, the lower confinement lid 1200 is detachably mounted to upper shielded lifting lid 1300 so that the lid assembly 1200/1300 may be lifted and moved as a single unit as shown with the lifting lid supporting the confinement lid when not attached to the canister 1100. When needed during the canister closure operations, the lifting lid 1300 may be uncoupled from the confinement lid 1200. In one embodiment, a plurality of circumferentially spaced fasteners such as threaded assembly bolts 1131 may be provided to attach lifting lid 1300 to confinement lid 1200. Assembly bolts 1131 which are inserted through the lifting lid 1300 and engage complementary threaded sockets 1208 (shown in FIG. 9) formed in the confinement lid (such arrangement and operation being apparent to those skilled in the art without further elaboration). A suitable number of assembly bolts 1131 are provided to support the lower confinement lid 1200 from the upper shielded lifting lid 1300 during hoisting. Accordingly, confinement lid 1200 may be considered to be fully supported by the lifting lid 1300 during lifting of the lid assembly 1200/1300.

As shown in FIGS. 15 and 16, shielded lifting lid 1300 includes a lifting attachment such as lifting lugs 1402 and pin 1404 for grappling and hoisting the lid. Other suitable lifting attachments configured for grappling such as for example lifting bails may be used.

An exemplary method for storing radioactive waste using the present container system with two-part lid assembly 1200/1300 (confinement lid 1200, lifting lid 1300) according to the present disclosure will now be described. As a preliminary step, the lower confinement lid 1200 is detachably mounted to the upper shielded lifting lid 1300 using assembly bolts 1131 to collectively form the lid assembly 1200/1300, shown in FIG. 15.

Referring to FIGS. 9 and 10, the method begins with a canister 1100 first being provided with an empty basket insert 1120 disposed inside the canister as shown. Next, the empty canister 1100 is lifted and placed into the overpack 1130 as shown in FIG. 13. In one embodiment, this step may be performed by bolting the lid assembly 1200/1300 to canister 1100 using the mounting bolts 1156 to threadably engage the mounting blocks 1150, and grappling and attaching a hoist 1400 to the upper lifting lid 1300 using lifting lugs 1402 and pin 1404 as shown in FIG. 15. The hoist 1400 may be part of the lifting equipment such as a crane or other suitable equipment operable to raise and lower the canister. After positioning the basket insert 1120 into the canister 1100, the mounting bolts 1156 may be removed to disconnect the canister from the lid assembly. The lid assembly 1200/1300 may then be lifted by the hoist and removed (see FIG. 13).

Next, one or preferably more lid alignment pins 1406 may be threaded into some of the threaded sockets 1152 of the mounting block to eventually help properly align the lid assembly 1200/1300 with the canister (see FIG. 13). In one non-limiting example, three alignment pins 1406 are used spaced apart on the canister. The alignment pins 1406 are preferably installed locally by an operator prior to loading the radioactively "hot" waste cylinders 1121 into the canister. Following installation of the alignment pins 1406, the waste cylinders 1121 are loaded into the canister 1100, and more specifically positioned in their respective locations provided in basket insert 1120 as shown in FIG. 14. Loading of the waste cylinders is performed remotely (i.e. at a distance) by an operator using suitable equipment to protect the operator from radiation.

After loading the waste cylinders 1121, the lid assembly 1200/1300 is remotely hoisted by the operator over and vertically positioned above the top 1102 of the canister 1100, as shown in FIG. 15. Using the lid alignment pins 1406, the operator vertically aligns holes 1302 in shielded lifting lid (with holes 1202 in confinement lid being concentrically aligned with holes 1302) with corresponding pins 1406 to properly orient the lid rotationally with respect to the canister. When the pins 1406 and their corresponding holes have been axially aligned, the operator lowers lid assembly 1200/1300 onto the canister 1100 as shown in FIG. 16 (see pins 1406 extending through holes 1302). The operator will now be shielded from radiation emitted from the canister so that the confinement lid 1200 may be bolted in place locally.

Next, the lid alignment pins 1406 and assembly bolts 1131 which hold the lower confinement lid 1200 to upper shielded lifting lid 1300 may be removed (see, e.g. FIG. 18). All of the confinement lid mounting bolts 1154 may then be installed to mount the confinement lid 1200 to the canister 1100 using the mounting blocks 1150. The mounting bolts 1154 are threaded through bolt holes 1302 until the heads of the bolts engage the top surface 1206 of the confinement lid 1200 and the bolts are tightened to the required torque (see FIGS. 19 and 20).

Prior to removing the shielded lifting lid 1300, a set of overpack lid alignment pins 1408 may next be installed in threaded sockets 1510 of the overpack 1130.

Figure 23:
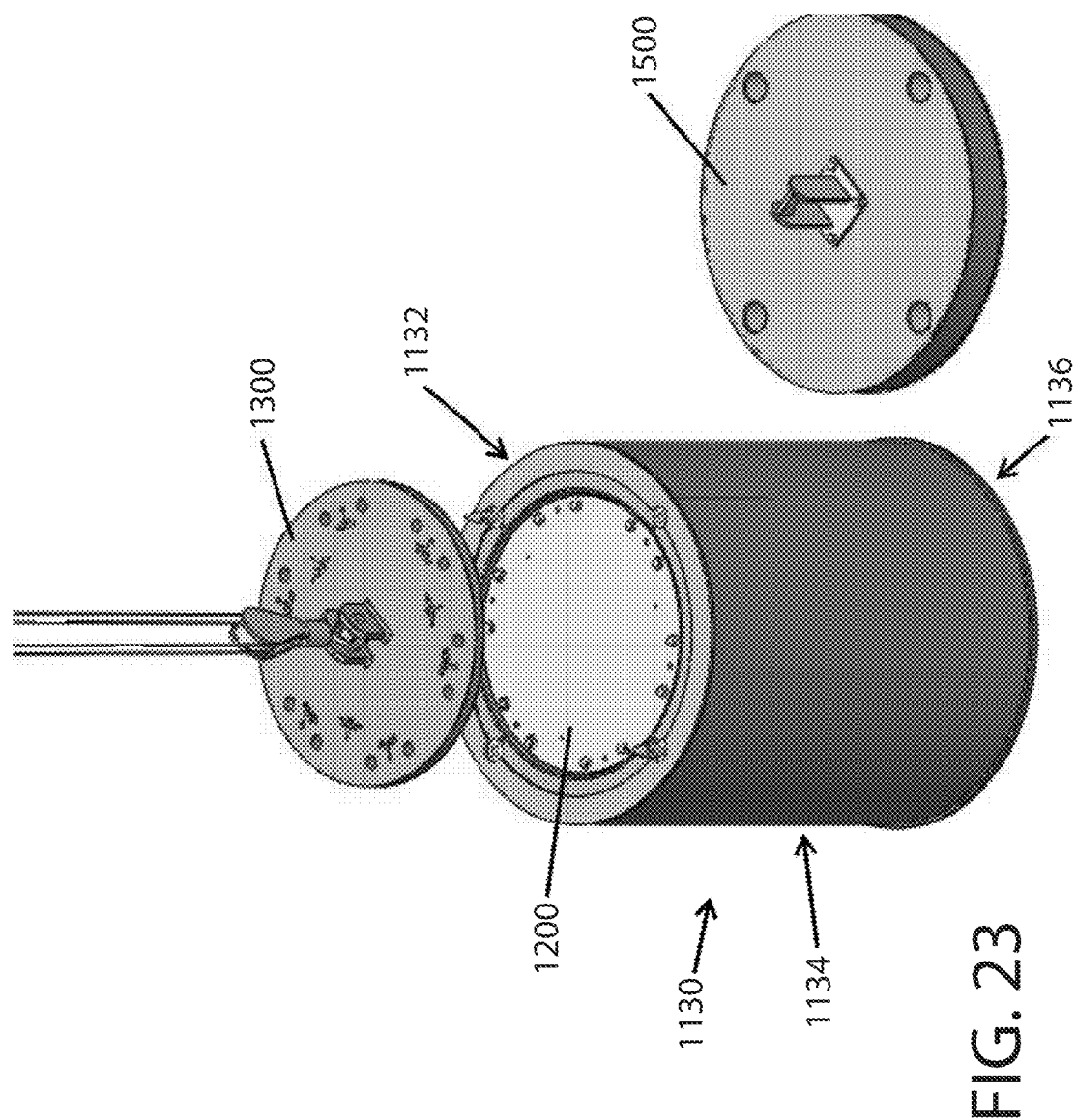
FIG. 23 is a perspective view of the grappled shielded lifting lid uncoupled from the confinement lid and being removed from the overpack and canister, with the overpack lid staged for installation.

With the confinement lid 1200 now fully fastened to canister 1100, the shielded lifting lid 1300 may next be removed via the hoist remotely by an operator as shown in FIG. 23.

Figure 21:
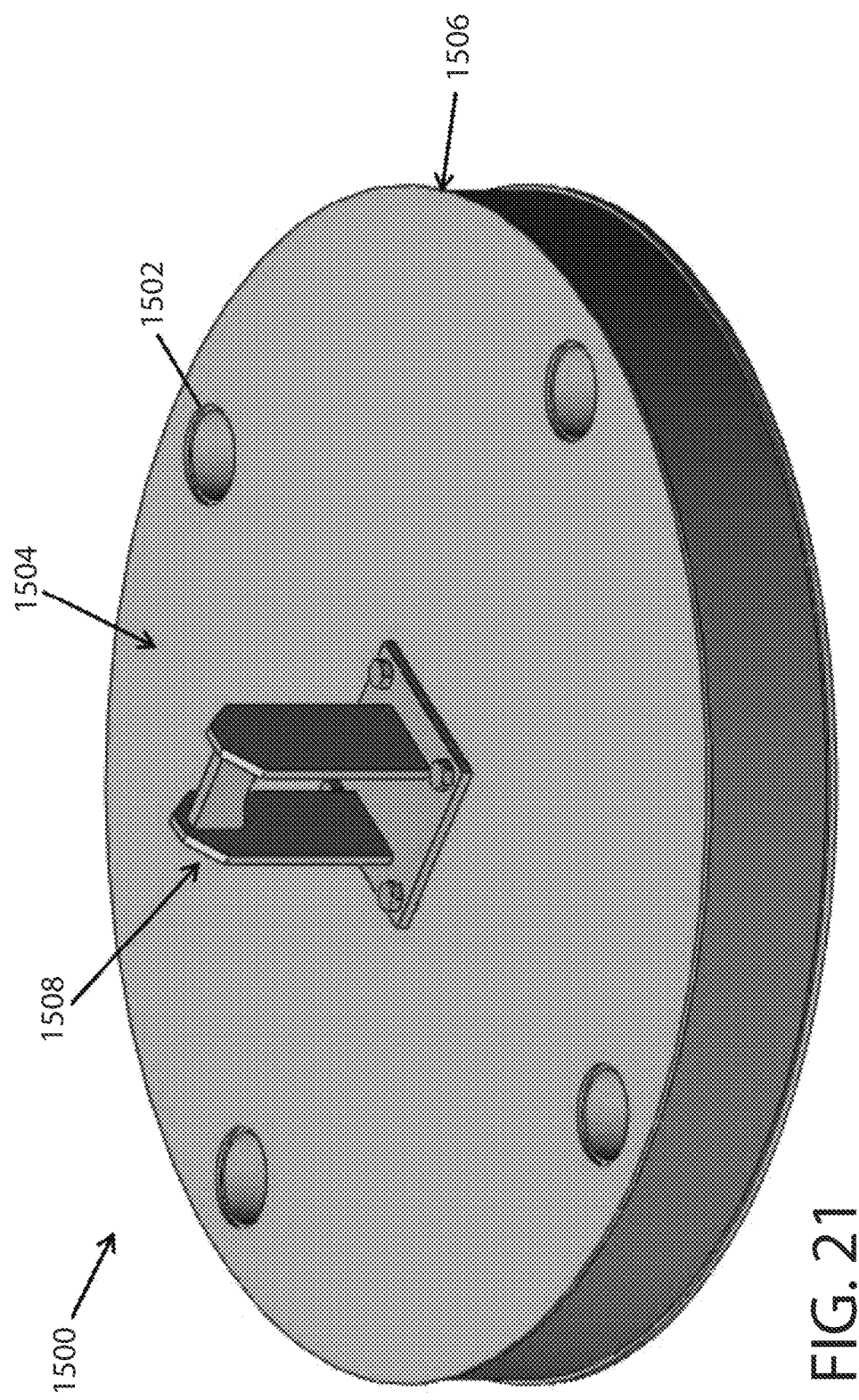
FIG. 21 is a perspective view of the overpack lid.
Figure 22:
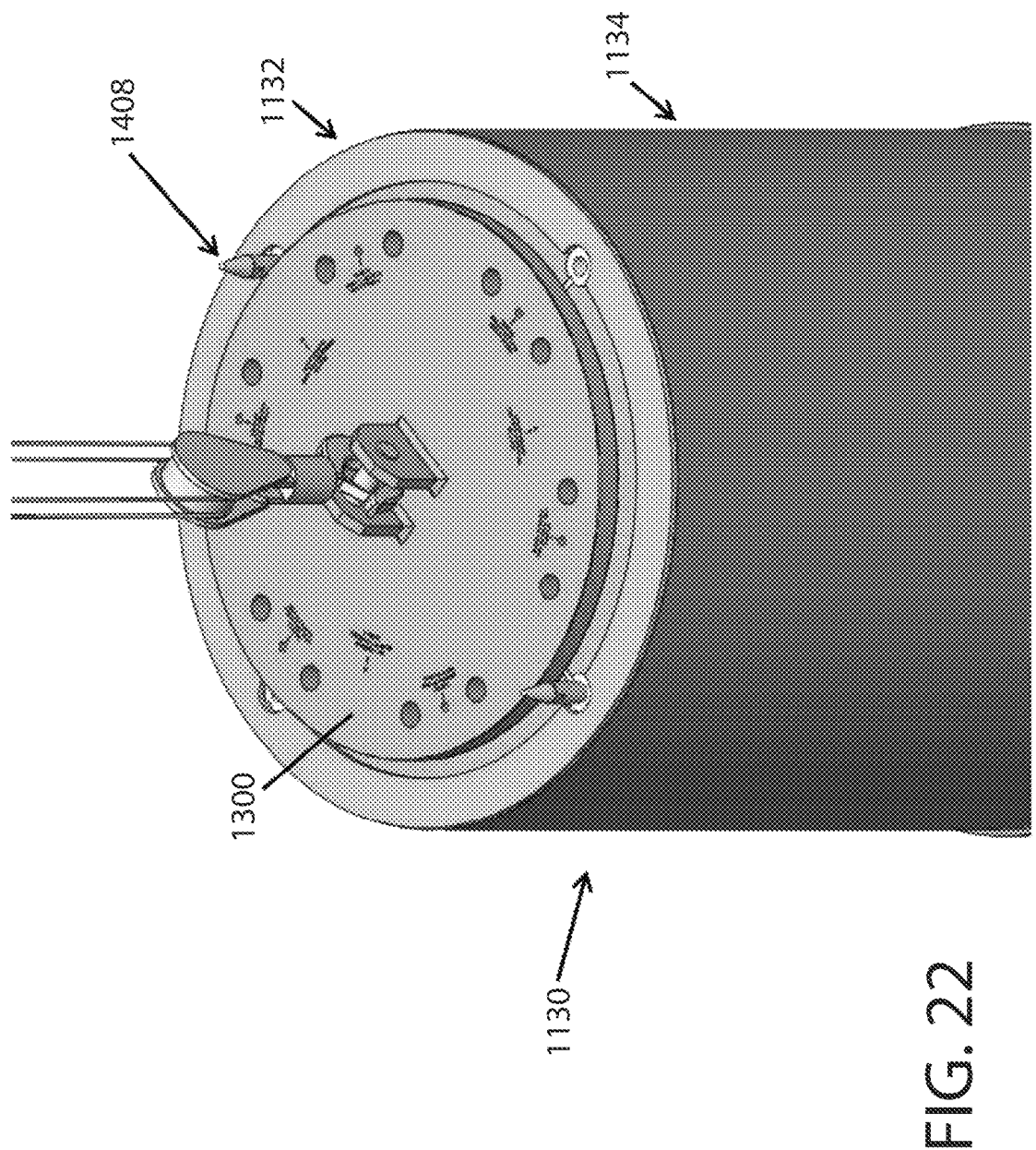
FIG. 22 is a perspective view thereof showing the confinement lid-shielded lifting lid assembly and overpack of FIG. 16 with overpack lid alignment pins in place.

In the following steps, the overpack lid 1500 is installed on overpack 1130 following closure of canister 1100 described above. FIG. 23 shows the shielded lifting lid 1300 being removed and the overpack lid 1500 staged for installation. FIG. 21 shows overpack lid 1500 in greater detail. Overpack lid 1500 is circular in shape (top plan view) and includes a plurality of mounting holes 1502, top surface 1504, peripheral sides 1506, and a lifting bail 1508 attached towards the center of the lid for engagement by a hoist. Overpack lid 1500 serves a structural role of protecting the canister 1100 disposed inside the overpack 1130, and in some embodiments supporting the weight of the overpack when mounted thereto for transport and lifting. Accordingly, overpack lid 1500 may have a thickness greater than the thickness of the confinement lid 1200.

Figure 24:
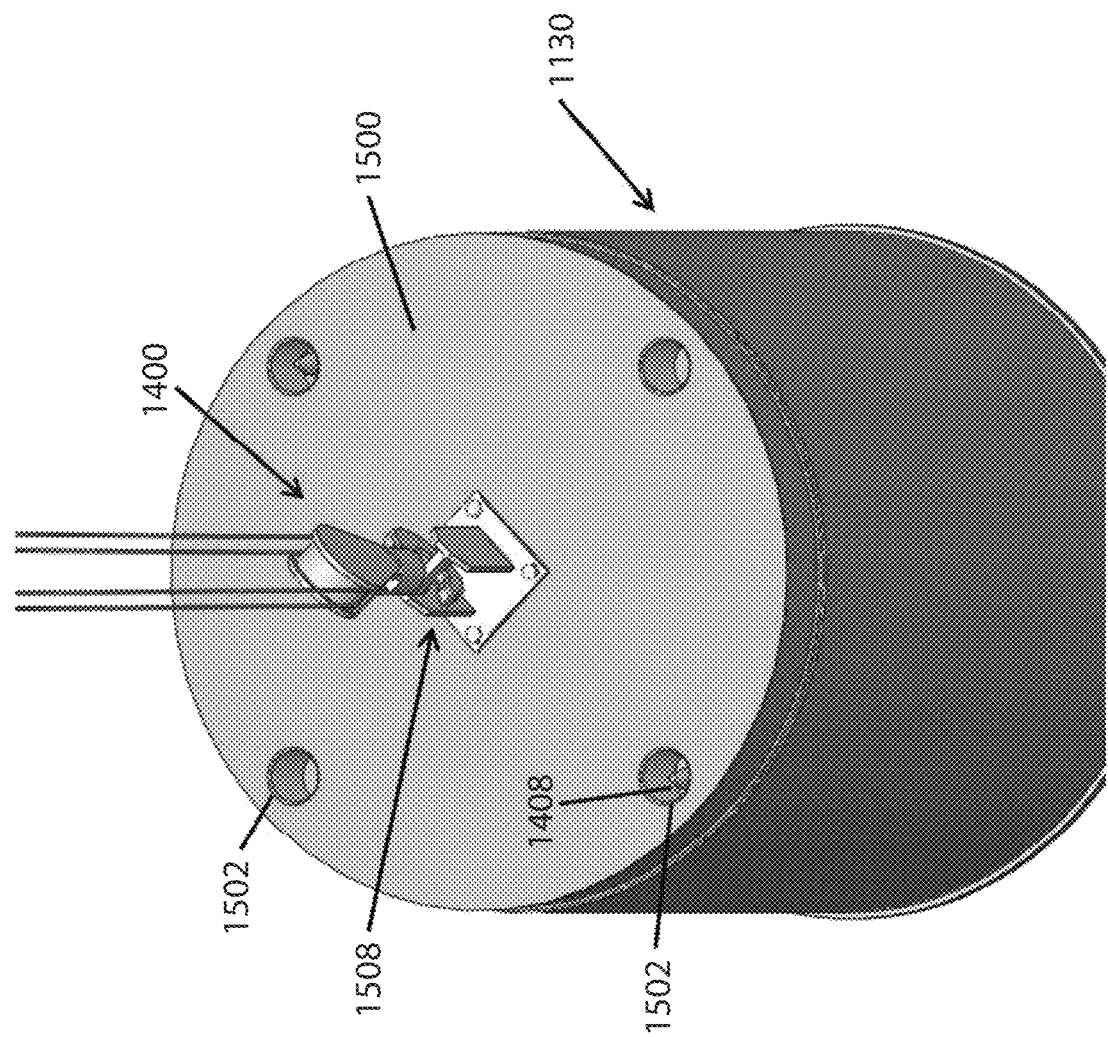
FIG. 24 is a perspective view of the grappled overpack lid lowered into position on the overpack.
Figure 25:
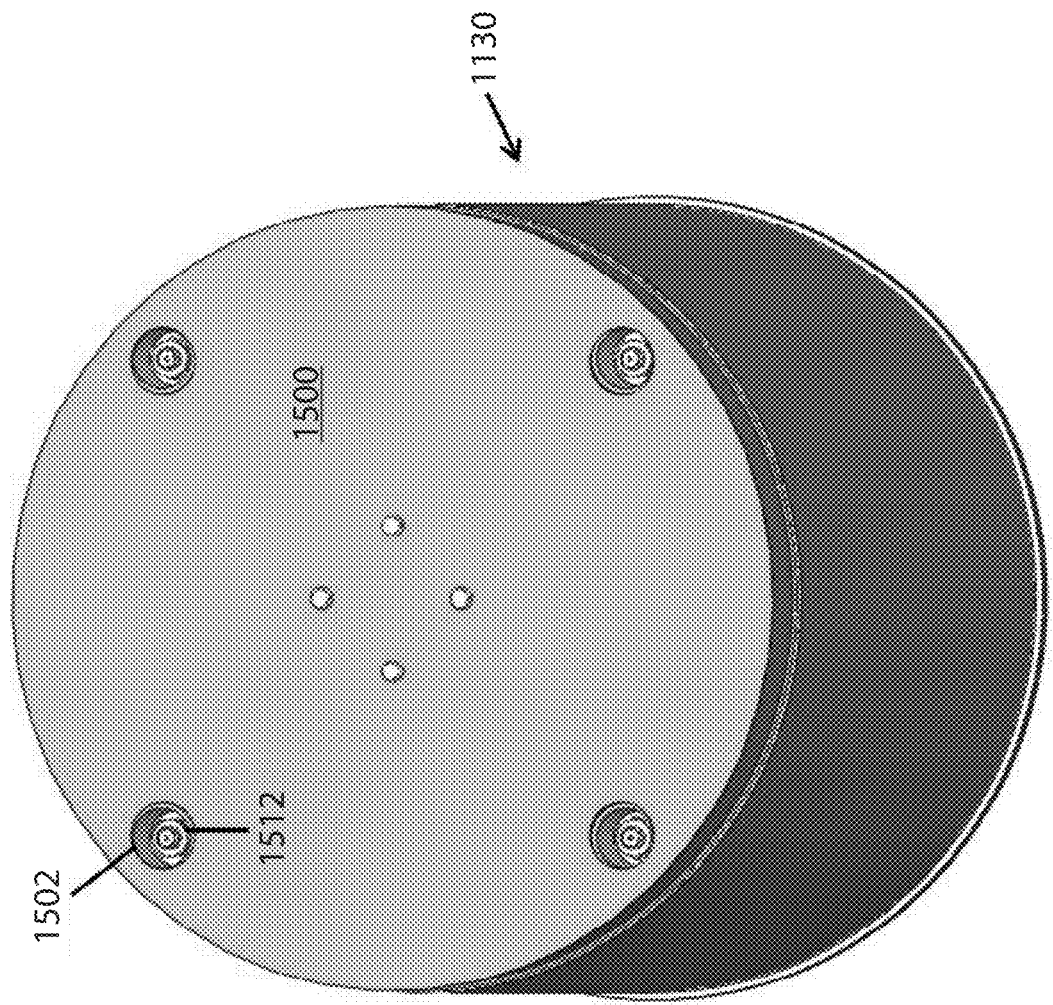
FIG. 25 is a perspective view thereof with the overpack lid bolted onto the overpack.

Referring now to FIGS. 23 and 24, the overpack lid 1500 is grappled and lifted via the attached hoist 1400 by crane or other equipment, vertically aligned with overpack 1130 using the alignment pins 1408 in a manner similar to alignment pins 1406, and lowered onto the overpack. Alignment pins 1408 are then removed and mounting bolts 1512 are then installed in the threaded sockets 1510 of the overpack 1130 to complete installation and securement of the overpack lid 1500, as shown in FIG. 25. Optionally, the lifting bail 1508 may be removed.

Figure 26:
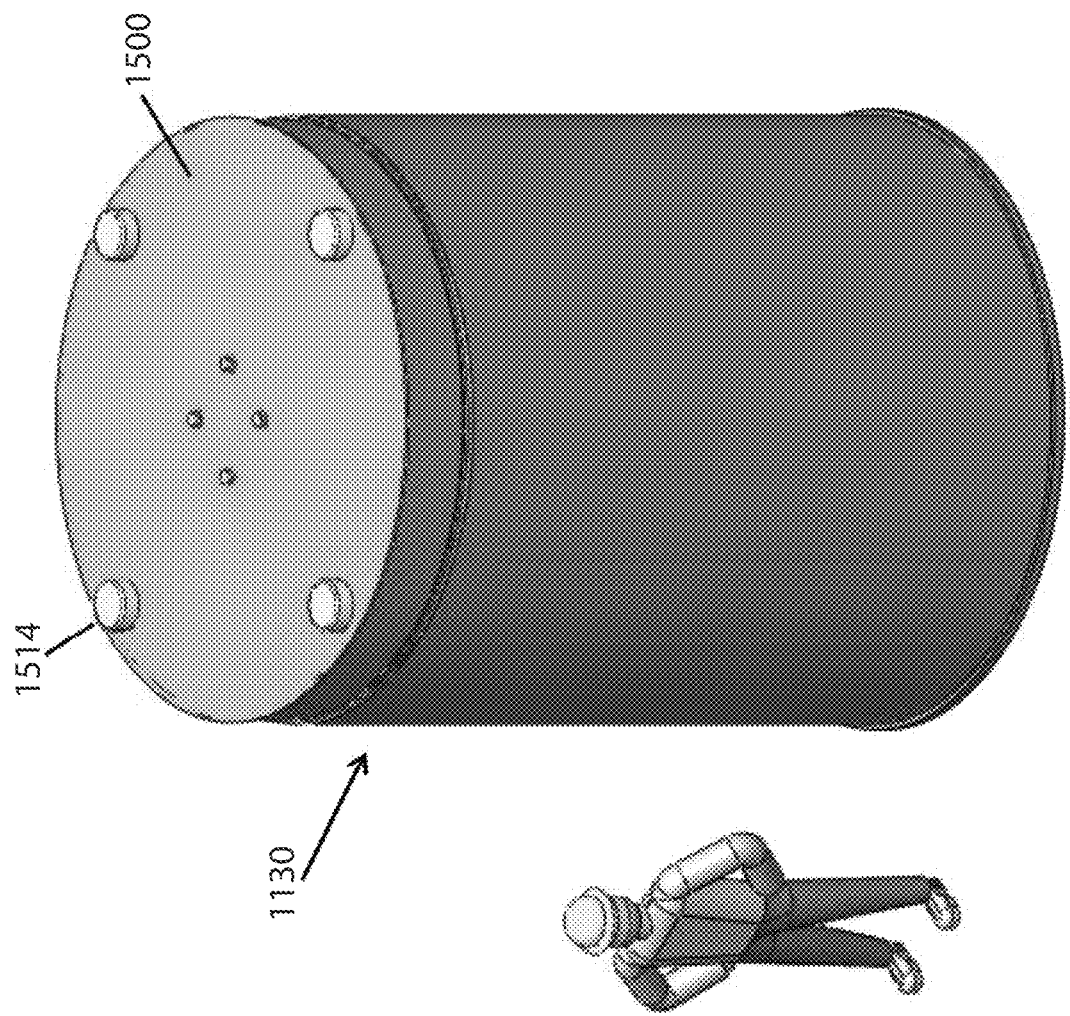
FIG. 26 is a perspective view of the fully assembled overpack.

FIG. 26 shows the overpack 1130 with overpack lid 1500 fully installed and canister 1100 disposed inside loaded with waste cylinders 1121. Protective caps 1514 may be installed over mounting bolts 1512. An operator is shown in FIG. 26 to provide perspective on the size of overpack 1130 in one non-limiting embodiment, which may be about 6 or more feet in diameter and about 6 or more feet in height. Any suitable size overpack may be used.

As noted herein, the shielded lifting lid 1300 is reusable. Accordingly, in some embodiments, the exemplary method described above may further comprise a step of detachably mounting a second different confinement lid 1200 to the shielded lifting lid 1300; the second confinement lid and shielded lifting lid collectively forming a second lid assembly.

It will be appreciated that the two-part lid assembly 1200/1300 may also be used in applications where the confinement lid 1200 is intended to be welded to the canister 1100 for closure rather than by bolting.

III. Inventive Concept 3

With reference to FIGS. 27-34, a third inventive concept will be described.

Figure 27A:
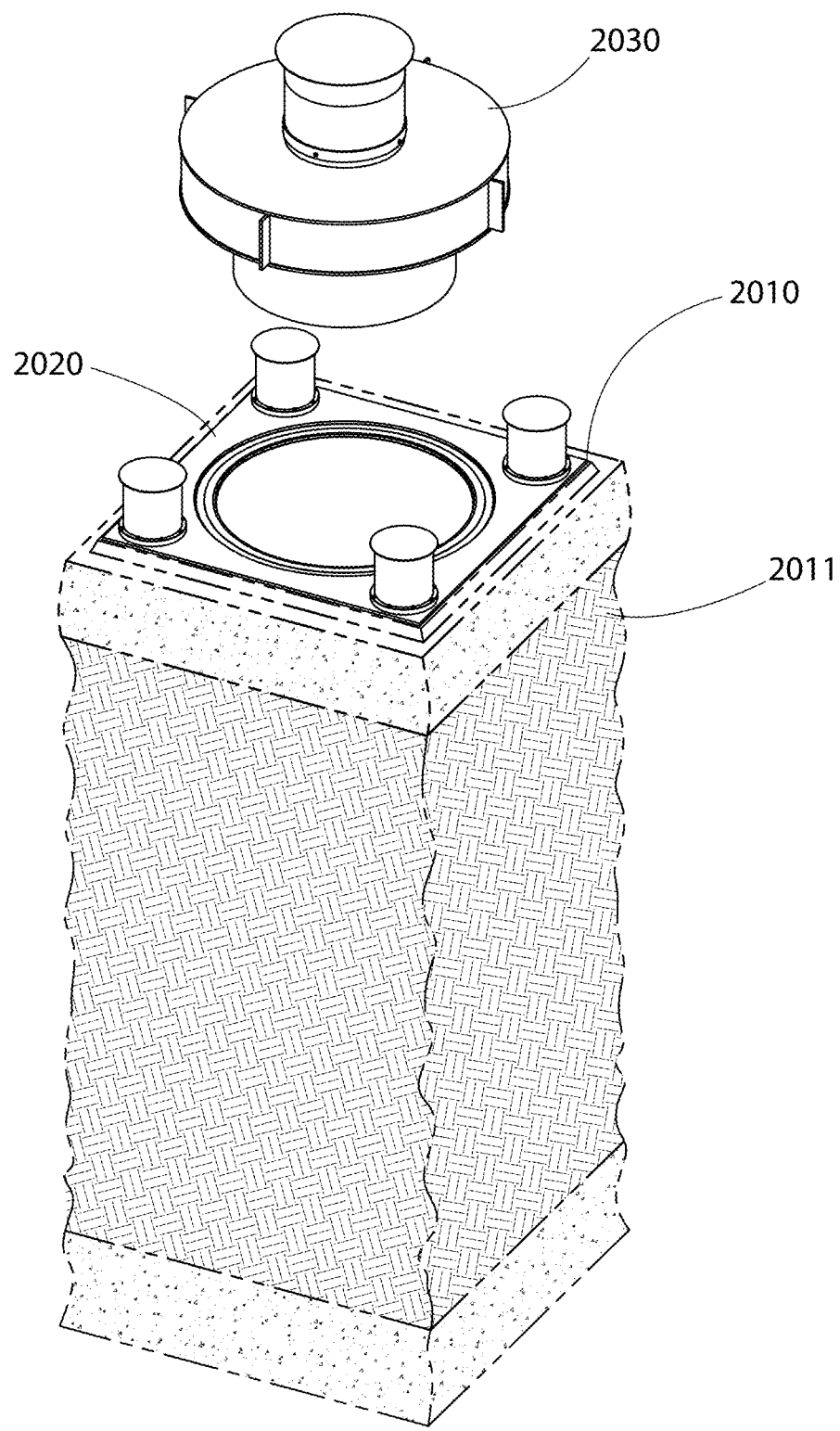
FIG. 27A is a partially exploded perspective view of a HLW storage container.
Figure 27B:
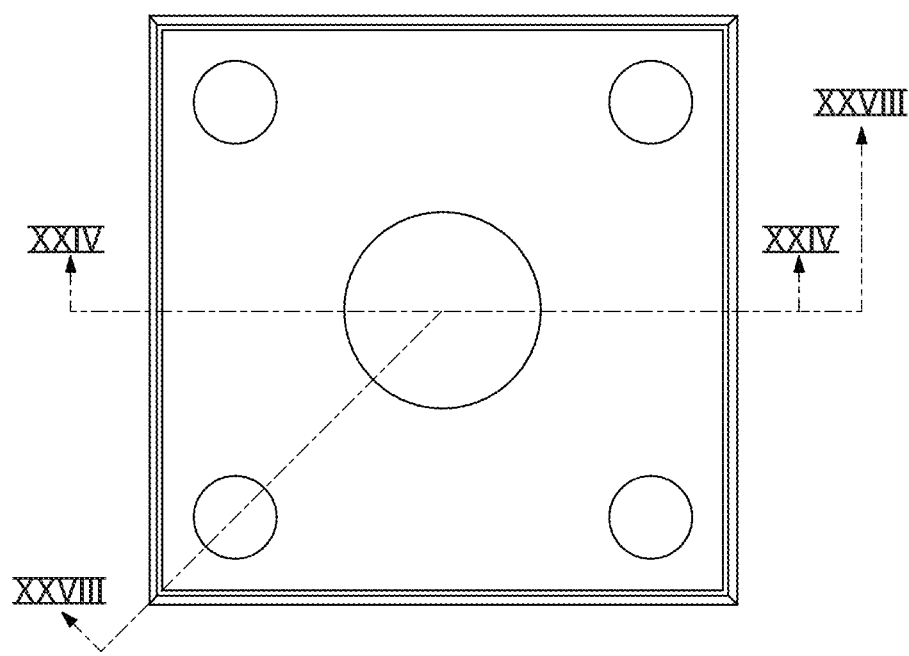
FIG. 27B is a top plan view of the HLW storage container of FIG. 27A.
Figure 28:
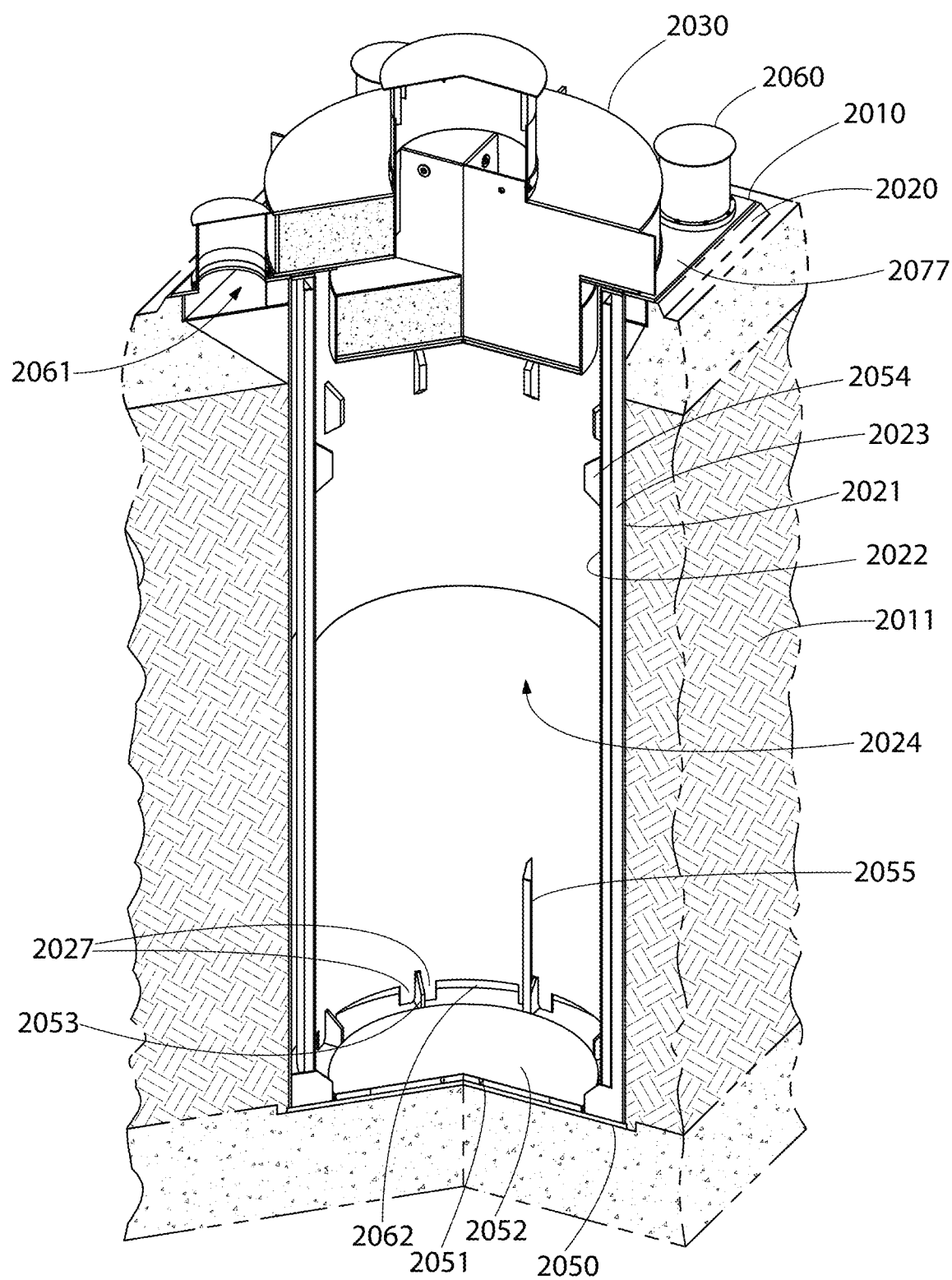
FIG. 28 is a sectional view of the HLW storage container of FIG. 27B along the line XXVIII-XXVIII.

FIG. 27A illustrates a high level waste ("HLW") storage container 2010, encased in surrounding concrete 2011, as it would be in an installation. FIG. 28 illustrates the storage container 2010 in a sectional view, still with the surrounding concrete 2011. While the HLW storage container 2010 will be described in terms of being used to store a canister of spent nuclear fuel, it will be appreciated by those skilled in the art that the systems and methods described herein can be used to store any and all kinds of HLW.

The HLW storage container 2010 is designed to be a vertical, ventilated dry system for storing HLW such as spent fuel. The HLW storage container 2010 is fully compatible with 100 ton and 125 ton transfer casks for HLW transfer procedures, such as spent fuel canister transfer operations. All spent fuel canister types engineered for storage in free-standing, below grade, and/or anchored overpack models can be stored in the HLW storage container 2010.

As used in this section the term "canister" broadly includes any spent fuel containment apparatus, including, without limitation, multi-purpose canisters and thermally conductive casks. For example, in some areas of the world, spent fuel is transferred and stored in metal casks having a honeycomb grid-work/basket built directly into the metal cask. Such casks and similar containment apparatus qualify as canisters, as that term is used herein, and can be used in conjunction with the HLW storage container 2010 as discussed below.

The HLW storage container 2010 can be modified/designed to be compatible with any size or style of transfer cask. The HLW storage container 2010 can also be designed to accept spent fuel canisters for storage at an Independent Spent Fuel Storage Installations ("ISFSI"). ISFSIs employing the HLW storage container 2010 can be designed to accommodate any number of the HLW storage container 2010 and can be expanded to add additional HLW storage containers 2010 as the need arises. In ISFSIs utilizing a plurality of the HLW storage container 2010, each HLW storage container 2010 functions completely independent form any other HLW storage container 2010 at the ISFSI.

The HLW storage container 2010 has a body 2020 and a lid 2030. The lid 2030 rests atop and is removable/detachable from the body 2020. Although an HLW storage container can be adapted for use as an above grade storage system, by incorporating design features found in U.S. Pat. No. 7,933,374, this HLW storage container 2010, as shown, is designed for use as a below grade storage system.

Referring to FIG. 28, the body 2020 includes an outer shell 2021 and an inner shell 2022. The outer shell 2021 surrounds the inner shell 2022, forming a space 2023 therebetween. The outer shell 2021 and the inner shell 2022 are generally cylindrical in shape and concentric with one another. As a result, the space 2023 is an annular space. While the shape of the inner and outer shells 2022, 2021 is cylindrical in the illustrated embodiment, the shells can take on any shape, including without limitation rectangular, conical, hexagonal, or irregularly shaped. In some embodiments, the inner and outer shells 2022, 2021 will not be concentrically oriented.

The space 2023 formed between the inner shell 2022 and the outer shell 2021 acts as a passageway for cool air. The exact width of the space 2023 for any HLW storage container 2010 is determined on a case-by-case design basis, considering such factors as the heat load of the HLW to be stored, the temperature of the cool ambient air, and the desired fluid flow dynamics. In some embodiments, the width of the space 2023 will be in the range of 1 to 6 inches. While the width of space 2023 can vary circumferentially, it may be desirable to design the HLW storage container 2010 so that the width of the space 2023 is generally constant in order to effectuate symmetric cooling of the HLW container and even fluid flow of the incoming air. As discussed in greater detail below, the space 2023 may be divided up into a plurality of passageways.

The inner shell 2022 and the outer shell 2021 are secured atop a floor plate 2050. The floor plate 2050 is hermetically sealed to the outer shell 2021, and it may take on any desired shape. A plurality of spacers 2051 are secured atop the floor plate 2050 within the space 2023. The spacers 2051 support a pedestal 2052, which in turn supports a canister. When a canister holding HLW is loaded into the cavity 2024 for storage, the bottom surface of the canister rests atop the pedestal 2052, forming an inlet air plenum between the underside of the pedestal 2052 and the floor of cavity 2024. This inlet air plenum contributes to the fluid flow and proper cooling of the canister.

Preferably, the outer shell 2021 is seal joined to the floor plate 2050 at all points of contact, thereby hermetically sealing the HLW storage container 2010 to the ingress of fluids through these junctures. In the case of weldable metals, this seal joining may comprise welding or the use of gaskets. Most preferably, the outer shell 2021 is integrally welded to the floor plate 2050.

An upper flange 2077 is provided around the top of the outer shell 2021 to stiffen the outer shell 2021 so that it does not buckle or substantially deform under loading conditions. The upper flange 2077 can be integrally welded to the top of the outer shell 2021.

The inner shell 2022 is laterally and rotationally restrained in the horizontal plane at its bottom by support legs 2027 which straddle lower ribs 2053. The lower ribs 2053 are preferably equispaced about the bottom of the cavity 2024. The inner shell 2022 is preferably not welded or otherwise permanently secured to the bottom plate 2050 or outer shell 2021 so as to permit convenient removal for decommissioning, and if required, for maintenance.

The inner shell 2022, the outer shell 2021, the floor plate 2050, and the upper flange 2077 are preferably constructed of a metal, such as a thick low carbon steel, but can be made of other materials, such as stainless steel, aluminum, aluminum-alloys, plastics, and the like. Suitable low carbon steels include, without limitation, ASTM A516, Gr. 70, A515 Gr. 70 or equal. The desired thickness of the inner and outer shells 2022, 2021 is matter of design choice and will determined on a case-by-case basis.

Figure 30A:
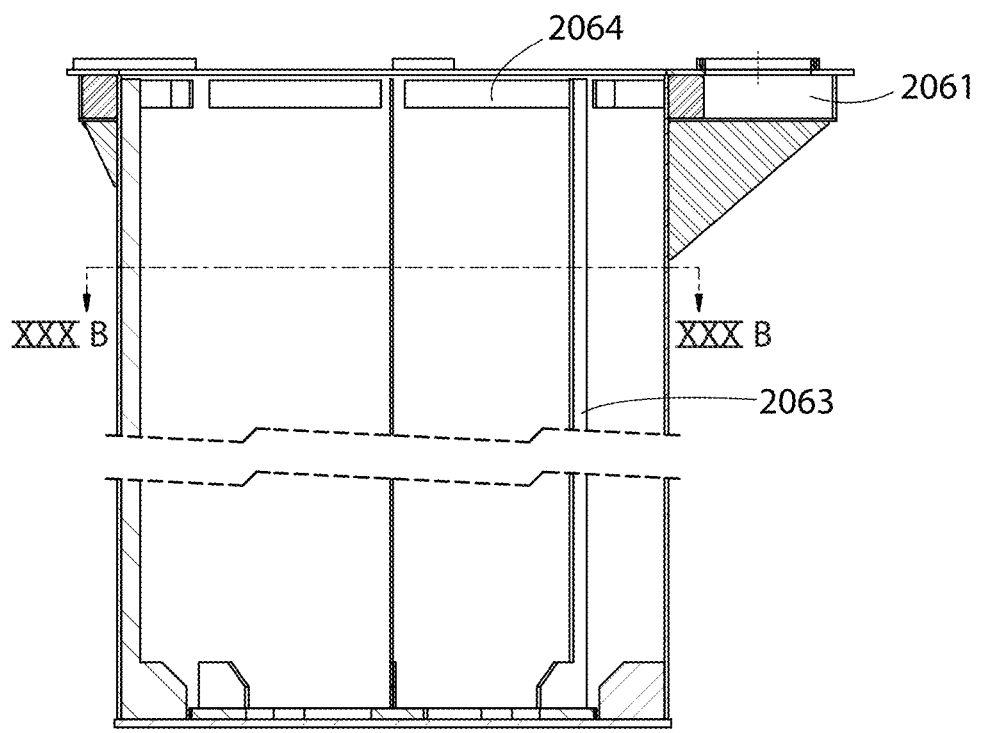
FIG. 30A is a partial sectional view of the HLW storage container of FIG. 27A.

The inner shell 2022 forms a cavity 2024. The size and shape of the cavity 2024 is also a matter of design choice. However, it is preferred that the inner shell 2022 be designed so that the cavity 2024 is sized and shaped so that it can accommodate a canister of spent nuclear fuel or other HLW. While not necessary, it is preferred that the horizontal cross-sectional size and shape of the cavity 2024 be designed to generally correspond to the horizontal cross-sectional size and shape of the canister-type that is to be used in conjunction with a particular HLW storage container. More specifically, it is desirable that the size and shape of the cavity 2024 be designed so that when a canister containing HLW is positioned in the cavity 2024 for storage (as illustrated in FIG. 30A), a small clearance exists between the outer side walls of the canister and the side walls of the cavity 2024.

Designing the cavity 2024 so that a small clearance is formed between the side walls of the stored canister and the side walls of the cavity 2024 limits the degree the canister can move within the cavity during a catastrophic event, thereby minimizing damage to the canister and the cavity walls and prohibiting the canister from tipping over within the cavity. This small clearance also facilitates flow of the heated air during HLW cooling. The exact size of the clearance can be controlled/designed to achieve the desired fluid flow dynamics and heat transfer capabilities for any given situation. In some embodiments, for example, the clearance may be 1 to 3 inches. A small clearance also reduces radiation streaming.

The inner shell 2022 is also equipped with multiple sets of equispaced longitudinal ribs 2054, 2055, in addition to the lower ribs 2053 discussed above. One set of ribs 2054 are preferably disposed at an elevation that is near the top of a canister of HLW placed in the cavity 2024. This set of ribs 2054 may be shorter in length in comparison to the height of the cavity 2024 and a canister. Another set of ribs 2055 are set below the first set of ribs 2054. This second set of ribs 2055 is more elongated than the first set of ribs 2054, and these ribs 2055 extend to, or nearly to, the bottom of the cavity 2024. These ribs 2053, 2054, 2055 serve as guides for a canister of HLW is it is lowered down into the cavity 2024, helping to assure that the canister properly rests atop the pedestal 2052. The ribs also serve to limit the canister's lateral movement during an earthquake or other catastrophic event to a fraction of an inch.

A plurality of openings 2025 are provided in the inner shell 2022 at or near its bottom between the support legs 2027. Each opening 2025 provides a passageway between the annular space 2023 and the bottom of the cavity 2024. The openings 2025 provide passageways by which fluids, such as air, can pass from the annular space 2023 into the cavity 2024. The openings 2025 are used to facilitate the inlet of cooler ambient air into the cavity 2024 for cooling a stored HLW having a heat load. As illustrated, eight openings 2025 are equispaced about the bottom of the inner shell 2022. However, any number of openings 2025 can be included, and they may have any spacing desired. The exact number and spacing will be determined on a case-by-case basis and will be dictated by such considerations as the heat load of the HLW, desired fluid flow dynamics, etc. Moreover, while the openings 2025 are illustrated as being located in the side wall of the inner shell 2022, the openings can be provided in the floor plate in certain modified embodiments of the HLW storage container.

The openings 2025 in the inner shell 2022 are sufficiently tall to ensure that if water enters the cavity 2024, the bottom region of a canister resting on the pedestal 2052 would be submerged for several inches before the water level reaches the top edge of the openings 2025. This design feature helps ensure thermal performance of the system under accidental flooding of the cavity 2024.

With reference to FIG. 29, a layer of insulation 2026 is provided around the outside surface of the inner shell 2022 within the annular space 2023. The insulation 2026 is provided to minimize heating of the incoming cooling air in the space 2023 before it enters the cavity 2024. The insulation 2026 helps ensure that the heated air rising around a canister situated in the cavity 2024 causes minimal preheating of the downdraft cool air in the annular space 2023. The insulation 2026 is preferably chosen so that it is water and radiation resistant and undegradable by accidental wetting. Suitable forms of insulation include, without limitation, blankets of alumina-silica fire clay (Kaowool Blanket), oxides of alimuna and silica (Kaowool S Blanket), alumina-silica-zirconia fiber (Cerablanket), and alumina-silica-chromia (Cerachrome Blanket). The desired thickness of the layer of insulation 2026 is matter of design and will be dictated by such considerations such as the heat load of the HLW, the thickness of the shells, and the type of insulation used. In some embodiments, the insulation will have a thickness in the range ½ to 6 inches.

Figure 30B:
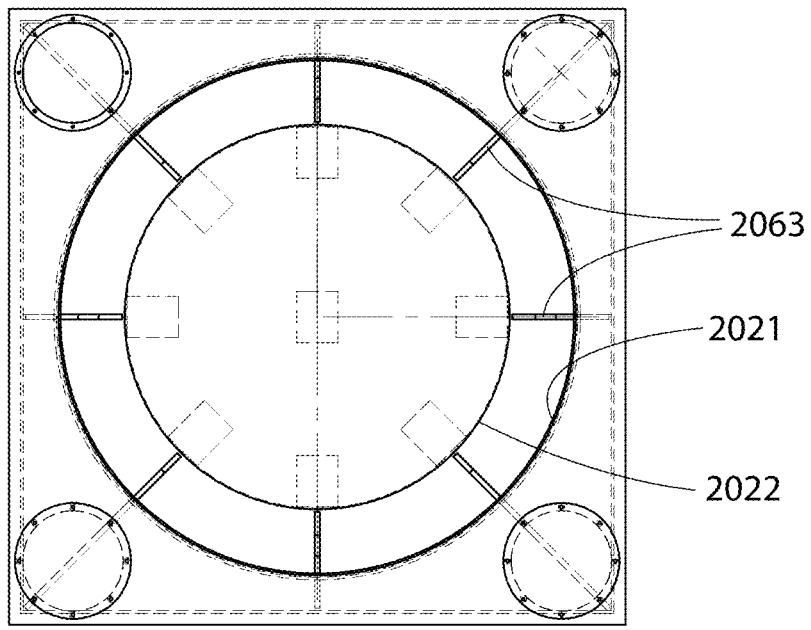
FIG. 30B is a sectional view of the HLW storage container FIG. 30A along the line XXX-B-XXX-B.

As shown in FIGS. 28 and 29, inlet ducts 2060 are disposed on the top surface of the upper flange 2077. Each inlet duct 2060 connects to two inlet passageways 2061 which continue from under the upper flange 2077, into the space 2023 between the outer and inner shells 2021, 2022, and then connect to the cavity 2024 by lower openings 2062 in the bottom of the inner shell 2022. Within the space 2023, the inlet passageways 2061 are separated by dividers 2063 to keep cooling air flowing through each inlet passageway 2061 separate from the other inlet passageways 2061 until the cooling air emerges into the cavity 2024. FIGS. 30A and 30B illustrate the configuration of the inlet passageways 2061 and the dividers 2063. Each inlet passageway 2061 connects with the space 2023 by openings 2064 in the top of the outer shell 2021. From the openings 2064, the cooling air continues down the in the space, via the individual inlet passageways 2061 created by the dividers 2064, and into the cavity 2024, where it is used to cool a placed HLW canister. The dividers 2063 are equispaced within the space 2023 to aid in balancing the air pressure entering the space 2023 from each inlet duct and inlet passageway. Also, as shown in the figures, each of the lower ribs 2053 is integrated with one of the dividers 2063, such that the lower ribs form an extension of the dividers, extending into the cavity 2024.

Referring back to FIG. 29, each inlet duct 2060 includes a duct cover 2065, to help prevent rain water or other debris from entering and/or blocking the inlet passageways 2061, affixed on top of an inlet wall 2066 that surrounds the inlet passageways 2061 on the top surface of the upper flange 2077. The inlet wall 2066 is peripherally perforated around the entire periphery of the opening of the inlet passageways 2061. At least a portion of the lower part of the inlet ducts are left without perforations, to aid in preventing rain water from entering the HLW storage container. Preferably, the inlet wall 2066 is perforated over 60% or more of its surface, and the perforations can be made in any shape, size, and distribution in accordance with design preferences. When the inlet ducts 2060 are formed with the inlet wall 2066 peripherally perforated, each of the inlet ducts has been found to maintain an intake air pressure independently of each of the other inlet ducts, even in high wind conditions, and each of the inlet ducts has been found to maintain an intake air pressure substantially the same as each of the other inlet ducts, again, even in high wind conditions.

The lid 2030 rests atop and is supported by the upper flange 2077 and a shell flange 2078, the latter being disposed on and connected to the tops edge of the inner shell 2022. The lid 2030 encloses the top of the cavity 2024 and provides the necessary radiation shielding so that radiation does not escape from the top of the cavity 2024 when a canister loaded with HLW is stored therein. The lid 2030 is designed to facilitate the release of heated air from the cavity 2024.

Figure 31A:
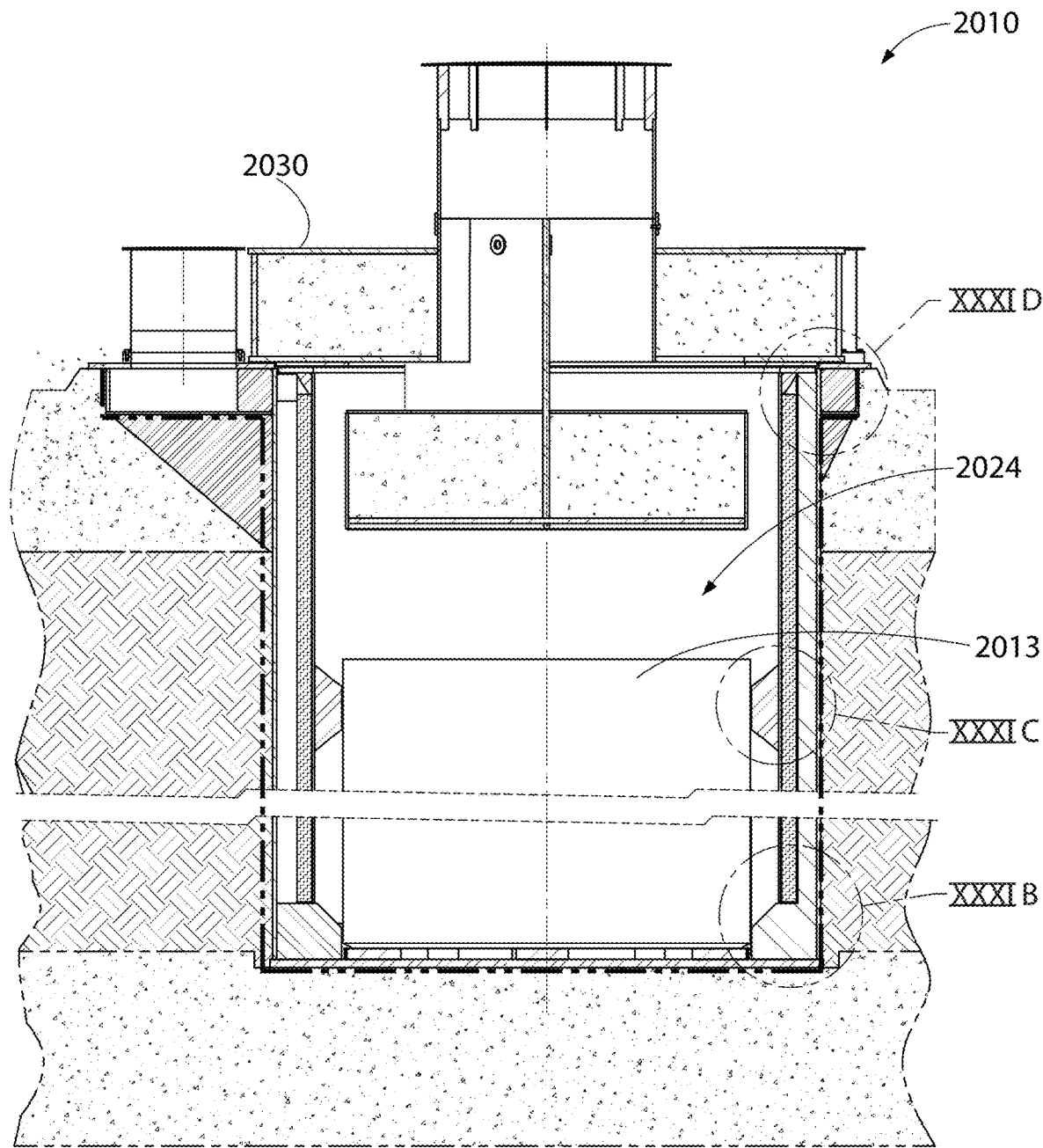
FIG. 31A is a partial sectional view of the HLW storage container of FIG. 27A having a canister positioned in the cavity.

FIG. 31A illustrates the HLW storage container 2010 with a canister 2013 placed within the cavity 2024. As shown in the FIG. 31B detailed view, the bottom of the canister 2013 sits on the pedestal 2052, and the lower ribs 2053 maintain a space between the bottom of the canister 2013 and the inner shell 2022. Similarly, the FIG. 31C detailed view shows that the upper ribs 2054 maintain a space between the top of the canister 2013 and the inner shell 2022.

The FIG. 31D detailed view shows the lid 2030 resting atop the upper flange 2077 and the shell flange 2078. The lid 2030 includes a closure gasket 2031 which forms a seal against the upper flange 2077 when the 20 lid 30 is seated, and a leaf spring gasket 2032 which forms a seal against the shell flange 2078.

Figure 32:
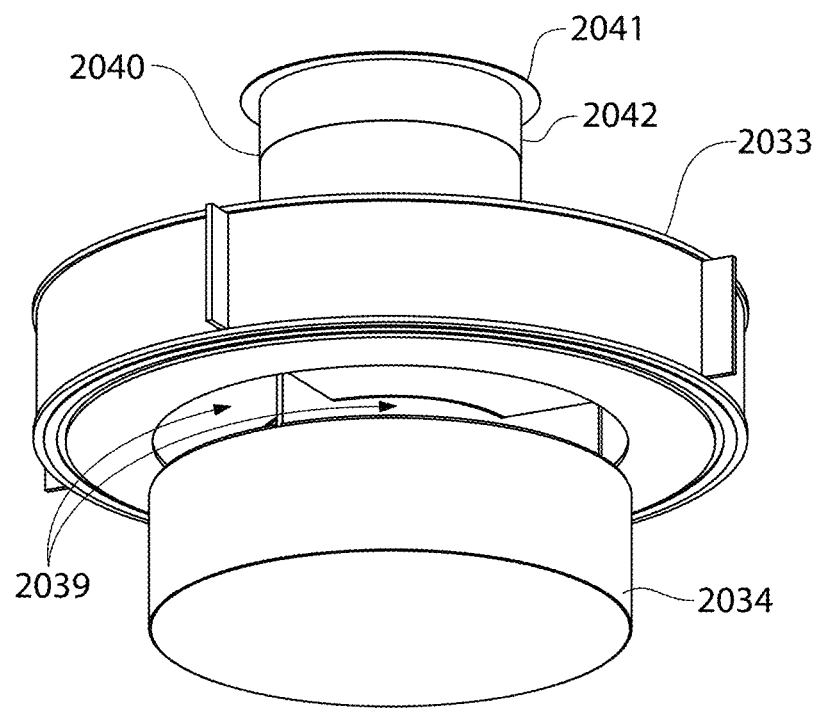
FIG. 32 is an isometric view of a lid for a HLW storage container.
Figure 33:
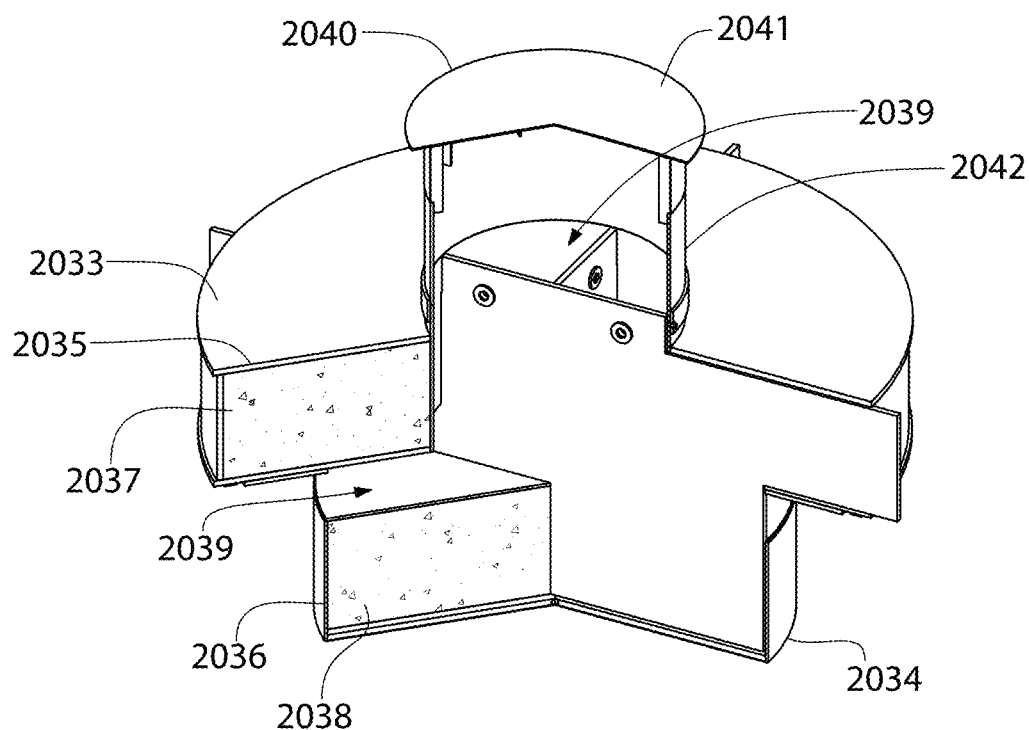
FIG. 33 is a sectional view of the lid of FIG. 32.

FIGS. 32 and 33 illustrate the lid 2030 removed from the body of the HLW storage container. Referring first to FIG. 32, the lid 2030 is preferably constructed of a combination of low carbon steel and concrete (or another radiation absorbing material) in order to provide the requisite radiation shielding. The lid 2030 includes an upper lid part 2033 and a lower lid part 2034. The upper lid part 2033 preferable extends at least as high as, if not higher than, the top of each inlet duct 2060. Each lid part 2033, 2034 includes an external shell 2035, 2036 encasing an upper concrete shield 2037 and a lower concrete shield 2038. One or more outlet passageways 2039 are formed within and around the body parts 2033, 2034 to connect the cavity with the outlet duct 2040 formed on the top surface of the lid 2030. The outlet passageways 2039 pass over the lower lid part 2034, between the upper and lower lid parts 2033, 2034, and up through a central aperture within the upper lid part 2034. The outlet duct 2040 covers this central aperture to better control the heated air as it rises up out of the. By being disposed on the top of the lid 2030, the outlet duct 2040 may also be raised up significantly higher than the inlet ducts, using any desired length of extension for the outlet duct. By raising up the outlet duct higher, mixing between the heated air emitted from the outlet duct and cooler air being drawn into the inlet ducts can be significantly reduced, if not eliminated altogether.

The outlet duct 2040, which is constructed similar to the inlet ducts, includes a duct cover 2041, to help prevent rain water or other debris from entering and/or blocking the outlet passageways 2039, affixed on top of an outlet wall 2042 that surrounds the outlet passageways 2039 on the top surface of the upper lid part 2033. The outlet wall 2042 is peripherally perforated around the entire periphery of the opening of the outlet passageways 2039. At least a portion of the lower part of the outlet duct is left without perforations, to aid in preventing rain water from entering the HLW storage container. Preferably, the outlet wall 2042 is perforated over 60% or more of its surface, and the perforations can be made in any shape, size, and distribution in accordance with design preferences.

The external shell of the lid 2030 may be constructed of a wide variety of materials, including without limitation metals, stainless steel, aluminum, aluminum-alloys, plastics, and the like. The lid may also be constructed of a single piece of material, such as concrete or steel for example, so that it has no separate external shell.

When the lid 2030 is positioned atop the body 2020, the outlet passageways 2039 are in spatial cooperation with the cavity 2024. As a result, cool ambient air can enter the HLW storage container 2010 through the inlet ducts 2060, flow into the space 2023, and into the bottom of the cavity 2024 via the openings 2062. When a canister containing HLW having a heat load is supported within the cavity 2024, this cool air is warmed by the HLW canister, rises within the cavity 2024, and exits the cavity 2024 via the outlet ducts 2040.

Because the inlet ducts 2060 are placed on different sides of the lid 2030, and the dividers separate the inlet passageways associated with the different inlet ducts, the hydraulic resistance to the incoming air flow, a common limitation in ventilated modules, is minimized. This configuration makes the HLW storage container less apt to build up heat internally under high wind conditions.

Figure 34:
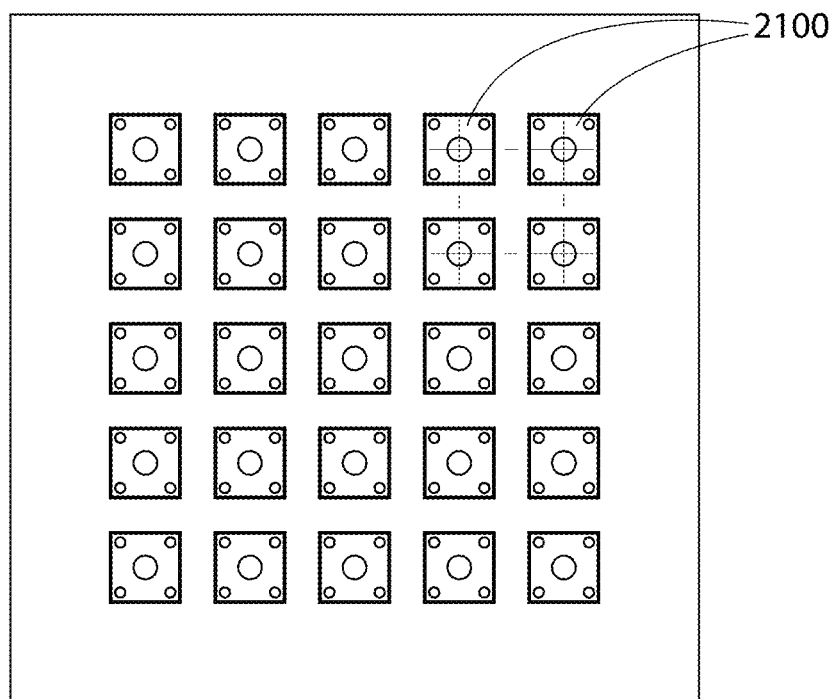
FIG. 34 is a plan view of an array of HLW storage containers.

A plurality of HLW storage containers 2100 can be used at the same ISFSI site and situated in arrays as shown in FIG. 34. Although the HLW storage containers 2100 are closely spaced, the design permits a canister in each HLW storage container 2100 to be independently accessed and retrieved easily. In addition, the design of the individual storage containers 2100, and particularly the design and positioning of the inlet and outlet ducts, enables the inlet ducts of a first of the storage containers to maintain air pressure independently of the inlet ducts of a second of the storage containers. Each storage container therefore will operate independently of each of the other storage containers, such that the failure of one storage container is unlikely to lead directly to the failure of other surrounding storage containers in the array.

IV. Inventive Concept 4

With reference to FIGS. 35-47, a fourth inventive concept will be described.

Figure 35:
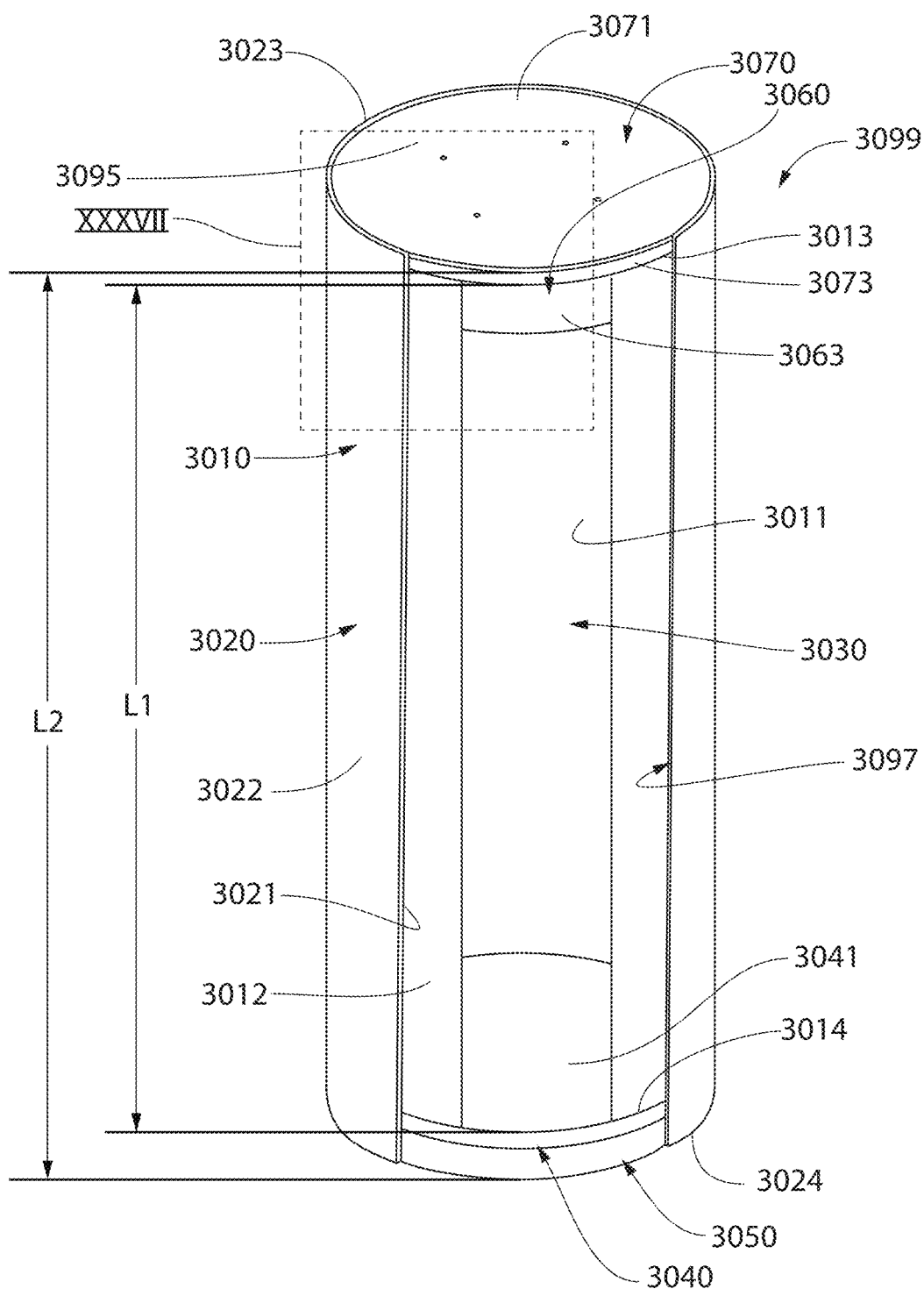
FIG. 35 is a top perspective view of a dual-walled DSC having a section cut-away.

Referring to FIG. 35, a dual-walled DSC 3099 according to one embodiment of the present invention is disclosed. The dual-walled DSC 3099 and its components are illustrated and described as an MPC style structure. However, it is to be understood that the concepts and ideas disclosed herein can be applied to other areas of high level radioactive waste storage, transportation and support. Moreover, while the dual-walled DSC 3099 is described as being used in combination with a specially designed fuel basket 3090 (which in of itself constitutes an invention), the dual-walled DSC 3099 can be used with any style of fuel basket, such as the one described in U.S. Pat. No. 5,898,747, issued Apr. 27, 1999. In fact, in some instances it may be possible to use the dual-walled DSC 3099 without a fuel basket, depending on the intended function. Furthermore, the dual-walled DSC 3099 can be used to store and/or transport any type of high level radioactive materials and is not limited to SNF.

As will become apparent from the structural description below, the dual-walled DSC 3099 contains two independent containment boundaries about the storage cavity 3030 that operate to contain both fluidic (gas and liquid) and particulate radiological matter within the cavity 3030. As a result, if one containment boundary were to fail, the other containment boundary will remain intact. While theoretically the same, the containment boundaries formed by the dual-walled DSC 3099 about the cavity 3030 can be literalized in many ways, including without limitation a gas-tight containment boundary, a pressure vessel, a hermetic containment boundary, a radiological containment boundary, and a containment boundary for fluidic and particulate matter. These terms are used synonymously throughout this application. In one instance, these terms generally refer to a type of boundary that surrounds a space and prohibits all fluidic and particulate matter from escaping from and/or entering into the space when subjected to the required operating conditions, such as pressures, temperatures, etc.

Finally, while the dual-walled DSC 3099 is illustrated and described in a vertical orientation, it is to be understood that the dual-walled DSC 3099 can be used to store and/or transport its load in any desired orientation, including at an angle or horizontally. Thus, use of all relative terms through this specification, including without limitation "top," "bottom," "inner" and "outer," are used for convenience only and are not intended to be limiting of the invention in such a manner.

The dual-walled DSC 3099 includes a first shell that acts as an inner shell 3010 and a second shell that acts as an outer shell 3020. The inner and outer shells 3010, 3020 are preferably cylindrical tubes and are constructed of a metal. Of course, other shapes can be used if desired. The inner shell 3010 is a tubular hollow shell that includes an inner surface 3011, an outer surface 3012, a top edge 3013 and a bottom edge 3014. The inner surface 3011 of the inner shell 3010 forms a cavity/space 3030 for receiving and storing SNF. The cavity 3030 is a cylindrical cavity formed about a central axis.

The outer shell 3020 is also a tubular hollow shell that includes an inner surface 3021, an outer surface 3022, a top edge 3023 and a bottom edge 3024. The outer shell 3020 circumferentially surrounds the inner shell 3010. The inner shell 3010 and the outer shell 3020 are constructed so that the inner surface 3021 of the outer shell 3020 is in substantially continuous surface contact with the outer surface 3012 of the inner shell 3010. In other words, the interface between the inner shell 3010 and the outer shell 3020 is substantially free of gaps/voids and are in conformal contact. This can be achieved through an explosive joining, a cladding process, a roller bonding process and/or a mechanical compression process that bonds the inner shell 3010 to the outer shell 3020. The continuous surface contact at the interface between the inner shell 3010 and the outer shell 3020 reduces the resistance to the transmission of heat through the inner and outer shells 3010, 3020 to a negligible value. Thus, heat emanating from the SNF loaded within the cavity 3030 can efficiently and effectively be conducted outward through the shells 3010, 3020 where it is removed from the outer surface 3022 of the outer shell via convection.

Even though the interface is formed in any of these manners, there still remains an interstitial space 3097 between the inner shell 3010 and the outer shell 3020. Alternatively, the interstitial space may be formed without the inner surface of the outer shell being in substantially continuous surface contact with the outer surface of the inner shell. As is discussed in more detail below, the presence of this interstitial space is used advantageously during a leak testing process.

The inner and outer shells 3010, 3020 are preferably both made of a metal. As used herein, the term metal refers to both pure metals and metal alloys. Suitable metals include without limitation austenitic stainless steel and other alloys including Hastelloy™ and Inconel™. Of course, other materials can be utilized. The thickness of each of the inner and outer shells 3010, 3020 is preferably in the range of 5 mm to 25 mm. The outer diameter of the outer shell 3020 is preferably in the range of 1700 mm to 2000 mm. The inner diameter of the inner shell 3010 is preferably in the range of 1700 mm to 1900 mm. The specific size and/or thickness of the shells 3010, 3020, however, is a matter of design choice.

In some embodiments, it may be further preferable that the inner shell 3010 be constructed of a metal that has a coefficient of thermal expansion that is equal to or greater than the coefficient of thermal expansion of the metal of which the outer shell 3020 is constructed. Thus, when the SNF that is stored in the cavity 3030 and emits heat, the outer shell 3020 will not expand away from the inner shell 3010. This ensures that the continuous surface contact between the outer surface 3012 of the inner shell 3010 and the outer surface 3021 of the outer shell 3020 will be maintained and a gaps will not form under heat loading conditions.

The dual-walled DSC 3099 also includes a first lid that acts as an inner top lid 3060 for the inner shell 3010 and a second lid that acts as an outer top lid 3070 for the second shell 3020. The inner and outer top lids 3060, 3070 are plate-like structures that are preferably constructed of the same materials discussed above with respect to the shells 3010, 3020. Preferably the thickness of the inner top lid 3060 is in the range of 99 mm to 300 mm. The thickness of the outer top lid is preferably in the range of 50 mm to 150 mm. The invention is not, however, limited to any specific dimensions, which will be dictated on a case-by-case basis and the radioactive levels of the SNF to be stored in the cavity 3030.

Figure 36:
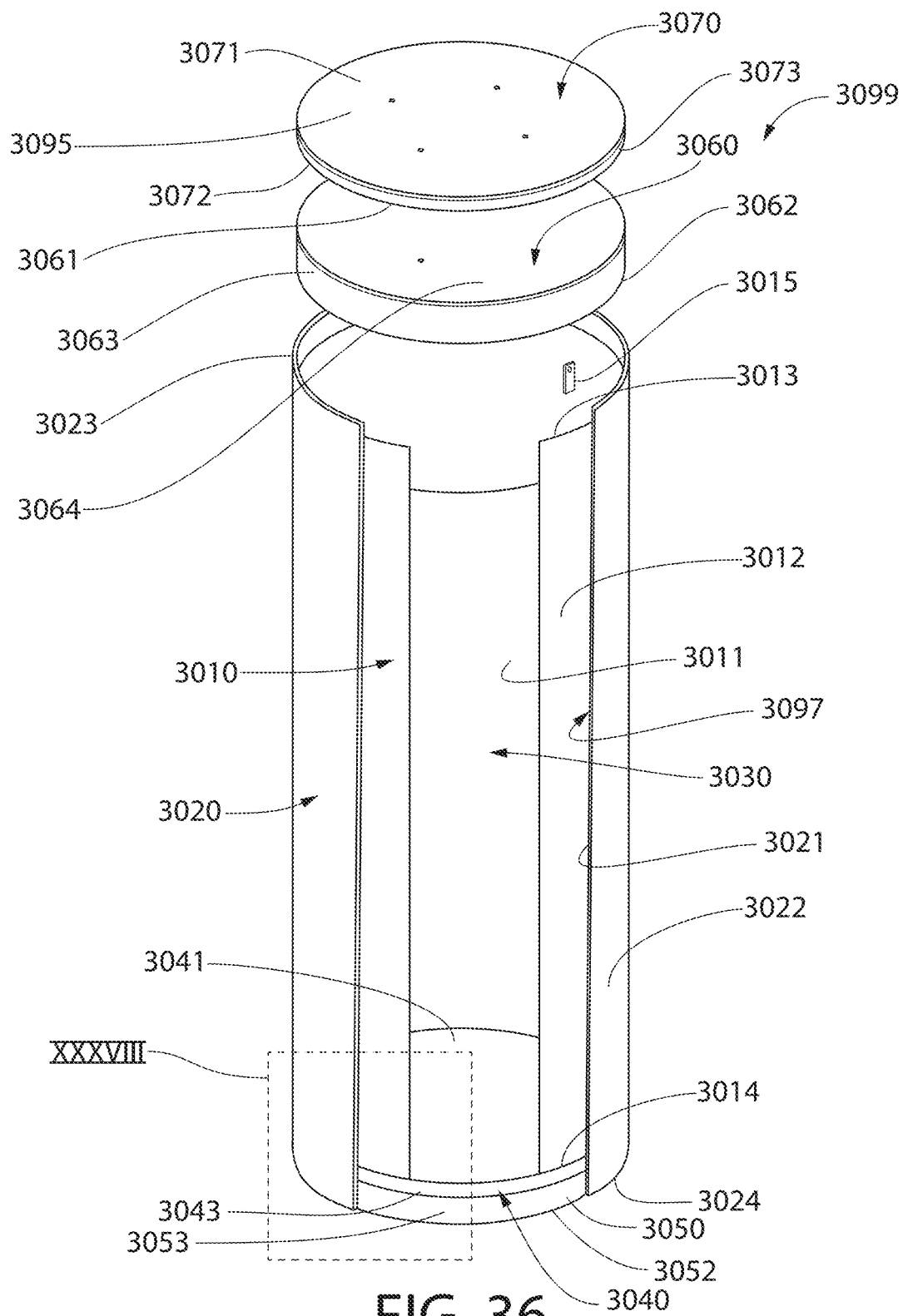
FIG. 36 is an exploded view of the dual-walled DSC of FIG. 35 showing the inner and outer top lids removed from the inner and outer shells.

Referring to FIG. 36, the inner top lid 3060 includes a top surface 3061, a bottom surface 3062 and an outer lateral surface/edge 3063. The outer top lid 3070 includes a top surface 3071, a bottom surface 3072 and an outer lateral surface/edge 3073. When fully assembled, the outer lid 3070 is positioned atop the inner lid 3060 so that the bottom surface 3072 of the outer lid 3070 is in substantially continuous surface contact with the top surface 3061 of the inner lid 3060. The outer lid 3070 also includes a test port 3095, to which one end of conduit is coupled (see FIGS. 44 and 45) in fluidic communication therewith. As is discussed below, the other end of the conduit is fitted with both a removable seal, to enable leak testing, and valve, both being included to comply with ASME Code.

During an SNF underwater loading procedure, the inner and outer lids 3060, 3070 are removed. Once the cavity 3030 is loaded with the SNF, the inner top lid 3060 is positioned so as to enclose the top end of the cavity 3030 and rests atop the brackets 3015. Once the inner top lid 3060 is in place and seal welded to the inner shell 3010, the cavity 3030 is evacuated/dried via the appropriate method and backfilled with nitrogen, helium or another inert gas. The drying and backfilling process of the cavity 3030 is achieved via the holes 3064 of the inner lid 3060 that form passageways into the cavity 3030. Once the drying and backfilling is complete, the holes 3061 are filled with a metal or otherwise plugged so as to hermetically seal the cavity 3030.

Figure 37:
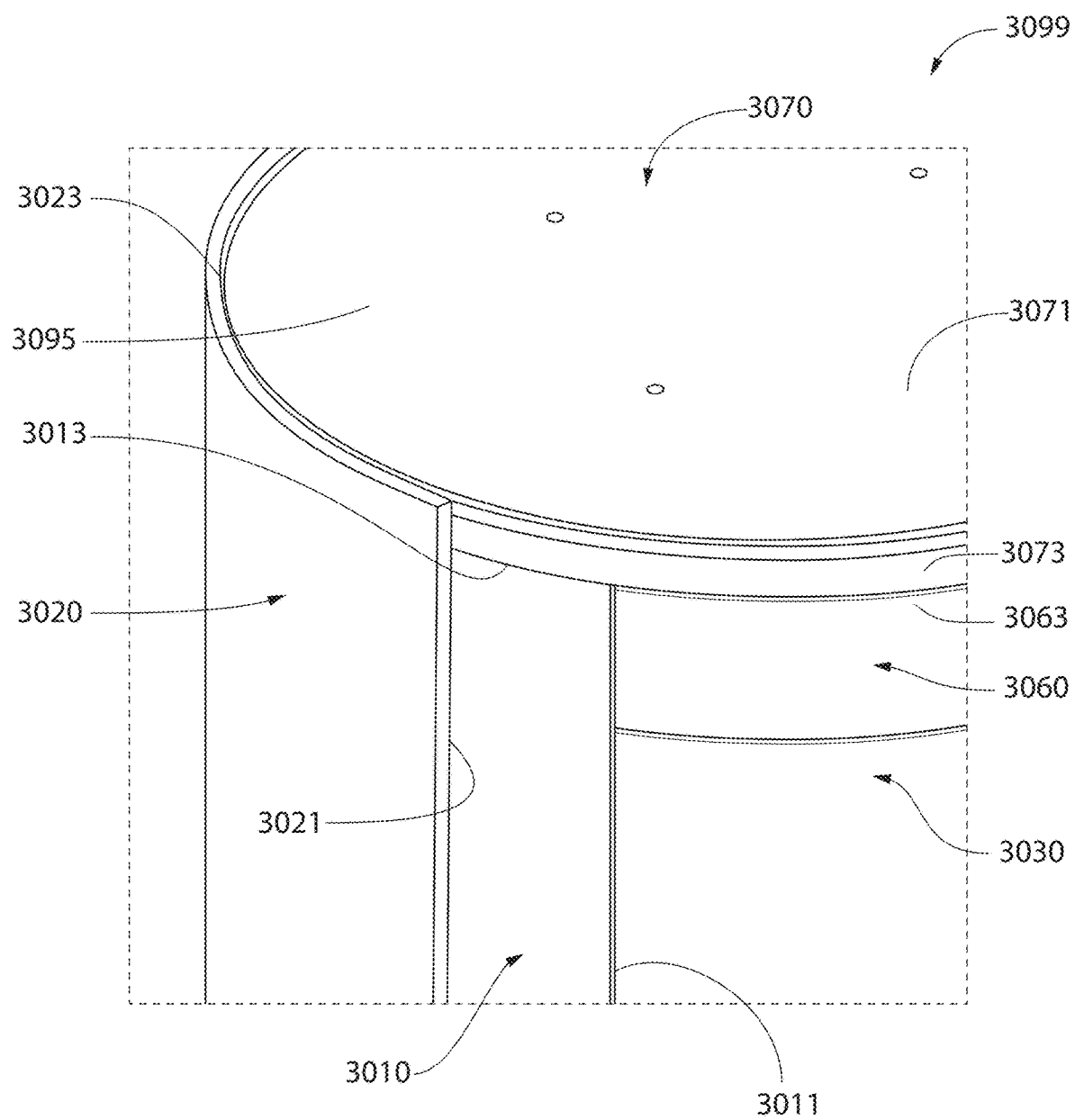
FIG. 37 is a close-up view of the area XXXVII-XXXVII of FIG. 35.

Referring now to FIGS. 35 and 37 concurrently, the outer shell 3020 has an axial length $L_2$ that is greater than the axial length $L_1$ of the inner shell 3010. As such, the top edge 3013 of the inner shell 3010 extends beyond the top edge 3023 of the outer shell 3020. Similarly, the bottom edge 3024 of the outer shell 3020 extends beyond the bottom edge 3013 of the inner shell 3010.

The offset between the top edges 3013, 3023 of the shells 3010, 3020 allows the top edge 3013 of the inner shell 3010 to act as a ledge for receiving and supporting the outer top lid 3070. When the inner lid 3060 is in place, the inner surface 3011 of the inner shell 3010 extends over the outer lateral edges 3063. When the outer lid 3070 is then positioned atop the inner lid 3060, the inner surface 3021 of the outer shell 3020 extends over the outer lateral edge 3073 of the outer top lid 3070. The top edge 3023 of the outer shell 3020 is substantially flush with the top surface 3071 of the outer top lid 3070. The inner and outer top lids 3060, 3070 are welded to the inner and outer shells 3010, 3020 respectively after the fuel is loaded into the cavity 3030. Conventional edge groove welds can be used. However, it is preferred that all connections between the components of the dual-walled DSC 3099 be through-thickness weld.

The dual-walled DSC 3099 also includes a first plate that acts as an inner base plate 3040 and a second plate that acts as an outer base plate 3050. The inner and outer base plates 3040, 3050 are rigid plate-like structures having circular horizontal cross-sections. The invention is not so limited, however, and the shape and size of the base plates 3040, 3050 is dependent upon the shape of the inner and outer shells 3010, 3020. The inner base plate 3040 includes a top surface 3041, a bottom surface 3042 and an outer lateral surface/edge 3043. Similarly, the outer base plate 3050 includes a top surface 3051, a bottom surface 3052 and an outer lateral surface/edge 3053.

The top surface 3041 of the inner base plate 3040 forms the floor of the cavity 3030. The inner base plate 3040 rests atop the outer base plate 3050. Similar to the other corresponding components of the dual-walled DSC 3099, the bottom surface 3042 of the inner base plate 3040 is in substantially continuous surface contact with the top surface 3051 of the outer base plate 3050. As a result, the interface between the inner base plate 3040 and the outer base plate 3050 is free of gaseous gaps/voids for thermal conduction optimization. An explosive joining, a cladding process, a roller bonding process and/or a mechanical compression process can be used to effectuate the contact between the base plates 3040, 3050. Preferably, the thickness of the inner base plate 3040 is in the range of 50 mm to 150 mm. The thickness of the outer base plate 3050 is preferably in the range of 99 mm to 200 mm. Preferably, the length from the top surface of the outer top lid 3070 to the bottom surface of the outer base plate 3050 is in the range of 4000 mm to 5000 mm, but the invention is in no way limited to any specific dimensions.

The outer base plate 3050 may be equipped on its bottom surface with a grapple ring (not shown) for handling purposes. The thickness of the grapple ring is preferably between 50 mm and 150 mm. The outer diameter of the grapple ring is preferably between 350 mm and 450 mm.

Figure 38:
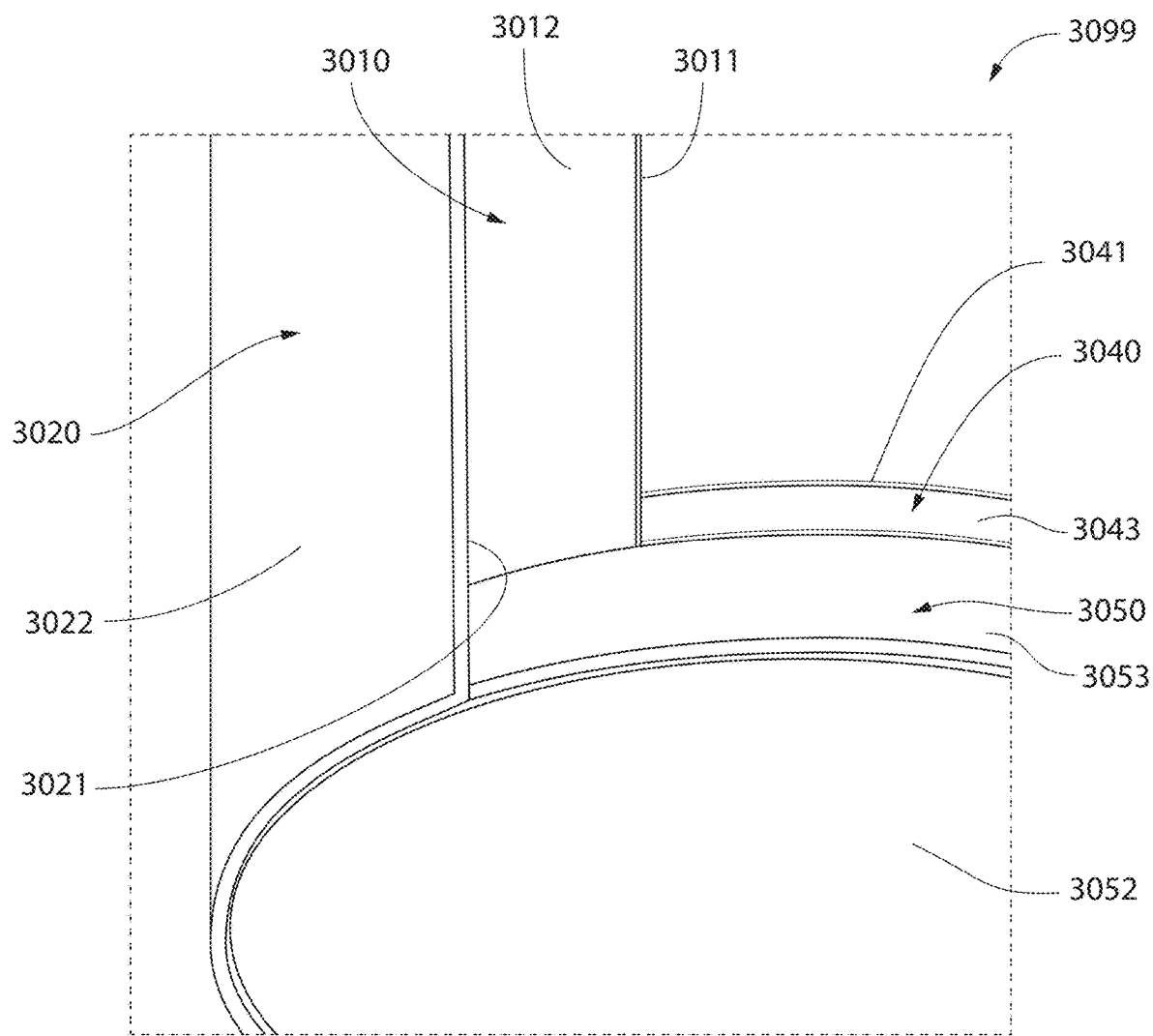
FIG. 38 is a close-up view of the area XXXVIII-XXXVIII of FIG. 36.

Referring now to FIGS. 36 and 38 concurrently, the inner shell 3010 rests atop the inner base plate 3040 in a substantially upright orientation. The bottom edge 3014 of the inner shell 3010 is connected to the top surface 3041 of the inner base plate 3040 by a through-thickness single groove (V or J shape) weld. The outer surface 3012 of the inner shell 3010 is substantially flush with the outer lateral edge 3043 of the inner base plate 3040. The outer shell 3020, which circumferentially surrounds the inner shell 3010, extends over the outer lateral edges 3043, 3053 of the inner and outer base plates 3040, 3050 so that the bottom edge 3024 of the outer shell 3020 is substantially flush with the bottom surface 3052 of the outer base plate 3050. The inner surface 3021 of the outer shell 3020 is also connected to the outer base plate 3050 using a through-thickness edge weld. In an alternative embodiment, the bottom edge 3024 of the outer shell 3020 could rest atop the top surface 3051 of the outer base plate 3050 (rather than extending over the outer later edge of the base plate 3050). In that embodiment, the bottom edge 3024 of the outer shell 3020 could be welded to the top surface 3051 of the outer base plate 3050.

When all of the seal welds discussed above are completed, the combination of the inner shell 3010, the inner base plate 3040 and the inner top lid 3060 forms a first hermetically sealed structure surrounding the cavity 3030, thereby creating a first pressure vessel. Similarly, the combination of the outer shell 3020, the outer base plate 3050, and the outer top lid 3070 form a second sealed structure about the first hermetically sealed structure, thereby creating a second pressure vessel about the first pressure vessel and the cavity 3030. With the inclusion of the test port 3095, the seal of the second pressure vessel also effectively includes the conduit, sealed at the end not coupled to the test port. Theoretically, the first pressure vessel is located within the internal cavity of the second pressure vessel. Each pressure vessel is engineered to autonomously meet the stress limits of the ASME Code with significant margins.

Unlike the prior art DSC, all of the SNF stored in the cavity 3030 of the dual-walled DSC 3099 share a common confinement space. The common confinement space (i.e., cavity 3030) is protected by two independent gas-tight pressure retention boundaries. Each of these boundaries can withstand both sub-atmospheric supra-atmospheric pressures as needed, even when subjected to the thermal load given off by the SNF within the cavity 3030.

In the event of a failure of the first hermetically sealed structure surrounding the cavity 3030, at least some of the backfilled helium will leak into the interstitial space 3097. Because helium is both an inert gas and a small molecule, the testing equipment and processes, described in greater below, are able to draw helium through the interstitial space 3097 for detection and determination of whether the first hermetically sealed structure has failed.

Figure 39A:
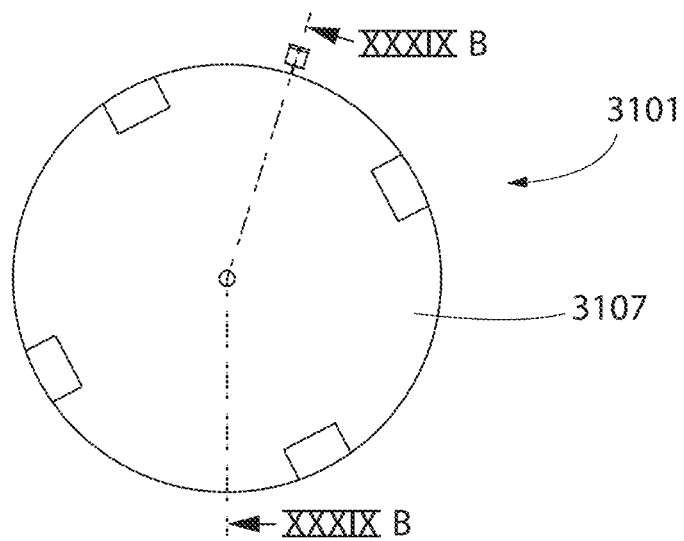
FIG. 39A is a top view of a ventilated storage system.
Figure 39B:
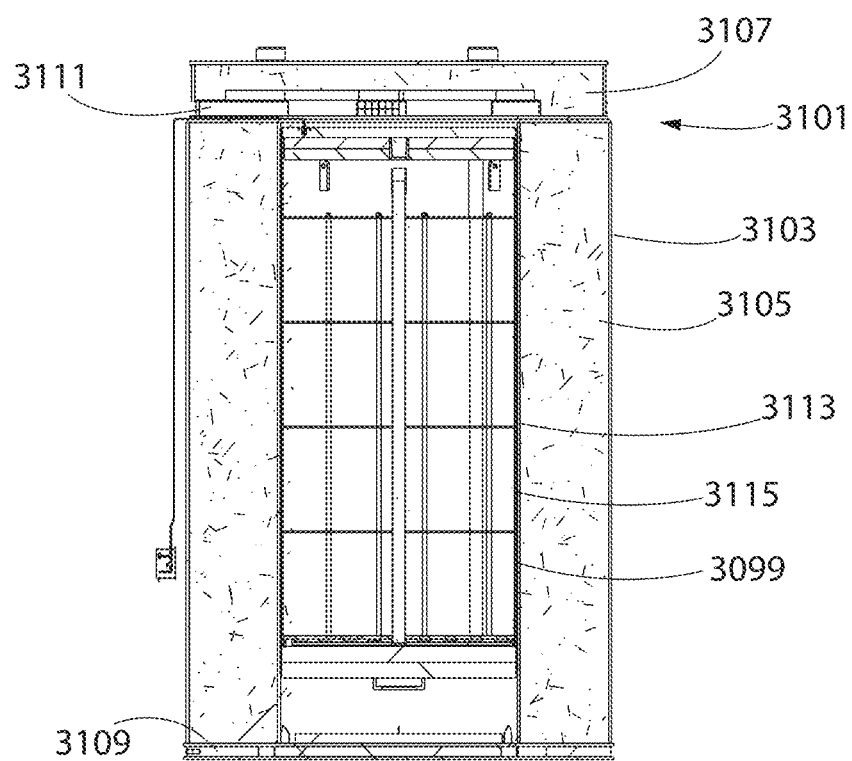
FIG. 39B is a cross-sectional view of the ventilated storage system of FIG. 39A along the line XXXIX-B.

A ventilated system 3101 is shown in FIGS. 39A & 39B. The cask lid 3107 of a ventilated cask 3103 is shown in FIG. 39A, and a cross section of the ventilated cask 3103 is shown in FIG. 39B. As can be seen in FIG. 39B, the ventilated cask 3103 includes a cylindrical cask body 3105 and a cask lid 3107. The cylindrical cask body 3105 includes a set of air inlet ducts 3109 near its bottom and a set of air outlet ducts 3111 near its top. A dual-walled DSC 3099 containing decaying spent nuclear fuel stands upright inside the ventilated cask 3103, with a small diametrical clearance, in the form an annular gap 3113, being formed between an inner surface of the cylindrical cask body 3105 of the ventilated cask 3103 and the outer surface 3115 of the DSC 399. The outer surface 3115 of the DSC 3099 becomes heated due to the thermal energy being generated by the spent nuclear fuel sealed in the DSC 3099. The heat of the outer surface 3115 causes the surrounding air column to heat and rise, resulting in a continuous natural convective ventilation action. The cold air entering the air inlet ducts 3111 at the bottom of the cylindrical cask body 3105 is progressively heated as it rises in the annular gap 3113, reaching its maximum value as it exits the cylindrical cask body 3105. Different designs of such casks are known and described in greater detail in the prior art, e.g., U.S. patent publication No. 2003/0147486, published Aug. 7, 2003, and WO 2013/115881, published Aug. 8, 2013, the disclosures of which are incorporated herein by reference in their entirety.

Figure 40:
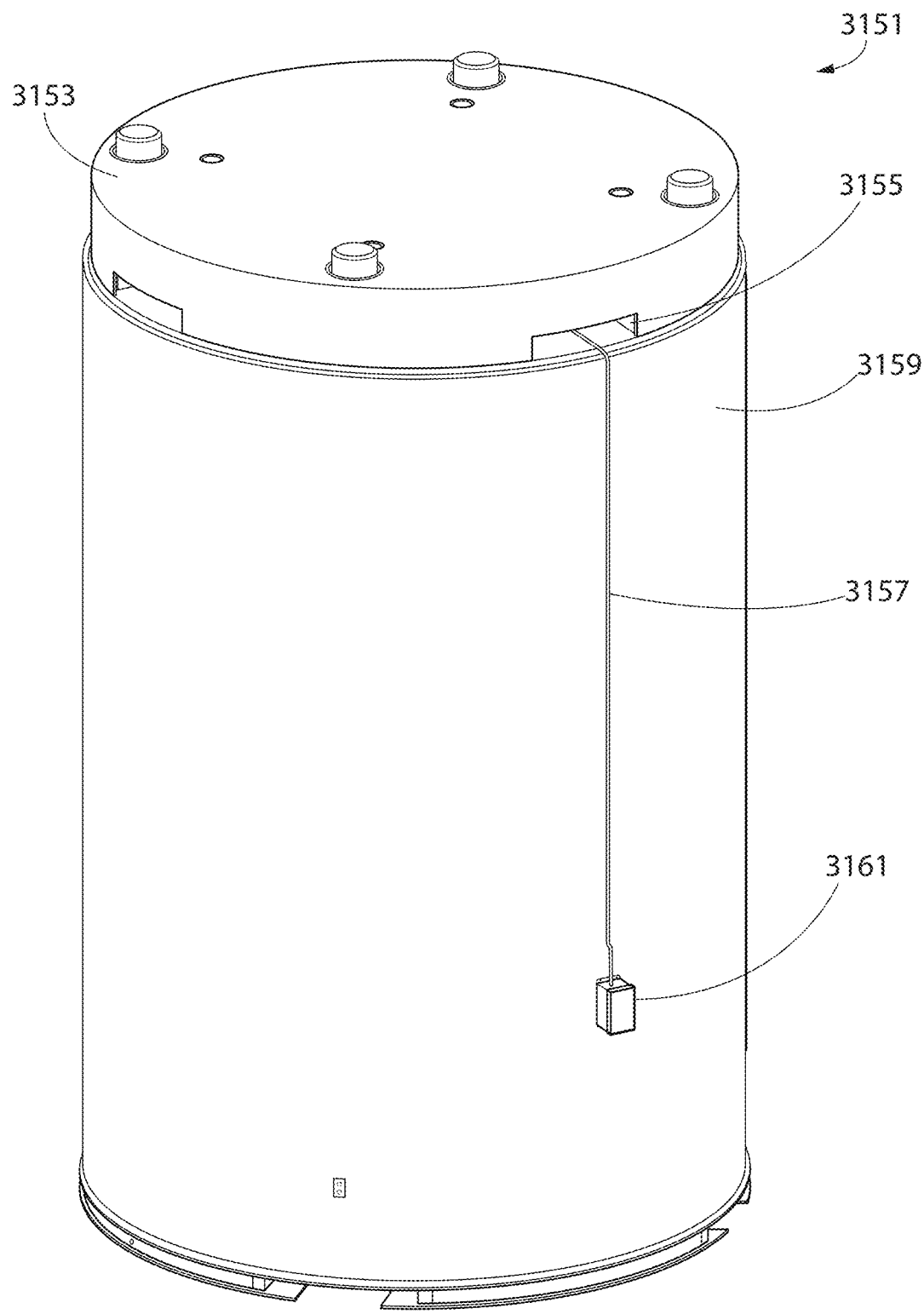
FIG. 40 is a perspective view of a system for storing radioactive materials.

An assembled cask 3151 is shown in FIG. 40. The cask lid 3153 includes ventilation ducts 3155, through one of which the conduit 3157 runs to the outside of the cask 3151. The conduit 3157 extends down the side of the cask body 3159, and into an enclosure 3161 which is affixed to the exterior of the cask body 3159. Although not shown, the conduit may be secured to the cask body 3159 by appropriate brackets affixed to the cask body 3159. As an alternative, the conduit may extend away from the cask body entirely, to an enclosure that is affixed to an independent support (such as a nearby pole or other wall). The conduit 3157 is preferably ¼ inch stainless steel conduit, as such conduit can be evacuated without collapsing. Other conduit materials and sizes that exhibit a similar strength and properties as stainless steel conduit may also be used. Also, the conduit 3157 follows a tortuous path from the first end, where it is coupled to the test port, to the second end, to which the seal, valve, and alternately the testing equipment are coupled. The tortuous path is included so that there is no line of sight path for radiation to escape from the DSC to the outside of the cask 3151. Also, by running the conduit to the outside of the cask, the testing described below may be performed while the cask remains in its storage position and the cask lid remains on the cask, thereby minimizing the amount of time needed to perform the test and significantly reducing the amount of radiation to which workers are exposed.

Figure 41:
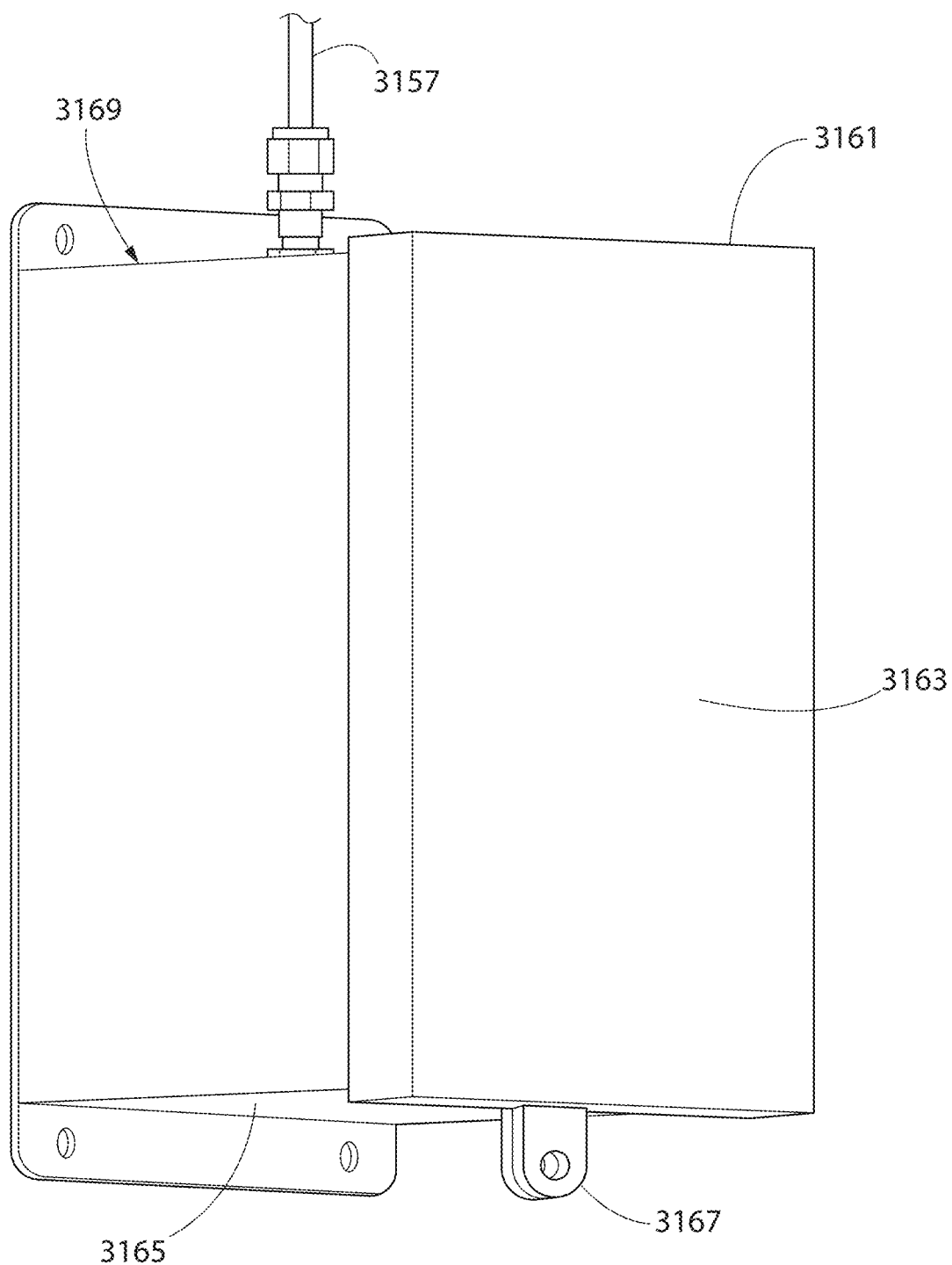
FIG. 41 is a perspective view of an external enclosure for the system of FIG. 40.

FIG. 41 shows a detailed view of the enclosure 3161 with a cover 3163 in place, which serves to protect contents of the internal chamber of the enclosure 3161, and may be used to make the enclosure waterproof, if desired. One sidewall 3165 of the enclosure 3161 and cover 3163 may include features for locking the cover in place—as shown these features are a pair of aligned rings 3167 on the sidewall 3165 and on the cover 3163, which enable a lock or other security feature (e.g., a tag) to be placed on the enclosure 3161.

Figure 42:
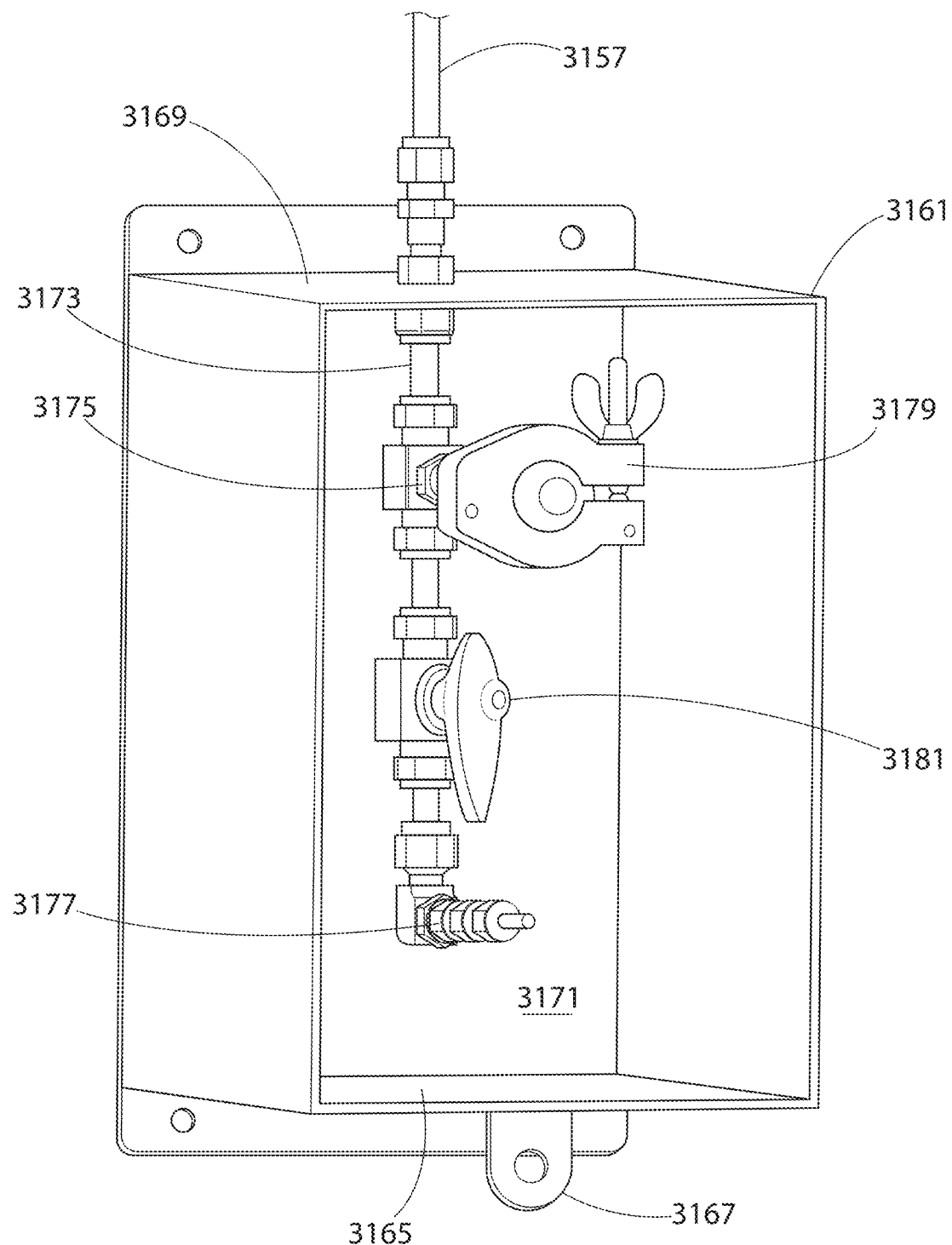
FIG. 42 is a perspective view of the external enclosure without the cover.

The conduit 3157 passes through sidewall 3169 and into the internal chamber 3171 of the enclosure 3161, as shown in FIG. 42. Within the enclosure 3161, the second end 3173 of the conduit 3157 includes one test apparatus connector 3175 and a secondary connector 3177. The two connectors 3175, 3177 provide a dual failsafe boundary in compliance with ASME Code. When no test is being performed, a removable seal 3179 is coupled to the test apparatus connector 3175. The removable seal 3179 may be of any type suitable for sealing the test apparatus connector 3175 and for use under the operating conditions described herein. The test apparatus connector 3175 is otherwise configured for coupling to the test apparatus to be used, which may be a mass spectrometer leak detector (MSLD) of the kind which are readily available on the market today, and one of ordinary skill in the art would be aware of the types of different MSLDs available. The secondary connector 3177 is regulated by a valve 3181 which is suitable for the operating conditions described herein. During the testing process, once tests are performed by the MSLD, a source of a second inert gas (different from the inert gas which is filled in the canister) may be connected to the secondary connector so that the conduit and at least part of the interstitial space are backfilled with this second inert gas.

Figure 43:
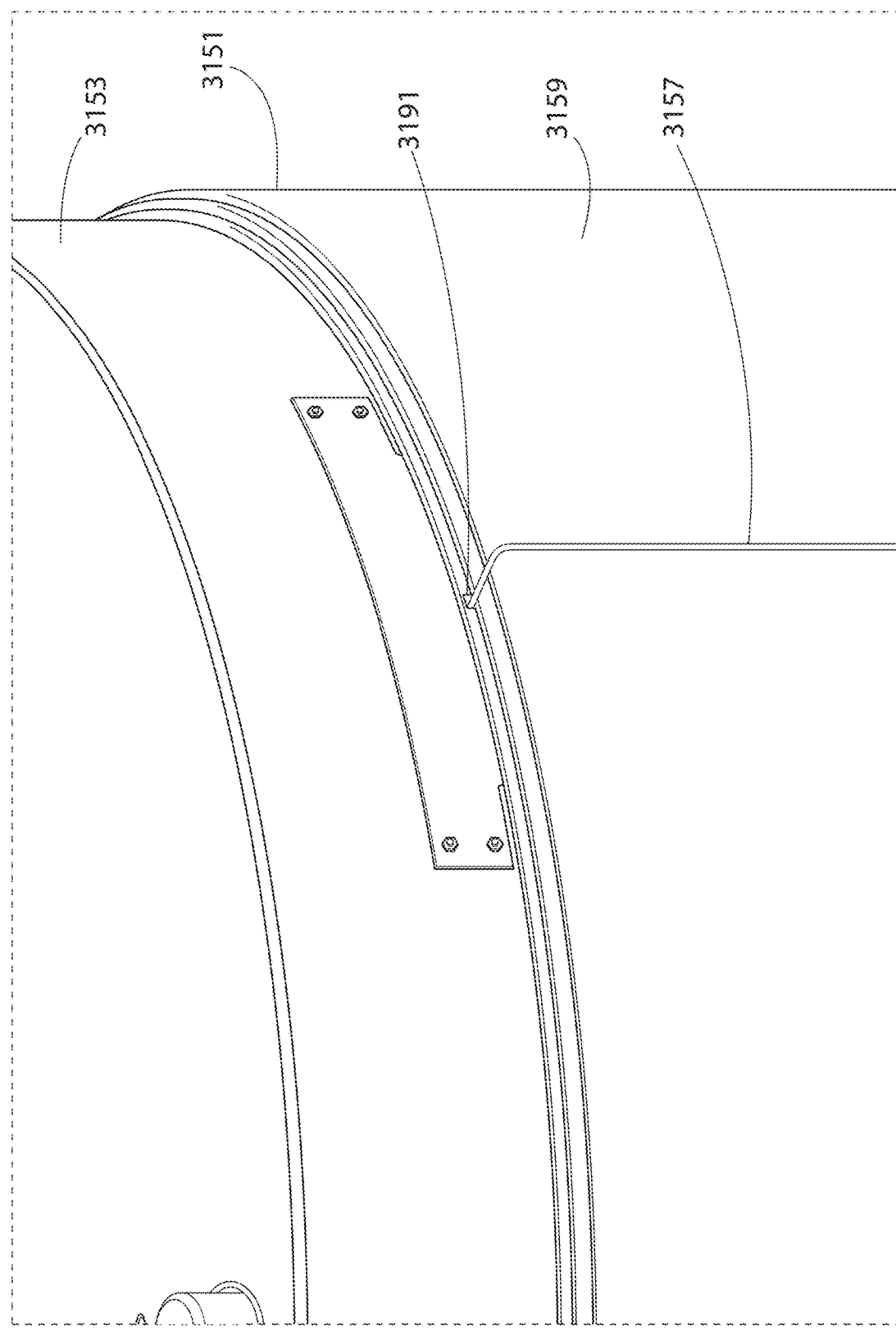
FIG. 43 is a detailed perspective view of a top portion of a ventilated storage system.
Figure 44:
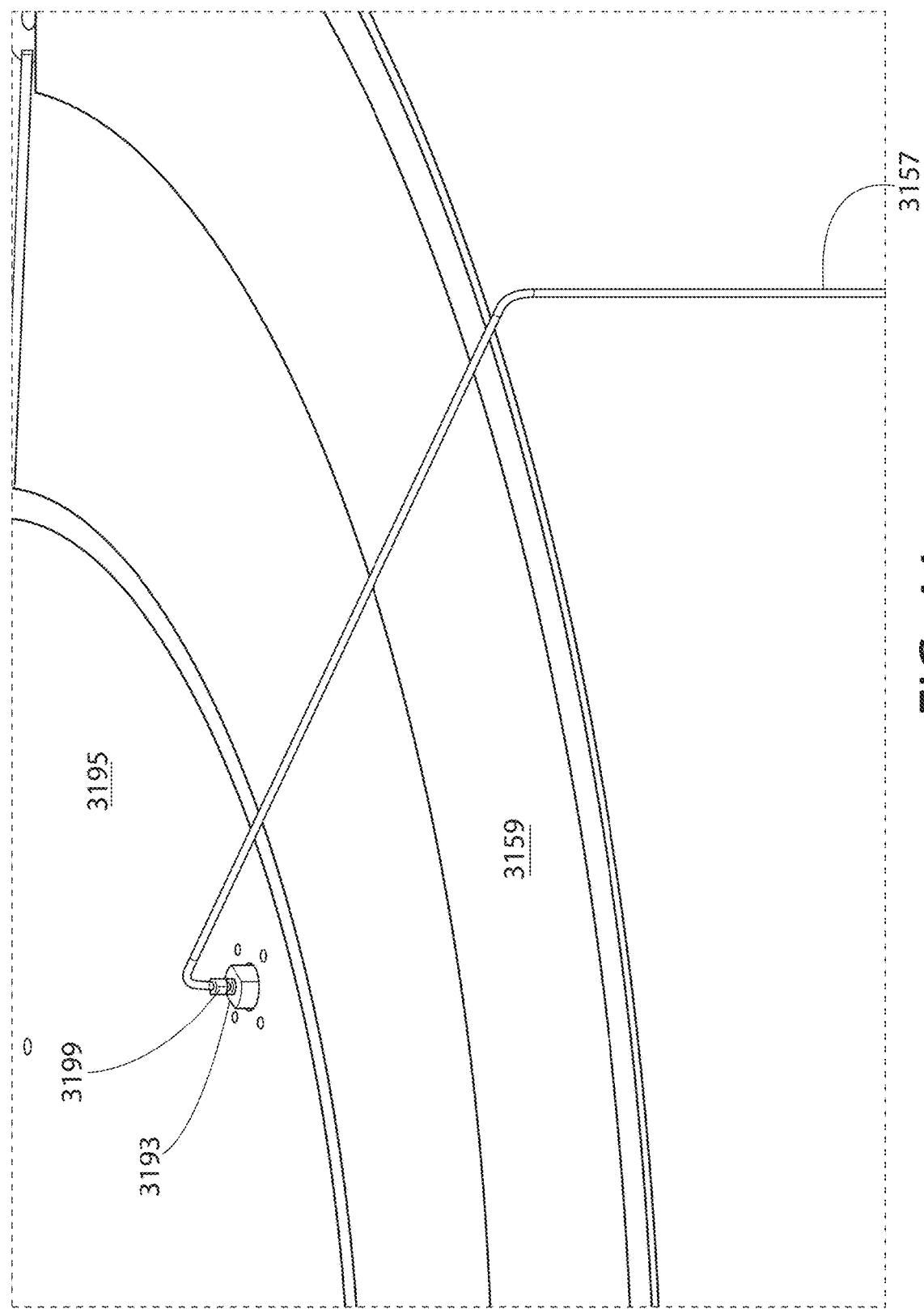
FIG. 44 is a detailed perspective view of a top portion of a ventilated storage system without the cask lid.

An alternative for extending the conduit 3157 to the outside of the cask 3151 is shown in FIG. 43. In this embodiment, a groove 3191 is formed in the cask lid 3153, and the conduit 3157 is positioned in the groove 3191, with the cask lid 3153 in place on the cask body 3159 so that the conduit 3157 may extend to the outside of the cask 3151. FIG. 44 shows this same embodiment without the cask lid in place. As shown, the conduit 3157 extends across the top of the cask body 3159 from the test port 3193 formed in the outer top lid 3195 of the second pressure vessel. The conduit 3157 is coupled to the test port 3193 with an appropriate pressure fitting 3199, which may also be constructed from stainless steel.

Figure 45:
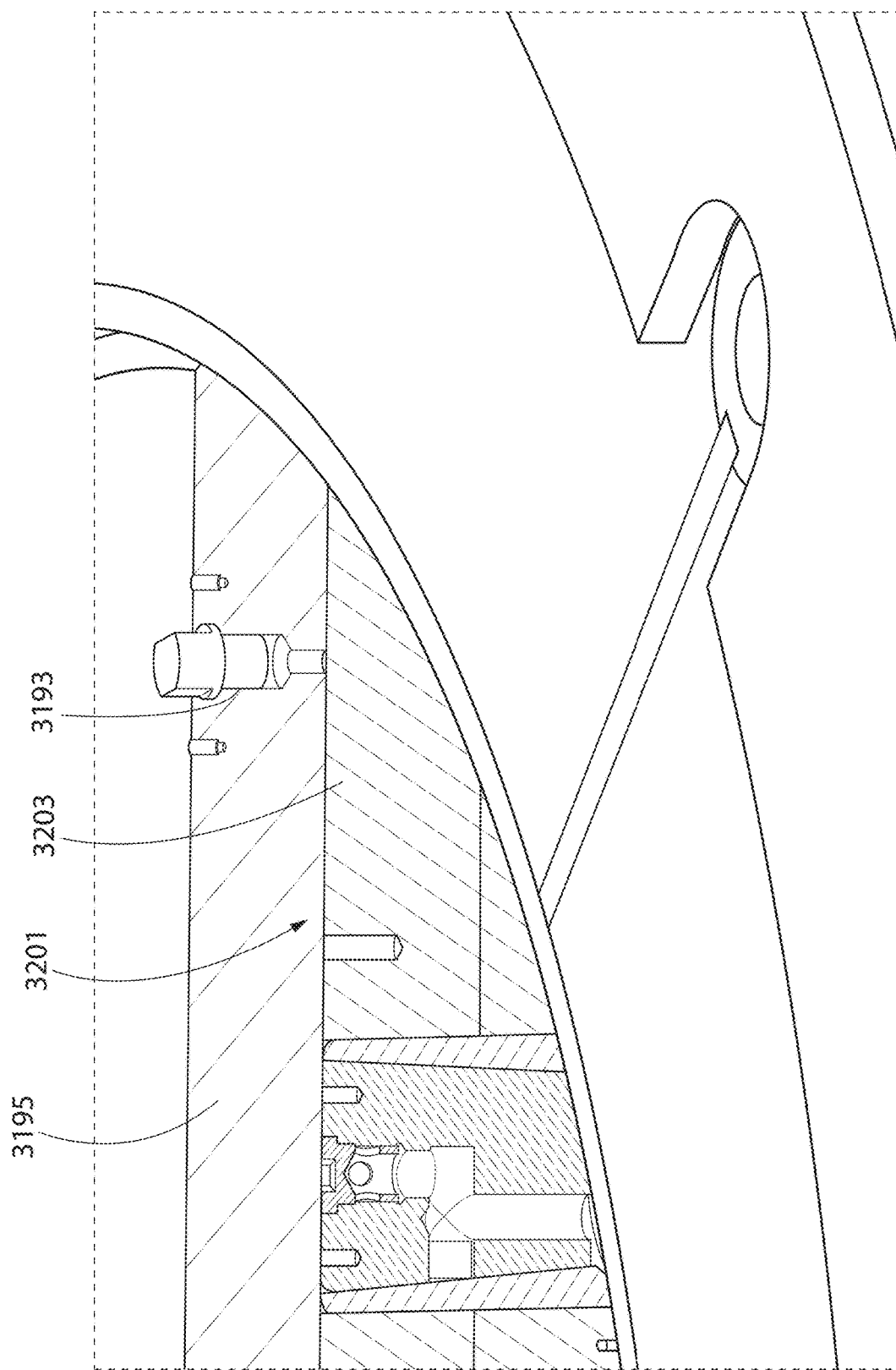
FIG. 45 is a partial cross-sectional view of a ventilated storage system showing the test port.
Figure 46:
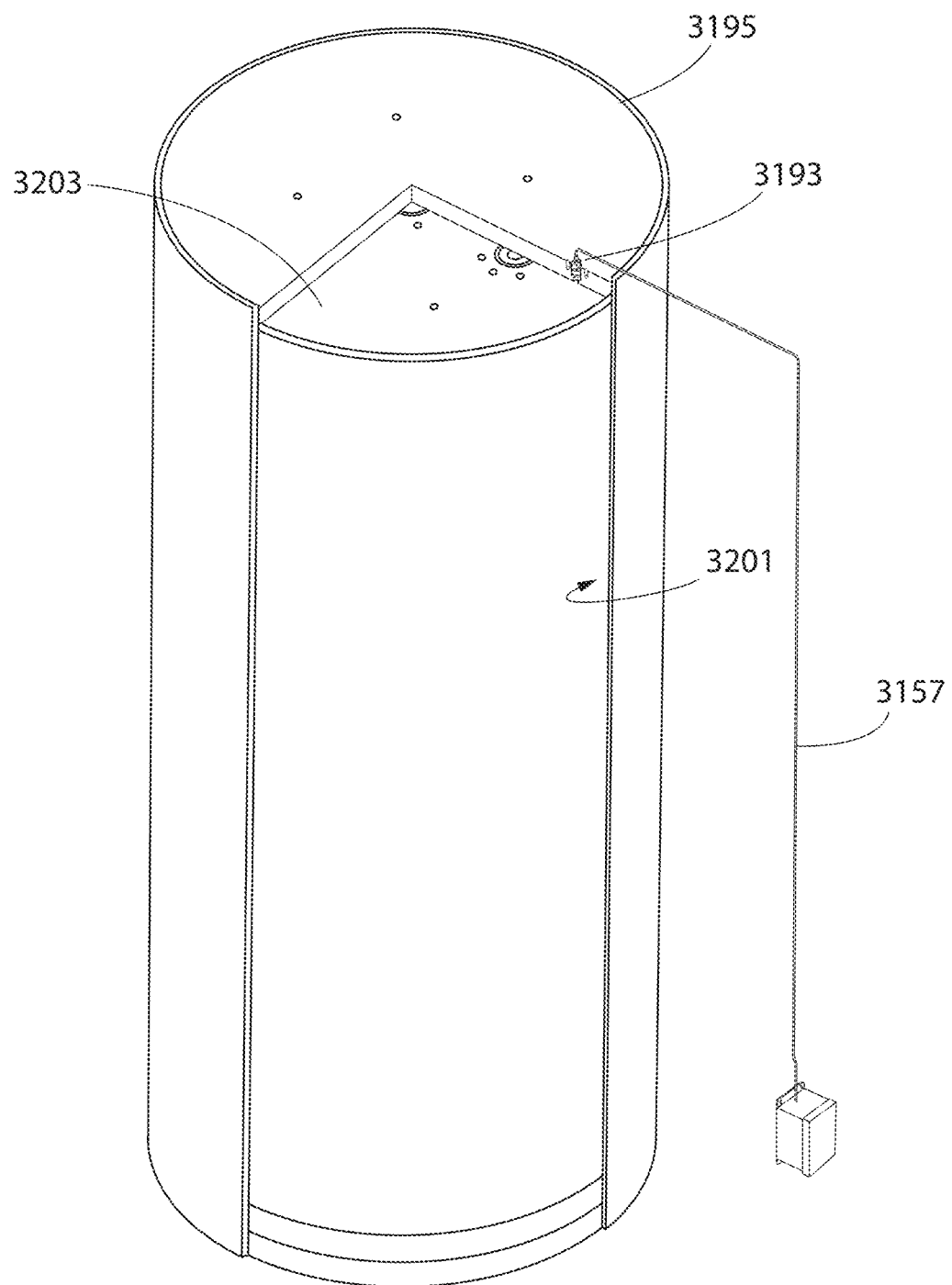
FIG. 46 is a partial cross-sectional view of two pressure vessels used for storing radioactive materials.

FIGS. 45 and 46 illustrate the test port 3193 in greater detail—in FIG. 46, the cask is not shown for additional clarity. A portion of the interstitial space 3201 exists between the inner top lid 3203 and the outer top lid 3195. As indicated above, although the interstitial space 3201 may be very small, in such a small space, small, inert helium atoms may still move around within such a space. In the event that larger inert atoms are used to fill the cavity of the canister, the choices of how to form the interstitial space may be more limited to take into consideration the presently disclosed system and method of leak detection. The test port 3193 extends through the outer top lid 3195 so that it is in fluidic communication with the interstitial space 3201. Thus, when the vacuum is created in the conduit, if helium molecules are present within the interstitial space, at least some of them will be drawn into the conduit, and from there into the attached MSLD, so that they may be detected.

Figure 47:
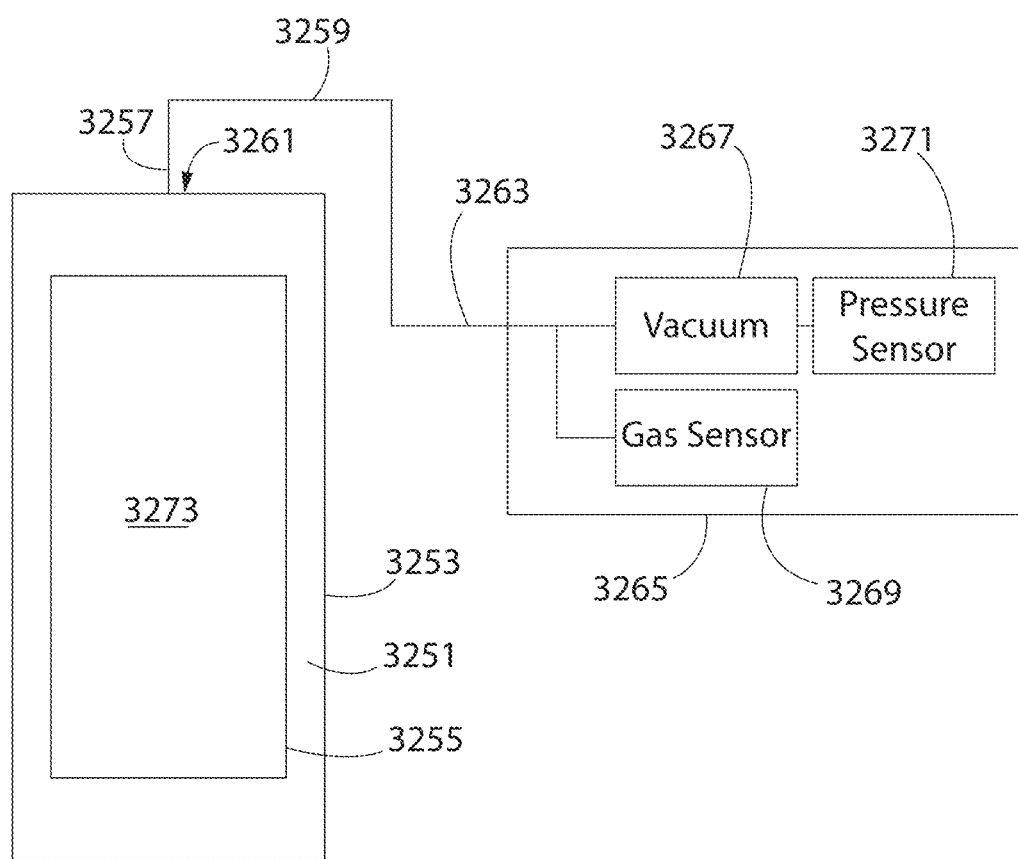
FIG. 47 is a schematic view of a radioactive waste storage system.

A block diagram showing the leak detection system and illustrating the method for detecting leaks is depicted in FIG. 47. The interstitial space 3251 is formed between the inner pressure vessel 3253 and the outer pressure vessel 3255. The first end 3257 of the conduit 3259 is coupled to the test port 3261, and the second end 3263 of the conduit 3259 is coupled to the leak detector 3265, so that the interstitial space 3251, the test port 3261, the conduit 3259, and the leak detector 3265 are all in fluidic communication. The leak detector 3265 includes a vacuum system 3267, which is used to draw gas from the conduit 3259, and thus also from the interstitial space 3251, into the leak detector 3265 for analysis. The leak detector also includes a gas sensor 3269, which is preferably a mass spectrometer, and a pressure sensor 3271 to monitor the state of the vacuum established in the conduit 3259. The gas sensor 3269 is configured to detect the presence of the inert gas backfilled into the cavity 3273 of the inner pressure vessel 3253.

During operation of the leak detector 3265, in one embodiment, the mass spectrometer of an MSLD is used to analyze the gas being drawn from the interstitial space while the vacuum is being established. An analysis is performed to determine if the gas being drawn contains helium atoms, and the number of helium atoms are counted. Depending upon the conditions existing at the time of testing, once the count of helium atoms passes a predetermined number, then a leak in the fluidic containment boundary that is formed by the inner pressure vessel may be said to exist. This predetermined number may vary, depending upon the particular storage container, conditions at the time the storage container was manufactured, or the conditions existing at the storage site. In other words, the presence of a single helium atom is not necessarily indicative of a leak in the inner storage container. However, a count of several helium atoms may be indicative of a leak. Further, because of the ease of the testing procedures, a particular canister might be tested two or more times to confirm the presence of excess helium in the interstitial space before a leak is determined to be positively identified.

Also during operation of the leak detector 3265, in one embodiment, the pressure sensor of the MSLD is used to monitor the established vacuum in the conduit and in the interstitial space. In the event that the vacuum decreases over a short period of time from its initially established level, or alternatively if the MSLD needs to perform additional work to maintain the vacuum once established, then a leak in the fluidic containment boundary that is formed by the outer pressure vessel may be said to exist. In one embodiment, an MSLD is able to establish a vacuum in the conduit and in the interstitial space at about $10^{-8}$ atms, and if that established vacuum changes by about an order of magnitude, to about $10^{-7}$ atms within a time period of about 1 second, then this is an indicator that there is a breach in the containment provided by the outer pressure vessel.

Once a test is complete, and whether or not a potential or actual leak is identified, the MSLD is decoupled from the conduit, and the removable seal may be put back in place on the test apparatus connector. Alternatively, before the removable seal is put back in place, the conduit may be backfilled with an inert gas that is different from the inert gas used to backfill the cavity of the inner pressure vessel.

The two tests performed by the leak tester are very accurate, and unlike current testing systems, they do not require further investigation to determine if the test resulted in a false positive identification of a leak.

The simplicity of the leak testing system and processes described above enables testing of radioactive materials containment on a regular basis, such as monthly, semi-annually, annually, or at any other chosen interval, without requiring dedicated (and costly) test equipment being connected to every individual containment system. Although dedicated equipment permits constant monitoring, it has been found that intermittent testing is sufficient and more cost effective. In addition, testing a single radioactive materials canister may be performed quickly, meaning that a reduction in manpower may be realized by implementing such systems and methods. Finally, the additional equipment that is added to a canister for performing these leak tests is not complex and requires little maintenance, thereby enabling further cost savings to be realized.

V. Inventive Concept 5

With reference to FIGS. 48-52B, a fifth inventive concept will be described.

Figure 48:
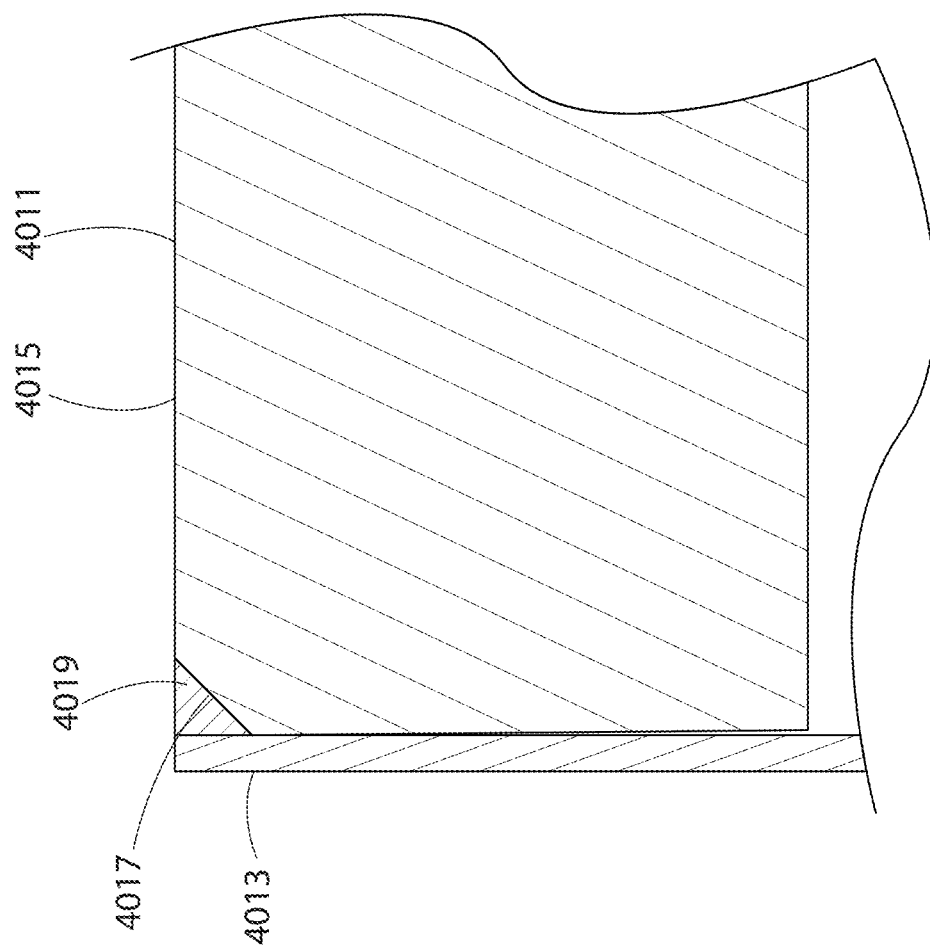
FIG. 48 illustrates the top lid welded to the side wall of a canister according to the prior art.

The lid 4011 and top portion of a side wall 4013 for an MPC of the prior art are shown in FIG. 48. The top surface 4015 of the lid 4011 includes a beveled edge 4017, and the closure weld 4019 joining the lid 4011 to the side wall 4013 is formed in the space between the half V-shaped space between the beveled edge 4017 and the top portion of the side wall 4013. As shown, the weld is a through-thickness single groove weld V-shaped groove, although the groove could instead be J-shaped. Due the physical configuration of the lid, the sidewall, and the closure weld, this type of closure weld is not susceptible to 100% volumetric examination.

Figure 49A:
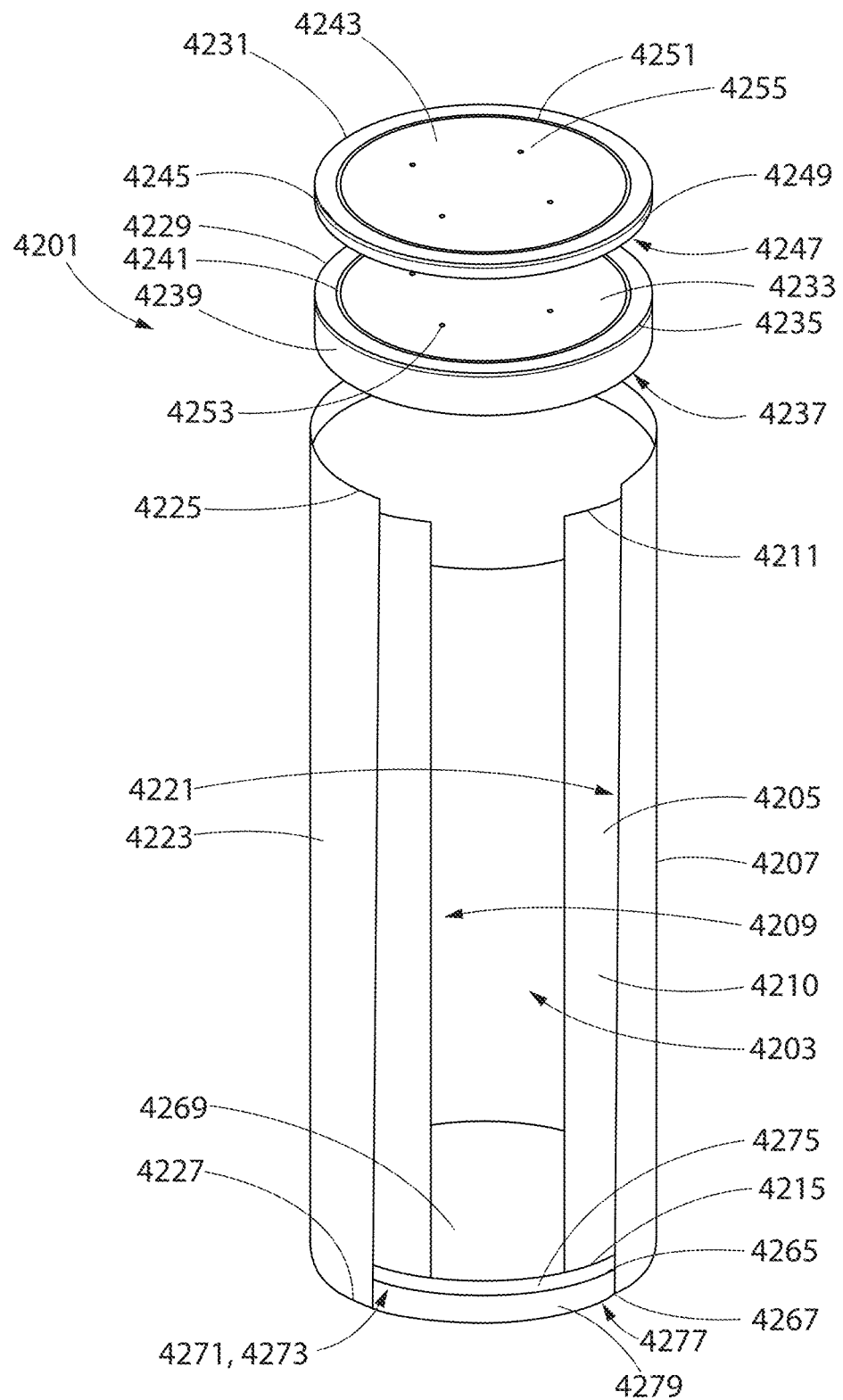
FIG. 49A illustrates a double-walled MPC having lids configured to allow 100% volumetric examination of the respective closure weld.

A dual-walled MPC 4201 is illustrated in FIG. 49A, and this MPC 4201 is configured so that the closure weld may be subjected to 100% volumetric examination. The dual-walled MPC 4201 may be used with any style of fuel basket, such as the one described in U.S. Pat. No. 5,898,747, issued Apr. 27, 1999. In some instances it may be possible to use the dual-walled MPC 4201 without a fuel basket, depending on the intended function. Furthermore, the dual-walled MPC 4201 may be used to store and/or transport any type of high level radioactive materials and is not limited to spent nuclear fuel.

As will become apparent from the structural description below, the dual-walled MPC 4201 creates two independent containment boundaries about the storage cavity 4203 which operate to contain both fluidic (gas and liquid) and particulate radiological matter within the cavity 4203. As a result, if one containment boundary were to fail, the other containment boundary will remain intact. While theoretically the same, the containment boundaries formed by the dual-walled MPC 201 about the cavity 4203 can be literalized in many ways, including without limitation a gas-tight containment boundary, a pressure vessel, a hermetic containment boundary, a radiological containment boundary, and a containment boundary for fluidic and particulate matter. These terms are used synonymously throughout this application. In one instance, these terms generally refer to a type of boundary that surrounds a space and prohibits all fluidic and particulate matter from escaping from and/or entering into the space when subjected to the required operating conditions, such as pressures, temperatures, etc.

Finally, while the dual-walled MPC 4201 is illustrated and described in a vertical orientation, it is to be understood that the dual-walled MPC 4201 can be used to store and/or transport its load in any desired orientation, including at an angle or horizontally. Thus, use of all relative terms through this specification, including without limitation "top," "bottom," "inner" and "outer," are used for convenience only and are not intended to be limiting of the invention in such a manner.

The dual-walled MPC 4201 includes a first shell that acts as an inner shell 4205 and a second shell that acts as an outer shell 4207. The inner and outer shells 4205, 4207 are preferably cylindrical tubes and are constructed of a metal. Of course, other shapes can be used if desired. The inner shell 4205 is a tubular hollow shell that includes an inner surface 4209, an outer surface 4210, a top edge 4212 and a bottom edge 4215. The inner surface 4209 of the inner shell 4205 forms a cavity/space 4203 for receiving and storing SNF. The cavity 4203 is a cylindrical cavity formed about a central axis.

The outer shell 4207 is also a tubular hollow shell that includes an inner surface 4221, an outer surface 4223, a top edge 4225 and a bottom edge 4227. The outer shell 4207 circumferentially surrounds the inner shell 4205. The inner shell 4205 and the outer shell 4207 are constructed so that the inner surface 4221 of the outer shell 4207 is in substantially continuous surface contact with the outer surface 4223 of the inner shell 4205. In other words, the interface between the inner shell 4205 and the outer shell 4207 is substantially free of gaps/voids such that the two shells 4205, 4207 are in conformal contact. This can be achieved through an explosive joining, a cladding process, a roller bonding process and/or a mechanical compression process that bonds the inner shell 4205 to the outer shell 4207. The continuous surface contact at the interface between the inner shell 4205 and the outer shell 4207 reduces the resistance to the transmission of heat through the inner and outer shells 4205, 4207 to a negligible value. Thus, heat emanating from the spent nuclear fuel loaded within the cavity 4203 can efficiently and effectively be conducted outward through the shells 4205, 4207 where it is removed from the outer surface 4223 of the outer shell via convection.

The inner and outer shells 4205, 4207 are preferably both made of a metal. As used herein, the term metal refers to both pure metals and metal alloys. Suitable metals include without limitation austenitic stainless steel and other alloys including Hastelloy™ and Inconel™. Of course, other materials can be utilized. The thickness of each of the inner and outer shells 4205, 4207 is preferably in the range of 5 mm to 25 mm. The outer diameter of the outer shell 4207 is preferably in the range of 1700 mm to 2000 mm. The inner diameter of the inner shell 4205 is preferably in the range of 1700 mm to 1900 mm. The specific size and/or thickness of the shells 4205, 4207, however, is a matter of design choice.

In some embodiments, it may be further preferable that the inner shell 4205 be constructed of a metal that has a coefficient of thermal expansion that is equal to or greater than the coefficient of thermal expansion of the metal of which the outer shell 4207 is constructed. Thus, when the spent nuclear fuel that is stored in the cavity 4203 emits heat, the outer shell 4207 will not expand away from the inner shell 4205. This ensures that the continuous surface contact between the outer surface 4210 of the inner shell 4205 and the outer surface 4223 of the outer shell 4207 will be maintained and a gaps will not form under heat loading conditions.

The dual-walled MPC 4201 also includes a first top plate that acts as an inner top lid 4229 for the inner shell 4205 and a second top plate that acts as an outer top lid 4231 for the outer shell 4207. The inner and outer top lids 4229, 4231 are plate-like structures that are preferably constructed of the same materials discussed above with respect to the shells 4205, 4207. Preferably the thickness of the inner top lid 4229 is in the range of 99 mm to 300 mm. The thickness of the outer top lid 4231 is preferably in the range of 50 mm to 150 mm. The invention is not, however, limited to any specific dimensions, which will be dictated on a case-by-case basis and the radioactive levels of the spent nuclear fuel to be stored in the cavity 4203.

The inner top lid 4229 includes a top surface 4233 with a beveled edge 4235, a bottom surface 4237, an outer lateral surface/edge 4239, and a channel 4241 formed in the top surface 4233 and set in from the beveled edge 4235. The outer top lid 4231 includes a top surface 4243 with a beveled edge 4245, a bottom surface 4247, an outer lateral surface/edge 4249, and a channel 4251 formed in the top surface 4243 and set in from the beveled edge 4245. When fully assembled, the outer lid 4231 is positioned atop the inner lid 4229 so that the bottom surface 4247 of the outer lid 4231 is in substantially continuous surface contact with the top surface 4233 of the inner lid 4229. Both the inner top lid 4229 and the outer top lid 4231 also include vent and/or drain ports 4253, 4255.

During loading procedure involving spent nuclear fuel, the cavity 4203 is loaded with the spent nuclear fuel, then the inner top lid 4229 is positioned so as to enclose the top end of the cavity 4203 and rests atop brackets (not shown). Once the inner top lid 4229 is in place, a closure weld is formed to seal the inner top lid 4229 to the inner shell 4205. The top lid 4229 may be welded to the inner shell 4205 using any suitable welding technique or combinations of techniques that use a filler material. Examples of suitable welding techniques include resistance seam welding, manual metal arc welding, metal inert gas welding, tungsten inert gas welding, submerged arc welding, plasma arc welding, gas welding, electroslag welding, thermit welding.

After the cavity 4203 is sealed by the closure weld, it may then be evacuated/dried via the appropriate method and backfilled with nitrogen, helium or another inert gas using the ports 4249 of the inner lid 4229 that form passageways into the cavity 4203. The ports 4249 may thereafter be filled with a metal or other wise plugged so as to hermetically seal the cavity 4203.

The outer shell 4207 has an axial length that is greater than the axial length of the inner shell 4205. As such, the top edge 4225 of the outer shell 4207 extends beyond the top edge 4211 of the inner shell 4205. Similarly, the bottom edge 4227 of the outer shell 4207 extends beyond the bottom edge 4215 of the inner shell 4205.

The offset between the top edges 4211, 4225 of the shells 4205, 4207 allows the top edge 4211 of the inner shell 4205 to act as a ledge for receiving and supporting the outer top lid 4231. When the inner top lid 4229 is in place, the inner surface 4209 of the inner shell 4205 extends over the outer lateral edges 4239. When the outer top lid 4231 is then positioned atop the inner lid 4229, the inner surface 4221 of the outer shell 4207 extends over the outer lateral edge 4249 of the outer top lid 4231. The top edge 4225 of the outer shell 4207 is substantially flush with the top surface 4253 of the outer top lid 4231. The inner and outer top lids 4229, 4231 are welded to the inner and outer shells 4205, 4207 respectively after the fuel is loaded into the cavity 4203. Similar to the inner top lid 4229, once the outer top lid 4231 is in place, a closure weld is formed to seal the outer top lid 4231 to the outer shell 4207. The outer top lid 4231 may be welded to the outer shell 4207 using any suitable welding technique or combinations of techniques that use a filler material. Examples of suitable welding techniques include resistance seam welding, manual metal arc welding, metal inert gas welding, tungsten inert gas welding, submerged arc welding, plasma arc welding, gas welding, electroslag welding, thermit welding. The closure welds sealing the inner and outer top lids 4229, 4231 to the inner and outer shells 4205, 4207 may be subjected to 100% volumetric examination once the welds are formed. It is to be understood that the closure weld for the inner top lid 4229 is to undergo volumetric examination before the outer top lid 4231 put in place.

The dual-walled MPC 4201 also includes a first plate that acts as an inner base plate 4265 and a second plate that acts as an outer base plate 4267. The inner and outer base plates 4265, 4267 are rigid plate-like structures having circular horizontal cross-sections. The invention is not so limited, however, and the shape and size of the base plates is dependent upon the shape of the inner and outer shells. The inner base plate 4265 includes a top surface 4269, a bottom surface 4271 and an outer lateral surface/edge 4273. Similarly, the outer base plate 4267 includes a top surface 4275, a bottom surface 4277 and an outer lateral surface/edge 4279.

The top surface 4269 of the inner base plate 4265 forms the floor of the cavity 4203. The inner base plate 4265 rests atop the outer base plate 4267. Similar to the other corresponding components of the dual-walled MPC 201, the bottom surface 4271 of the inner base plate 4265 is in substantially continuous surface contact with the top surface 4275 of the outer base plate 4267. As a result, the interface between the inner base plate 4265 and the outer base plate 4267 is free of gaseous gaps/voids for thermal conduction optimization. An explosive joining, a cladding process, a roller bonding process and/or a mechanical compression process can be used to effectuate the contact between the base plates 4265, 4267. Preferably, the thickness of the inner base plate 4265 is in the range of 50 mm to 150 mm. The thickness of the outer base plate 4267 is preferably in the range of 99 mm to 200 mm. Preferably, the length from the top surface of the outer top lid 4231 to the bottom surface of the outer base plate 4267 is in the range of 4000 mm to 5000 mm, but the invention is in no way limited to any specific dimensions.

The outer base plate 4267 may be equipped on its bottom surface with a grapple ring (not shown) for handling purposes. The thickness of the grapple ring is preferably between 50 mm and 150 mm. The outer diameter of the grapple ring is preferably between 350 mm and 450 mm.

The inner shell 4205 rests atop the inner base plate 4265 in a substantially upright orientation. The bottom edge 4215 of the inner shell 4205 is connected to the top surface 4275 of the inner base plate 4265 by a through-thickness single groove (V or J shape) weld. The outer surface 4210 of the inner shell 4205 is substantially flush with the outer lateral edge 4273 of the inner base plate 4265. The outer shell 4207, which circumferentially surrounds the inner shell 4205, extends over the outer lateral edges 4273, 4279 of the inner and outer base plates 4265, 4267 so that the bottom edge 4227 of the outer shell 4207 is substantially flush with the bottom surface 4277 of the outer base plate 4267. The inner surface 4221 of the outer shell 4207 is also connected to the outer base plate 4267 using a through-thickness edge weld. In an alternative embodiment, the bottom edge 4227 of the outer shell 4207 could rest atop the top surface 4275 of the outer base plate 4267 (rather than extending over the outer later edge of the base plate 4267). In such an embodiment, the bottom edge 4227 of the outer shell 4207 could be welded to the top surface 4275 of the outer base plate 4267.

When all of the seal and closure welds discussed above are completed, the combination of the inner shell 4205, the inner base plate 4265 and the inner top lid 4229 forms a first hermetically sealed structure surrounding the cavity 4203, thereby creating a first pressure vessel. Similarly, the combination of the outer shell 4207, the outer base plate 4267, and the outer top lid 4231 form a second sealed structure about the first hermetically sealed structure, thereby creating a second pressure vessel about the first pressure vessel and the cavity 4203. Theoretically, the first pressure vessel is located within the internal cavity of the second pressure vessel. Each pressure vessel is engineered to autonomously meet the stress limits of the ASME Code with significant margins.

Figure 49B:
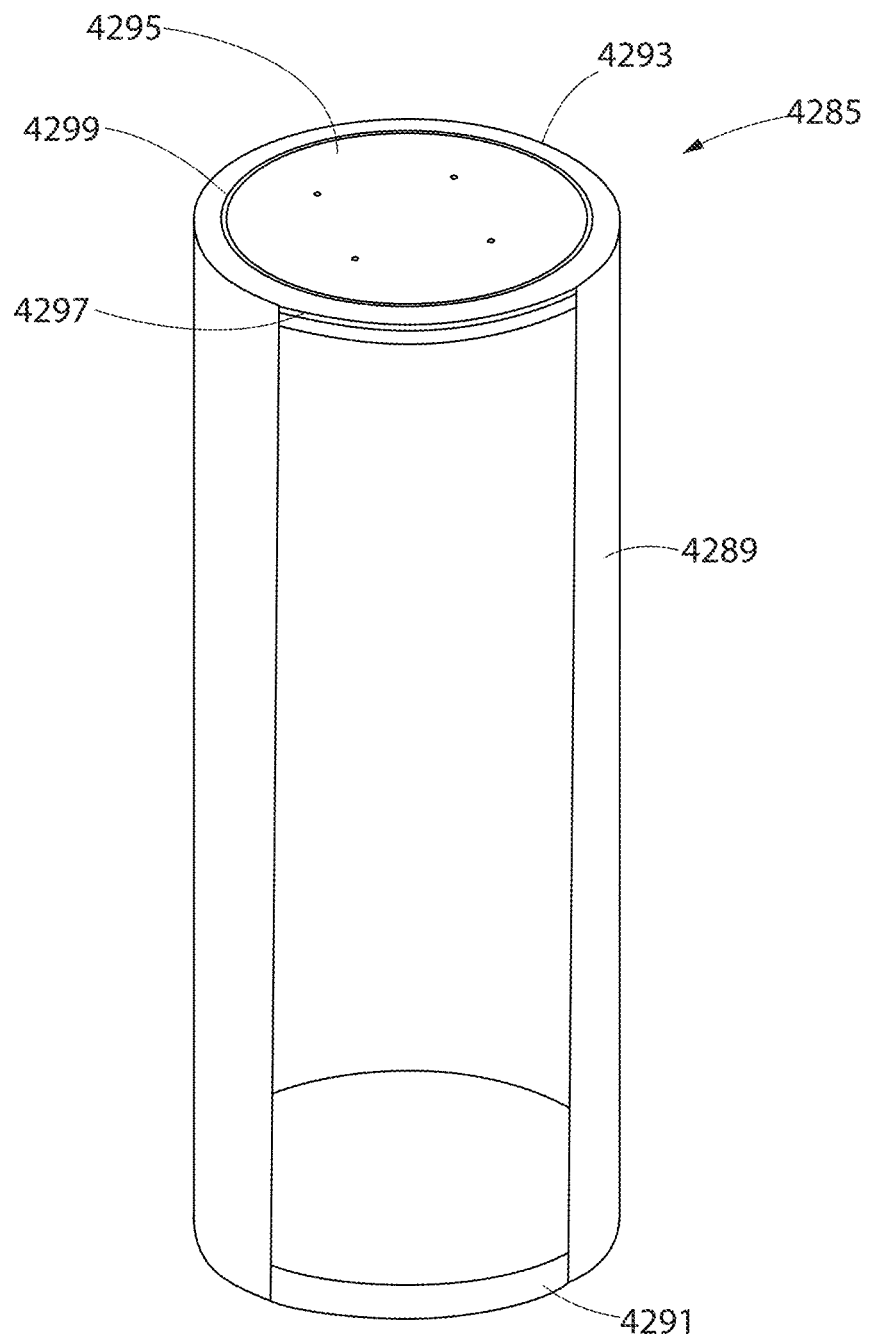
FIG. 49B illustrates a single walled MPC having a lid configured to allow 100% volumetric examination of the closure weld.

FIG. 49B illustrates a single-walled MPC 4285 which is constructed in a similar manner as each pressure vessel of the double-walled MPC 4201 discussed above. This single-walled MPC 4287 includes a side wall 4289 seal welded to a base plate 4291, and a top plate 4293. The top surface 4295 of the top plate 4293 includes a beveled top edge 4297 and a channel 4299 set in from the top edge 4297. Having the lid configured with the channel 4299 makes it so that the closure weld may be subjected to 100% volumetric examination. All other parts of the single-walled MPC 285 may be constructed in the same manner described above.

Figure 49C:
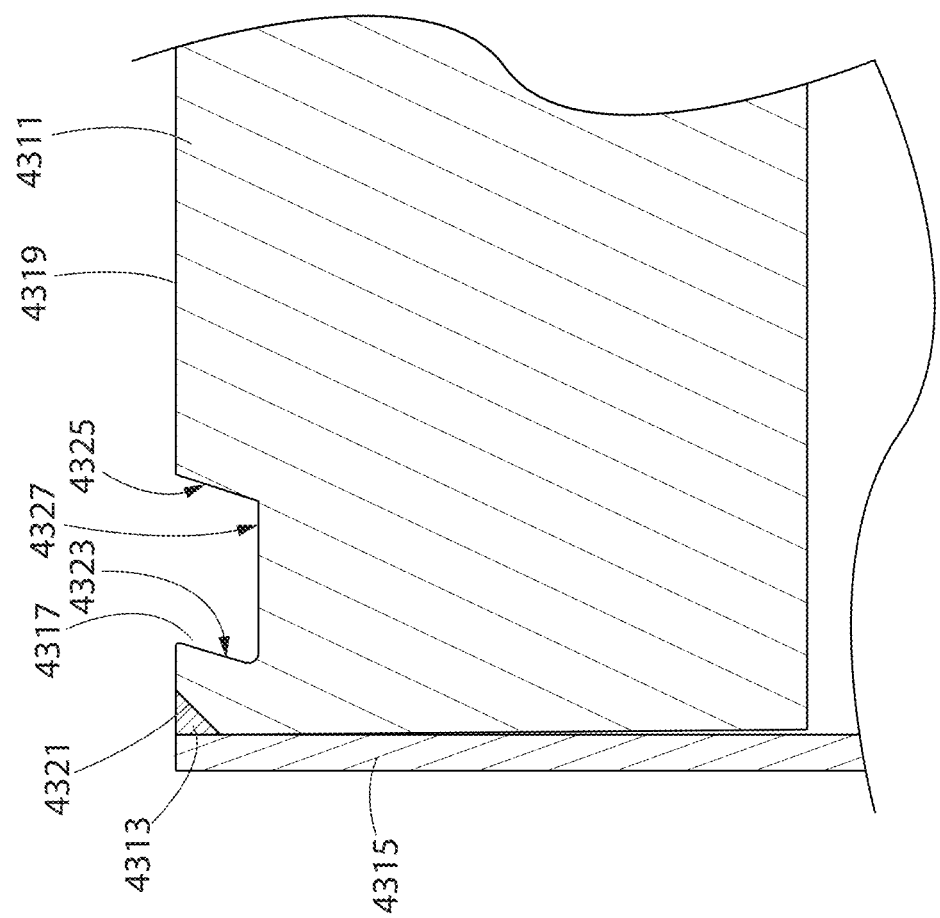
FIG. 49C illustrates a detailed sectional view of a lid and closure weld, the lid being configured to allow 100% volumetric examination of the closure weld.

A detailed view a top plate 4311 and the closure weld 4313 sealing the top plate 4311 to a side wall 4315 of an MPC are illustrated in FIG. 49C. The channel 4317 in the top surface 4319 is set in from the beveled top edge 4321. The channel 4317 extends below the top surface 4319 at least as much as does the bevel of the beveled top edge 4321. In some embodiments, depending upon the configuration of the probe being used, it may be desirable to have the channel 4317 extend deeper below the top surface than the bevel in order to accommodate the probe. The channel 4317 is sufficiently wide so that a probe used for examining the closure weld may be placed within the channel 4317 and moved circumferentially around the top plate 4311 for purposes of achieving 100% volumetric examination of the closure weld. For some types of probes, the channel may be as wide as 2" to 3", although these dimensions may vary significantly to accommodate the configuration of the probe used to examine the closure weld. The side wall 4323 of the channel 4317 nearest the beveled top edge 4321 is placed at an angle that is approximately parallel to the angle of the beveled top edge 4321. However, in some embodiments the angle of this channel side wall may vary from the angle of the top beveled edge by 5°-20° or more, depending upon the configuration of probe being used. The side wall 4323, however, may be formed at any angle relative to the beveled top edge 4321. The opposite wall 4325 of the channel 4317 may have any configuration, from a well-defined wall, as is shown, to a curved or flat surface adjoining the bottom 4327 of the channel 4317.

Figure 50:
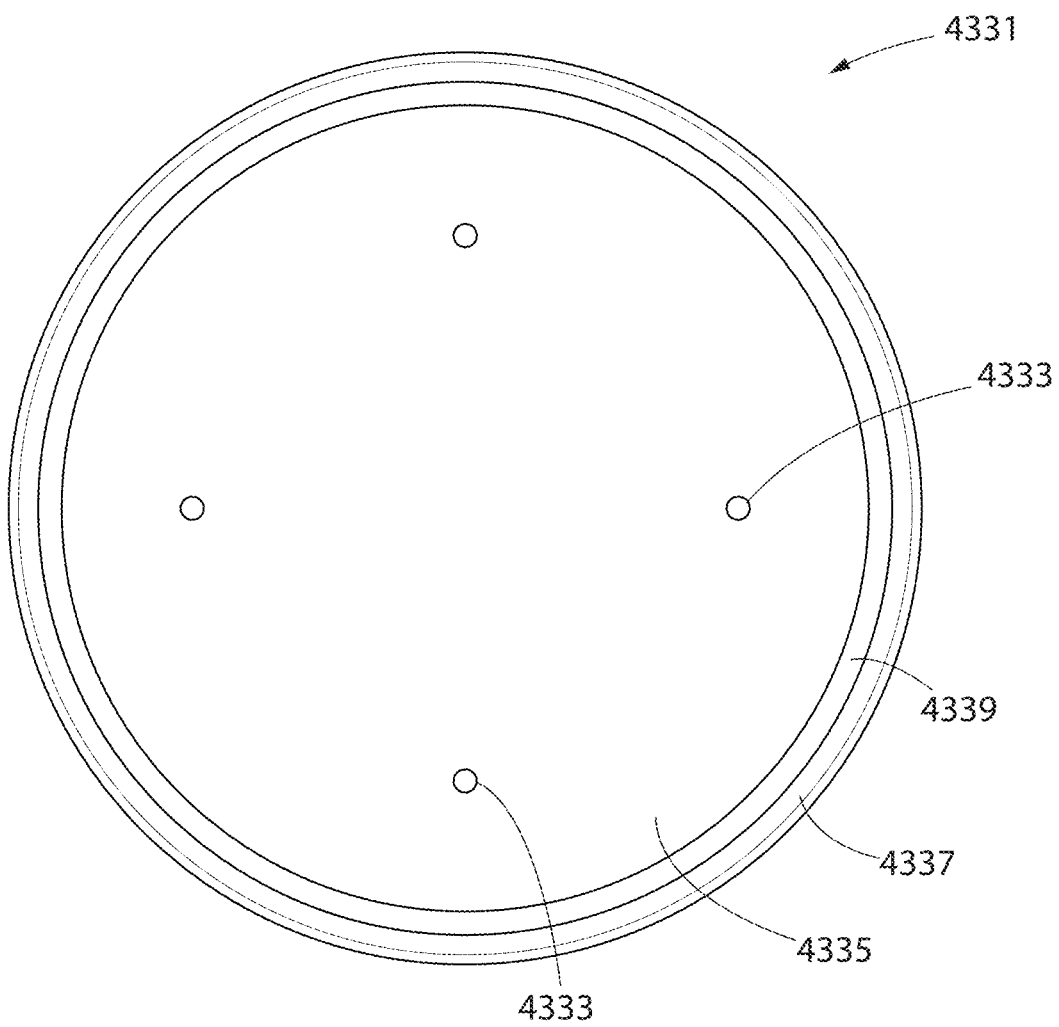
FIG. 50 illustrates a top elevation view of a first lid configured to allow 100% volumetric examination of the closure weld.
Figure 51:
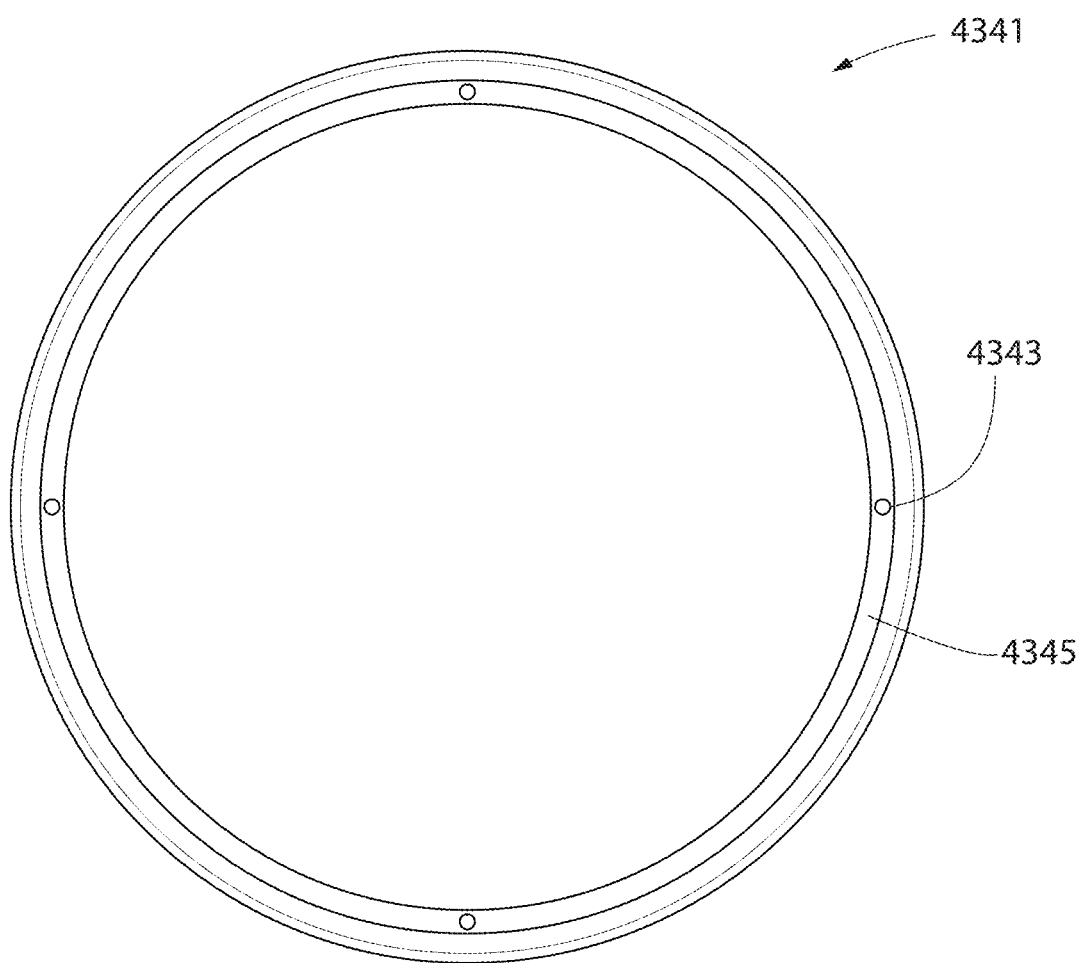
FIG. 51 illustrates a top elevation view of a second lid configured to allow 100% volumetric examination of the closure weld.

One embodiment of a top plate 4331 is shown in FIG. 50 with ports 4333 positioned in the central portion 4335 of the top surface 4337 of the top plate 4331, radially inward from the channel 4339. The ports 4333 may serve any desired purpose for the MPC for which the top plate 4331 is used, and the different ports may be used for different purposes. Examples of purposes for the ports include their use as vent ports, as vacuum ports, as drain ports, as backfill ports, as test ports, among others. Another embodiment of a top plate 4341 is shown in FIG. 51. In this embodiment, the ports 4343 are positioned within the channel 4345. In other embodiments, ports may be positioned both within the channel and in the central portion of the top surface of the top plate.

Figure 52A:
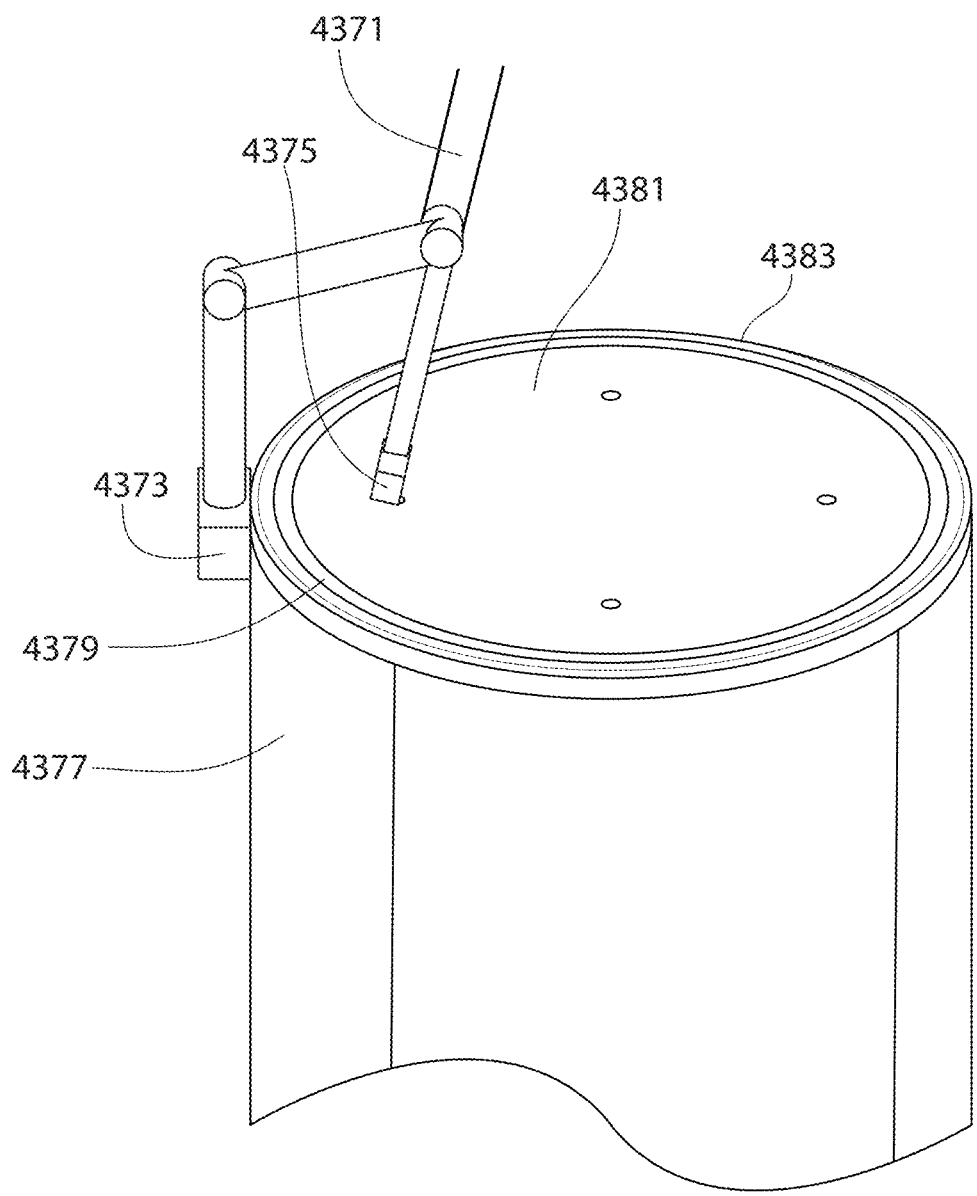
FIG. 52A illustrates a weld arm positioned to form a closure weld and probes positioned to volumetrically examine the closure weld.
Figure 52B:
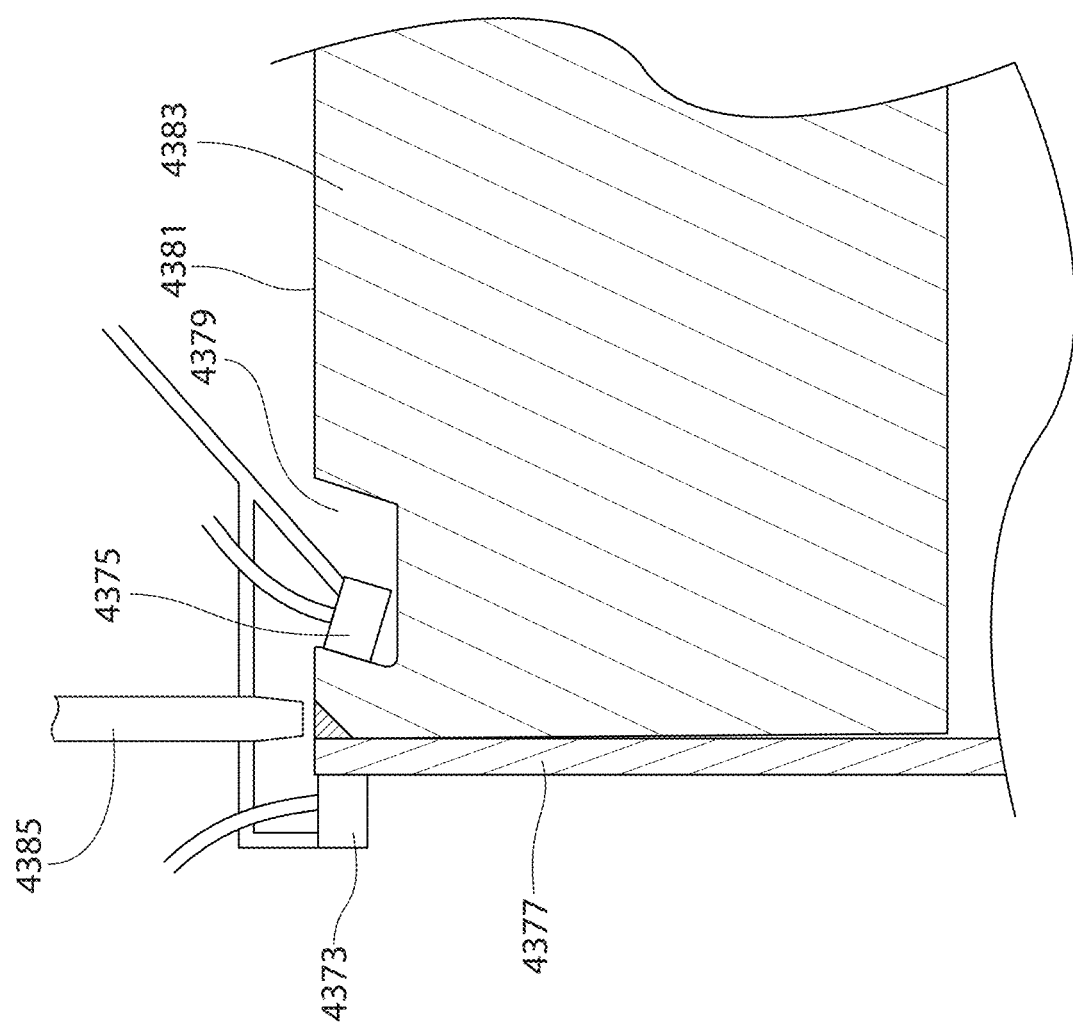
FIG. 52B illustrates a detailed sectional view of a lid, the weld head, and the probes of FIG. 52A.

FIGS. 52A and 52B illustrate the process of performing the 100% volumetric examination of the closure weld after it has been formed. With the top plate in place on the top opening of the sidewall, the top plate having a channel as described above, the closure weld may be formed by automated equipment, such as is well known in the art. In order to volumetrically examine the closure weld, probes are mounted on a support arm capable of rotating and positioning the probes to perform the volumetric examination of the closure weld. For example, the probes may be mounted on the same type of weld arm that is used in the automated process for forming the closure weld. The volumetric examination may be carried out once the entire weld is formed.

Only the end of the support arm 4371 is illustrated in FIG. 52A to simplify the drawing. It is to be understood that the support arm may have any appropriate configuration that is capable of supporting the probes and moving them around the top plate to perform the volumetric examination, as many different types and configurations of such support arms are well-known in the arts, including combination rotary/articulating robotic arms. Two probes 4373, 4375 are affixed to the end of the support arm 4371, and the support arm is configured for automated or remote positioning of the probes so that the volumetric examination of the closure weld may be performed. The first probe 4373 is positioned on the outside of the top of the side wall 4377, and the second probe 4375 is shown just prior to being positioned within the channel 4379 formed in the top surface 4381 of the top plate 4383. This second probe 4375 is shown positioned within the channel 4379 in FIG. 52B. Once the two probes are in position, the entire volume of a portion of the closure weld is disposed between the two probes, and that entire volume may be volumetrically examined. By activating the two probes and moving them synchronously around the top plate, maintaining their relative position with respect to the closure weld, the entirety of the weld is passed between the two probes in one circumscription of the top plate. It is therefore possible, with the appropriate examination technology, to perform a 100% volumetric examination of the closure weld. Using well-known processes associated with the selected examination technology, the integrity of the entire closure weld may be determined from the examination.

In the embodiment of FIG. 52A, the entire closure weld is formed first, followed by the volumetric examination of the closure weld. In the embodiment of FIG. 52B, the weld head 4385 extends from the same support arm (not shown in FIG. 52B) as the probes 4373, 4375. The weld arm then moves the weld head around the top edge of the top plate to form the closure weld, and the probes trail the weld head to perform the volumetric examination. This embodiment may be used to form the weld and substantially concurrently volumetrically examine the weld. For a multi-pass closure weld, having the probes trail the weld head in this manner enables a separate volumetric examination of each pass of the closure weld. Due to the heat generated from the welding process, which may interfere with the examination process, this embodiment may be best suited for use in pools or in the presence of a coolant, such as a flow of demineralized water.

In certain embodiments, a Linear Scan-Phased Array UT system may be used to examine the closure weld, and for such embodiments the probes are ultrasound transducer probes. Such a UT system is capable of conducting the 100% volumetric examination of the closure weld within a matter of minutes. Beneficially, with the top plate configured as described above and with use of the two probes, no human activity needs to be directly involved for placing the top plate, forming the closure weld, or examining the integrity of the closure weld, so that work crews are not exposed to any significant doses of radiation.

In embodiments where a UT system is used outside of a pool of water or other fluid, a coupling agent, such as demineralized water or an appropriate gel, may be introduced between the transducer probes and the top plate and/or side wall to increase the amount of ultrasound energy that passes into the closure weld, thereby improving the volumetric examination. As is well known in the art of UT, only small amounts of the coupling agent are needed to form a thin film, minimizing air gaps, between the transducer probe and the parts of the MPC into which the ultrasound energy is being directed. Therefore, a simple drip system suffices to introduce a coupling agent such as demineralized water to the process of volumetric examination described herein.

In embodiments involving a high heat load canister, to ensure that the metal temperature of the weld mass is not too high for an accurate UT reading, it may be necessary to circulate cooling water through the MPC using the vent and drain ports in the lid before performing the volumetric examination. As an alternative, the use of a coupling agent for ultrasound energy, such as demineralized water, between the transducer probes and the MPC helps to insure that the volumetric examination is performed at a uniform temperature, thereby preserving the UT calibration integrity.

VI. Inventive Concept 6

With reference to FIGS. 53-59, a sixth inventive concept will be described.

Figure 53:
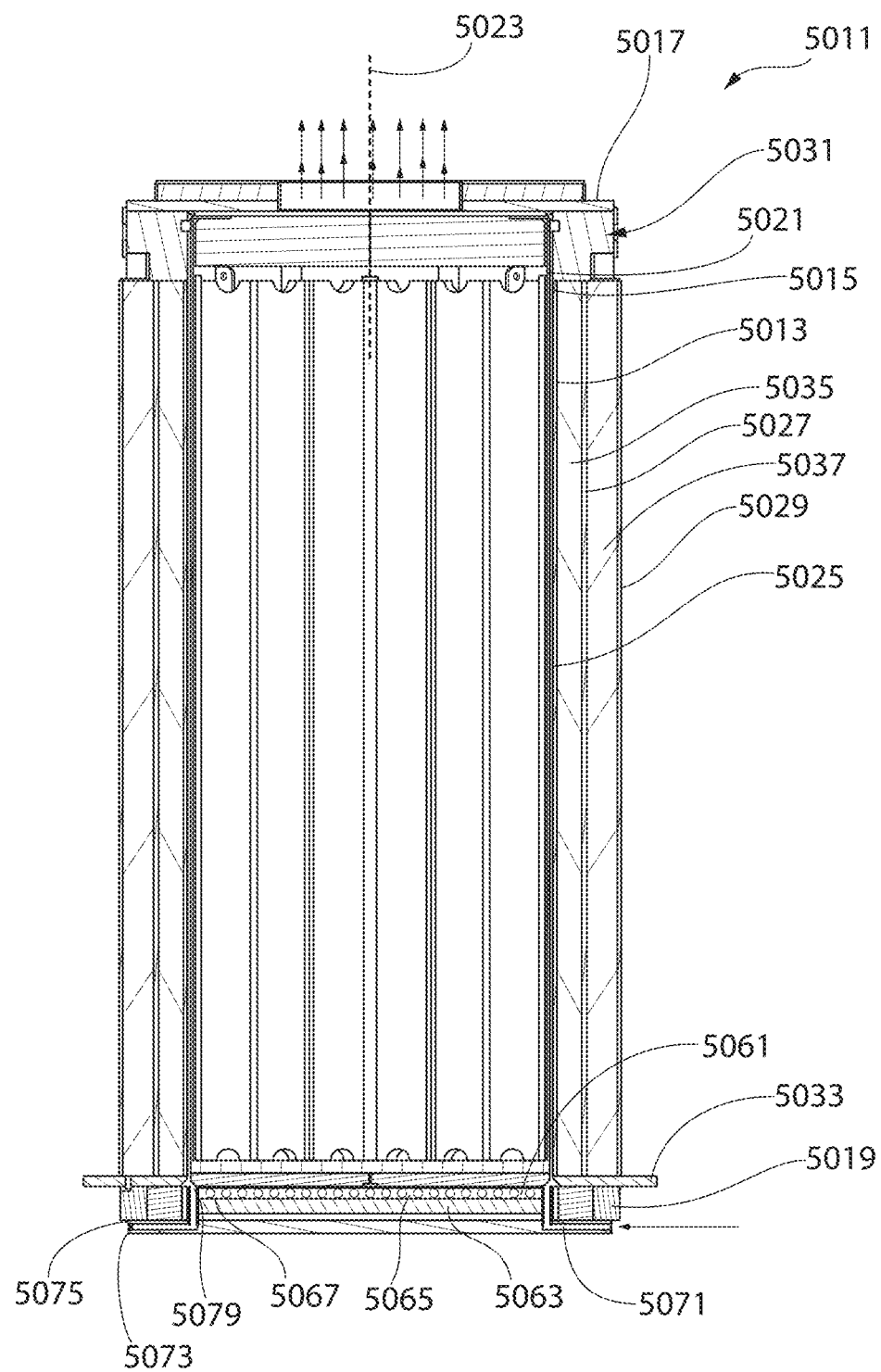
FIG. 53 is a cross-sectional view of a transfer cask.
Figure 55:
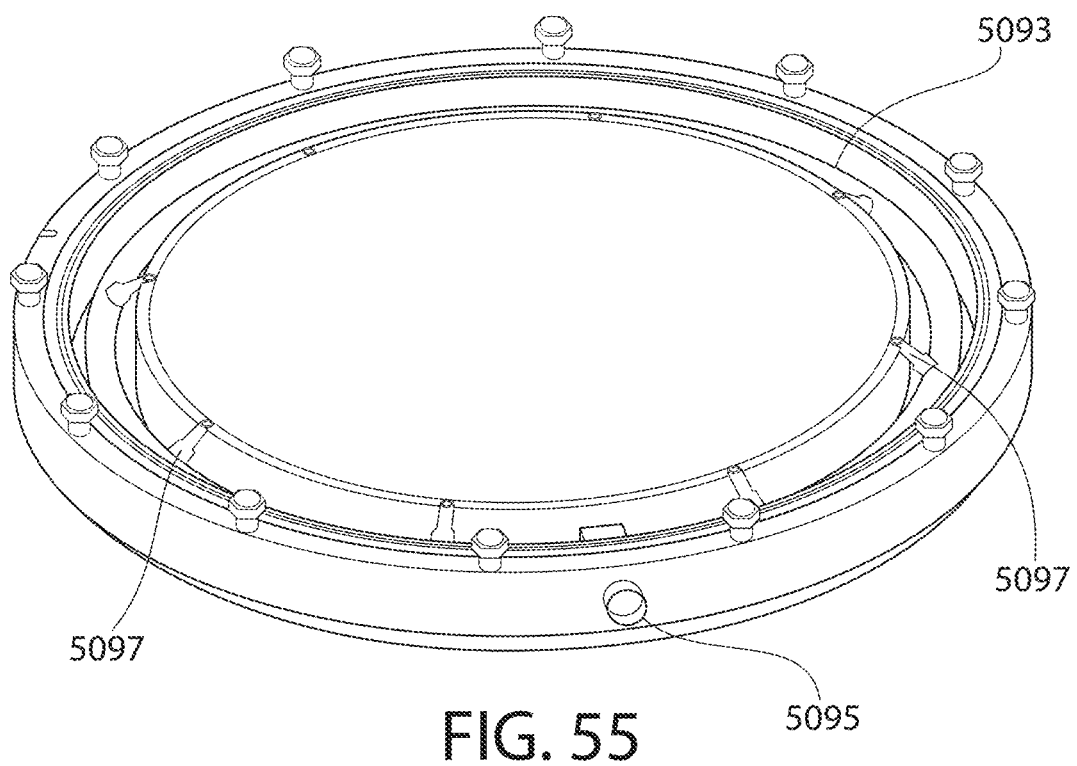
FIG. 55 is a perspective view of a bottom lid for a transfer cask.

FIG. 53 illustrates an apparatus for transferring spent nuclear fuel in the form of a transfer cask 5011. The transfer cask 5011 includes a cylindrical inner shell 5013 which forms a cavity 5015 along with the top lid 5017 and the bottom lid 5019. As shown, a canister 5021 for holding spent nuclear fuel is disposed within the cavity 5015. The inner shell 5013 has a longitudinal axis 5023, and the inner shell 5013 has a slightly larger radius, measured from the longitudinal axis 5023, as compared to the canister 5021, to create an annulus 5025 of space between the inner shell 5013 and the canister 5021 disposed in the cavity 5015. This annulus 5025, as discussed in greater detail below, serves to enable cooling of the canister 5021 by ventilation with atmosphere.

The transfer cask further includes an intermediate shell 5027 and an outer shell 5029. Each of the inner shell 5013, the intermediate shell 5027, and the outer shell 5029 are preferably made from carbon steel, with the top of each welded to a top flange 5031, and the bottom of each welded to a bottom flange 5033. The intermediate shell 5027 is disposed concentrically around and spaced apart from the inner shell 5013, thereby forming a second annulus 5035. This second annulus 5035 is capable of holding a gamma absorbing material such as concrete, lead, or steel. Lead is preferred because it most effectively provides gamma shielding for the radioactive spent nuclear fuel once it is placed within cavity 5015. The outer shell 5029 is disposed concentrically around and spaced apart from the intermediate shell 5027, thereby forming a third annulus 5037. This third annulus 5037 is capable of holding a neutron absorbing material such as water or the aforementioned aluminum trihydrate-boron carbide-epoxy mixture. As shown, the third annulus 5037 includes panels of a metal matrix composite.

For alternative embodiments in which water is to be used in the third annulus, U.S. Pat. No. 7,330,525 describes a manner in which the outer shell may be formed, in order to contain water, and a process for using water as a neutron absorber in the transfer cask during transfer of a canister containing spent nuclear fuel.

The top lid 5017 is securable to the top flange 5031 by extending bolts (not shown) through the top lid 5017 to engage the top flange 5031. The top lid 5017 is typically only secured to the top flange 5031 once the canister 5021 is in place within the cavity 5015 during the transfer process. A central opening 5039 in the top lid 5017 provides access to the canister 5021 for performing certain handling operations with respect to the canister 5021 while the top lid 5017 is secured to top flange 5031.

Referring to FIG. 54A, the top flange 5031 is integrally formed through forging and machining so that it does not include any joints, welds, or seams, and so that it does not include parts that are separately formed and then subsequently joined together. The top flange 5031 is machined to include two trunnions 5041 to be used for lifting the transfer cask with a crane. As shown in FIGS. 54A-54C, the trunnions may be of a variety of cross sections such as round trunnions 5041 (FIG. 54A), rectangular trunnions 5041*b* (FIG. 54B), obround trunnions 5041*c* (FIG. 54C), oblong trunnions, and the like. The cross-sectional form of the trunnions may be any shape according to design choice, with specific implementations limited only by the equipment used to hoist the transfer cask.

More than two trunnions may be machined as part of the top flange, based upon design choices and the lifting system with which the transfer cask is to be used. For purposes of stability during lifting, the trunnions are distributed approximately equidistantly around the top flange.

The top flange 5031 also includes a seating groove 5043 for a sealing ring (not shown), which serves as a seal, against the canister and within the annulus, when the canister is placed in the cavity. A plurality of ventilation channels 5045 are included in the top flange 5031, with internal channel inlets 5047 on the interior surface 5049 of the top flange 5031 located below the seating 5043 so that when a canister is placed, air is directed through the ventilation channels 5045. The ventilation channels 5045 open up to the exterior of the top flange 5031, and to the exterior of the transfer cask, at external channel outlets 5051 so that the ventilation channels fluidically connect the annulus 5025 with the exterior of the top flange 5031 and the transfer cask. The ventilation channels 5045 through the top flange 5031 may have a variety of forms or paths, however, because air is being used to ventilate the transfer cask, and unlike water, air is not a good neutron absorber, the one design constraint for the ventilation channels is that the paths of the ventilation channels preclude a direct line of travel from within the cavity to the exterior of the top flange. With this design constraint on the ventilation channels of the top flange, emissions from the canister cannot pass through an all-air pathway from the canister to the exterior of the transfer cask.

The integral design of the trunnions 5041 as part of the top flange 5031 serves to eliminate joints between the top flange and the trunnions, thereby significantly improving the fidelity of structural integrity of the overall lifting system (as compared to the prior art, in which the trunnions are joined to the top flange by welding or a threaded joint). The top flange 5031 is also enlarged as compared to top flanges of the prior art, but still keeping within the constraints of the size of the cask pit in the pool and the lifting limit of the cask crane. Even though enlarged, the top flange 5031, inclusive of the integral trunnions 5041, has a smaller outer diameter as compared to the outer shell 5029. To aid in preventing damage that may be caused by protruding trunnions in the event of a transfer cask accidentally tipping into other casks, each trunnion 5041 is disposed within a recess 5053 of the top flange 5031. The larger top flange 5031 also serves to provide increased shielding in the top region of the cask where most human activity (to weld and dry the canister) occurs.

Turning back to FIG. 53, the bottom lid 5019 is secured to the bottom flange 5033 by a plurality of bolts (not shown) that extend through holes in the bottom flange 5033 the engage the bottom lid 5019. The bottom lid 5019 includes an impact zone 5061 positioned directly beneath the cavity 5015. The bottom lid 5019 also includes a gamma-absorbing layer 5063, such as lead, below the impact zone 5061. To be most effective in absorbing impacts from accidental falls of the transfer cask, the impact zone 5061 extends substantially under the entirety of the cavity 5015. The impact zone includes an impact absorbing structure 5065 which can serve to cushion the fall of a canister loaded into the transfer cask, thereby providing some damage protection to the fuel in the event of a handling mishap while the transfer cask is being moved around the building or plant site. As shown, the impact absorbing structure 5065 is formed by a plurality of cylindrical tubes 5067 within the bottom lid 5019. These tubes 5067 are distributed throughout the impact zone 5061, with their longitudinal axes aligned with a major dimension (i.e., the diameter) of the bottom lid 5019. The thickness, number of tubes, and the cross-sectional shape of the tubes are a matter of design choice based upon the particular implementation. Factors that may be taken into consideration for these design choices include estimated drop height (based on the operational procedures of the facility), the weight of the canister, and the weight of the loaded transfer cask.

Computations have shown that a set of parallel 2-inch tubes distributed throughout the impact zone 5061 can limit the impact load experienced by a 40-ton canister, placed with a transfer cask, falling from 18 inches onto a concrete pad to a g-force of less than 25 (in the absence of the impact limiter, the g-force may shoot up to over 100).

A plurality of ventilation channels 5071 are included in the bottom lid 5029, with external channel inlets 5073 on the external surface 5075 of the bottom lid and internal channel outlets 5077 located so that the ventilation channels 5071 can direct an air flow into the annulus 5025. A plurality of ventilation channels configured in this manner are formed approximately equidistantly around the bottom lid to provide cooling ventilation to the canister 5021 outside of the storage pool. At the point of intersection between the channel outlets 5077 and the annulus 5025, the bottom flange 5033 is configured with a chamfered surface 5079 to broaden out the annulus 5025, thereby providing an enlarged space about the base of the canister 5021 into which air may be drawn through the ventilation channels 5071. Each channel inlet 5073 is configured to receive a sealing plug (not shown), which may threadably engage the channel inlet 5073 to provide a seal and turn the ventilation channel and annulus into a "blind" cavity that does not have ingress through the bottom lid. Similar plugs may be placed in the channel outlets of the top flange, thereby rendering the entire annuls cavity into a "blind" cavity. Such plugs may be placed under circumstances where it is desirable to protect the ventilation channel from ingress of contaminated water or other matter, either solely at the bottom of the transfer cask, or at the top and the bottom.

Figure 57:
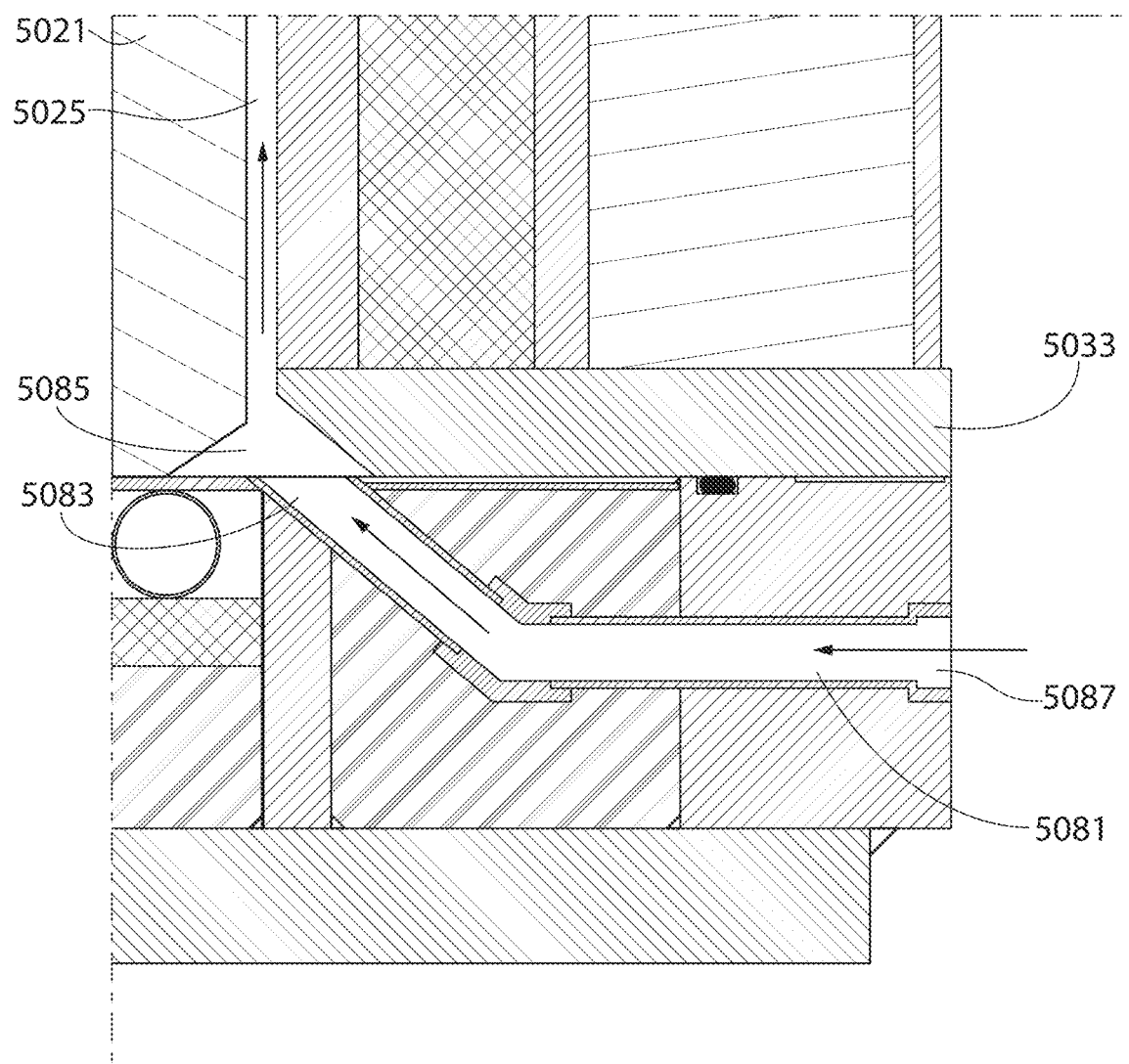
FIG. 57 is a partial sectional view of a bottom portion of a second alternative transfer cask.
Figure 58:
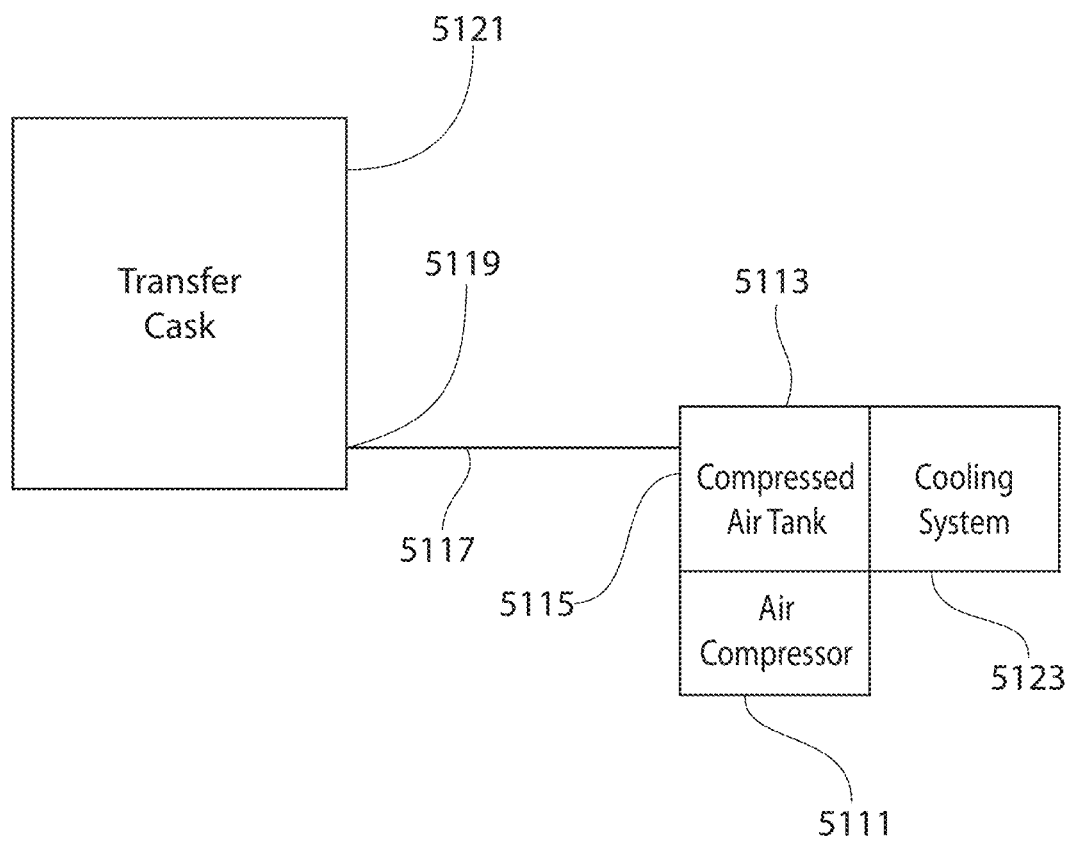
FIG. 58 schematically shows a transfer tank coupled to a forced air cooling system.

A second example of a ventilation channel 5081 is shown in FIG. 57, and a plurality of ventilation channels 5081 configured in this manner are formed approximately equidistantly around the bottom lid to provide cooling ventilation to the canister 5021 outside of the storage pool. Again, at the point of intersection between the channel outlets 5083 and the annulus 5025, an enlarged space 5085 is included about the base of the canister 5021 into which air may be drawn through the ventilation channels 5081. The channel inlets 5087 may also be configured to receive a sealing plug (not shown).

The ventilation channels 5071 through the bottom lid 5029 may have a variety of forms or paths, however, because air is being used to ventilate the transfer cask, and unlike water, air is not a good neutron absorber, the one design constraint for the ventilation channels is that the paths of the ventilation channels preclude a direct line of travel from within the cavity to the exterior of the bottom lid. With this design constraint on the ventilation channels of the bottom lid, emissions from the canister cannot pass through an all-air pathway from the canister to the exterior of the transfer cask.

Figure 56:
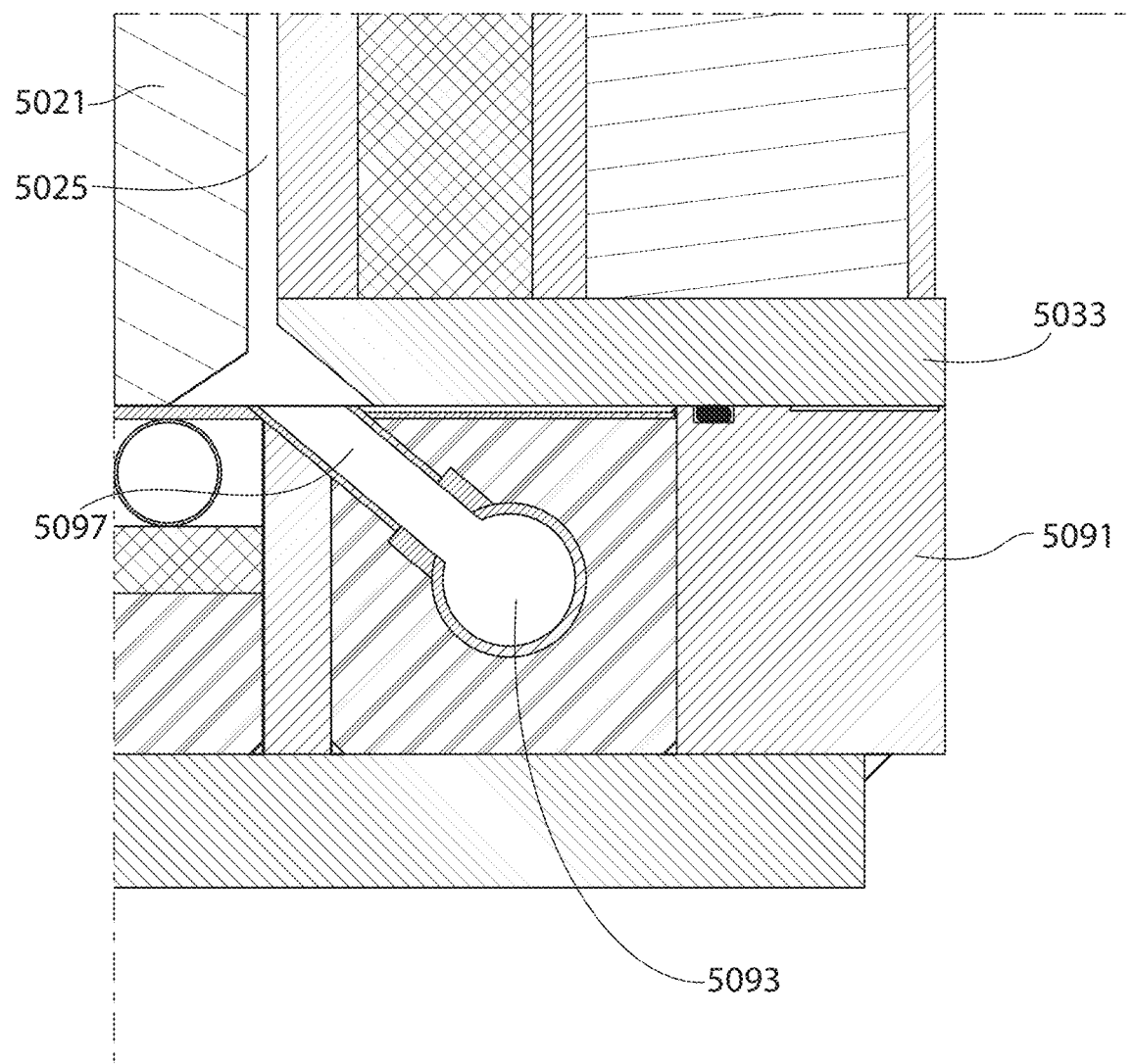
FIG. 56 is a partial sectional view of a bottom portion of a first alternative transfer cask.

FIGS. 56 and 57 illustrate another alternative embodiment of the bottom lid 5091 and an integrated ventilation channel. In this embodiment, the ventilation channel is a toroidal-shaped distribution channel 5093 having a single channel inlet 5095 and a plurality of channel outlets 5097 which are positioned to fluidically connect the annulus, formed between the inner shell of the transfer cask and the canister placed in the cavity, with the exterior of the bottom lid 5091 and the transfer cask. The radial position of the channel inlet 5095 is different than the radial position of the channel outlets 5097 so that the configuration of the ventilation channel 5093 precludes a direct line of travel from within the cavity to the exterior of the bottom lid.

A transfer cask which includes the annulus between the inner shell and the canister, the ventilation channels in the top flange, and the ventilation channels in the bottom flange, configured in any of the manners discussed above, when out of a storage pool allows ambient air to ventilate up the annulus to enhance the heat removal efficacy of the cask. Calculations have shown that a mere ¾ inch wide annulus can reduce the fuel cladding temperature by as much as an additional 20° C., in comparison to a blind annulus with stagnant air (which is the state-of-the-art). And, as compared to a water-cooled annulus, a passive ambient air-cooled annulus is much simpler, easier to use, and easier to maintain, thereby resulting in greater operational reliability.

Such a transfer cask will remove decay heat from the canister by ventilation action. For low heat canisters (those generating less than about 18 kW), the natural ventilation through the annulus coupled with heat dissipation from the external surfaces of the cask are sufficient to keep the contents of the canister from overheating.

In circumstances where additional cooling is needed for higher heat load canisters, beyond the cooling that can be provided by ventilation of ambient air, chilled air can be forced through the annulus. One such system is shown schematically in FIG. 58. And, even a forced air system is simpler and easier to use and maintain than a cooled water system. A forced air system is most easily used when the bottom lid includes an integrated ventilation channel with a single channel inlet, such as is shown in FIG. 56. During use, an air compressor 5111 operates to store compressed air in a compressed air tank 5113, and the air outlet 5115 of the compressed air tank 5113 is fluidically coupled though an appropriate air line 5117 to the channel inlet 5119 of the bottom lid of the transfer cask 5121. The compressed air tank 5113 itself may be cooled by ambient air, or it may be cooled by an active cooling or refrigeration system 5123. As those of skill in the art will recognize, decompression of air naturally decreases the temperature of that air, so that the amount of cooling needed for the compressed air tank 5113 will depend upon the heat dissipation needs of the transfer cask. For example, a refrigeration system may be used to cool the compressed air tank to a temperature as low as 5° C., thereby causing the decompressed air from the compressed air tank to be cooler still when it is directed into the annulus of the transfer cask. The decompressed air is delivered into the ventilation channel of the bottom lid, and then into the annulus, by the positive pressure of expansion upon release from the compressed air tank.

The air compressor and compressed air tank are sized to provide the cooled air at a sufficiently high velocity to ensure turbulent flow conditions within the annulus. Calculations have shown that a 50 HP compressor is adequate to cool a canister with as much as 35 kW heat load. The chilled air is heated within the annulus and exits the transfer cask through the ventilation channels in the flange.

As an alternative to using a compressed air tank and an air compressor, chilled air may alternatively be forced into the annulus by use of a blower.

Figure 59:
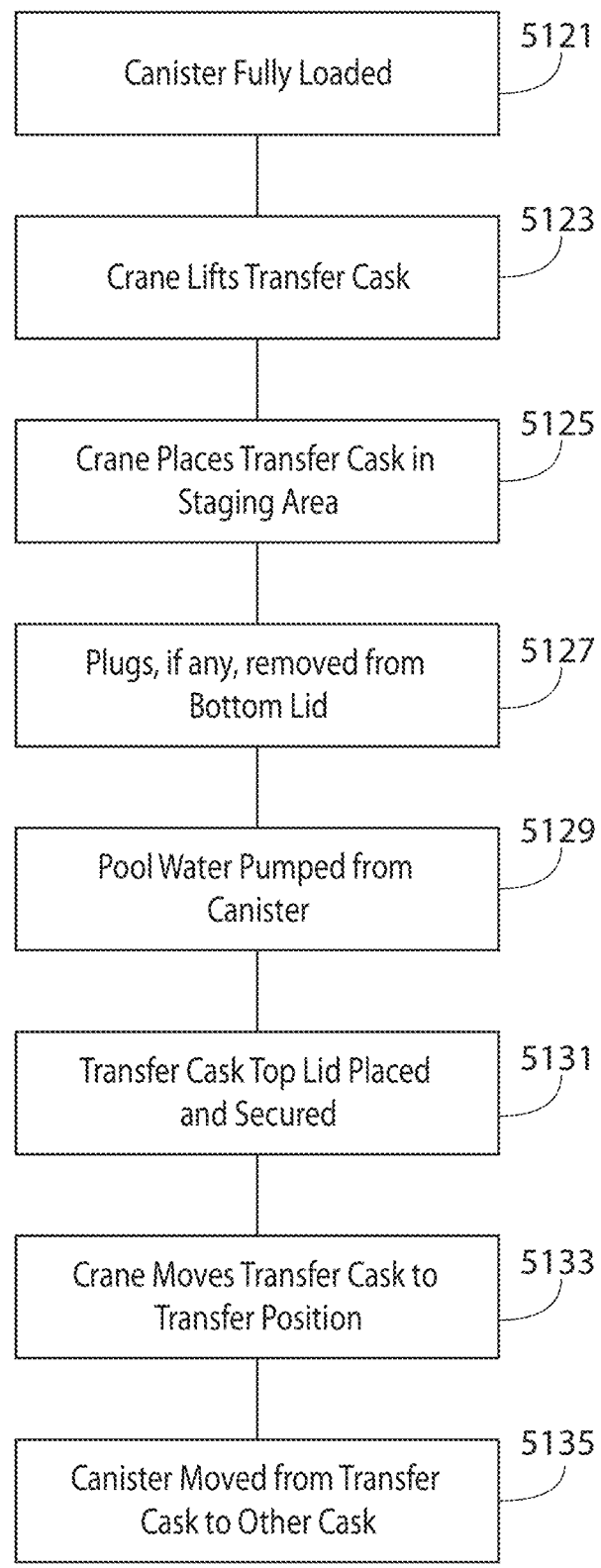
FIG. 59 is a flow chart showing a process for moving a transfer cask loaded with a canister containing spent nuclear fuel out of a storage pool.

The advantages of a forced air cooling system include greater simplicity, as compared to a water cooled system, use of single phase cooling medium (air rather than water) and mitigation of the concerns of leakage (no water spillage) at the flanged or screwed joints. The performance of the system is easily monitored by measuring the temperature of the exiting heated air from the cask FIG. 59 is a flowchart showing the process of moving a transfer cask, as described above with ventilation channels, loaded with a canister from a pool for transport or storage of the canister.

The process starts 5121 with a fully loaded canister in the cavity of transfer cask without the top lid in place. The process of loading the canister is well-known to those of skill in the art, and so they are not discussed herein. As the transfer cask sits in the pool, one or more plugs may be in place in the bottom lid to seal off the ventilation channels to make the ventilation channels and the annulus a "blind" cavity, thereby protecting from ingress of contaminated water. Without the plugs in place, water fills the annulus and helps to remove heat generated by the spent nuclear fuel in the canister.

The hoist of a crane is lowered into the pool and secured to the trunnions of the transfer cask. Once the hoist is secured to the trunnions, the crane lifts 5123 the transfer cask, along with the canister payload, out of the storage pool. The transfer cask is designed so that at this stage in the process, the combined weight of the transfer cask and payload is equal to or less than the rated lifting capacity of the crane.

Once lifted out of the storage pool, the crane sets transfer cask down 5125 in a staging area. At this point, the canister contains pool water in addition to the spent nuclear fuel. This pool water acts as a neutron absorber as long as it is in the canister, and it removed from the canister in order to store the spent nuclear fuel in a dry-state. In the event that one or more plugs are in place in the bottom lid, they are removed 5127 to allow ventilated cooling by circulation of atmospheric air through the annulus.

As an alternative, at this point, a compressed air tank is fluidically coupled to the channel inlet of the bottom lid using an appropriate hose and coupling. The compressed air tank is coupled to an air compressor so that compressed air is maintained in the tank during use. Compressed air from the tank is decompressed and passed into the channel inlet during the remaining steps of moving the transfer cask while it is loaded with the canister.

Once the transfer cask is ventilated, the pool water in the canister is pumped out 5129, and the spent nuclear fuel in the canister is allowed to dry. The canister is then backfilled with an inert gas, such as helium, and sealed. The cask lid is then secured 5131 to transfer cask. The transfer cask is then lifted by the crane and moved to a position above another cask 5133, at which point the bottom lid is removed and the canister is lowered into the other cask 5135. The other cask may be a storage cask, if the spent nuclear fuel is to be stored long-term, or it may be a transport cask suitable for moving spent nuclear fuel over long distances.

Once the canister is removed from the transfer cask, the transfer cask may be reused to perform the above described procedure again. To reuse the transfer cask, the one or more plugs are again put in place in the bottom lid to seal off the ventilation channels.

VI. Inventive Concept 7

With reference to FIGS. 60-66, a seventh inventive concept will be described.

Figure 60:
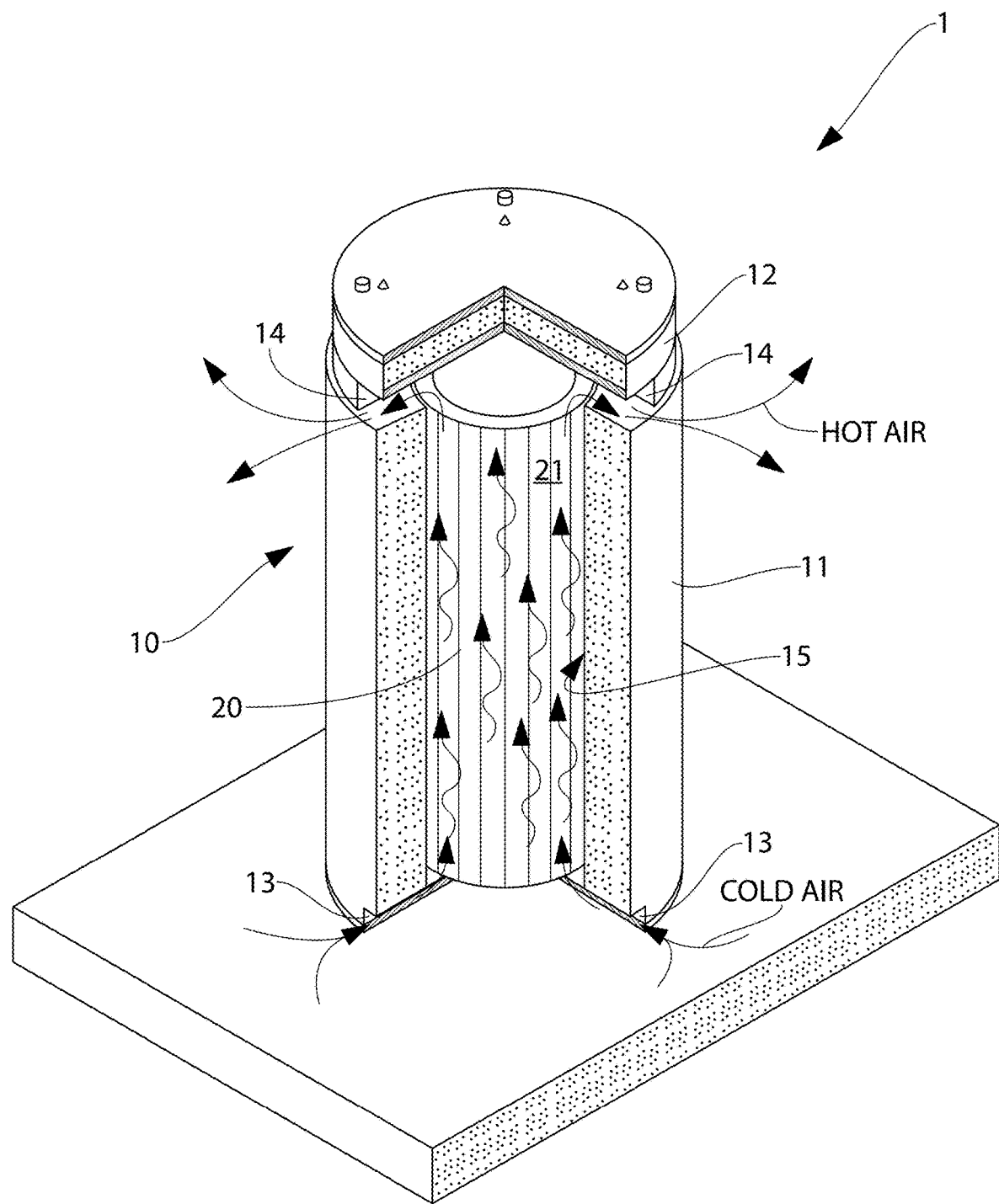
FIG. 60 is a perspective view of a prior art ventilated storage system.
Figure 61:
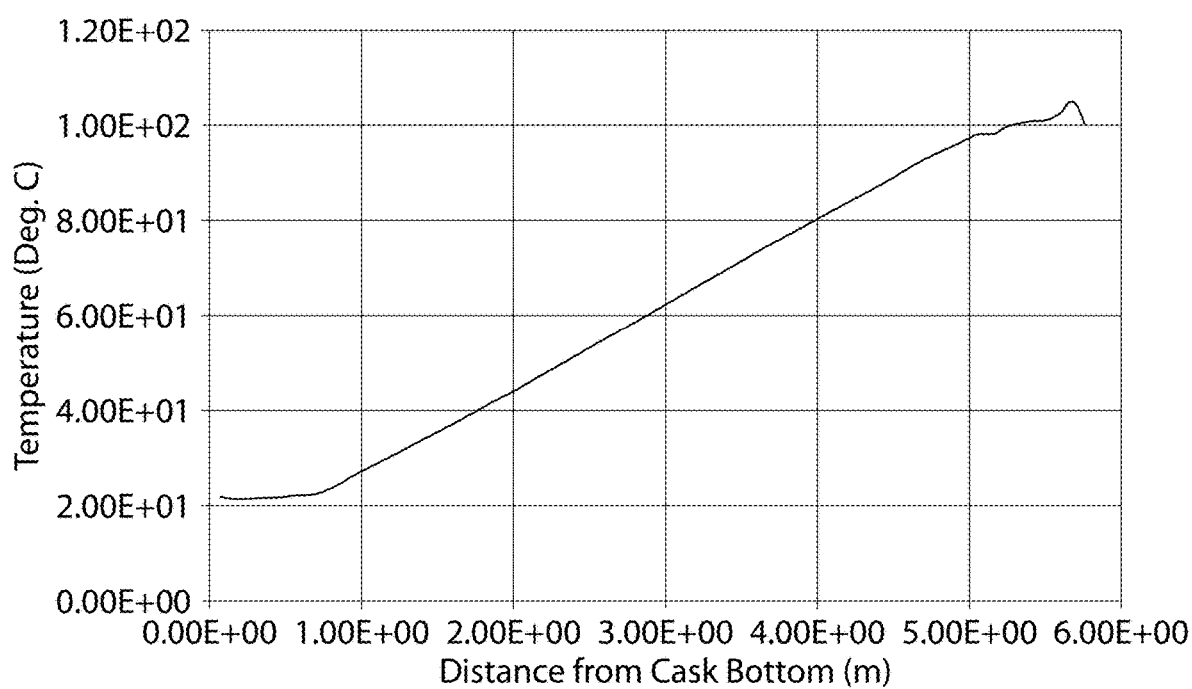
FIG. 61 is a graph of air temperature as a function of distance from the bottom end of the cask body within the ventilated cask of the prior art ventilated storage system of FIG. 60 when a canister loaded with high level radioactive waste having a heat load is positioned within the ventilated cask.
Figure 62:
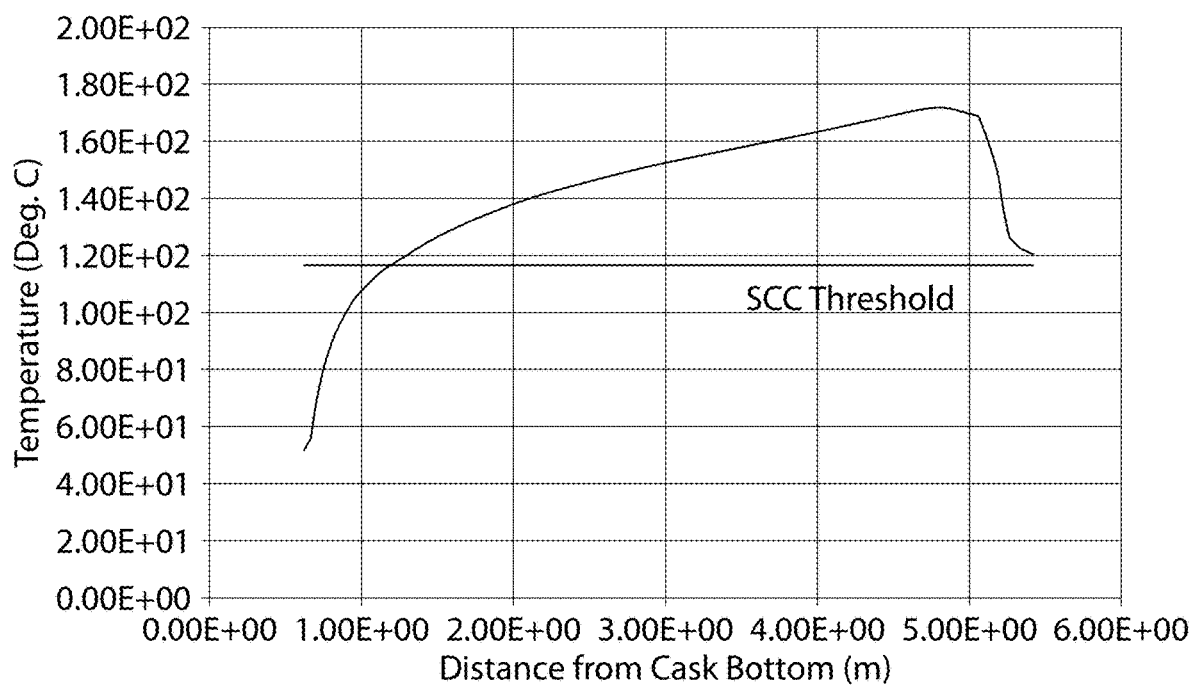
FIG. 62 is a graph of the temperature of the outer surface of the canister as a function of distance from the bottom end of the cask body when the canister is stored in the ventilated cask of the prior art ventilated storage system of FIG. 60.
Figure 63:
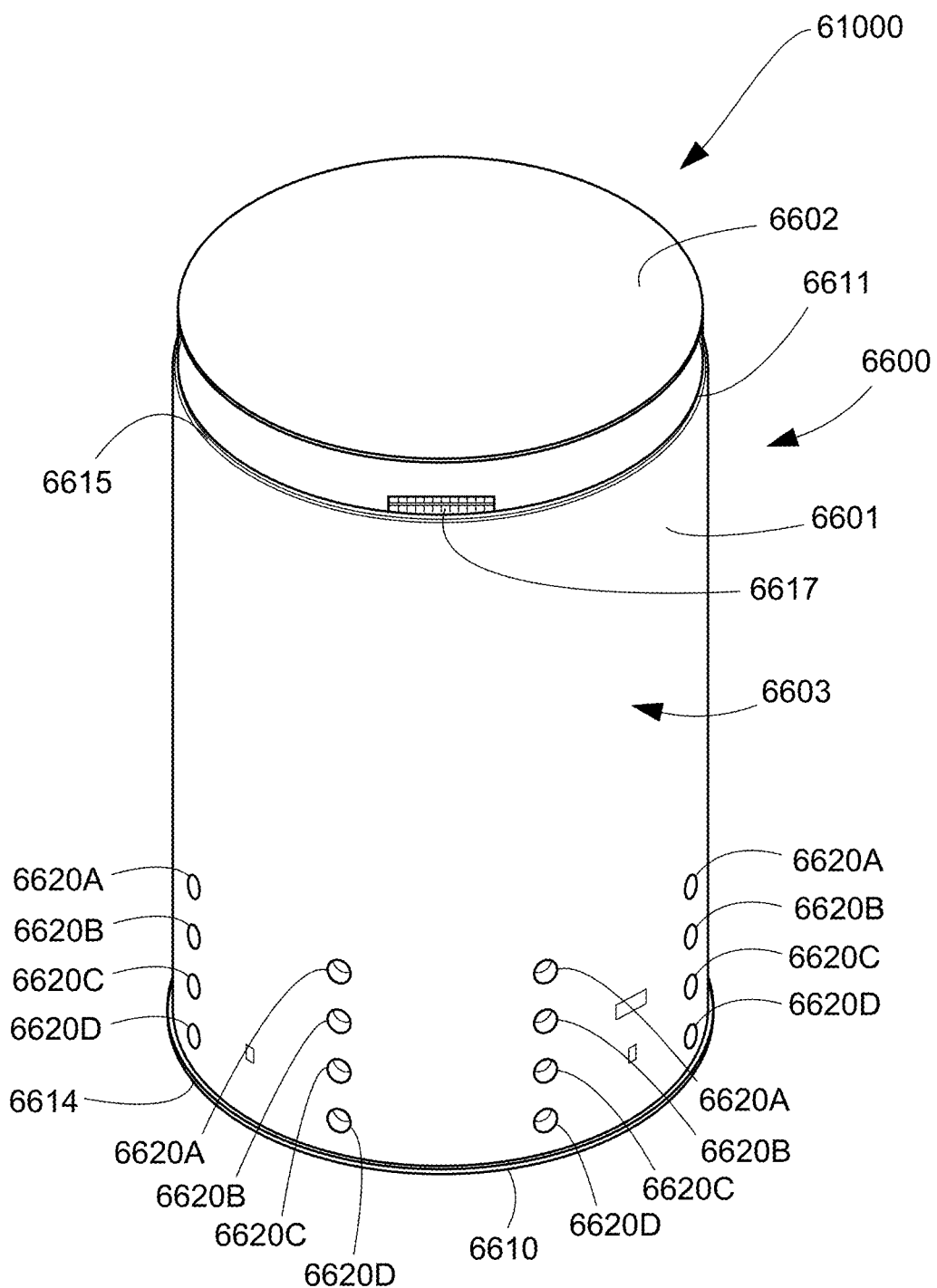
FIG. 63 is a perspective view of a ventilated system according to an embodiment of the present invention.

Referring to FIG. 60, a prior art ventilated system 1 is shown. The prior art ventilated system 1 comprises ventilated cask 10 that comprises a cylindrical cask body 11 and a cask lid 12. The cylindrical cask body 11 comprises a set of air inlet ducts 13 near its bottom and a set of air outlet ducts 14 near its top. A dry storage canister 20 containing decaying spent nuclear fuel stands upright inside the VVO 10 with a small diametral clearance, in the form an annular gap 15, being formed between an inner surface of the cylindrical cask body 12 of the VVO 10 and the outer surface 21 of the canister 20. The outer surface 21 of the canister 20 becomes heated due to the thermal energy being generated by the spent nuclear fuel sealed in the canister 20. The heat outer surface 21 causes the surrounding air column to heat and rise, resulting in a continuous natural convective ventilation action. The cold air entering the air inlet ducts 14 at the bottom of the cylindrical cask body 12 is progressively heated as it rises in the annular gap 15, reaching its maximum value as it exits the cylindrical cask body 12.

Figure 2:
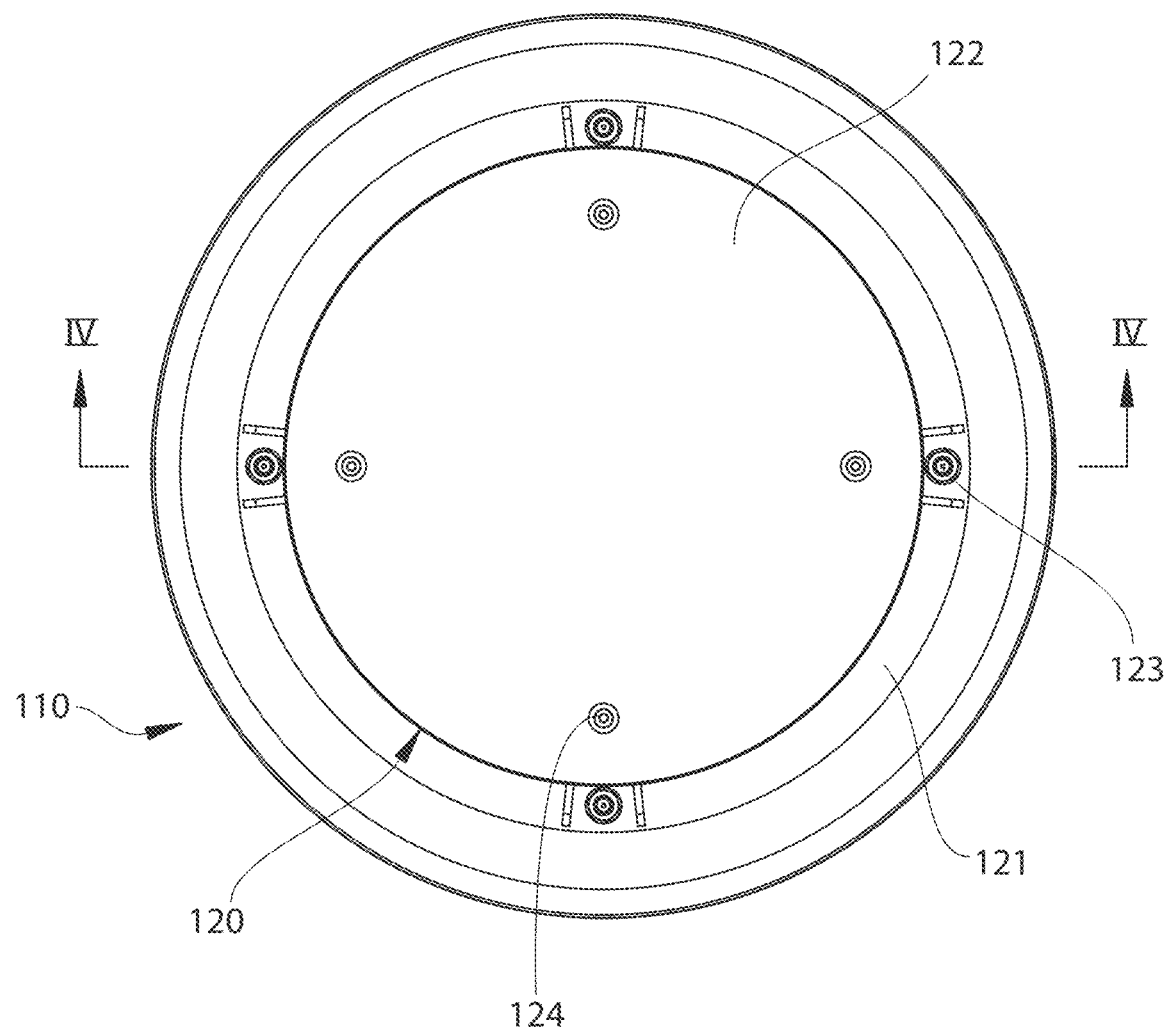
FIG. 2 is a top view of the vertical ventilated overpack of FIG. 1.
Figure 3:
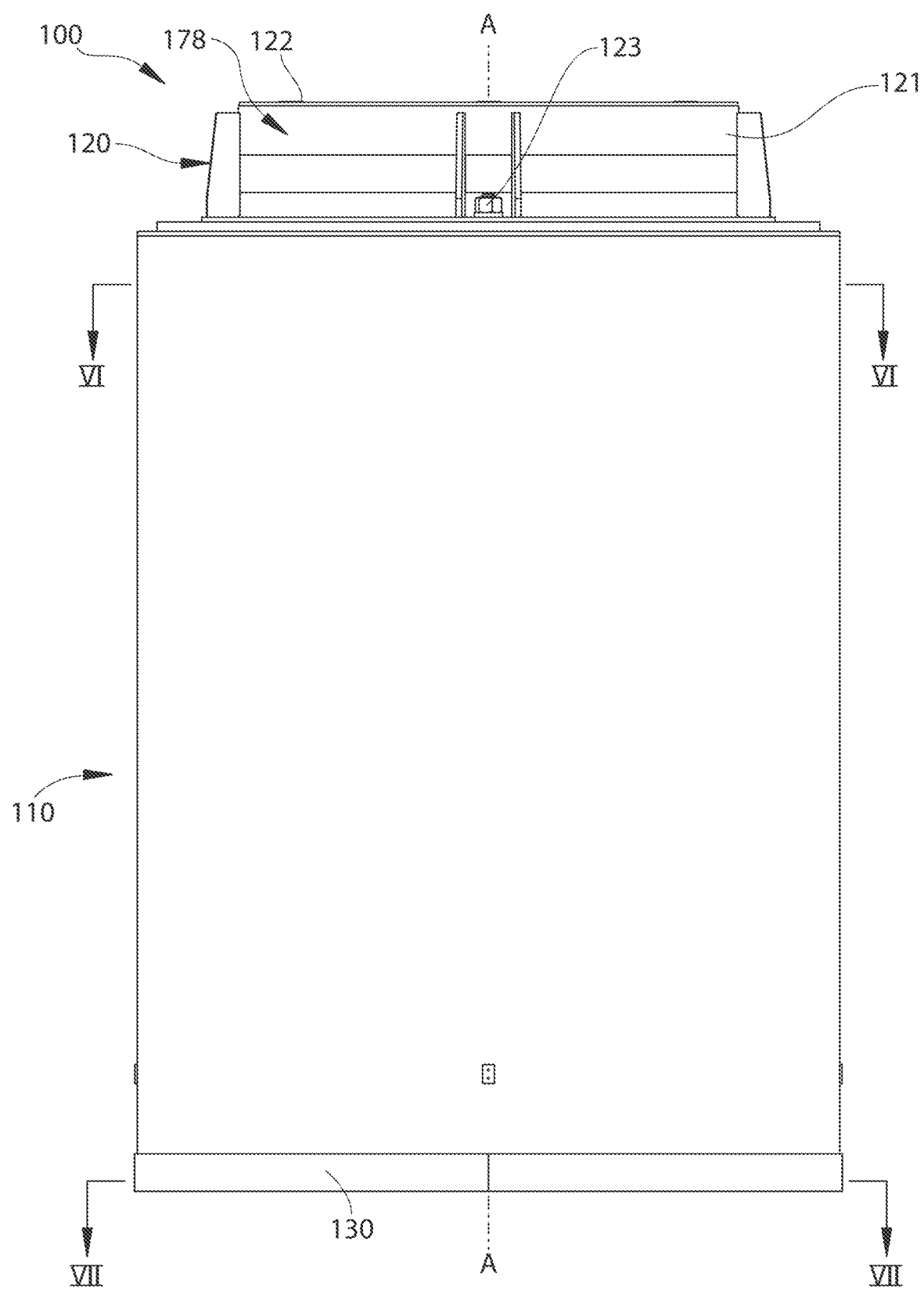
FIG. 3 is a front view of the vertical ventilated overpack of FIG. 1.

The metal temperature of the canister 20 (which is typically made of austenitic stainless steel) likewise increases with increasing height (i.e., vertical distance from the bottom of the canister 20), more rapidly in the bottom half of the canister 20 where the ΔT between the air temperature and the canister temperature is larger than the top half where the ΔT between the air temperature and the canister temperature is less. A larger ΔT draws results in the heat of the canister 20 being drawn out and away more vigorously. Referring to FIGS. 2 and 3, typical air and canister temperatures, as a function of canister height, are graphed for the prior art ventilated system 1 @ a 28.74 kW heat load (of the spent nuclear fuel) and a 26.6° C. temperature for the ambient cooling air using an axisymmetric model in the computer code FLUENT. As FIG. 3 shows, the surface temperature of the canister is within 90° C. of the ambient air temperature at a reference of 26.6° C. for approximately 10.4% of its height.

The region where the canister surface temperature is within the range of 90° C. above the ambient temperature has been identified by research as a potential "vulnerable zone" to SCC, especially in marine environments. This is particularly true of weld seams and heat affected zones in the canister's confinement boundary. Thus, weld seams in canisters of ISFSIs located at coastal sites, i.e., those on the Atlantic and Pacific coasts, are especially vulnerable to SCC. Moreover, as the spent nuclear fuel decays with the passage of time, the emitted heat generation rate drops as well, which puts more and more of the canister surface in the "vulnerable zone" (i.e., within 90° C. of the ambient air temperature). This potential degradation of the canister's confinement boundary is inconsistent with the evolving policy to extend the service life of ISFSIs by many decades.

Referring now to FIGS. 63-66 concurrently, a ventilated storage system 61000 according to an embodiment of the present invention is illustrated. The ventilated storage system 61000 is a vertical, ventilated, dry, SNF storage overpack that is fully compatible with 1000 ton and 125 ton transfer casks for spent fuel canister transfer operations. The ventilated cask 50 can, of course, be modified and/or designed to be compatible with any size or style of transfer cask. Moreover, while the ventilated storage system 61000 is discussed herein as being used to store SNF, it is to be understood that the invention is not so limited and that, in certain circumstances, the ventilated storage system 61000 can be used to store other forms of radioactive waste that is emitting a heat load, such as any high level radioactive waste.

The ventilated storage system 61000 generally comprises a hermetically sealed metal canister 6200 and a ventilated cask 6600. The canister 6200 forms a fluidic containment boundary about the SNF loaded therein. Thus, the canister 6200 can be considered a hermetically sealed pressure vessel. The canister 6200, however, is thermally conductive so that heat generated by the SNF loaded therein is conducted to its outer surface where it can be removed by convection. In one embodiment, the canister 6200 is formed of a stainless steel due to its corrosion resistant nature. In other embodiments, the canister 6200 can be formed of other metals or metal alloys. Suitable canisters include multipurpose canisters ("MPCs") and, in certain instances, can include thermally conductive casks that are hermetically sealed for the dry storage of high level radioactive waste. Typically, such canisters comprise a honeycomb basket, or other structure, positioned therein to accommodate a plurality of SNF rods in spaced relation. In one embodiment, the canister 6200 is an MPC that is configured to achieve an internal natural cyclical thermosiphon flow within the internal volume of the canister 6200. An example of one such MPC is disclosed in U.S. Pat. No. 5,898,747, issued to Singh on Apr. 27, 1999, the entirety of which is hereby incorporated by reference. Another MPC that is particularly suited for use in the ventilated storage system 61000 is disclosed in U.S. Pat. No. 8,135,107, issued to Singh et al. on Mar. 13, 2012, the entirety of which is hereby incorporated by reference.

The ventilated cask 6600 is designed to accept the canister 6200. The ventilated cask 6600, in the exemplified embodiment, is in the style of a ventilated vertical overpack ("VVO") and comprises a cask body 6601 and a cask lid 6602. However, in other embodiments, the ventilated cask 6600 can take on a wide variety of structures, including any type of structure that is used to house the canister and provide adequate radiation shielding for the SNF loaded within the canister.

The ventilated cask 6600 generally comprises a cask body 6601 and a cask lid 6602 positioned atop the cask body 6601. The cask body 6601 comprises an outer surface 6603 and an inner surface 6604 that forms a storage cavity 6605 for receiving high level radioactive waste, which is in the exemplified embodiment is contained within the canister

6200. The cask lid is positioned atop the cask body 6601 to encloses a top end of the storage cavity 6605. In the exemplified embodiment, the cask body 6601 comprises an inner metal shell 6606 and an outer metal shell 6607 circumferentially surrounding the inner metal shell 6600 so that an annulus 6608 is formed therebetween. As discussed in greater detail below, the annulus 6608 is filled with concrete 6609 (or another gamma radiation absorbing material). The cask body 6601 further comprises a metal baseplate 6610 and an annular top plate 6611 that are connected to the bottom and top edges of the inner and outer metal shells 6606, 6607 respectively. In one embodiment, each of the inner metal shell 6606, the outer metal shell 6607, the metal baseplate 6610 and the annular top plate 6611 are formed of a steel, such as carbon steel or stainless steel.

The cask body 6600 is a rugged, heavy-walled cylindrical vessel. The main structural function of the cask body 6600 is provided by its steel components while the main radiation shielding function is provided by the annular concrete mass 6609. The plain concrete mass 6609 between the inner and outer metal steel shells 6606, 6607 is specified to provide the necessary shielding properties (dry density) and compressive strength for the ventilated storage system 61000. The principal function of the concrete mass 6609 is to provide shielding against gamma and neutron radiation.

The cask body 6602 extends along a longitudinal axis A-A from a bottom end 6614 to a top end 6615. In the exemplified embodiment, the longitudinal axis A-A is vertically oriented. The cask body has a vertical height $V_B$ measured from the bottom end 6614 to the top end 6615. The storage cavity 6605, in the exemplified embodiment, has a transverse cross-sectional that accommodates no more than one of the canister 6200. When the canister 6200 containing high level radioactive waste is positioned within the storage cavity 6605, an annular gap 6616 exists between an outer surface 6201 of the canister 6200 and the inner surface 6604 of the cask body 6601. As will be discussed in greater detail below, the annular gap 6616 forms a vertical annular passageway from the plurality of the inlet ducts to the outlet ducts so that natural convective cooling of the canister 6200 can be achieved.

The cask lid 6602 is a weldment of steel plates 6612 filled with a plain concrete mass 6613 that provides neutron and gamma attenuation to minimize skyshine. The cask lid 6602 is removably secured to the top end 6615 of the cask body 6601. When secured to the cask body 6601, surface contact between the cask lid 6602 and the cask body 6601 forms a lid-to-body interface. The cask lid 6601 is preferably non-fixedly secured to the cask body 6601 and encloses the top end of the storage cavity 6610 formed by the cask body 6601.

The ventilated cask 6600 further comprises a plurality of outlet ducts 6617 extending from a top 6618 of the storage cavity 6605 to an ambient atmosphere 6700. In the exemplified embodiment, the plurality of outlet ducts 6617 are formed in the cask lid 6602. However, in alternate embodiments, the plurality of outlet ducts 6617 can be formed in the cask body 6601. The plurality of outlet ducts 6617 allow heated air that rises within the annular gap 6616 and gather within the top 6618 of the storage cavity 6605 to exit the ventilates cask 6600.

Figure 64:
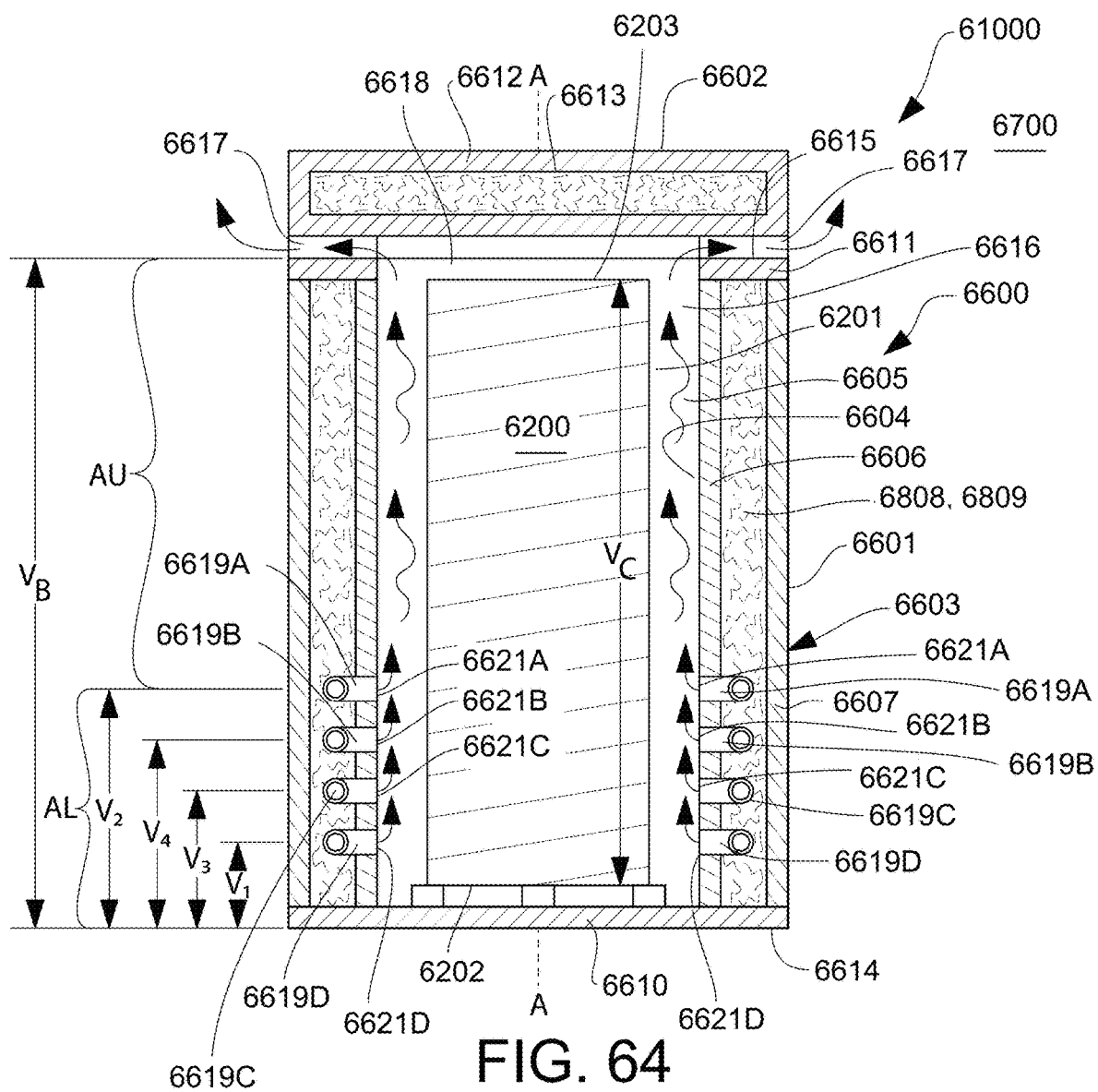
FIG. 64 is a schematic cross-sectional view of the ventilated system of FIG. 63.

The ventilated cask 6600 further comprises a plurality of inlet ducts 6619A-D. Each of the inlet ducts 6619A-D extend from a first opening 6620A-D in the outer surface 6603 of the cask body 6601 to a second opening 6621A-D in the inner surface 6604 of the cask body 6601. In the exemplified embodiment, the plurality of inlet ducts 6619A-D comprise an uppermost set of inlet ducts 6619A, a first middle set of inlet ducts 6619B, a second middle set of inlet ducts 6619C, and a lowermost set of inlet ducts 6619B. In certain other embodiments, more or less sets of inlet ducts can be used as desired. As shown in FIG. 64, the second openings 6621D of the lowermost set of air inlet ducts 6619D are located at a first vertical distance $V_1$ from the bottom end 6614 of the cask body 6601. The second openings 6621A of the uppermost set of air inlet ducts 6619A are located at a second vertical distance $V_2$ from the bottom end 6614 of the cask body 6601. The second openings 6621C of the first middle set of inlet ducts 6619C are at a third vertical distance $V_3$ from the bottom end 6614 of the cask body 6601. The second openings 6621B of the second middle set of inlet ducts 6619B are at a fourth vertical distance $V_4$ from the bottom end 6614 of the cask body 6601. The second vertical distance $V_2$ is greater than the first vertical distance $V_1$. The third vertical distance $V_3$ is greater than the first vertical distance $V_1$ and less than the second vertical distance $V_2$. The fourth vertical distance $V_4$ is greater than the third vertical distance $V_3$ and less than the second vertical distance $V_2$. In certain embodiments, the second vertical height $V_2$ is equal to or less than 50% of the vertical height $V_B$ of the cask body 6601. In another embodiment, the second height $V_2$ is greater than or equal to 20% of the vertical height $V_B$ of the cask body 6601. In still another embodiment, the second vertical height $V_2$ is in a range of 20% to 50% of the vertical height $V_B$ of the cask body 6601.

The plurality of inlet ducts 6619A-D are metal tubes that are located within the annulus 6608 and extend between the first openings 6620A-D, which are formed in the outer metal shell 6607, and the second openings 6621A-D, which are formed in the inner metal shell 6606. The remaining volume of the annulus 6608 is filled with concrete and, thus, the plurality of inlet ducts 6619A-D are embedded in the concrete 6609.

Each of the plurality of inlet ducts 6619A-D forms a tortuous path through the cask body 6601 such that a line of sight does not exist from the storage cavity 6605 to outside 6700 of the cask body 6601. Thus, radiation cannot escape through the inlet ducts 6619A-D despite being at the same height as the canister 6200. As can best be seen in FIG. 65, each of the plurality of inlet vents 6619A-D is independent and distinct from all other ones of the plurality of inlet vents 6619A-D along the entire length thereof.

The second openings 6621A-D of all of the sets of inlet ducts 6619A-D are circumferentially arranged about the longitudinal axis A-A of the cask body 6601 (which is also the longitudinal axis A-A of the storage cavity 6605) in an equi-spaced symmetric manner. Moreover, in the exemplified embodiment, the second openings 6621A-D of all of the sets of inlet ducts 6619A-D are also in vertical alignment each other in columns. In other embodiments, the second openings 6621A-D of all of the sets of inlet ducts 6619A-D can be vertically offset from set to set. In one embodiment, each of the sets of inlet ducts 6619A-D comprises at least six of the inlet ducts. In another embodiment, each of the sets of inlet ducts 6619A-D comprises at least eight of the inlet ducts. In other embodiments, each of the sets of inlet ducts 6619A-D may include more or less inlet ducts. Moreover, in one embodiment, the number of inlet ducts may vary between the sets of inlet ducts 6619A-D.

The lowermost set of inlet ducts 6619D collectively have a first effective cross-sectional area. The uppermost set of inlet ducts 6619A collectively have a second effective cross-sectional area. In one embodiment, the second effective cross-sectional area is greater than the first effective cross-sectional area. In other embodiments, the first middle set of inlet ducts 6619C collectively have a third effective cross-sectional area while the second middle set of inlet ducts 6619B collectively have a fourth effective cross-sectional area. In one embodiment, each of the third and fourth effective cross-sectional areas is greater than the first effective cross-sectional area. In another embodiment, each of the second, third and fourth effective cross-sectional areas are substantially equal to one another and greater than the first effective cross-sectional area The second openings 6621A-D of the plurality of inlet ducts 6619A-D are arranged in a pattern on the inner surface 6604 of the cask body 6601. As will be described in greater detail below, this pattern and the second vertical distance $V_2$ are selected to maintain more than 90% of the vertical height $V_C$ of the metal canister above a predetermined threshold temperature at a predetermined heat generation rate of the high level radioactive waste stored therein. The vertical height $V_C$ of the canister 6200 is measured from a bottom end 6202 of the canister 6200 to a top end 6203 of the canister 6200.

In the exemplified embodiment, the second openings 6621A-D are arranged in a pattern of horizontally aligned rows and vertically aligned columns. In certain other embodiments, however, the second openings 6621A-D are arranged in a pattern that does not include distinct sets of the second openings 6621A-D (or sets of the inlet ducts 6619A-D). In one such pattern, the second openings 6621A-D are arranged in a horizontally and vertically staggered manner.

The cask body 6601, in certain embodiments, can be conceptually divided into a lower axial section AL and an upper axial section AU. The lower axial section AL is defined from the bottom end 6614 of the cask body 6601 to the vertical height of an uppermost one of the second openings 6621A-D of the plurality of air inlet ducts 6619A-D. Thus, all of the second openings 6621A-D of the plurality of air inlet ducts 6619A-D will be located in the lower axial section AL. The upper axial section AU is defined from the top end 6615 of the cask body 6601 to the vertical height of the uppermost one of the second openings 6621A-D of the plurality air inlet ducts 6619A-D. Thus, the upper axial section AU is free of the second openings 6621A-D of the plurality of air inlet ducts 6619A-D.

In such an embodiment, the pattern of the second openings 6621A-D is configured and the vertical height of the uppermost one of the second openings 6621A-D is selected to maintain more than 90% of a vertical height of the metal canister 6200 above a predetermined threshold temperature for a predetermined heat generation rate of the high level radioactive waste. In another embodiment, the pattern of the second openings 6621A-D is configured and the vertical height of the uppermost one of the second openings 6621A-D is selected to maintain more than 95% of the vertical height of the metal canister 6200 above the predetermined threshold temperature for the predetermined heat generation rate of the high level radioactive waste. In even another embodiment, the pattern of the second openings 6621A-D is configured and the vertical height of the uppermost one of the second openings 6621A-D is selected to maintain more than 97% of the vertical height of the metal canister 6200 above the predetermined threshold temperature for the predetermined heat generation rate of the high level radioactive waste.

In one embodiment, the predetermined threshold temperature is the sum of an ambient air temperature outside of the ventilated cask 6600 and a positive temperature value. In one embodiment, the positive temperature value is equal to or greater than about 90 degrees Celsius to prevent SCC.

The ventilated system 61000 can further comprises a plurality of plugs detachably coupled to the cask to body 6601 to seal the plurality of inlet ducts 6619A-D to accommodate for decay of the heat generation rate of the high level radioactive waste.

As set forth above, the cask body 6601 comprises a large number of small circumferentially and vertically distributed inlet ducts 6619-A-D. The inlet ducts 6619A-D are sufficiently small and curved so that they don't permit radiation streaming. The inlet ducts 6619A-D are located in the bottom half of the cask body 6601 while the outlet duct(s) 6617 is/are located in the top region as of the ventilated cask 6600. The new configuration of the inlet ducts 6619A-D reduces the air flow in the bottom region of the storage cavity 6605, causing the metal surface temperature of the canister 6200 to become elevated. In addition, air isolator channels (AICs) can be used to shield the weld seams of the canister 6200 and the adjacent heat affected zones from the cooling action of flowing ventilation air. The AICs can be made of spring steel connected to the cask body 6601. The combined effect of the AICs and the distributed air inlets 6619-A-D is to elevate the surface temperature of the most SCC prone portions of the canister 6200 out of the vulnerable range ("the V-zone").

Finally, as the heat emission rate in the high level radioactive waste within the canister 6200 decreases, the small inlet ducts 6619A-D can be capped/sealed so that the canister surface 6201 temperature is maintained above the V-zone (i.e., above the predetermined threshold temperature). In cold conditions and after many years of decay, it is entirely conceivable that all inlet vents 6619A-B are capped, and even the outlet vent(s) 6617 are capped. After the need for ventilation no longer exists, it may be prudent to fill the annulus gap 6616 with inert gas (say, nitrogen) to permanently banish the specter of SCC and hermetically seal the storage cavity 6605.

Figure 65:
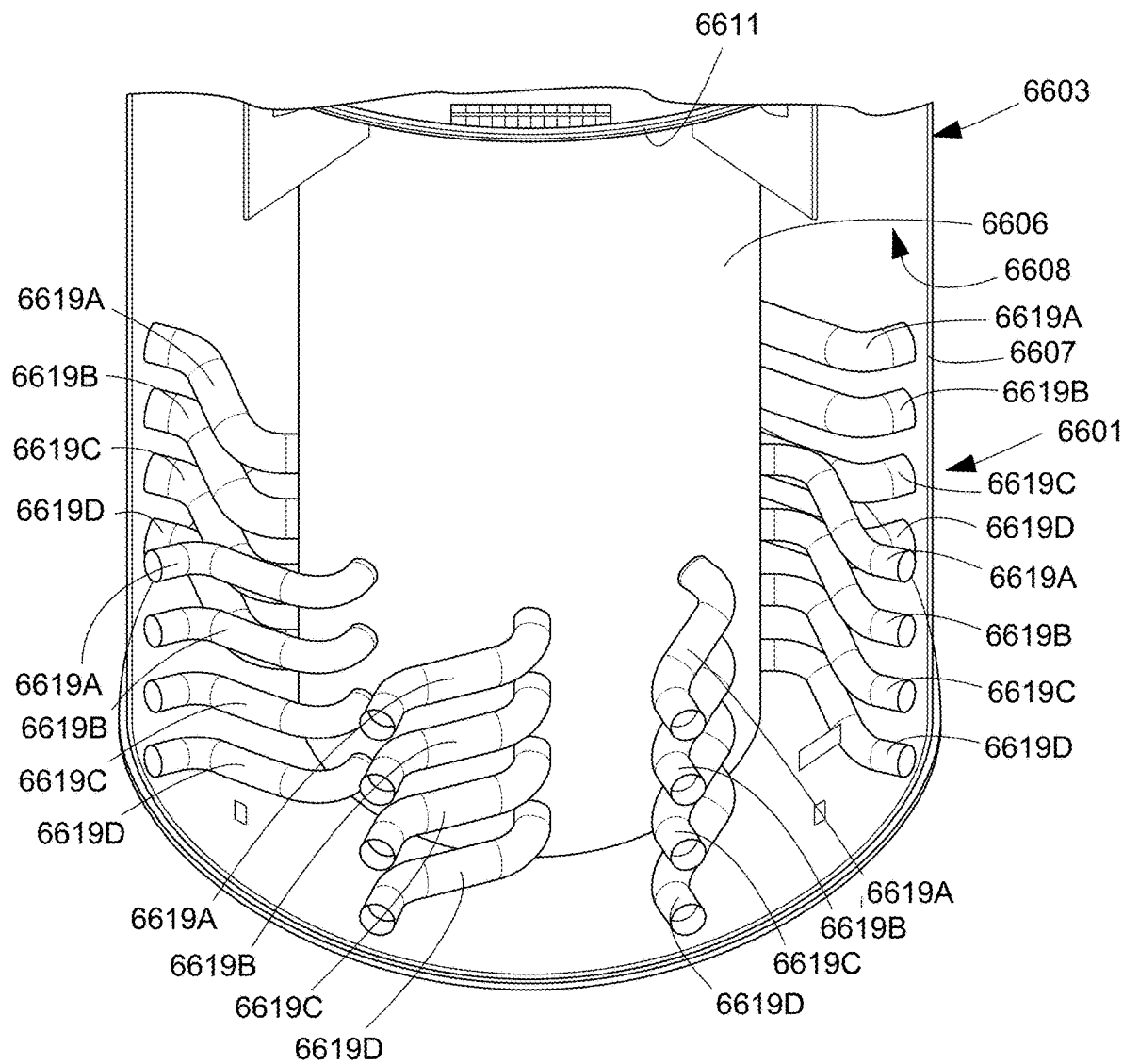
FIG. 65 is perspective view of the cask body of the ventilated system of FIG. 64 wherein a portion of the outer metal shell is cut-away and the concrete fill has been removed from the annulus to reveal the inlet ducts.
Figure 66:
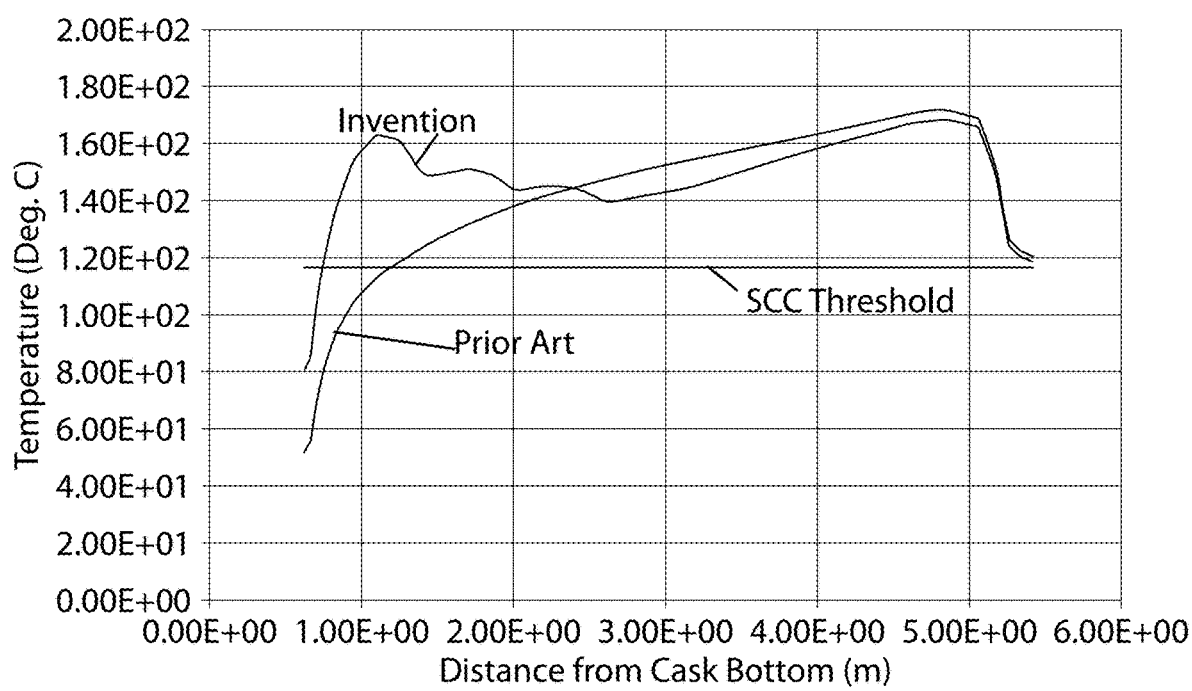
FIG. 66 is a comparative graph of the temperature of the outer surface of a canister as a function of distance from a bottom end of a cask body when stored in the ventilated system of the present invention as opposed to being stored in the prior art ventilated cask of FIG. 60.

To evaluate effectiveness of the enhanced design, the cask body 6601 is modified for a representative case wherein the bottom ducts area is distributed to inlet ducts placed at four elevations 0 ft, 4.8 ft, 6.8 ft and 8.8 ft in the ratio of 1:3:3:3. The modified cask body 6601 is analyzed using the FLUENT axisymmetric model at the same conditions as the prior art ventilated system of FIG. 60 (28.74 kW heat load and 26.6 deg. C. ambient temperature). The canister axial temperature profile is shown in FIG. 65 for the ventilation system 61000 of the present invention with the profile for the prior art ventilated system 1 superimposed for comparison purpose. The results show the following: (1) the present invention works as intended by raising the temperature of the cold bottom end of the canister substantially; (2) the distributed design of the inlets 6619A-D greatly diminishes the SCC prone length (the affected length is reduced from 10.4% to 2.4%); and (3) the maximum shell temperatures reached in the upper region of the canister 6200 are essentially identical (this provides reasonable assurance that fuel temperatures inside the canister 200 are not affected by the distributed design of the inlets ducts 6619A-D).

When the canister 6200 is loaded with SNF and positioned within the storage cavity 6605, heat generated by the SNF within the canister 6200 conducts to the outer surface 6201 of the canister 6200. This heat then warms the air located within the annular gap 6616. As a result of being heated, this warmed air rises within the annular gap 6616 and eventually exits the ventilated cask 6600 via the outlet ducts 6617 as heated air. Due to a thermosiphon effect created by the exiting heated air, cool air is drawn into the inlet ducts 6619A-D. This cool air flows through the inlet ducts 6619A-D and is the drawn upward into the annular gap 6616 where it becomes heated and begins to rise, thereby creating a continuous cycle, known as the chimney-effect. Thus, the heat generated by the SNF within the canister 6200 causes a natural convective flow of air through a ventilation passageway of the ventilated cask 6600. In the exemplified embodiment, the ventilation passageway is collectively formed by the inlet ducts 6619A-D, the annular gap 6616 and the outlet ducts 6617. In the exemplified embodiment, the ventilated cask 6600 is free of forced cooling equipment, such as blowers and closed-loop cooling systems. The rate of air flow through the ventilation passageway of the ventilated cask 6600 is governed, in part, by the heat generation rate of the SNF within the canister 6200 and the number of inlet ventilation ducts 6619A-D that are open.

In accordance with a method of the present invention, the metal canister 6200 containing high level radioactive waste having a heat generation rate is positioned in the storage cavity 6605. The cask lid 6602 is positioned atop the cask body 6601. As time passes, the heat generation rate of the high level radioactive waste decreases. Thus, in order to keep the outer surface 6201 of the canister above the desired SCC threshold, selected ones of the plurality of inlet ducts 6619A-B are sealed over time as a function of the decay of the heat generation rate to maintain a predetermined percentage of a vertical height of the metal canister 6200 above a predetermined threshold temperature. Sealing of selected ones of the plurality of inlet ducts 6619A-B reduces the natural convective flow rate of air through the storage cavity 6605. In one embodiment, a first set of the plurality of inlet ducts are sealed at a first point in time. In one example, the first set of the plurality of inlet ducts can be the lowermost ventilation ducts 6619D. As the heat generation rate of the high level radioactive waste continues to decrease, it will become necessary to further reduce the convective air flow through the ventilated cask 6600. Thus, at a second later point in time, a second set of the plurality of inlet ducts are sealed, which can be the second middle set of inlet ducts 6619C. In one embodiment, sealing of the inlet ducts continues and the inlet ducts 6619A-D are sealed in sets moving upward from the bottom end 6614 as time passes According to the present invention, it can be seen that utilizing a plurality of inlet vents 6619A-D that are decreased in size and spread out (as compared to prior art ventilated cask 1) so as to introduce cool air into the storage cavity 6605 over an increased height of the canister 6200 results in an increased portion of the outer surface 6201 of the canister 6200 remaining above the SCC threshold temperature for an increased period of time. Thus, the dangers associated with SCC are minimized.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of forming a sealed canister, the method comprising
   placing a top plate on a top opening of a side wall, a bottom of the side wall being sealed to a base plate, wherein the top plate includes a top surface with a top edge having a bevel and with a channel set in from the top edge;
   forming a weld between the beveled top edge and the top opening of the side wall to seal the top plate to the side wall;
   placing a first probe in the channel and a second probe opposite the first probe and adjacent the side wall, such that the weld is disposed between the two probes;
   activating the first and second probes to determine an integrity of a volume of the weld between the probes; and
   moving the first and second probes synchronously around the top plate to determine the integrity of an entire volume of the weld.

2. The method of claim 1, wherein the base plate, side wall, and top plate form a hermetically sealed vessel.

3. The method of claim 1, wherein the channel is approximately as deep as the bevel extends below the top surface.

4. The method of claim 1, wherein the channel is deeper than the bevel extends below the top surface.

5. The method of claim 1, wherein the bevel is formed as one of a J-cut or a half V-cut.

6. The method of claim 1, wherein the first and second probes comprise ultrasound probes.

7. A method of storing radioactive materials, the method comprising:
   placing radioactive materials in a cavity formed by a side wall having a bottom sealed to a base plate;
   placing a top plate on a top opening of the side wall, the top plate including a top surface with a top edge having a bevel and with a channel set in from the top edge;
   forming a weld between the beveled top edge and the top opening of the side wall to seal the top plate to the side wall, so that the cavity is sealed;
   placing a first probe in the channel and a second probe opposite the first probe and adjacent the side wall, such that the weld is disposed between the two probes;
   activating the first and second probes to determine an integrity of a volume of the weld between the probes; and
   moving the first and second probes synchronously around the top plate to determine the integrity of an entire volume of the weld.

8. The method of claim 7, wherein the channel is approximately as deep as the bevel extends below the top surface.

9. The method of claim 7, wherein the channel is deeper than the bevel extends below the top surface.

10. The method of claim 7, wherein the bevel is formed as one of a J-cut or a half V-cut.

11. The method of claim 7, wherein the cavity is hermetically by the formed weld.

* * * * *